US010053166B2

(12) United States Patent
Moriguchi et al.

(10) Patent No.: US 10,053,166 B2
(45) Date of Patent: Aug. 21, 2018

(54) TRAVELING VEHICLE

(71) Applicant: YANMAR CO., LTD., Osaka-shi, Osaka (JP)

(72) Inventors: Kazuma Moriguchi, Osaka (JP); Hidekazu Niu, Osaka (JP); Hideaki Aoki, Osaka (JP)

(73) Assignee: YANMAR CO., LTD., Osaka-Shi, Osaka (JP)

( * ) Notice: Subject to any disclaimer, the term of this patent is extended or adjusted under 35 U.S.C. 154(b) by 0 days.

(21) Appl. No.: 15/307,272

(22) PCT Filed: Apr. 22, 2015

(86) PCT No.: PCT/JP2015/062293
§ 371 (c)(1),
(2) Date: Oct. 27, 2016

(87) PCT Pub. No.: WO2015/166866
PCT Pub. Date: Nov. 5, 2015

(65) Prior Publication Data
US 2017/0043818 A1    Feb. 16, 2017

(30) Foreign Application Priority Data

Apr. 28, 2014   (JP) ................................ 2014-092252
Apr. 28, 2014   (JP) ................................ 2014-092253
(Continued)

(51) Int. Cl.
    B62D 55/065     (2006.01)
    B62K 25/20     (2006.01)
(Continued)

(52) U.S. Cl.
    CPC ............. B62D 55/065 (2013.01); B60G 5/00 (2013.01); B62D 55/104 (2013.01); B62K 25/20 (2013.01);
(Continued)

(58) Field of Classification Search
    CPC .... B62D 55/065; B62D 55/104; B62D 21/02; B60G 5/00; B62K 25/24; B62K 25/26; B62K 25/20
(Continued)

(56) References Cited

U.S. PATENT DOCUMENTS 2,954,833 A    10/1960    Davidson
5,390,752 A    2/1995    Urbanczyk
(Continued)

FOREIGN PATENT DOCUMENTS

CN      2105421 U    5/1992
JP      50-046620 U    5/1975
(Continued)

OTHER PUBLICATIONS

Canadian Notice of Allowance for Canadian Application No. 2,946,369, dated Aug. 4, 2017.
(Continued)

*Primary Examiner* — Jacob D Knutson
(74) *Attorney, Agent, or Firm* — Birch, Stewart, Kolasch & Birch, LLP

(57) ABSTRACT

A traveling vehicle includes: a vehicle body frame, a pair of right and left front crawler traveling devices, a pair of right and left rear crawler traveling devices, a front suspension device that suspends the pair of right and left front crawler traveling devices on the vehicle body frame, and a rear suspension device that suspends the pair of right and left rear crawler traveling devices on the vehicle body frame. The front suspension device integrally suspends the pair of right
(Continued)

and left front crawler traveling devices on the vehicle body frame and allows the pair of right and left front crawler traveling devices to be swingable in the vertical direction with respect to the vehicle body frame.

10 Claims, 56 Drawing Sheets

(30) Foreign Application Priority Data

Sep. 29, 2014 (JP) ................................. 2014-199464
Sep. 29, 2014 (JP) ................................. 2014-199465

(51) Int. Cl.
| | |
|---|---|
| *B62K 25/24* | (2006.01) |
| *B62K 25/26* | (2006.01) |
| *B60G 5/00* | (2006.01) |
| *B62D 55/104* | (2006.01) |
| *B62D 21/02* | (2006.01) |

(52) U.S. Cl.
CPC .............. *B62K 25/24* (2013.01); *B62K 25/26* (2013.01); *B62D 21/02* (2013.01)

(58) Field of Classification Search
USPC ......................................................... 180/9.6
See application file for complete search history.

(56) References Cited

U.S. PATENT DOCUMENTS

| | | | | |
|---|---|---|---|---|
| 7,017,688 B2* | 3/2006 | Bowers | ................... | B60G 5/00 |
| | | | | 180/9.5 |
| 7,614,465 B2* | 11/2009 | Brindle | ................. | B62D 55/10 |
| | | | | 180/9.1 |
| 7,690,738 B2* | 4/2010 | Wilt | ..................... | B62D 55/065 |
| | | | | 305/130 |
| 2005/0103547 A1* | 5/2005 | Mallette | ................. | B62M 27/02 |
| | | | | 180/190 |
| 2010/0276990 A1* | 11/2010 | Zuchoski | ............. | B62D 55/065 |
| | | | | 305/130 |
| 2010/0294164 A1* | 11/2010 | Oku | ........................ | B61D 13/00 |
| | | | | 105/182.1 |
| 2014/0138169 A1* | 5/2014 | Fairhead | ................ | B62K 3/002 |
| | | | | 180/9.5 |
| 2015/0101872 A1* | 4/2015 | Girouard | ................. | F16D 55/22 |
| | | | | 180/9.42 |

FOREIGN PATENT DOCUMENTS

| | | |
|---|---|---|
| JP | 54-018537 A | 2/1979 |
| JP | 58-5834 B2 | 2/1983 |
| JP | 1-154982 U | 10/1989 |
| JP | 5-77618 A | 3/1993 |
| JP | 9-123953 A | 5/1997 |
| JP | 11-291960 A | 10/1999 |
| JP | 2000-335457 A | 12/2000 |
| JP | 3161882 U | 8/2010 |
| JP | 2012-51385 A | 3/2012 |
| JP | 2014-133488 A | 7/2014 |
| RU | 2305045 C1 | 8/2007 |

OTHER PUBLICATIONS

Extended European Search Report for European Application No. 15786590.8, dated Jan. 15, 2018.
Japanese Office Action for Japanese Application No. 2014-199464, dated Feb. 13, 2018.
Russian Decision to Grant for Russian Application No. 2016143244, dated Jan. 31, 2018, with English translation.
Chinese Office Action and Search Report, dated May 3, 2018, for Chinese Application No. 201580022969.1.

* cited by examiner

TRAVELING VEHICLE

TECHNICAL FIELD

The present invention relates to a traveling vehicle. More specifically, the invention relates to a traveling vehicle including a vehicle body frame, at least a pair of right and left traveling devices, and a suspension device that suspends the pair of right and left traveling devices on the vehicle body frame.

BACKGROUND ART

Recently, a crawler type traveling device capable of realizing a stable traveling operation is used in a working vehicle traveling on a soft ground or an irregular ground such as a slope. Then, there is known a technology that improves ground contact performance of a crawler traveling device by connecting a pair of right and left crawler traveling devices to each other through an equalizer bar and suspending the equalizer bar on the vehicle body frame to be rotatable about the longitudinal direction serving as an axis so that the crawler traveling device moves to follow a slope of a ground in the horizontal direction (for example, Patent Literature 1). Further, there is known a technology in which a lower portion of a chassis frame turnably equipped with an upper turning body including a working tool and a cab is provided with four telescopic arm each having a travel crawler traveling device provided at a lower end thereof and four telescopic arms move in a telescopic manner to follow an unevenness portion of an irregular ground so that the upper turning body is kept horizontally (for example, Patent Literature 2).

CITATION LIST

Patent Literature

Patent Literature 1: JP H11-291960 A
Patent Literature 2: JP 2000-335457 A

SUMMARY OF INVENTION

Technical Problem

However, in Patent Literature 1, the ground contact performance of the crawler traveling device is not sufficient when the vehicle travels on the slope, the possibility of causing a risk such as a sideslip and an overturn is high, and the operability or the traveling performance may be degraded in some cases. Further, in Patent Literature 2, since four telescopic arms are moved in a telescopic manner to follow the unevenness portion of the irregular ground, the operation is complicated. Further, since the crawler traveling device slowly follows the unevenness portion of the irregular ground, the operability or the traveling performance may be degraded.

Here, an object of the invention is to provide a traveling vehicle capable of realizing a stable traveling operation on an irregular ground with an unevenness portion or a slope and improving traveling performance.

Solution to Problem

Accordingly, a traveling vehicle of the present invention includes: a vehicle body frame; a pair of right and left front crawler traveling devices; a pair of right and left rear crawler traveling devices; a front suspension device that suspends the pair of right and left front crawler traveling devices on the vehicle body frame; and a rear suspension device that suspends the pair of right and left rear crawler traveling devices on the vehicle body frame, wherein the front suspension device integrally suspends the pair of right and left front crawler traveling devices on the vehicle body frame and allows the pair of right and left front crawler traveling devices to be swingable or elevatable in the vertical direction with respect to the vehicle body frame.

Further, the front suspension device includes: a swing support portion that is supported by the vehicle body frame to be swingable in the vertical direction about the horizontal direction serving as an axis, a rotation arm that extends in the horizontal direction and is supported by the swing support portion to be rotatable at the center of the rotation arm in the horizontal direction, a right swing arm that is supported by the vehicle body frame to be swingable in the vertical direction about the horizontal direction serving as an axis and has an end connected to the right front crawler traveling device, a left swing arm that is supported by the vehicle body frame to be swingable in the vertical direction about the horizontal direction serving as an axis and has an end connected to the left front crawler traveling device, a right connection arm that has one end connected to a right end of the rotation arm and the other end connected to the right swing arm, and a left connection arm that has one end connected to a left end of the rotation arm and the other end connected to the left swing arm, and wherein the traveling vehicle further includes a cushion mechanism that is provided between the vehicle body frame and the swing support portion.

Further, the front suspension device includes: a bogie frame that is supported by the vehicle body frame to be rotatable about a steering shaft serving as an axis and provided in the vertical direction, and a pair of right and left connection mechanisms that respectively connects the pair of right and left front crawler traveling devices to right and left sides of the bogie frame, and wherein the pair of right and left connection mechanisms allows the pair of right and left front crawler traveling devices to be elevatable in the direction of the steering shaft.

Further, the front suspension device includes: a bogie frame that is supported by the vehicle body frame to be rotatable about a steering shaft serving as an axis and provided in the vertical direction, a pair of right and left connection mechanisms that respectively connects the pair of right and left front crawler traveling devices to right and left sides of the bogie frame to be elevatable in the direction of the steering shaft, and an elevation device that elevates the front crawler traveling device.

Further, the front suspension device includes: a rotation arm that extends in the horizontal direction and is supported by the vehicle body frame to be rotatable at the center of the rotation arm in the horizontal direction, a right swing arm that is supported by the vehicle body frame to be swingable in the vertical direction about the horizontal direction serving as an axis and has an end connected to the right front crawler traveling device, a left swing arm that is supported by the vehicle body frame to be swingable in the vertical direction about the horizontal direction serving as an axis and has an end connected to the left front crawler traveling device, a right connection arm that has one end connected to a right end of the rotation arm and the other end connected to the right swing arm, and a left connection arm that has one end connected to a left end of the rotation arm and the other end connected to the left swing arm.

Advantageous Effects of Invention

According to the traveling vehicle of the invention, since the traveling vehicle includes: a vehicle body frame, a pair of right and left front crawler traveling devices, a pair of right and left rear crawler traveling devices, a front suspension device that suspends the pair of right and left front crawler traveling devices on the vehicle body frame, and a rear suspension device that suspends the pair of right and left rear crawler traveling devices on the vehicle body frame and the front suspension device integrally suspends the pair of right and left front crawler traveling devices on the vehicle body frame and allows the pair of right and left front crawler traveling devices to be swingable or elevatable in the vertical direction with respect to the vehicle body frame, it is possible to provide a traveling vehicle which can stably travel on an irregular ground with an unevenness portion or a slope and has improved traveling performance. Further, a configuration is simple, the number of components is decreased, and the productivity or the maintenance workability is satisfactory.

Furthermore, the front suspension device includes: a swing support portion that is supported by the vehicle body frame to be swingable in the vertical direction about the horizontal direction serving as an axis, a rotation arm that extends in the horizontal direction and is supported by the swing support portion to be rotatable at the center of the rotation arm in the horizontal direction, a right swing arm that is supported by the vehicle body frame to be swingable in the vertical direction about the horizontal direction serving as an axis and has an end connected to the right front crawler traveling device, a left swing arm that is supported by the vehicle body frame to be swingable in the vertical direction about the horizontal direction serving as an axis and has an end connected to the left front crawler traveling device, a right connection arm that has one end connected to a right end of the rotation arm and the other end connected to the right swing arm, and a left connection arm that has one end connected to a left end of the rotation arm and the other end connected to the left swing arm, and wherein the traveling vehicle further includes a cushion mechanism that is provided between the vehicle body frame and the swing support portion. According to this configuration, since the right and left front crawler traveling devices promptly follow an inclination of a slope or a change in an unevenness portion of an irregular ground in the vertical direction, the traveling performance, the operability, or the riding comfort on the irregular ground with an unevenness portion is improved. Further, since it is possible to reduce a sideslip of the right and left front crawler traveling devices when the vehicle travels on the slope, the traveling performance when the vehicle travels on the slope is improved. Further, since it is possible to suppress an impact among the vehicle body frame, the right front crawler traveling device, and the left front crawler traveling device, the right front crawler traveling device and the left front crawler traveling device stably contact a ground and thus the traveling performance or the riding comfort is improved. Thus, it is possible to provide a traveling vehicle which can stably travel on an irregular ground with an unevenness portion or a slope and has improved traveling performance.

Furthermore, the front suspension device includes: a bogie frame that is supported by the vehicle body frame to be rotatable about a steering shaft serving as an axis and provided in the vertical direction and a pair of right and left connection mechanisms that respectively connects the pair of right and left front crawler traveling devices to right and left sides of the bogie frame and the pair of right and left connection mechanisms allows the pair of right and left front crawler traveling devices to be elevatable in the direction of the steering shaft. According to this configuration, the traveling performance for an irregular ground with an unevenness portion is satisfactory. Further, since it is possible to reduce a sideslip of the right and left front crawler traveling devices when the vehicle travels across the slope, the traveling performance when the vehicle travels across the slope is improved. Further, since it is possible to easily perform a turning traveling operation on an irregular ground with an unevenness portion or a slope, the traveling performance is improved. Further, since it is possible to shorten the entire length of the vehicle, the traveling performance is further improved. Thus, it is possible to provide a traveling vehicle which can stably travel on an irregular ground with an unevenness portion or a slope and has improved traveling performance.

Furthermore, the front suspension device includes: a bogie frame that is supported by the vehicle body frame to be rotatable about a steering shaft serving as an axis and provided in the vertical direction, a pair of right and left connection mechanisms that respectively connects the pair of right and left front crawler traveling devices to right and left sides of the bogie frame to be elevatable in the direction of the steering shaft, and an elevation device that elevates the front crawler traveling device. According to this configuration, the traveling performance for an irregular ground with an unevenness portion is satisfactory. Further, since it is possible to reduce a sideslip of the right and left front crawler traveling devices when the vehicle travels across the slope, the traveling performance when the vehicle travels across the slope is improved. Further, since it is possible to easily perform a turning traveling operation on an irregular ground with an unevenness portion or a slope, the traveling performance is improved. Further, since it is possible to elevate the right and left front crawler traveling devices to follow an inclination of a slope or an unevenness portion of an irregular ground, the traveling performance is further improved. Thus, it is possible to provide a traveling vehicle which performs a stable traveling operation on an irregular ground with an unevenness portion or a slope and has improved traveling performance.

Furthermore, the front suspension device includes: a rotation arm that extends in the horizontal direction and is supported by the vehicle body frame to be rotatable at the center of the rotation arm in the horizontal direction, a right swing arm that is supported by the vehicle body frame to be swingable in the vertical direction about the horizontal direction serving as an axis and has an end connected to the right front crawler traveling device, a left swing arm that is supported by the vehicle body frame to be swingable in the vertical direction about the horizontal direction serving as an axis and has an end connected to the left front crawler traveling device, a right connection arm that has one end connected to a right end of the rotation arm and the other end connected to the right swing arm, and a left connection arm that has one end connected to a left end of the rotation arm and the other end connected to the left swing arm. According to this configuration, since the right and left front crawler traveling devices promptly follow an inclination of a slope or a change in an unevenness portion of an irregular ground in the vertical direction, the traveling performance, the operability, or the riding comfort on the irregular ground with the unevenness portion is improved. Further, since it is possible to reduce a sideslip of the right and left front crawler traveling devices when the vehicle travels on a slope, the traveling performance when the vehicle travels on the slope is improved. Thus, it is possible to provide a traveling vehicle which can stably perform a traveling operation on an irregular ground with an unevenness portion or a slope and has improved traveling performance.

BRIEF DESCRIPTION OF DRAWINGS

FIG. 39A illustrates a state where a link mechanism of FIG. 38 is lengthened and FIG. 39B illustrates a state where the link mechanism of FIG. 38 is shortened.

FIG. 49A illustrates a state where a link mechanism of FIG. 48 is lengthened and FIG. 49B illustrates a state where the link mechanism of FIG. 48 is shortened.

DESCRIPTION OF EMBODIMENTS

Figure 1:
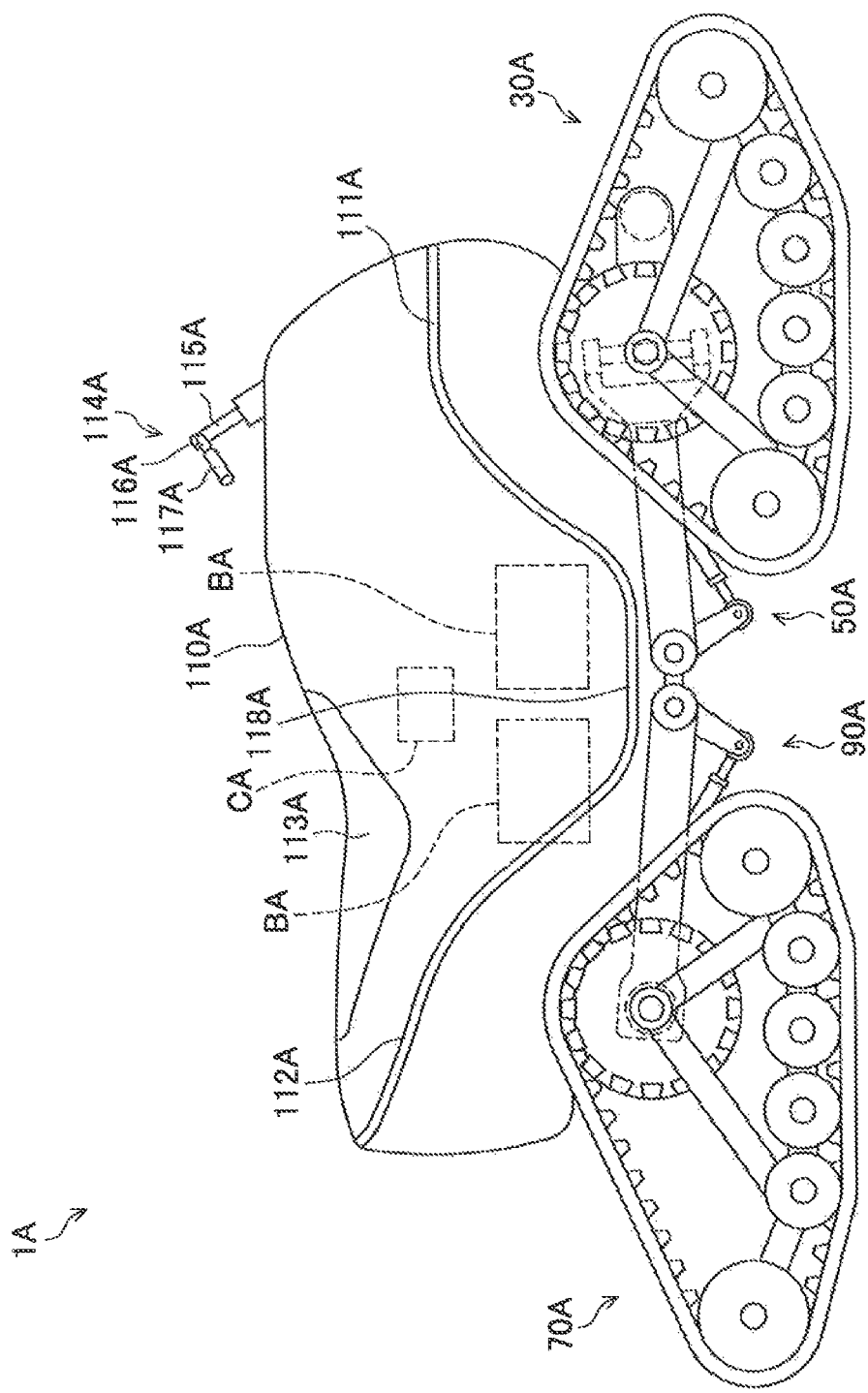
FIG. 1 is a right side view illustrating a traveling vehicle which is an example of an embodiment of the invention.
Figure 2:
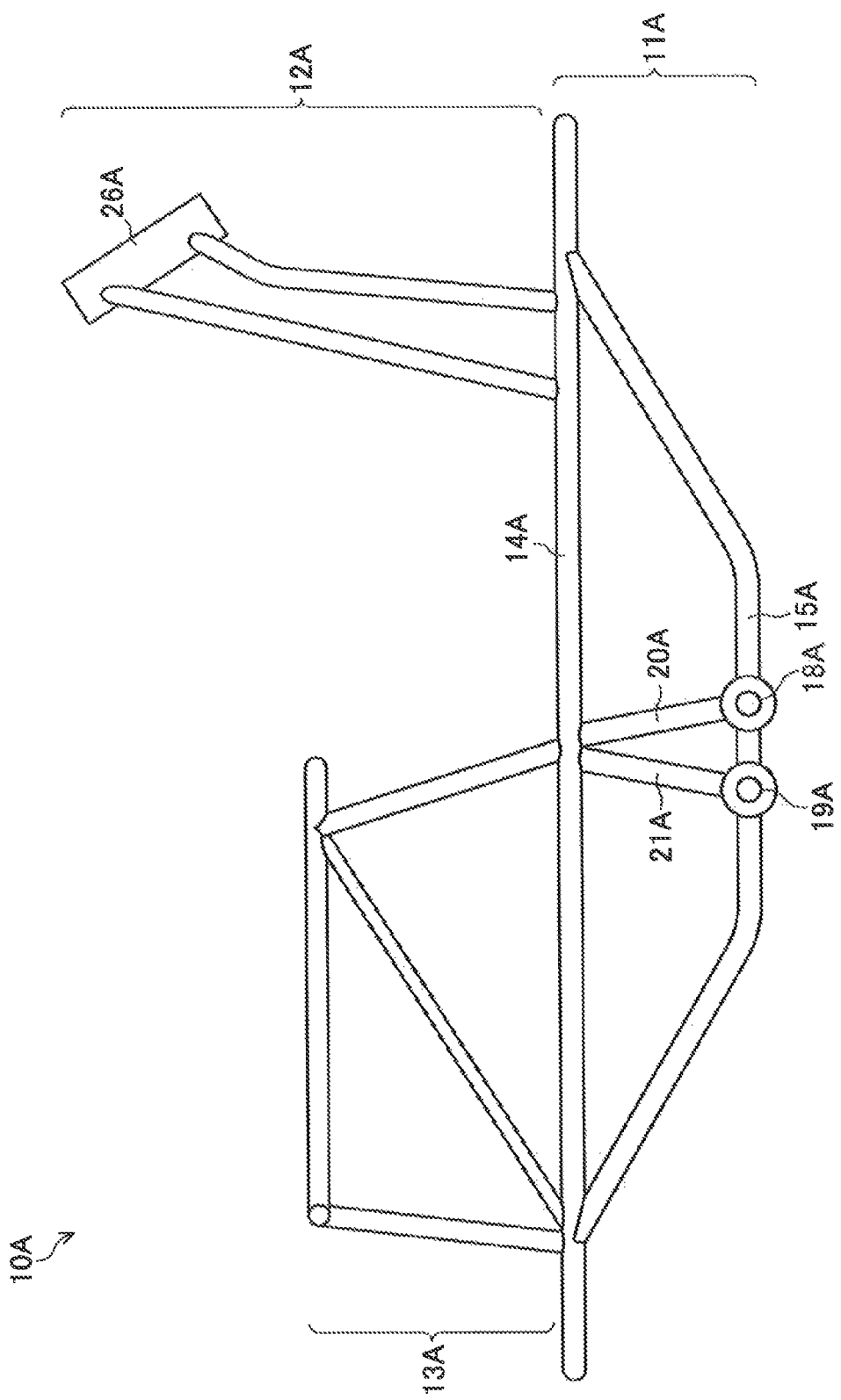
FIG. 2 is a right side view illustrating a vehicle body frame.
Figure 3:
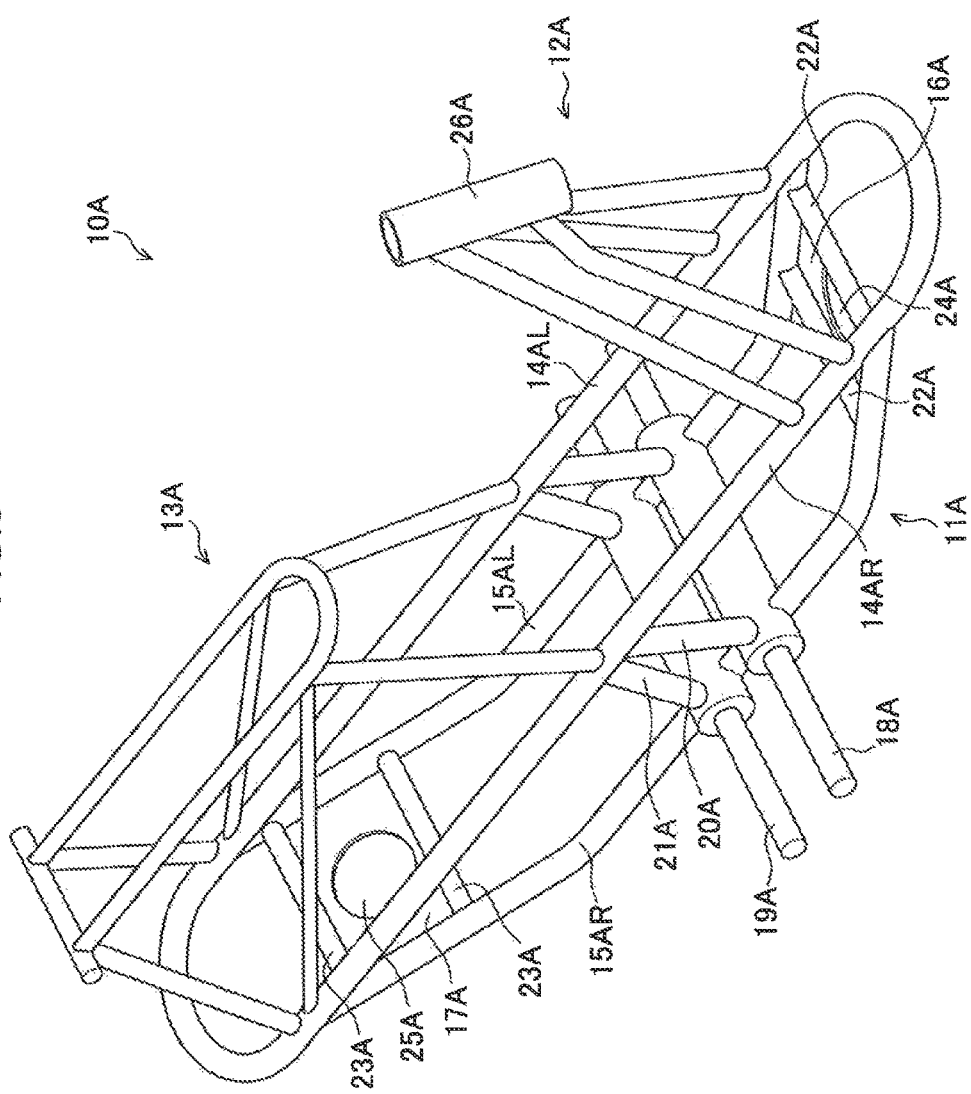
FIG. 3 is a perspective view illustrating the vehicle body frame.

A traveling vehicle according to the invention includes a vehicle body frame, at least a pair of right and left traveling devices, and a suspension device that suspends the pair of right and left traveling devices on the vehicle body frame and the suspension device integrally suspends the pair of right and left traveling devices on the vehicle body frame and allows the pair of right and left traveling devices to be swingable or elevatable with respect to the vehicle body frame. The traveling vehicle according to the invention having such a feature can be realized by several embodiments. Hereinafter, embodiments of the invention will be exemplified with reference to the drawings and a detailed description thereof will be made. Additionally, in the specification, the "front" indicates a forward movement direction of a traveling vehicle, the "rear" indicates a backward movement direction, the "right and left" indicates the "right and left" in the forward movement direction, and the "up and down" indicates the "up and down" of the traveling vehicle. FIG. 1 is a right side view illustrating a traveling vehicle 1A which is an example of an embodiment of the invention. FIG. 2 is a right side view illustrating a vehicle body frame 10A. FIG. 3 is a perspective view illustrating the vehicle body frame 10A when viewed from the forward-diagonally upside.

As illustrated in FIGS. 1 to 3, a traveling vehicle 1A includes a vehicle body frame 10A, front crawler traveling devices 30A which serve as a pair of right and left traveling devices provided at a front portion, a front suspension device 50A which suspends the pair of right and left front crawler traveling devices 30A on the vehicle body frame 10A, rear crawler traveling devices 70A which serve as a pair of right and left traveling devices provided at a rear portion, and a rear suspension device 90A which suspends the pair of right and left rear crawler traveling devices 70A on the vehicle body frame 10A. Further, the traveling vehicle 1A also includes a battery BA which stores electricity, a controller CA which includes a calculation unit and a storage unit and controls devices inside the vehicle body frame 10A.

The upside of the vehicle body frame 10A is covered by a main body cover 110A. The main body cover 110A covers the vehicle body frame 10A. The main body cover 110A includes front fenders 111A which is provided above the front crawler traveling devices 30A and rear fenders 112A which is provided above the rear crawler traveling devices 70A. A driver seat 113A is provided between the front crawler traveling device 30A and the rear crawler traveling device 70A. The driver seat 113A is attached to the vehicle body frame 10A.

A handle 114A for operating a traveling operation of the traveling vehicle 1A is provided at the front side of the driver seat 113A. The handle 114A includes a steering shaft 115A, a handle bar 116A which is provided at an upper end of the steering shaft 115A to protrude outward in the horizontal direction, and an accelerator grip 117A which serves as an accelerator provided at one end of the handle bar 116A.

The steering shaft 115A is supported by the vehicle body frame 10A to be rotatable. A lower end of the steering shaft 115A is provided with a handle sensor (not illustrated) detecting a rotation angle of the steering shaft 115A.

The accelerator grip 117A is supported by the handle bar 116A to be rotatable. The accelerator grip 117A includes an accelerator grip sensor (not illustrated) detecting a rotation angle of the accelerator grip 117A.

Right and left step floors 118A are provided below the driver seat 113A. The traveling vehicle 1A is a saddle type traveling vehicle. An occupant sits on the driver seat 113A while feet are placed on the right and left step floors 118A.

Next, the vehicle body frame 10A will be described. Additionally, since the vehicle body frame 10A has a horizontal symmetrical shape, a right component will be appropriately indicated by a reference sign R and a left component will be appropriately indicated by a reference sign L if necessary.

As illustrated in FIGS. 2 and 3, the vehicle body frame 10A is obtained by connecting a plurality of steel members through welding or the like. The steel member is a cylindrical pipe or a plate-shaped plate. The vehicle body frame 10A includes a base frame portion 11A which extends in the longitudinal direction and has a bottom portion formed in a ship bottom shape, a front frame portion 12A which extends upward from a front portion of the base frame portion 11A, a rear frame portion 13A which extends upward from a rear portion of the base frame portion 11A, and the like.

The base frame portion 11A forms a main part of the vehicle body frame 10A and is used to attach the front suspension device 50A, the rear suspension device 90A, and the like to be described later. The base frame portion 11A includes a pair of right and left main frames 14A (14AR, 14AL) which extends forward and backward, a pair of right and left lower frames 15A (15AR, 15AL), a front support plate 16A which is formed in a plate shape and is used to attach a part of the front suspension device 50A to be described later, a rear support plate 17A which is formed in a plate shape and is used to attach apart of the rear suspension device 90A to be described later, a plurality of reinforcement frames 20A, 21A, 22A, and 23A, and the like.

The front ends of the right and left main frames 14AR and 14AL are curved inward in the width direction of the traveling vehicle 1A so that the front ends are connected to each other. Further, the rear ends of the right and left main frames 14AR and 14AL are curved inward so that the rear ends are connected to each other.

The right and left lower frames 15AR and 15AL are respectively located below the right and left main frames 14AR and 14AL, are respectively parallel to the right and left main frames 14AR and 14AL, and are provided to extend in the longitudinal direction. Both ends of the right and left lower frames 15AR and 15AL are respectively inclined upward and are respectively connected to the right and left main frames 14AR and 14AL.

Two rotation shafts 18A and 19A which extend in the horizontal direction are disposed between the center portions of the right and left lower frames 15AR and 15AL. The rotation shafts 18A and 19A are located in parallel to be separated from each other by a predetermined gap in the longitudinal direction and both ends thereof protrude toward the outside of the lower frames 15AR and 15AL. Then, the rotation shafts 18A and 19A are respectively used to connect the front suspension device 50A and the rear suspension device 90A to the vehicle body frame 10A.

Additionally, the rotation shafts 18A and 19A between the right and left lower frames 15AR and 15AL are formed to have diameters larger than that of, for example, the main frame 14A or the lower frame 15A. Thus, the rotation shafts 18A and 19A improve the rigidity of the vehicle body frame 10A by rigidly connecting the right and left lower frames 15AR and 15AL.

Two reinforcement frames 20A and 21A are respectively formed between the right main frame 14AR and the right lower frame 15AR and between the left main frame 14AL and the left lower frame 15AL. More specifically, the reinforcement frame 20A extends upward and backward from the vicinity of the connection portion of the rotation shaft 18A with respect to the lower frame 14A and is connected to the substantial center of the main frame 14A in the longitudinal direction. The reinforcement frame 21A extends upward and forward from the vicinity of the connection portion of the rotation shaft 19A with respect to the lower frame 15A and is connected to the substantial center of the main frame 14A in the longitudinal direction. Then, the strength in the vicinity of the arrangement position of the rotation shafts 18A and 19A is improved by the reinforcement frames 20A and 21A.

Additionally, the base frame portion 11A has a longitudinal symmetrical shape. Then, two rotation shafts 18A and 19A are disposed at a longitudinal symmetrical position. Further, the base frame portion 11A is provided with a structure similar to a truss structure formed by the main frame 14A, the lower frame 15A, and the reinforcement frames 20A and 21A in the side view. Thus, the base frame portion 11A has a high strength since the vicinity of the rotation shafts 18A and 19A is effectively reinforced and strength is equalized.

The front support plate 16A is a rectangular plate-shaped member, includes a through-hole 24A formed at a center, and is disposed at a front slope between the right and left lower frames 15AR and 15AL. Both right and left ends of the front support plate 16A are respectively connected to the right and left lower frames 15AR and 15AL. Both front and rear ends of the front support plate 16A are provided with the reinforcement frame 22A which extends along the end to be connected to the right and left lower frames 15AR and 15AL. Then, a part of the front suspension device 50A to be described later is attached to the front support plate 16A.

The rear support plate 17A is similar to the front support plate 16A and is disposed at a longitudinal symmetrical position while having a different arrangement. The rear support plate 17A is a rectangular plate-shaped member, includes a through-hole 25A formed at a center, and is disposed at a rear slope between the right and left lower frames 15AR and 15AL. Both right and left ends of the rear support plate 17A are respectively connected to the right and left lower frames 15AR and 15AL. Both front and rear ends of the rear support plate 17A are provided with the reinforcement frame 23A which extends along the end to be connected to the right and left lower frames 15AR and 15AL. Then, a part of the rear suspension device 90A to be described later is attached to the rear support plate 17A.

The front frame portion 12A is formed by a plurality of cylindrical steel members and has a substantially rectangular shape extending upward in the side view. The front frame portion 12A is used to rotatably support the handle 114A (not illustrated). A head pipe 26A is provided at an upper portion of the front frame portion 12A. The head pipe 26A is a cylindrical pipe having an opening formed at both ends thereof and is disposed so that a front portion is low and a rear portion is high. Additionally, the head pipe 26A is located at the center of the vehicle body frame 10A in the horizontal direction. Then, the steering shaft 115A is inserted through the head pipe 26A from above so that the handle 114A is supported to be rotatable.

The rear frame portion 13A is formed by a plurality of cylindrical steel members and has a substantially cuboid shape. The driver seat 113A (not illustrated) is attached to an upper portion of the rear frame portion 13A. Further, various devices such as the battery BA (not illustrated) are accommodated inside the rear frame portion 13A.

Additionally, the vehicle body frame 10A is not limited to the above-described configuration. The vehicle body frame 10A may be used to attach the front suspension device 50A and a rear suspension device 90B thereto and have a sufficient rigidity for the traveling vehicle. For example, the vehicle body frame 10A may be formed by a hollow square column member or a steel member having an L-shaped or H-shaped cross-section instead of the cylindrical pipe. Further, a configuration may be employed in which the plate-shaped member is stretched across the frame in order to improve the strength or to place various devices.

Figure 4:
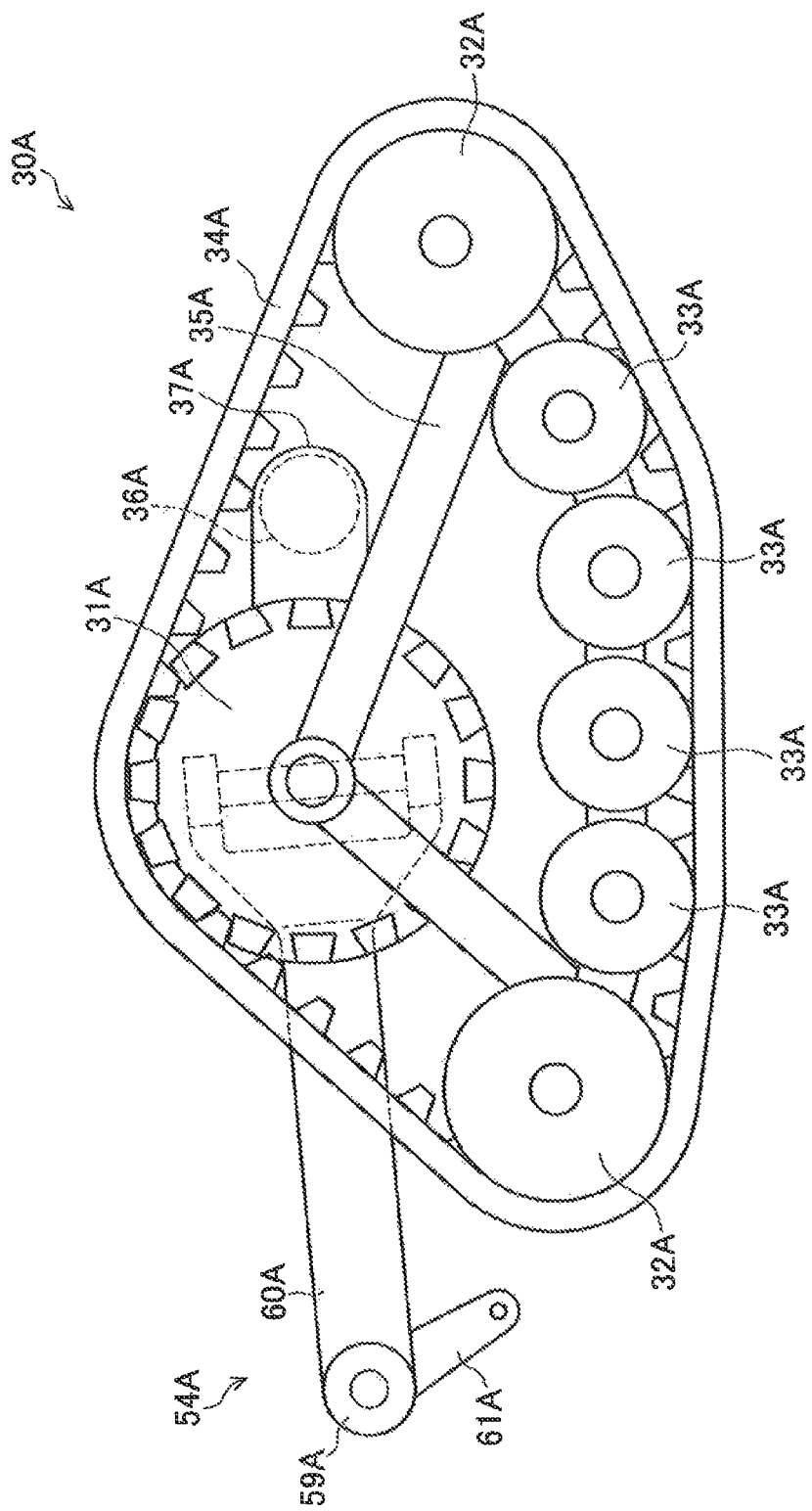
FIG. 4 is a right side view illustrating a front crawler traveling device.
Figure 5:
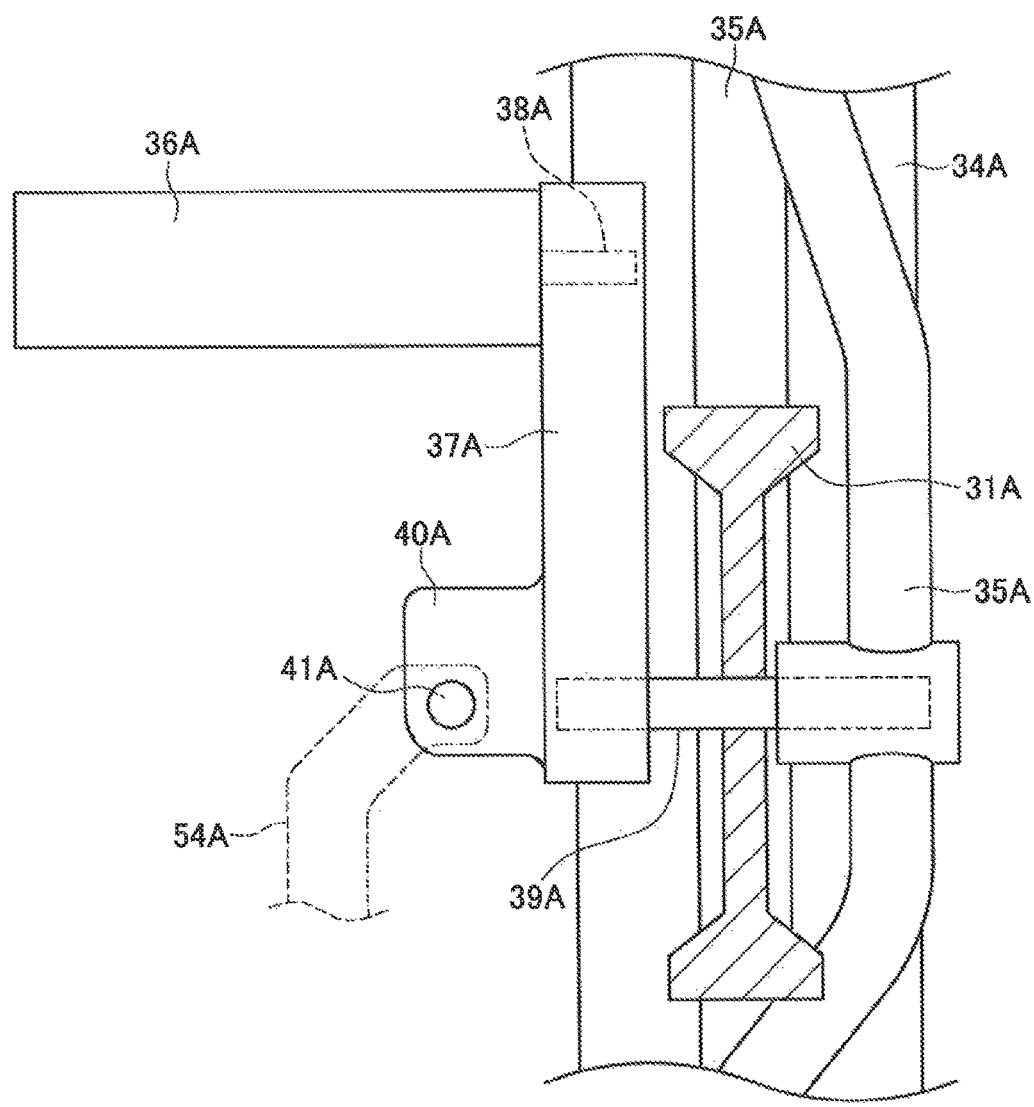
FIG. 5 is a partially enlarged cross-sectional view illustrating the front crawler traveling device.
Figure 6:
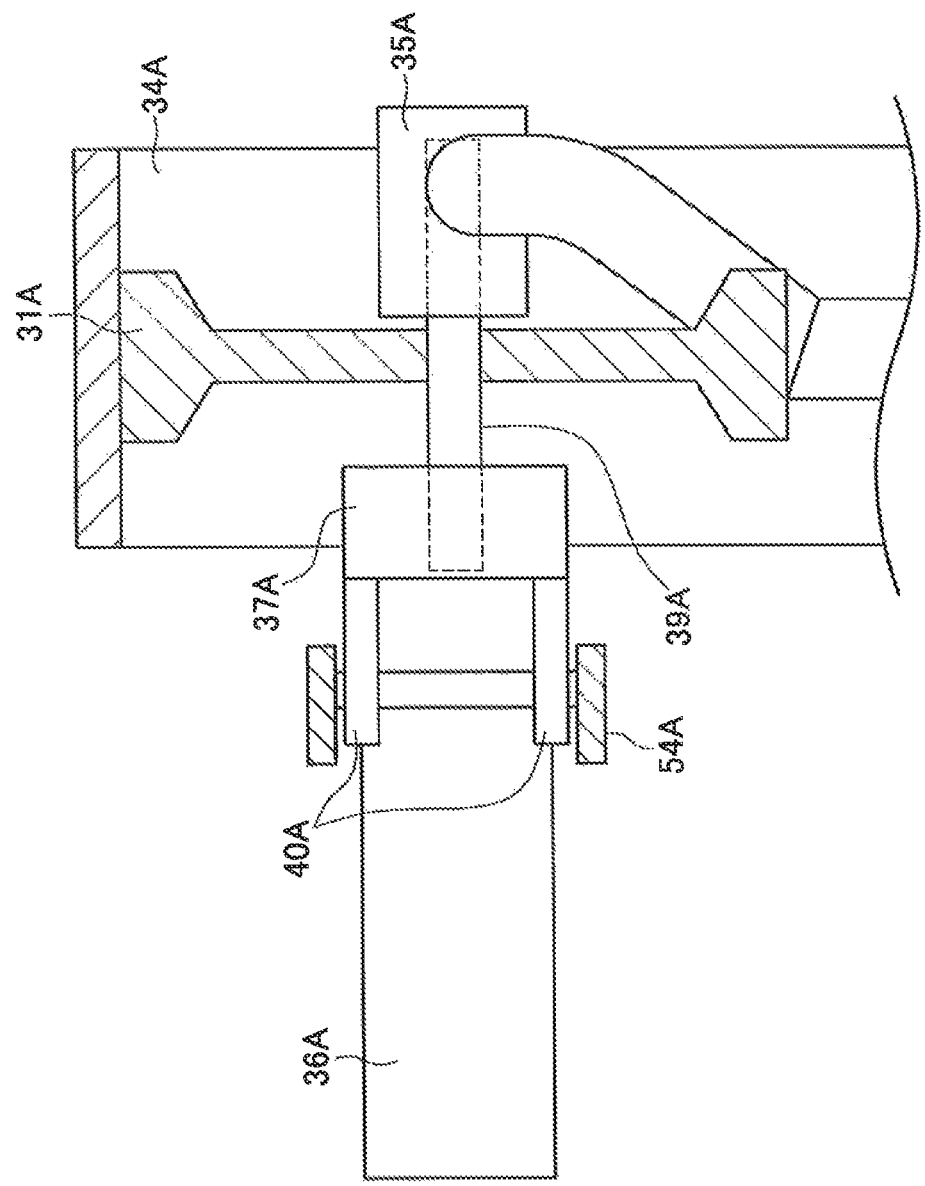
FIG. 6 is a partially enlarged cross-sectional view illustrating the front crawler traveling device.

Next, the front crawler traveling devices 30A serving as the pair of right and left traveling devices will be described. Additionally, since the right and left front crawler traveling devices 30A have a horizontal symmetrical shape, the right front crawler traveling device 30A will be representatively described below. A description of the configuration of the left front crawler traveling device 30A will be omitted. Further, a reference sign R will be appropriately added to the right front crawler traveling device 30A and a reference sign L will be appropriately added to the left front crawler traveling device 30A if necessary. FIG. 4 is a right side view illustrating the front crawler traveling device 30A. FIG. 5 is a partially enlarged cross-sectional view illustrating the front crawler traveling device 30A. FIG. 5 is used to describe an attachment configuration of a drive wheel 31A, the right side indicates the outside of the vehicle, the left side indicates the inside of the vehicle, the upside indicates the front side of the vehicle, and the downside indicates the rear side of the vehicle. FIG. 6 is a partially enlarged cross-sectional view illustrating the front crawler traveling device 30A. FIG. 6 is used to describe the attachment configuration of the drive wheel 31A, the right side indicates the outside of the vehicle, the left side indicates the inside of the vehicle, the upside indicates the upside of the vehicle, and the downside indicates the downside of the vehicle.

As illustrated in FIG. 4, the front crawler traveling device 30A includes the drive wheel 31A which is provided at an upper portion, driven wheels 32A which are provided below the drive wheel 31A to be located at front and rear portions, four auxiliary rollers 33A which are provided between two driven wheels 32A, a crawler belt 34A, an attachment frame 35A, a motor 36A which serves as a driving device for driving the crawler traveling device, and a gear casing 37A.

The crawler belt 34A is wound around the drive wheel 31A, two driven wheels 32A, and four auxiliary rollers 33A so as to contact the outer peripheries thereof. The attachment frame 35A is formed by three cylindrical pipes and is formed in a substantially upward triangular shape. The drive wheel 31A is rotatably supported at the upper apex of the triangular shape of the attachment frame 35A. The driven wheels 32A are rotatably supported at the vicinity of two lower apexes of the triangular shape of the attachment frame 35A and four auxiliary rollers 33A are rotatably supported between two driven wheels 32A. The motor 36A and the gear casing 37A are located at the attachment frame 35A on the inside of the vehicle and the driving power of the motor 36A is transmitted to the drive wheel 31A through the gear casing 37A so that the front crawler traveling device 30A is driven.

More specifically, as illustrated in FIG. 5, the motor 36A is fixed to the front end of the gear casing 37A extending in the longitudinal direction and located on the inside of the vehicle and the drive shaft 38A of the motor 36A protrudes into the gear casing 37A. The drive wheel 31A is located at the rear end of the gear casing 37A on the outside of the vehicle, the end of the rotation shaft 39A fixed to the drive wheel 31A on the inside of the vehicle protrudes into the gear casing 37A. Inside the gear casing 37A, sprockets (not illustrated) are respectively fixed to the drive shaft 38A of the motor 36A and the rotation shaft 39A of the drive wheel 31A. Then, the sprockets are connected to each other in an interlocking manner by an endless chain (not illustrated).

In this way, the front crawler traveling device 30A is configured to transmit the power of the motor 36A to the drive shaft 38A, the sprockets, the chain, and the rotation shaft 39A. Then, the front crawler traveling device 30A is driven in such a manner that the drive wheel 31A is rotated by the power transmitted to the rotation shaft 39A.

Additionally, the end of the rotation shaft 39A of the drive wheel 31A on the outside of the vehicle extends to the attachment frame 35A and the attachment frame 35A is rotatably connected to the rotation shaft 39A. That is, the front crawler traveling device 30A is configured to be swingable in the longitudinal direction about the rotation shaft 39A serving as an axis.

Further, as illustrated in FIGS. 5 and 6, a bracket 40A which is formed by two upper and lower plate-shaped members protruding toward the inside of the vehicle is formed at the rear end of the gear casing 37A on the inside of the vehicle. Two upper and lower plate-shaped members of the bracket 40A include a through-hole 41A formed in the vertical direction. The front crawler traveling device 30A is connected to the front suspension device 50A to be described later through the bracket 40A to be swingable in the horizontal direction about the vertical direction serving as an axis. Then, one end of a steering device (not illustrated) disposed in the vehicle body frame 10A is connected to a bracket 40AR of a right front crawler traveling device 30AR and the other end of the steering device is connected to a bracket 40AL of a left front crawler traveling device 30AL. Since the right and left front crawler traveling devices 30AR and 30AL rotate in an interlocking manner in the horizontal direction by the steering device, the traveling vehicle 1A can be steered.

The front crawler traveling device 30A is formed such that the crawler belt 34A between two driven wheels 32A contacts a ground. That is, the front crawler traveling device 30A has an upward triangular shape of which a bottom side becomes a ground contact portion and the triangular shape is formed such that the bottom side is curved downward. Additionally, the triangular shape is formed such that the upper apex provided with the drive wheel 31A is biased backward and the apex provided with the front driven wheel 32A is located above the apex provided with the rear driven wheel 32A.

Since the front crawler traveling device 30A has the above-described configuration, the crawler belt 34A is easily caught by a convex portion protruding upward from a ground when the traveling device climbs over the convex portion and thus the traveling operation is stabilized. Further, since the front crawler traveling device 30A is supported to be swingable in the longitudinal direction, the ground contact performance for a ground is improved and a cushion effect is obtained by the swing of the front crawler traveling device 30A. Thus, the vehicle can travel stably and the riding comfort is improved.

Additionally, the front crawler traveling device 30A also includes a tension adjustment device (not illustrated) which adjusts a tension of the crawler belt 34A by moving a position of the driven wheel 32A with respect to the attachment frame 35A, a brake device (not illustrated) which stops a rotation of the drive wheel 31A, a cushion mechanism which suppress the swing of the front crawler traveling device 30A in the longitudinal direction about the rotation shaft 39A serving as an axis, and the like. The cushion mechanism is provided between the attachment frame 35A and the gear casing 37A. Accordingly, the front crawler traveling device 30A stably contacts a ground and the traveling performance or the riding comfort is improved. Further, since the cushion mechanism can reduce a load such as an impact or torsion of a connection portion to the front suspension device 50A when the front crawler traveling device 30A contacts an unevenness portion of an irregular ground, the durability is improved.

Figure 7:
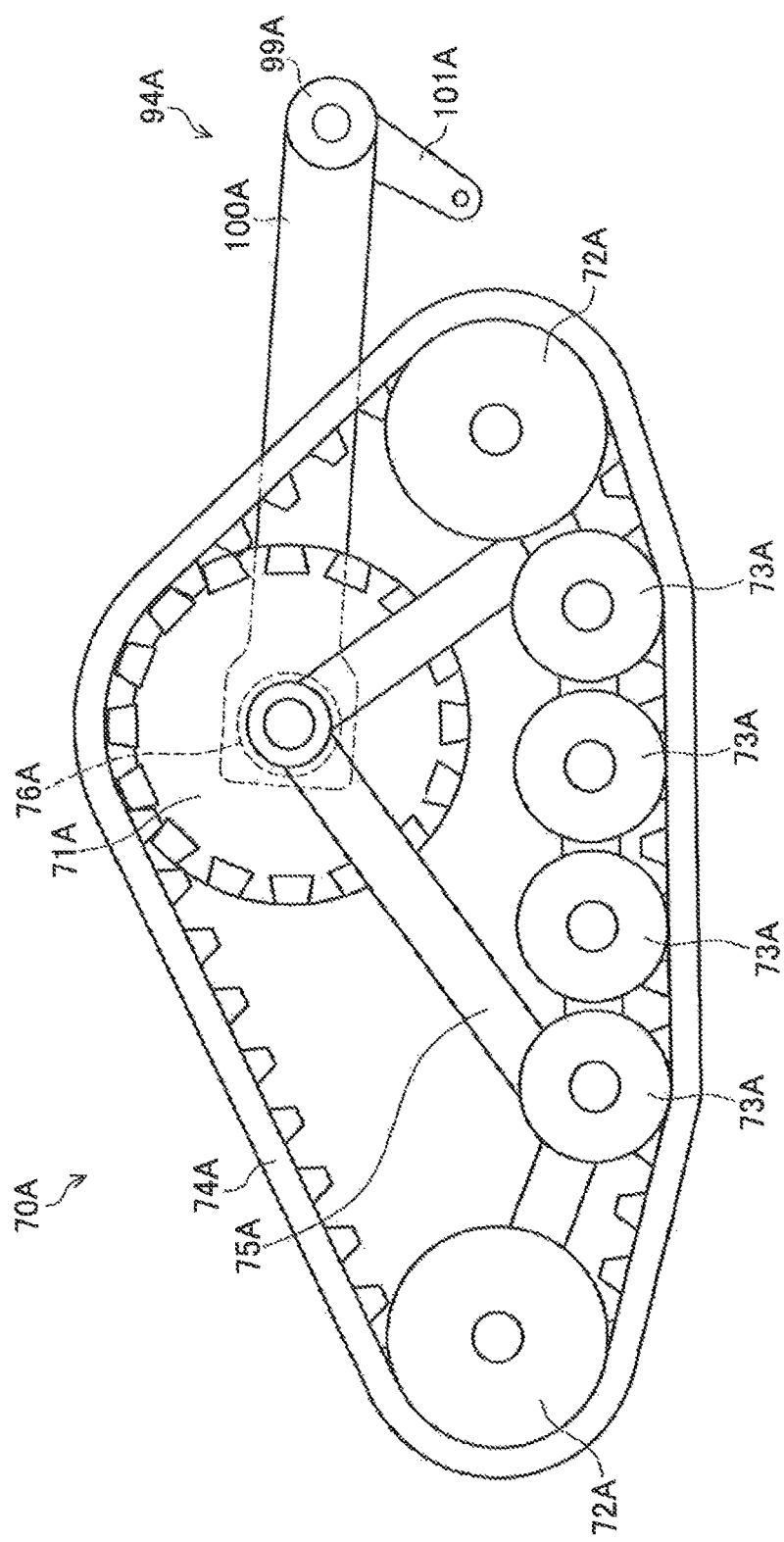
FIG. 7 is a right side view illustrating a rear crawler traveling device.
Figure 8:
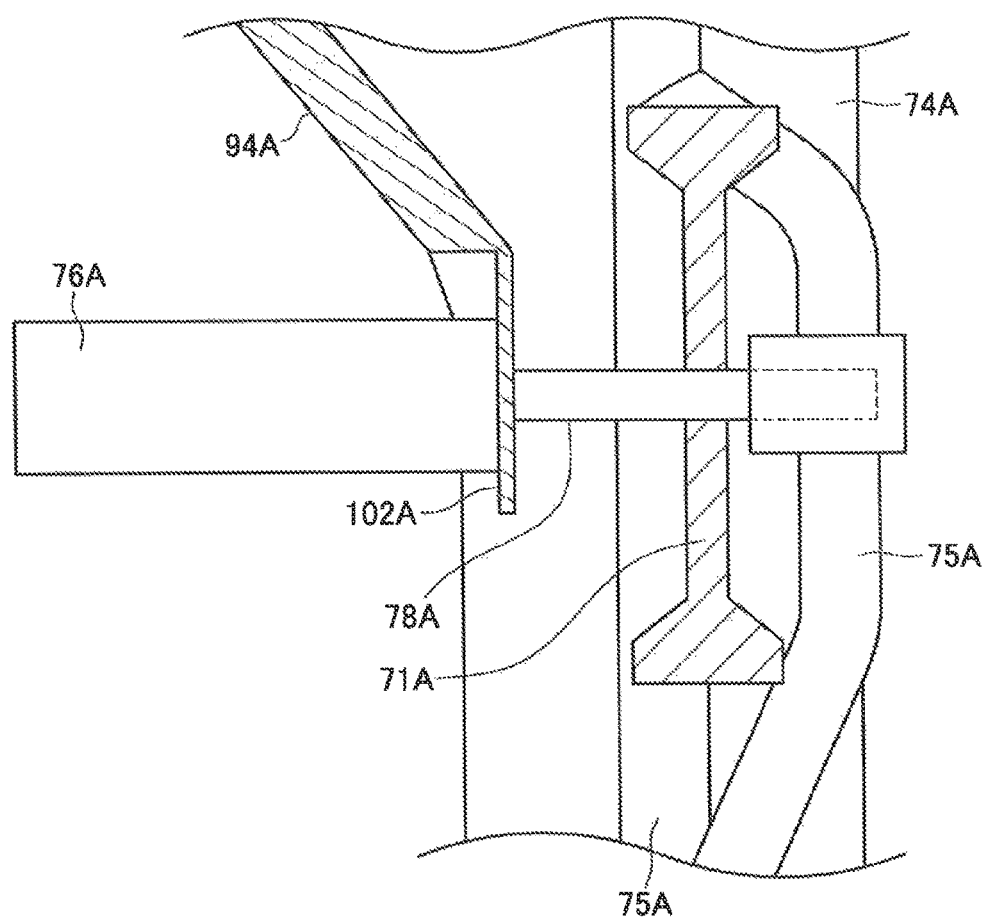
FIG. 8 is a partially enlarged cross-sectional view illustrating the rear crawler traveling device.

Next, the pair of right and left rear crawler traveling devices 70A serving as the traveling devices will be described. Additionally, since the right and left rear crawler traveling devices 70A has a horizontal symmetrical shape, the right rear crawler traveling device 70A will be representatively described below. A description of the configuration of the left rear crawler traveling device 70A will be omitted. Further, a reference sign R will be appropriately added to the right rear crawler traveling device 70A and a reference sign L will be appropriately added to the left rear crawler traveling device 70A if necessary. FIG. 7 is a right side view illustrating the rear crawler traveling device 70A and FIG. 8 is a partially enlarged cross-sectional view illustrating the rear crawler traveling device 70A. FIG. 8 is used to describe an attachment configuration of a drive wheel 71A, the right side indicates the outside of the vehicle, the left side indicates the inside of the vehicle, the upside indicates the front side of the vehicle, and the downside indicates the rear side of the vehicle.

As illustrated in FIG. 7, the rear crawler traveling device 70A includes the drive wheel 71A which is provided at an upper portion, driven wheels 72A which are provided below the drive wheel 71A to be located at front and rear portions, four auxiliary rollers 73A which are provided between two driven wheels 72A, a crawler belt 74A, an attachment frame 75A, a motor 76A which serves as a driving device for driving the crawler traveling device, and the like.

Here, the rear crawler traveling device 70A is formed in an upward triangular shape in the side view similarly to the front crawler traveling device 30A. The connection between the rear crawler traveling device 70A and the rear suspension device 90A to be described below is different from that of the front crawler traveling device 30A and the bracket 40A is not used in the connection. Further, the arrangement position of the motor 76A of the rear crawler traveling device 70A is different. Then, a description of the same configuration as that of the front crawler traveling device 30A will be appropriately omitted.

As illustrated in FIG. 8, the motor 76A is located at the attachment frame 75A on the inside of the vehicle and is fixed to a swing arm 94A of the rear suspension device 90A to be described later (a flange portion 102A of a first arm 100A). The drive wheel 71A is fixed to the drive shaft 78A of the motor 76A. The rear crawler traveling device 70A is driven in such a manner that the drive shaft 78A of the motor 76A rotates.

Additionally, the end of the drive shaft 78A of the motor 76A on the outside of the vehicle extends to the attachment frame 75A and the attachment frame 75A is rotatably connected to the drive shaft 78A. That is, the rear crawler traveling device 70A is configured to be swingable in the longitudinal direction about the drive shaft 78A serving as an axis.

Similarly to the front crawler traveling device 30A, the rear crawler traveling device 70A is formed such that the crawler belt 74A between two driven wheels 72A contacts a ground. Additionally, the ground contact portion of the rear crawler traveling device 70A is wider than that of the front crawler traveling device 30A. Thus, since the crawler belt 74A has a wider ground contact portion, the vehicle can travel stably.

Further, since the rear crawler traveling device 70A is supported to be swingable in the longitudinal direction, the ground contact performance for a ground is improved and a cushion effect is obtained by the swing of the front crawler traveling device 30A. Thus, the vehicle can travel stably and the riding comfort is improved.

Additionally, similarly to the front crawler traveling device 30A, the rear crawler traveling device 70A also includes a tension adjustment device (not illustrated) which adjusts a tension of the crawler belt 74A by moving a position of the driven wheel 72A with respect to the attachment frame 75A, a brake device (not illustrated) which stops a rotation of the drive wheel 71A, a cushion mechanism which suppresses the swing of the rear crawler traveling device 70A in the longitudinal direction about the drive shaft 78A serving as an axis, and the like. The cushion mechanism is provided between the attachment frame 75A and the swing arm 94A of the rear suspension device 90A to be described later. Accordingly, the rear crawler traveling device 70A stably contacts a ground and the traveling performance or the riding comfort is improved. Further, since the cushion mechanism can reduce a load such as an impact or torsion of a connection portion to the rear suspension device 90A when the rear crawler traveling device 70A contacts an unevenness portion of an irregular ground, the durability is improved.

Here, the motors 36A and 76A serving as driving devices driving the front and rear crawler traveling devices 30A and 70A are electric motors driven by the electric power of the battery BA and are controlled by the controller CA. The electricity (the electric power) from the battery BA to the motors 36A and 76A or the control signal from the controller CA is transmitted by a flexible wire harness. Then, when the motors 36A and 76A are driven by the electric power of the battery BA, the front and rear crawler traveling devices 30A and 70A are driven so that the traveling vehicle 1A travels. Additionally, the motors 36A and 76A serving as driving devices of the front and rear crawler traveling devices 30A and 70A are respectively provided inside the front and rear crawler traveling devices 30A and 70A.

Thus, since a transmission mechanism such as a drive shaft does not need to be provided between the vehicle body frame 10A and the front and rear crawler traveling devices 30A and 70A, a driving power transmission configuration can be simplified. Accordingly, the number of components is decreased and the productivity or the maintenance workability becomes satisfactory.

Further, the front and rear crawler traveling devices 30A and 70A are largely swingable in the vertical direction by the front and rear suspension devices 50A and 90A to be described later. Thus, it is desirable to supply the electric power from the battery BA disposed in the vehicle body frame 10A to the motors 36A and 76A of the front and rear crawler traveling devices 30A and 70A without disturbing the swing in the vertical direction. Accordingly, when a flexible wire harness is used, the front and rear crawler traveling devices 30A and 70A can be driven without disturbing the swing in the vertical direction.

Further, the front and rear crawler traveling devices 30A and 70A are not limited to the above-described configuration. For example, the crawler traveling device may have a square or trapezoid shape in the side view. Further, the front crawler traveling device 30A and the rear crawler traveling device 70A may have the same shape. With such a configuration, the number of components is decreased and the productivity is improved.

Further, a configuration may be employed in which a speed changing device is provided between the drive wheels 31A and 71A and the motors 36A and 76A and the driving power of the motors 36 and 76 is transmitted to the drive wheels 31A and 71A through the speed changing device.

With such a configuration, the front and rear crawler traveling devices 30A and 70A can be further easily driven by a desired output.

Further, the interlocked connection between the drive wheels 31A and 71A and the motors 36A and 76A of the front and rear crawler traveling devices 30A and 70A is not limited to the above-described configuration. For example, the motors 36A and 76A may be disposed at the drive wheels 31A and 71A on the outside of the vehicle and the motors 36A and 76A may be disposed in an in-wheel shape inside the drive wheels 31A and 71. Further, similarly to the front crawler traveling device 30A, the rear crawler traveling device 70A may have a configuration in which the motor 76A and the drive wheel 71A are connected to each other in an interlocking manner through a gear casing. With such a configuration, the degree of freedom in the arrangement of the motor is improved.

Further, similarly to the rear crawler traveling device 70A, the front crawler traveling device 30A may have a configuration in which the drive wheel 31A is fixed to the drive shaft 38A of the motor 36A. Additionally, the front crawler traveling device 30A offsets a position of the motor 36A forward by connecting the motor 36A and the drive wheel 31A to each other in an interlocking manner through the gear casing 37A. With such a configuration, a space capable of rotating the front crawler traveling device 30A in the horizontal direction is ensured. Thus, a configuration is desirable in which the position of the motor 36A is offset forward as described above from the viewpoint of a steering mechanism. Accordingly, it is possible to prevent an increase in size of the traveling vehicle 1A.

Further, the motors 36A and 76A serving as the driving devices of the front and rear crawler traveling devices 30A and 70A are not limited to the electric motors. For example, hydraulic motors driven by a pressure of a fluid may be used. When the hydraulic motor is used, for example, the traveling vehicle 1A is formed such that an engine serving as a prime mover, a pump driven by the engine, a tank storing oil serving as a hydraulic fluid, and the like are provided inside the vehicle body frame 10A. The pump is connected to the hydraulic motors of the front and rear crawler traveling devices 30A and 70A by a flexible hose through a hydraulic device. Then, the driving power of the engine is transmitted to the hydraulic motor through the pump so that the front and rear crawler traveling devices 30A and 70A are driven. Additionally, the hydraulic device includes valves such as a switching valve, a relief valve, and a flow rate adjustment valve or hydraulic equipment such as a filter. When various valves are controlled by the controller CA, the flow rate, the oil pressure, the inflow direction, and the like of the hydraulic oil to each hydraulic motor can be changed. Then, the hydraulic motors serving as the driving devices of the front and rear crawler traveling devices 30A and 70A are respectively provided inside the front and rear crawler traveling devices 30A and 70A.

Thus, according to such a configuration, since a transmission mechanism such as a drive shaft does not need to be provided between the vehicle body frame 10A and the front and rear crawler traveling devices 30A and 70A, a driving power transmission configuration can be simplified. Accordingly, the number of components is decreased and the productivity or the maintenance workability becomes satisfactory.

Further, as described above, the front and rear crawler traveling devices 30A and 70A are largely swingable in the vertical direction by the front and rear suspension devices 50A and 90A to be described later. Thus, it is desirable to supply the hydraulic oil from the pump disposed in the vehicle body frame 10A to the hydraulic motors of the front and rear crawler traveling devices 30A and 70A without disturbing the swing in the vertical direction. Accordingly, when a flexible hose is used, the front and rear crawler traveling devices 30A and 70A can be driven without disturbing the swing in the vertical direction.

Additionally, when the hydraulic motors are used in the driving devices of the front and rear crawler traveling devices 30A and 70A, a high output can be easily obtained. Meanwhile, when the electric motors are used in the driving devices of the front and rear crawler traveling devices 30A and 70A, a control can be easily performed and responsiveness becomes satisfactory.

Figure 9:
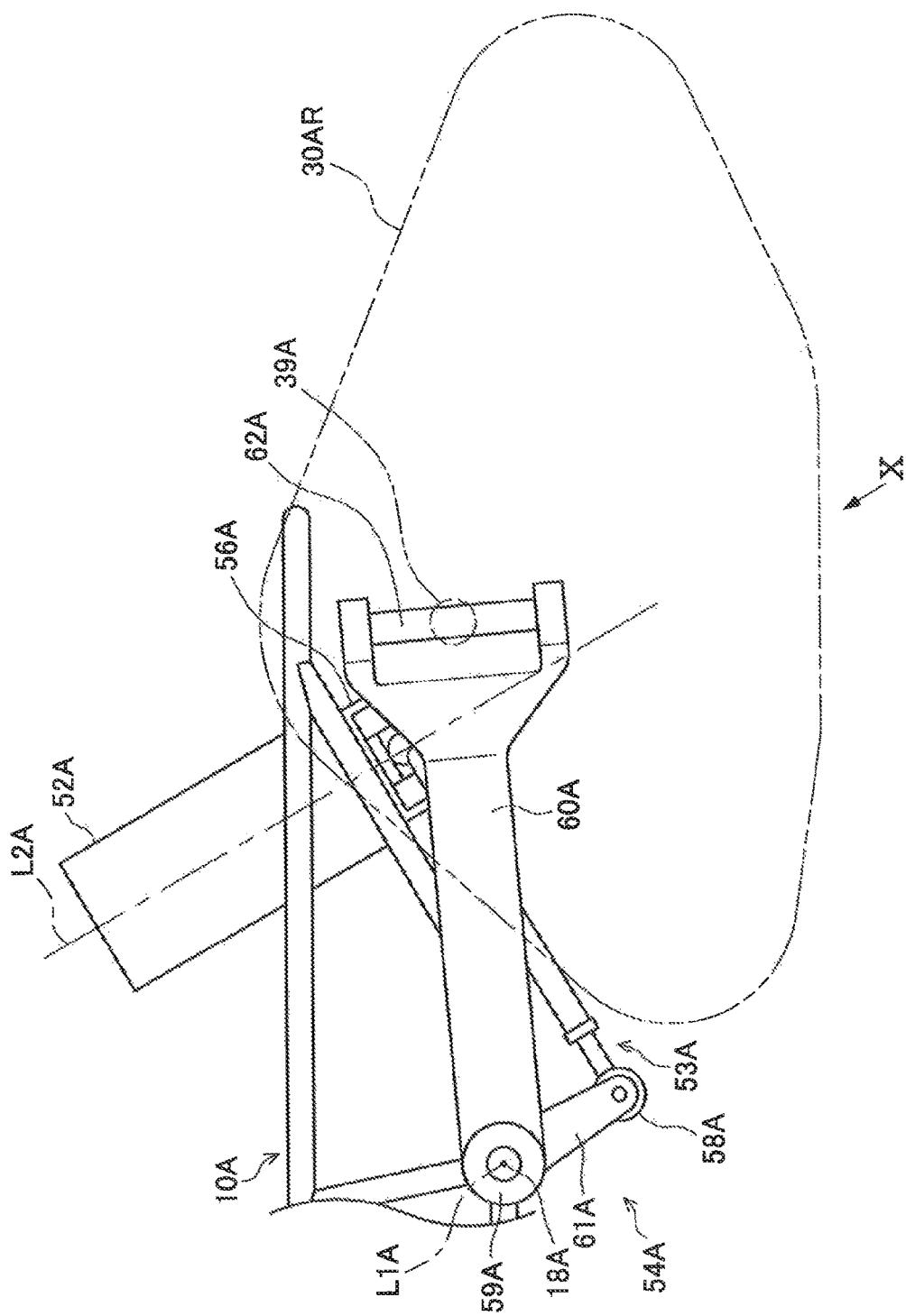
FIG. 9 is a right side view illustrating a front suspension device.
Figure 10:
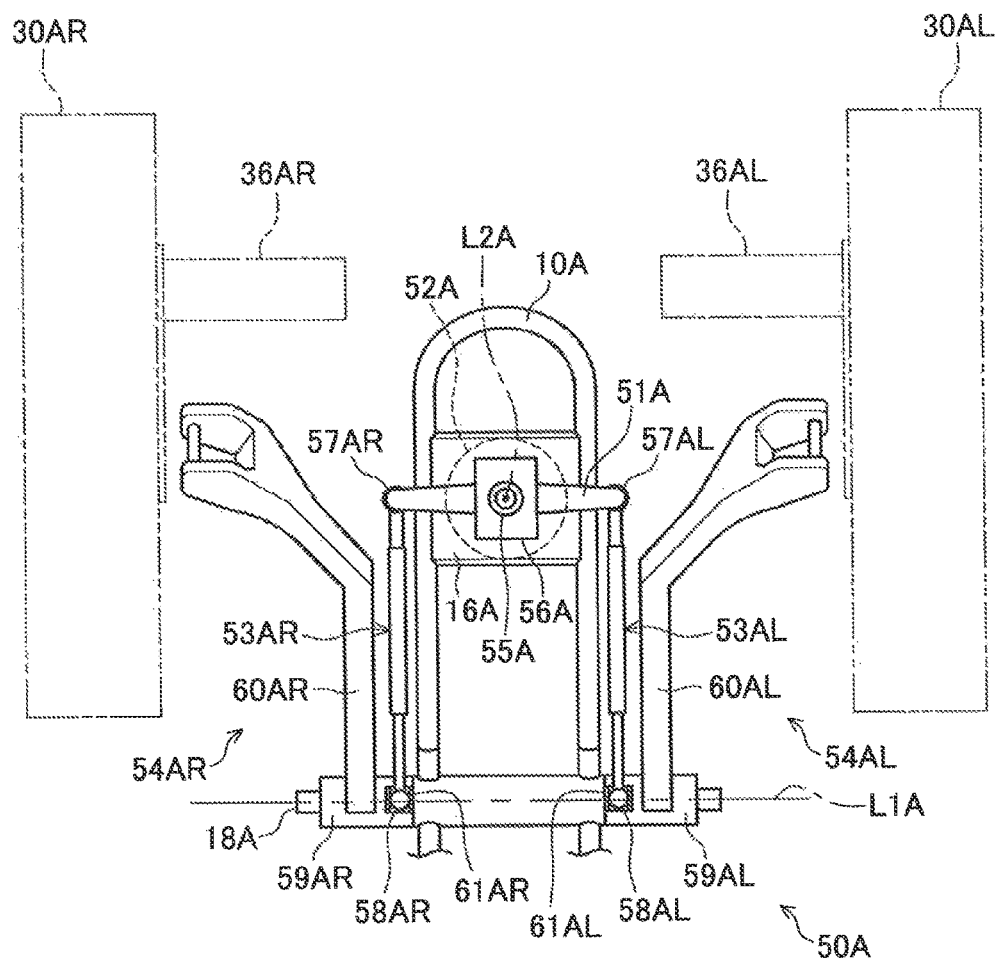
FIG. 10 is a view in a direction X of FIG. 9.
Figure 11:
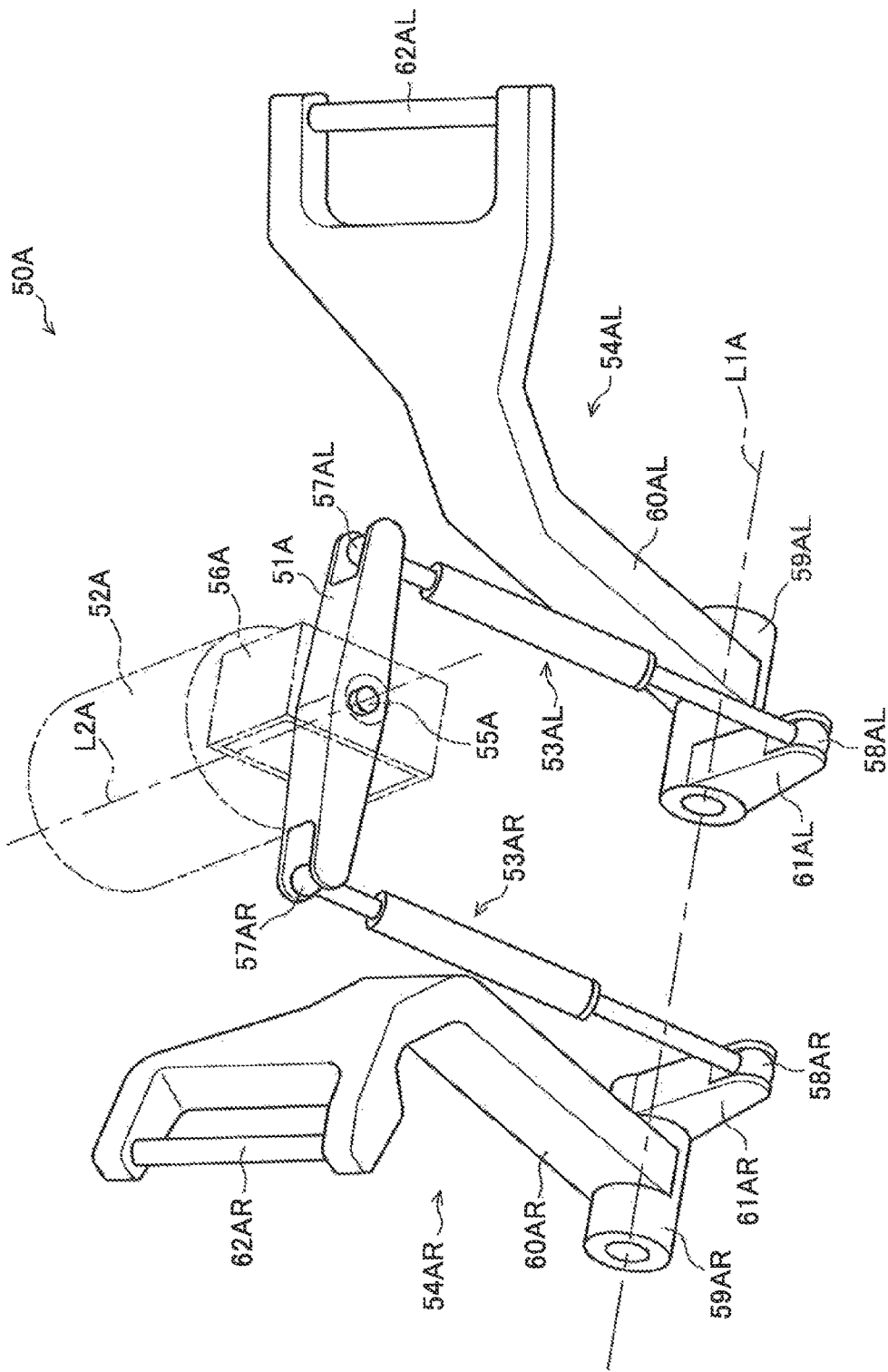
FIG. 11 is a perspective view illustrating the front suspension device.

Next, the front suspension device 50A will be described. Additionally, since the front suspension device 50A has a horizontal symmetrical shape, a right component will be appropriately indicated by a reference sign R and a left component will be appropriately indicated by a reference sign L if necessary. FIG. 9 is a right side view illustrating the front suspension device 50A. FIG. 10 is a view in a direction X of FIG. 9. FIG. 11 is a perspective view illustrating the front suspension device 50A when viewed from the forward-diagonally downside.

As illustrated in FIGS. 9 to 11, the front suspension device 50A includes a rotation arm 51A, a motor 52A which serves as a rotation device rotating the rotation arm 51A, a pair of right and left connection arms 53A (53AR, 53AL), a pair of right and left swing arms 54A (54AR, 54AL), and the like. Additionally, a description of the vehicle body frame 10A is omitted in FIG. 11. Further, in FIGS. 9 to 11, a line L1A is a line passing through the center of the rotation shaft 18A and a line L2A is a line passing through the rotation center of the rotation arm 51A.

The rotation arm 51A is a square column member extending in the horizontal direction and includes a rotation shaft 55A disposed at the center in the horizontal direction. The rotation arm 51A is supported by a bracket 56A to be rotatable about the rotation shaft 55A serving as an axis (the line L2A). The bracket 56A is fixed to the lower face of the front support plate 16A of the vehicle body frame 10A. Thus, the rotation arm 51A is supported by the vehicle body frame 10A through the bracket 56A to be rotatable about the vertical direction as an axis. Additionally, the rotation shaft 55A is perpendicular to the front support plate 16A and the rotation shaft 55A is inclined in the longitudinal direction.

The motor 52A is fixed to the upper face of the front support plate 16A of the vehicle body frame 10A while a drive axis (not illustrated) is directed downward. Additionally, the drive shaft of the motor 52A is connected to the rotation shaft 55A of the rotation arm 51A through a speed changing device (not illustrated) including gears and the like. Thus, the motor 52A is able to rotate the rotation arm 51A about the rotation shaft 55A serving as an axis.

Here, the rotation arm 51A is not limited to the above-described configuration. The rotation arm 51A may extend in the horizontal direction and may be supported by the vehicle body frame 10A to be rotatable at the center of the rotation arm in the horizontal direction. For example, a configuration in which the rotation shaft 55A is not inclined in the longitudinal direction, that is, the rotation shaft 55A is disposed perpendicularly or a configuration in which the rotation shaft 55A is disposed horizontally may be employed. Additionally, it is desirable to dispose the rotation arm 51A so that the rotation shaft 55A is disposed in the substantially vertical direction from the viewpoint of effectively ensuring and using a space inside the vehicle body frame 10A. With such a configuration, the front suspension device 50A can be disposed along the vehicle body frame 10A and thus the inner space of the vehicle body frame 10A can be effectively used.

Further, the connection between the rotation arm 51A and the drive shaft of the motor 52A is not particularly limited and the rotation shaft 55A and the drive shaft of the motor 52A may be directly connected to each other.

Here, the motor 52A is an electric motor which is driven by the electric power of the battery BA and is controlled by the controller CA. Additionally, a device that rotates the rotation arm 51A may be configured to rotate the rotation arm 51A by a predetermined angle in a predetermined rotation direction and is not limited to the electric motor.

For example, a hydraulic motor driven by a fluid pressure may be also employed. Similarly to the case where the motors 36A and 76A serving as the driving devices of the front and rear crawler traveling devices 30A and 70A are the hydraulic motors when the hydraulic motors are used, the traveling vehicle 1A includes an engine which serves as a prime mover, a pump which is driven by the engine, a tank which stores oil as a hydraulic fluid, and the like. The hydraulic motor which serves as a device that rotates the rotation arm 51A is connected to the pump through a hydraulic device including hydraulic equipment such as a switching valve. Then, when a switching valve and the like of the hydraulic device are controlled by the controller CA, the hydraulic motor is rotated by a desired angle in a desired direction. Then, the rotation arm 51A is rotated by the rotation of the hydraulic motor.

Further, a device which rotates the rotation arm 51A may be a hydraulic cylinder including a piston rod, a cylinder liner, and the like instead of the hydraulic motor. When the hydraulic cylinder is used, one end is connected to the rotation arm 51A and the other end is connected to the vehicle body frame 10A. Then, the hydraulic cylinder is moved in a telescopic manner when the switching valve of the hydraulic device is controlled by the controller CA similarly to the hydraulic motor. Then, the rotation arm 51A is rotated by the telescopic movement of the hydraulic cylinder.

Additionally, it is desirable that the drive sources of the front and rear crawler traveling devices 30A and 70A be similar to the drive source of the rotation device rotating the rotation arm 51A from the viewpoint of whether the number of components can be decreased, a production can be easily performed, and a vehicle weight can be decreased. That is, when the motors 36A and 76A serving as the driving devices of the front and rear crawler traveling devices 30A and 70A are the electric motors, it is desirable that the rotation device rotating the rotation arm 51A be the electric motor driven by the electric power. Meanwhile, it is desirable that the rotation device rotating the rotation arm 51A be a hydraulic motor or a hydraulic cylinder driven by a fluid pressure when the motors 36A and 76A are the hydraulic motors.

The connection arm 53A (53AR, 53AL) is a telescopic bar-shaped cushion mechanism including a cylinder and the like and is a so-called damper. One end of the right connection arm 53AR is connected to the right end of the rotation arm 51A through a ball joint 57AR serving as a universal joint. The other end of the right connection arm 53AR is connected to the right swing arm 54AR through the ball joint 58AR serving as a universal joint.

Similarly to the right connection arm 53AR, one end of the left connection arm 53AL is connected to the left end of the rotation arm 51A through a ball joint 57AL serving as a universal joint. Further, the other end of the left connection arm 53AL is connected to the left swing arm 54AL through a ball joint 58AL serving as a universal joint. That is, one end of the connection arm 53A is connected to the rotation arm 51A through the ball joint 57A and the other end thereof is connected to the swing arm 54A through the ball joint 58A.

Here, the connection arm 53A is not limited to the above-described configuration. One end of the connection arm 53A may be connected to the rotation arm 51A and the other end thereof may be connected to the swing arm 54A. For example, a connection using a cross type universal joint instead of the ball joint as a universal joint may be performed. Further, the connection arm 53A may not be the telescopic bar-shaped cushion mechanism and may be an arm formed by a steel member. However, in order to realize a stable traveling operation and to improve the riding comfort, it is desirable that the connection arm 53A include a cushion mechanism and a telescopic bar-shaped cushion mechanism realizing the function of the damper be used.

The swing arm 54A (54AR, 54AL) includes a support portion 59A, a first arm 60A, a second arm 61A, and the like. Then, the swing arm 54A is formed in a substantial L-shape in the side view such that the first arm 60A and the second arm 61A extend from the support portion 59A.

The support portion 59A has a cylindrical shape extending in the horizontal direction and is supported by the rotation shaft 18A of the vehicle body frame 10A to be rotatable.

The first arm 60A is a bar-shaped member that extends forward from the outer periphery of the support portion 59A and the end thereof is connected to the front crawler traveling device 30A. The end of the first arm 60A is branched into upper and lower forks and a rotation shaft 62A is fixed between the forks. Then, the rotation shaft 62A is inserted through the through-hole 41A of the bracket 40A of the front crawler traveling device 30A. Thus, the front crawler traveling device 30A is connected to the end of the first arm 60A through the bracket 40A to be rotatable in the horizontal direction about the vertical direction serving as an axis (the rotation shaft 62A). Additionally, the rotation shaft 62A passes through the center of the rotation shaft 39A of the front crawler traveling device 30A in the side view.

The second arm 61A is a bar-shaped member that extends downward from the outer periphery of the support portion 59A and the end thereof is connected to one end of the connection arm 53A through the ball joint 58A serving as a universal joint. Additionally, the second arm 61A is located at the inside of the vehicle in relation to the first arm 60A. Further, the length of the second arm 61A is shorter than the length of the first arm 60A. Thus, the swing arm 54A is supported by the vehicle body frame 10A through the support portion 59A to be swingable in the vertical direction about the horizontal direction serving as an axis (the line L1A). Further, the swing arm 54A is connected to the front crawler traveling device 30A by the first arm 60A. In addition, the swing arm 54A is connected to one end of the connection arm 53A by the second arm 61A.

Here, the swing arm 54A is not limited to the above-described configuration. The swing arm 54A may be supported by the vehicle body frame 10A to be swingable in the vertical direction about the horizontal direction serving as an axis and the end thereof may be connected to the front crawler traveling device 30A and the end of the connection arm 53A is connected. For example, the swing arm 54A may have a configuration in which the first arm 60A and the second arm 61A are located on a line in the side view. Further, the second arm 61A may extend from the first arm 60A. Additionally, when a transmission of a force to the connection arm 53A to be described later is considered, the first arm 60A and the second arm 61A may extend from the support portion 59A and the second arm 61A and the connection arm 53A may be connected to each other to form a substantially right angle in the side view.

Further, the first arm 60A and the second arm 61A are not limited to the above-described shapes and may have, for example, curved shapes. Further, the second arm 61A may extend upward from the outer periphery of the support portion 59. Additionally, when an operation of the swing arm 54A to be described later is considered, it is desirable that a distance from the rotation shaft 18A serving as the rotation center of the swing arm 54A to the connection portion between the first arm 60A and the front crawler traveling device 30A be longer than a distance from the rotation shaft 18A to the connection portion between the second arm 61A and the connection arm 53A. That is, it is desirable that a distance from the rotation shaft 18A to the connection portion between the swing arm 54A and front crawler traveling device 30A be longer than a distance from the rotation shaft 18A to the connection portion between the swing arm 54A and the connection arm 53A.

Figure 12:
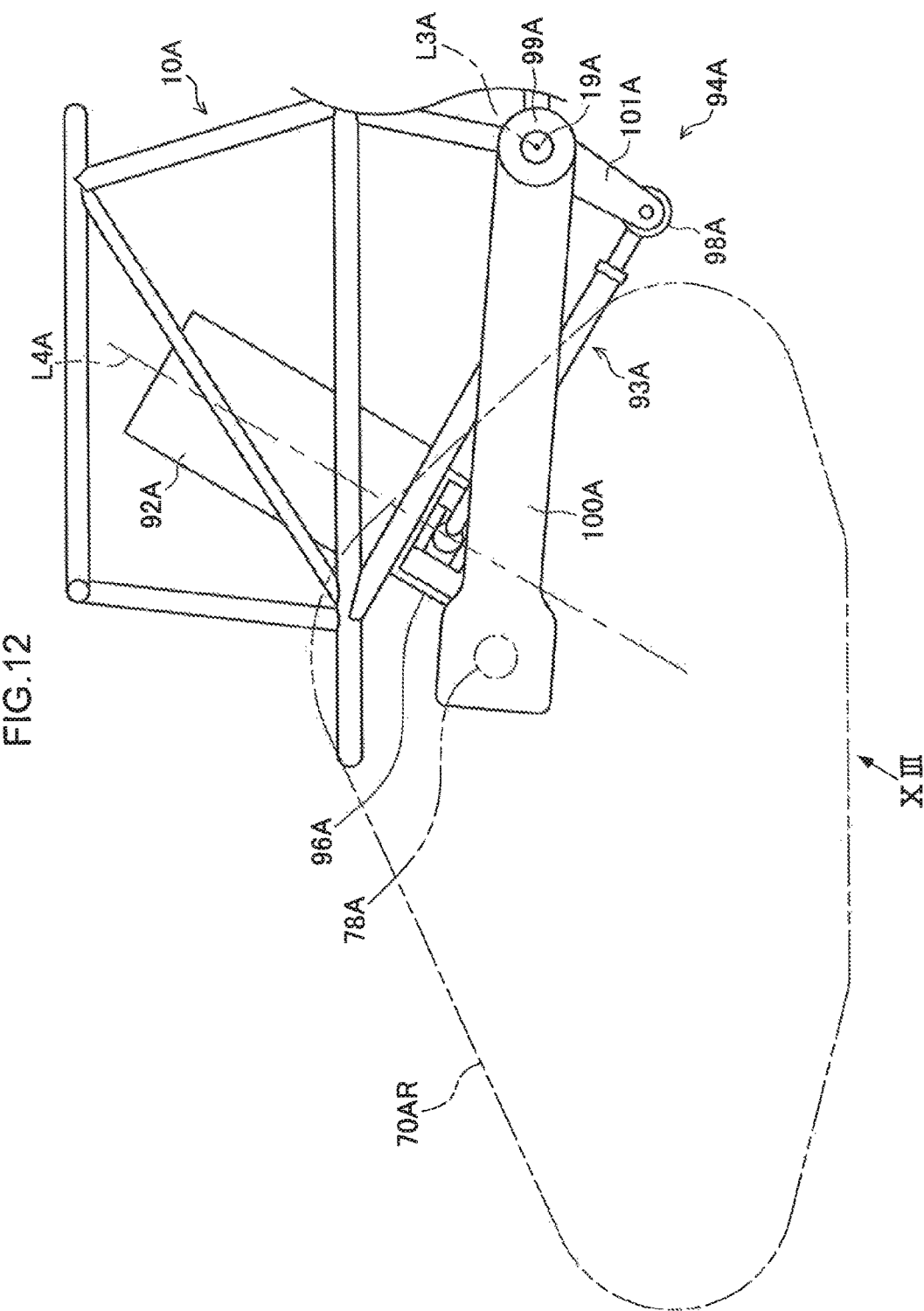
FIG. 12 is a right side view illustrating a rear suspension device.
Figure 13:
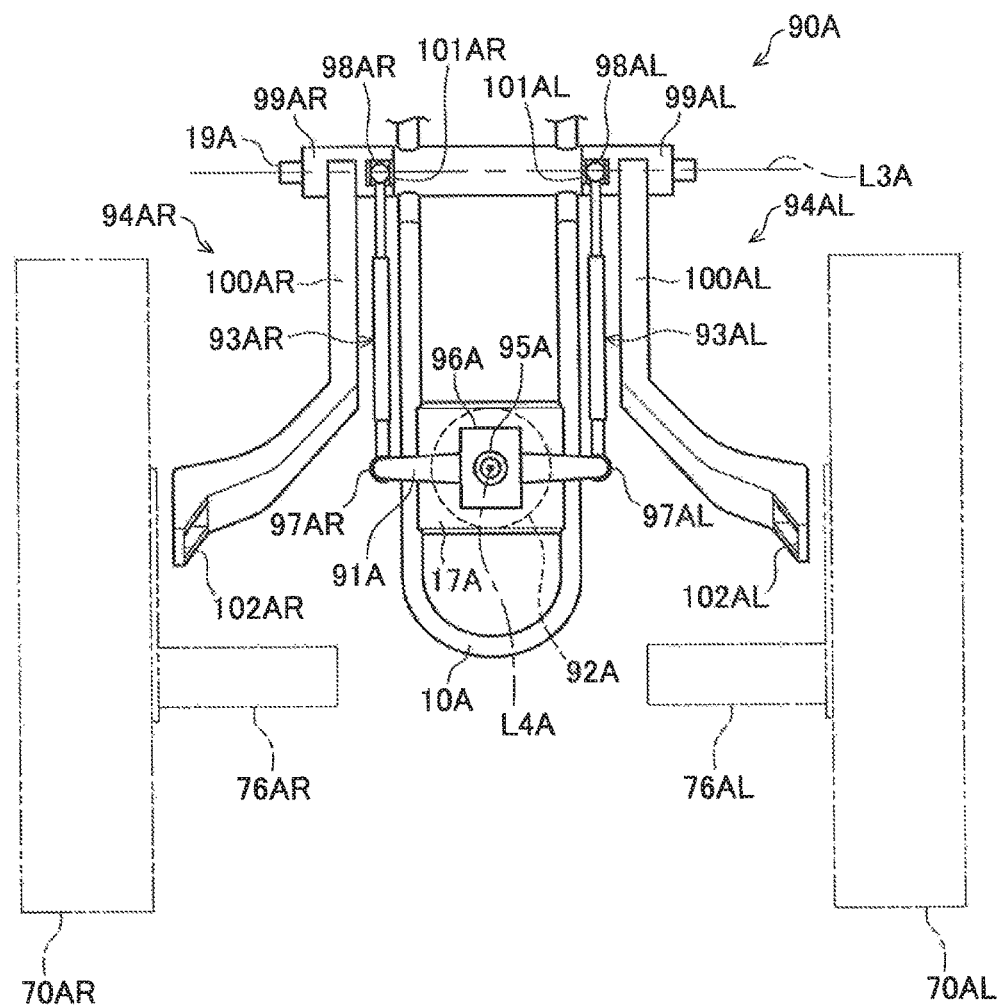
FIG. 13 is a view in a direction XIII of FIG. 12.

Next, the rear suspension device 90A will be described. Additionally, since the rear suspension device 90A has a horizontal symmetrical shape, a right component will be appropriately indicated by a reference sign R and a left component will be appropriately indicated by a reference sign L if necessary. FIG. 12 is a right side view illustrating the rear suspension device 90A. FIG. 13 is a view in a direction XIII of FIG. 12. Additionally, in FIGS. 12 and 13, a line L3A is a line passing through the center of the rotation shaft 19A and a line L4A is a line passing through the rotation center of a rotation arm 91A.

As illustrated in FIGS. 12 and 13, the rear suspension device 90A includes the rotation arm 91A, a motor 92A which serves as a rotation device rotating the rotation arm 91A, a pair of right and left connection arms 93A (93AR, 93AL), a pair of right and left swing arms 94A (94AR, 94AL), and the like.

Here, the rear suspension device 90A is longitudinally symmetrical to the front suspension device 50A with respect to the line L1A except for the shape of the swing arm 94A. The connection between the swing arm 94A and the rear crawler traveling device 70A is different from the connection between the front crawler traveling device 30A and the swing arm 54A of the front suspension device 50A and a connection is performed without the bracket 40A. That is, since only the shape of the end of the first arm 100A of the swing arm 94A is different, a description of the same configuration as that of the front suspension device 50A will be appropriately omitted.

The rotation arm 91A is supported by a bracket 96A to be rotatable about a rotation shaft 95A serving as an axis and the bracket 96A is fixed to the lower face of the rear support plate 17A of the vehicle body frame 10A. Then, the rotation arm 91A is supported by the vehicle body frame 10A through the bracket 96A to be rotatable about the substantially vertical direction serving as an axis. Additionally, the rotation shaft 95A is inclined in the longitudinal direction.

The motor 92A is fixed to the upper face of the rear support plate 17A of the vehicle body frame 10A. A drive shaft (not illustrated) of the motor 92A is connected to the rotation shaft 95A of the rotation arm 91A through a speed changing device (not illustrated) including gears and the like. Then, the motor 92A is able to rotate the rotation arm 91A about the rotation shaft 95A serving as an axis.

The connection arm 93A is a damper of the telescopic bar-shaped cushion mechanism. One end of the connection arm 93A is connected to the rotation arm 91A through a ball joint 97A. The other end of the connection arm 93A is connected to the swing arm 94A through a ball joint 98A. The swing arm 94A is formed in a substantial L-shape in the side view such that the first arm 100A and the second arm 101A extend from the support portion 99A. The support portion 99A has a cylindrical shape extending in the horizontal direction and is supported by the rotation shaft 19A of the vehicle body frame 10A to be rotatable. The first arm 100A is a bar-shaped member that extends backward from the outer periphery of the support portion 99A and the end thereof is provided with the flange portion 102A which is flat in the vertical direction. Then, the motor 76A of the rear crawler traveling device 70A is fixed to a face of the flange portion 102A on the inside of the vehicle (see FIG. 8). Thus, the rear crawler traveling device 70A is connected to the end of the first arm 100A.

Additionally, the connection between the first arm 100A and the rear crawler traveling device 70A is not limited to the above-described configuration. For example, a configuration may be employed in which the end of the first arm 100A is fixed to the main body of the motor 76A of the rear crawler traveling device 70A. Further, when the rear crawler traveling device 70A includes a gear casing similarly to the front crawler traveling device 30A, the end of the first arm 100A may be fixed to the gear casing.

The second arm 101A is a bar-shaped member that extends downward from the outer periphery of the support portion 99A and the end thereof is connected to one end of the connection arm 93A through the ball joint 98A serving as a universal joint. Then, the swing arm 94A is supported by the vehicle body frame 10A through the support portion 99A to be swingable in the vertical direction about the horizontal direction serving as an axis. Further, the swing arm 94A is connected to the rear crawler traveling device 70A by the first arm 100A. Further, the swing arm 94A is connected to one end of the connection arm 93A by the second arm 101A.

Figure 14:
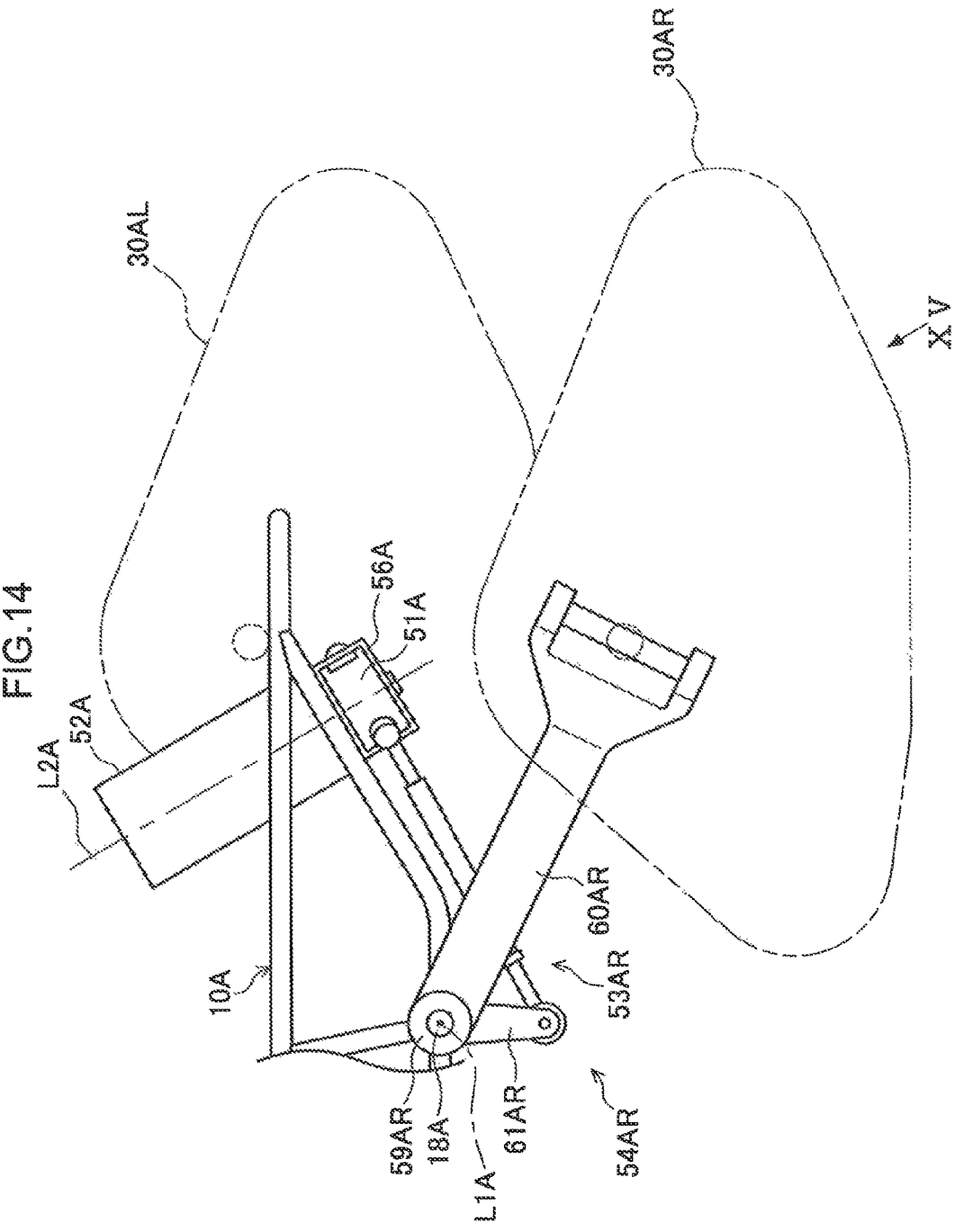
FIG. 14 is a right side view illustrating an operation state of the front suspension device.
Figure 15:
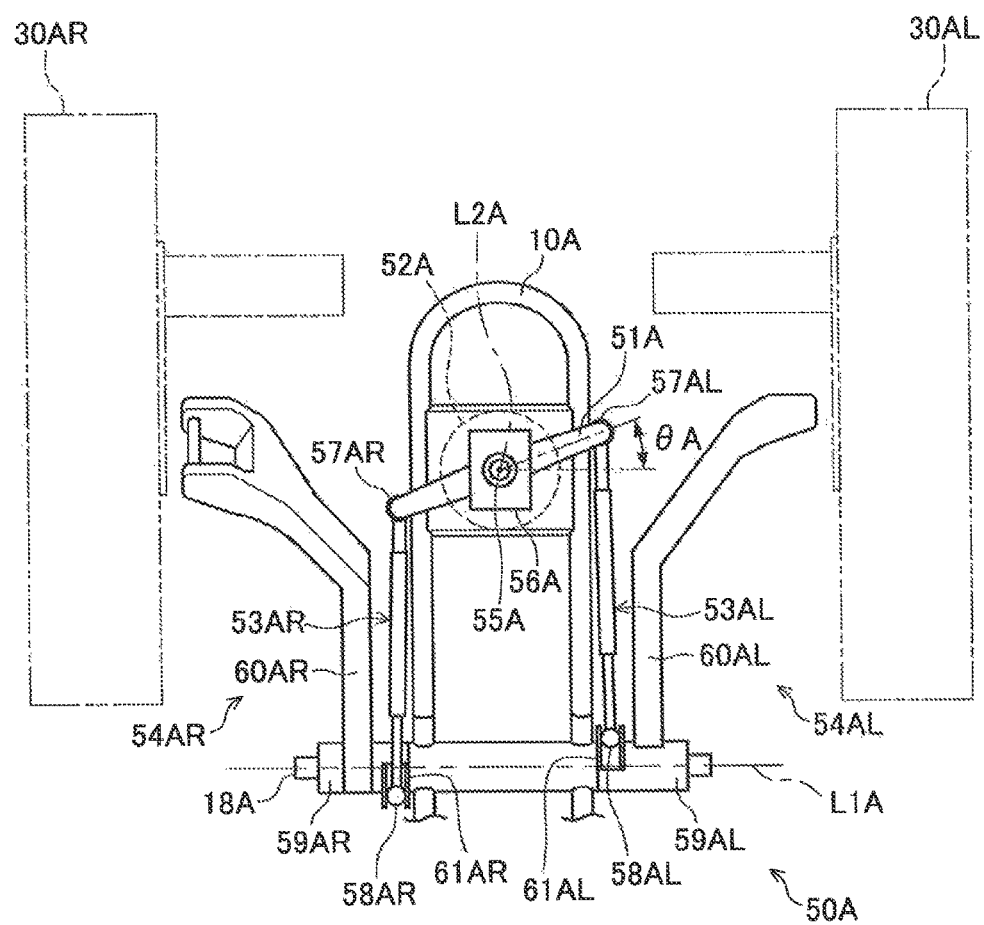
FIG. 15 is a view in a direction XV of FIG. 14.

Next, the operations of the front suspension device 50A and the rear suspension device 90A will be described. Additionally, since the front suspension device 50A and the rear suspension device 90A have a longitudinally symmetrical shape except for the connection structures to the crawler traveling devices 30A and 70A, the front suspension device 50A will be representatively described below and a description of the rear suspension device 90A will be omitted. FIG. 14 is a right side view illustrating an operation state of the front suspension device 50A. FIG. 15 is a view in a direction XV of FIG. 14. Additionally, FIG. 14 illustrates a state where the right front crawler traveling device 30AR swings downward and the left front crawler traveling device 30AL swings upward and a description of the left connection arm 53AL and the left swing arm 54AL of the front suspension device 50A will be omitted.

The front suspension device 50A is able to swing the suspended right and left front crawler traveling devices 30AR and 30AL in the opposite directions in the vertical direction in an interlocking manner. In the state of FIG. 10, when the rotation arm 51A is rotated in the counter-clockwise direction (leftward) by the motor 52A, the right front crawler traveling device 30AR swings downward about the rotation shaft 18A serving as an axis and the left front crawler traveling device 30AL swings upward about the rotation shaft 18A serving as an axis as illustrated in FIGS. 14 and 15.

More specifically, as illustrated in FIG. 15, when the rotation arm 51A rotates in the counter-clockwise direction (leftward) by an angle θA through the motor 52A, the right connection arm 53AR is moved backward. When the right connection arm 53AR is moved backward, a second arm 61AR of the right swing arm 54AR is rotated backward (in FIG. 14, in the clockwise direction) about the rotation shaft 18A serving as an axis. The right second arm 61AR integrally rotates with the right first arm 60AR along with the right support portion 59AR. For this reason, when the right second arm 61AR is rotated backward, the right first arm 60AR is rotated downward (in FIG. 14, in the clockwise direction) about the rotation shaft 18A serving as an axis and the right front crawler traveling device 30AR is swung downward.

Meanwhile, when the rotation arm 51A rotates in the counter-clockwise direction (leftward) by an angle θA through the motor 52A, the left connection arm 53AL is moved forward. When the left connection arm 53AL is moved forward, a second arm 61AL of the left swing arm 54AL is rotated forward (in FIG. 14, in the counter-clockwise direction) about the rotation shaft 18A serving as an axis. When the left second arm 61AL is rotated forward, a left first arm 60AL is rotated upward (in FIG. 14, in the counter-clockwise direction) about the rotation shaft 18A serving as an axis and a left front crawler traveling device 30L is swung upward. Additionally, when the rotation arm 51A is rotated in the clockwise direction (rightward) by the motor 52A, the front suspension device 50A performs an operation opposite to the above-described operation and thus a description thereof will be omitted.

Thus, the suspended right and left front crawler traveling devices 30AR and 30AL are swung in the opposite directions in the vertical direction in an interlocking manner by the front suspension device 50A. This is because the right and left front crawler traveling devices 30AR and 30AL are connected to each other through the rotation arm 51A supported by the vehicle body frame 10A to be rotatable about the substantially vertical direction serving as an axis.

Here, the front crawler traveling device 30A swings in the vertical direction without the movement in the horizontal direction and the rotation about the longitudinal direction serving as an axis. Then, a ground contact portion of the front crawler traveling device 30A is kept in parallel to the vehicle body frame 10A at all times and slides in the vertical direction with respect to the vehicle body frame 10A. Thus, the right and left front crawler traveling devices 30AR and 30AL are able to promptly follow an inclination of a slope or a change in an unevenness portion of an irregular ground in the vertical direction. Accordingly, the traveling performance, the operability, or the riding comfort becomes satisfactory.

Further, since the right and left front crawler traveling devices 30AR and 30AL are swung in the vertical direction by the motor 52A, an occupant does not need to perform an operation in accordance with the movement of a body weight or the like. Thus, since the occupant can easily swing the right and left front crawler traveling devices 30AR and 30AL in the vertical direction, a burden on a driving operation of the occupant is reduced and the driving operation can be comfortably and continuously performed for a long period of time.

Further, the front suspension device 50A is configured to integrally suspend the right and left front crawler traveling devices 30AR and 30AL on the vehicle body frame 10A. Since this configuration is simpler than the configuration in which the crawler traveling devices are independently suspended and the number of components is decreased, the productivity or the maintenance workability becomes satisfactory.

Further, even when the right and left front crawler traveling devices 30AR and 30AL are swung in the vertical direction to follow an inclination of a slope when the vehicle travels on the slope, the ground contact portion of the front crawler traveling device 30A is kept in parallel to the vehicle body frame 10A at all times. Thus, a crest side portion of the ground contact portion of the front crawler traveling device 30A can be bitten into the slope while being used as an edge. For example, when the vehicle travels on a slope in which the right side of the traveling vehicle 1A is high and the left side thereof is low, a right portion of the ground contact portion of the front crawler traveling device 30A can be bitten into the slope while being used as an edge. Thus, the front crawler traveling device 30A cannot easily slip laterally on the slope and thus the traveling performance or the riding comfort when the vehicle travels on the slope becomes satisfactory.

Here, as illustrated in FIG. 9, the connection arm 53A and the second arm 61A are connected to each other at a substantially right angle in the side view. Thus, a force generated by the rotation of the rotation arm 51A can be effectively transmitted from the connection arm 53A as a force of swinging the swing arm 54A in the vertical direction (a rotation about the rotation shaft 18A serving as an axis) and thus the heavy front crawler traveling device 30A can be easily swung in the vertical direction. Then, the motor 52A can be decreased in size.

Further, a distance (the length of the first arm 60A) from the rotation center of the support portion 59A (the line L1A passing through the center of the rotation shaft 18A) to the connection portion between the first arm 60A and the front crawler traveling device 30A is longer than a distance (the length of the second arm 61A) from the rotation center of the support portion 59A (the line L1A passing through the center of the rotation shaft 18A) to the connection portion between the second arm 61A and the connection arm 53A. Thus, even when the movement amount of the connection arm 53A in the longitudinal direction, that is, the rotation amount of the rotation arm 51A is small, the rotation amount of the swing arm 54A about the rotation shaft 18A serving as an axis can be increased. That is, the front crawler traveling device 30A can be largely swung by the small rotation of the rotation arm 51A and thus the front suspension device 50A can be decreased in size.

Further, the rotation shaft 18A is located at the substantial center of the vehicle body frame 10A in the longitudinal direction and the connection arm 53A and the swing arm 54A are disposed to extend forward from the rotation shaft 18A. That is, the front suspension device 50A is bent at the connection portion between the connection arm 53A and the swing arm 54A (the end of the second arm 61A) and the connection arm 53A and the swing arm 54A are disposed side by side in the top view. Thus, since the length of the front suspension device 50A in the longitudinal direction can be shortened so that the entire length of the traveling vehicle 1A can be shortened, the traveling performance is improved.

Further, the rotation shaft 18A is located at the substantial center of the vehicle body frame 10A in the longitudinal direction. That is, the support portion 59A is supported by the substantial center of the vehicle body frame 10A in the longitudinal direction to be rotatable and the swing arm 54A is disposed to extend forward from the substantial center of the vehicle body frame 10A in the longitudinal direction. Thus, since the front suspension device 50A (the swing arm 54A) does not largely protrude toward the front side of the traveling vehicle 1A and the entire length of the traveling vehicle 1A can be shortened, the traveling performance is improved.

Further, the swing arm 54A of the front suspension device 50A and the swing arm 94A of the rear suspension device 90A are adjacent to the substantial center of the vehicle body frame 10A in the longitudinal direction and are supported to be rotatable. Then, a force applied from the front suspension device 50A and the rear suspension device 90A to the vehicle body frame 10A easily concentrates on the vicinity of the center. Here, the base frame portion 11A provided with the rotation shafts 18A and 19A has a longitudinally symmetrical shape and a structure similar to a truss structure formed by the reinforcement frames 20A and 21A connected to the vicinity of the rotation shafts 18A and 19A. That is, the base frame portion 11A has a high strength since a position easily collecting a force is effectively reinforced and strength is equalized. Thus, the vehicle body frame 10A has a sufficient strength and can suppress an increase in weight.

Further, the rotation shaft 18A is located at the lower portion of the substantial center of the vehicle body frame 10A in the longitudinal direction, the second arm 61A is provided to vertically extend downward from the support portion 59A, and the rotation arm 51A and the connection arm 53A are located below the vehicle body frame 10A. That is, main components of the front suspension device 50A are located below the vehicle body frame 10A. Additionally, the swing arm 54A is located at the lateral side of the vehicle body frame 10A. Thus, the front suspension device 50A does not occupy the inside of the vehicle body frame 10A, the inner space of the vehicle body frame 10A can be efficiently used, and the entire length of the traveling vehicle 1A can be shortened. Then, for example, a battery and the like can be disposed inside the vehicle body frame 10A.

Further, the right and left connection arms 53AR and 53AL are dampers of telescopic bar-shaped cushion mechanisms configured as cylinders and the right and left front crawler traveling devices 30AR and 30AL are suspended on the vehicle body frame 10A through the damper. Thus, an impact across the vehicle body frame 10A and the right and left front crawler traveling devices 30AR and 30AL can be reduced by the right and left connection arms 53AR and 53AL. Then, since the right and left front crawler traveling devices 30AR and 30AL respectively stably contact a ground, the traveling performance or the riding comfort is improved.

Here, the swing of the front crawler traveling device 30A in the vertical direction, that is, the rotation of the motor 52A may be performed in response to the operation of the occupant. However, there are many cases in which the occupant cannot easily operate the right and left front crawler traveling devices 30AR and 30AL to swing so that the traveling devices follow a slope or an unevenness portion of an irregular ground. Thus, it is desirable to control the motor 52A serving as a rotation device by various sensors and a controller to be described later. Additionally, as a configuration in which the motor 52A is operated in response to the operation of the occupant, for example, an operation device is provided in the vicinity of the accelerator grip 117A of the handle lever 116A and the motor 52A is operated in response to the operation of the operation device from the occupant. As the operation device, for example, a switch assembly such as a toggle switch or a push switch can be used. With such a configuration, since the occupant can operate the operation device with griping the accelerator grip 117A, the traveling operation of the traveling vehicle 1A and the operation of the operation device can be performed at the same time and thus safety and the operability become satisfactory. Additionally, the operation device is not particularly limited. A configuration and an arrangement are desirable in which the operation device can be operated while the occupant performs the traveling operation of the traveling vehicle 1A.

Next, a traveling operation and a steering operation of the traveling vehicle 1A will be described. As described above, the front and rear crawler traveling devices 30A and 70A are driven while the drive wheels 31A and 71A are rotated by the motors 36A and 76A. Then, when the front and rear crawler traveling devices 30A and 70A are driven, the traveling vehicle 1A can be moved forward and backward. Further, when the right and left front crawler traveling devices 30AR and 30AL are rotated in an interlocking manner in the horizontal direction with respect to the vehicle body frame 10A by a steering device (not illustrated), the traveling vehicle 1A can be steered. Then, the traveling operation and the steering operation of the traveling vehicle 1A are performed when the front and rear crawler traveling devices 30A and 70A or the steering device is controlled by the controller CA.

More specifically, the steering operation is performed by the control of the steering device based on the detection value of the handle sensor detecting the rotation angle of the steering shaft 115A and the front and rear crawler traveling devices 30A and 70A are controlled on the basis of the detection value of the accelerator grip sensor detecting the rotation angle of the accelerator grip 117A.

Figure 16:
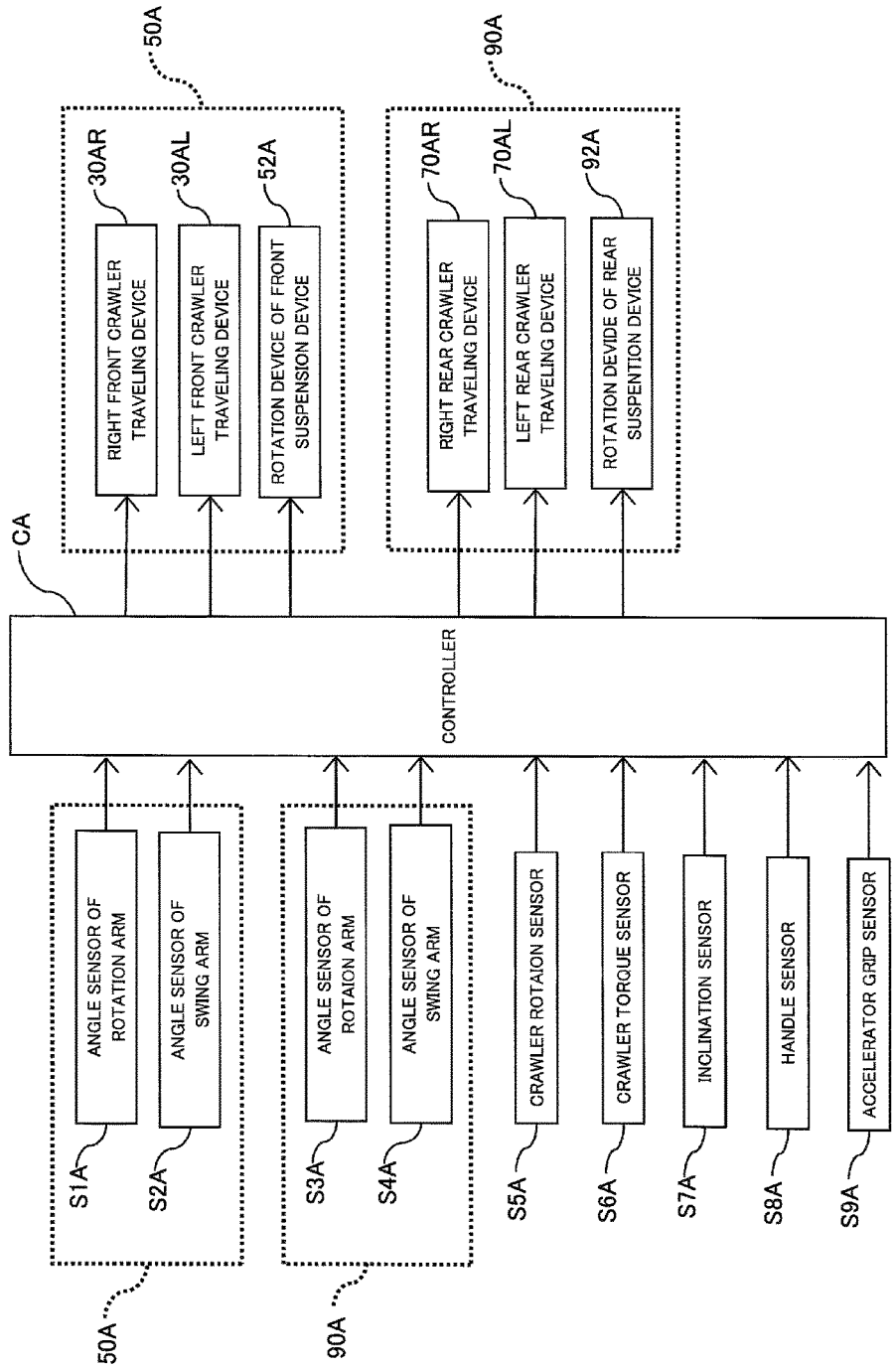
FIG. 16 is a configuration block diagram illustrating an example of a configuration of a controller.

Additionally, in the above-described configuration, the front and rear crawler traveling devices 30A and 70A are controlled on the basis of the detection value of the accelerator grip sensor corresponding to the operation amount of the occupant for the accelerator grip 117A, but the invention is not limited to this configuration. A configuration may be employed in which the front and rear crawler traveling devices 30A and 70A are controlled on the basis of the detection value of the accelerator grip sensor corresponding to at least the operation amount of the occupant. For example, the front and rear crawler traveling devices 30A and 70A may be controlled on the basis of the detection value of the handle sensor and the detection value of the accelerator grip sensor. That is, the crawler traveling devices 30AR, 30AL, 70AR, and 70AL may be driven at a different speed in a turning travel state. With such a configuration, the traveling vehicle 1A can perform a turning traveling operation in consideration of an inner wheel difference and thus can smoothly turn in a travel state. Further, as illustrated in FIG. 16, a configuration may be employed in which various sensors detecting the travel state of the traveling vehicle 1A are provided and the vehicle is controlled on the basis of the detection values of various sensors. Additionally, a configuration may be employed in which the steering shaft 115A and the steering device are connected to each other in an interlocking manner and the steering device is operated in response to the operation of the steering shaft 115A.

A sensor detecting the travel state of the traveling vehicle 1A includes an angle sensor S1A which detects a rotation angle of the rotation arm 51A of the front suspension device 50A with respect to the vehicle body frame 10A, an angle sensor S2A which detects a rotation angle of the swing arm 54A of the front suspension device 50A with respect to the vehicle body frame 10A, an angle sensor S3A which detects a rotation angle of the rotation arm 91A of the rear suspension device 90A with respect to the vehicle body frame 10A, an angle sensor S4A which detects a rotation angle of the swing arm 94A of the rear suspension device 90A with respect to the vehicle body frame 10A, a crawler rotation sensor S5A which detects the number of rotations of the drive wheels 31A and 71A of the front and rear crawler traveling devices 30A and 70A, a torque sensor S6A which detects output torques of the motors 36A and 76A of the front and rear crawler traveling devices 30A and 70A, an inclination sensor S7A which detects an inclination angle of the vehicle body frame 10A with respect to a horizontal plane, and the like. Then, the controller CA controls the crawler traveling devices 30AR, 30AL, 70AR, and 70AL and the motors 52A and 92A serving as the rotation devices on the basis of the detection values of various sensors as well as a handle sensor S8A and an accelerator grip sensor S9A.

Here, the controller CA can calculate a swing state (a position) of each of the crawler traveling devices 30AR, 30AL, 70AR, and 70AL in the vertical direction with respect to the vehicle body frame 10A on the basis of the rotation angles of the angle sensors S1A to S4A. Thus, a swing state in the vertical direction (a position in the vertical direction) of each of the crawler traveling devices 30AR, 30AL, 70AR, and 70AL with respect to the vehicle body frame 10A can be detected by the detection values (the rotation angles) of the angle sensors S1A to S4A. Further, a ground contact state (a road condition) of each of the crawler traveling devices 30AR, 30AL, 70AR, and 70AL can be detected by the crawler rotation sensor S5A and the torque sensor S6A. Further, an inclination angle of the traveling vehicle 1A with respect to a horizontal plane, that is, a traveling posture of the traveling vehicle 1A can be detected by the inclination sensor S7A. Further, the traveling operation of the occupant can be detected by the handle sensor S8A and the accelerator grip sensor S9A.

Thus, the travel state of the traveling vehicle 1A can be checked in detail by various sensors. Then, since the controller CA can control the crawler traveling devices 30AR, 30AL, 70AR, and 70AL in response to the travel state of the traveling vehicle 1A by the operations of the handle and the accelerator from the occupant, the traveling performance of the traveling vehicle 1A is improved. Further, when the motors 52A and 92A serving as the rotation devices are controlled on the basis of the detection values of the angle sensors S1A to S4A or the detection values of the angle sensors S1A to S4A and the inclination sensor S7A, the vehicle body frame 10A can be held horizontally and thus the traveling performance or the riding comfort on an irregular ground is improved.

Additionally, the type of various sensors is not particularly limited. For example, a potentiometer or an encoder is used to detect a rotation angle. A gyro sensor is used as the inclination sensor S7A. Additionally, the inclination sensor S7A may be used to detect at least a roll angle as an inclination in the horizontal direction and may be also used to detect a pitch angle as an inclination in the longitudinal direction. With such a configuration, an inclination angle of the traveling vehicle 1A with respect to a horizontal plane can be checked in more detail and thus the traveling performance and the stability of the traveling vehicle 1A can be improved.

Further, the controller CA may intermittently store the detection values of various sensors and may control the devices on the basis of the detection values of various sensors and the change amounts thereof. For example, the controller CA may be configured to calculate a swing state in the vertical direction (a position in the vertical direction) of each of the crawler traveling devices 30AR, 30AL, 70AR, and 70AL with respect to the vehicle body frame 10A on the basis of the detection values of the angle sensors S1A to S4A and to calculate a swing speed (a speed in the vertical direction) of each of the crawler traveling devices 30AR, 30AL, 70AR, and 70AL on the basis of an intermittent change in swing displacement. With such a configuration, the swing states of the crawler traveling devices 30AR, 30AL, 70AR, and 70AL can be checked by a swing displacement and a swing speed. Thus, since the detailed travel state of the traveling vehicle 1A can be checked, the traveling performance of the traveling vehicle 1A is improved.

Further, the configurations of various sensors for checking the travel state are not particularly limited. For example, a sensor for detecting the swing state of each of the crawler traveling devices 30AR, 30AL, 70AR, and 70AL in the vertical direction may be a sensor that detects a distance between the vehicle body frame 10A and a ground. As such a distance detecting sensor, an ultrasonic distance sensor or an infrared distance sensor can be used. Additionally, a sensor for detecting the swing state may be desirably configured as the angle sensors S1A to S4A. In this case, the swing state in the vertical direction of each of the crawler traveling devices 30AR, 30AL, 70AR, and 70AL can be checked with high accuracy compared to the distance sensor.

Further, an acceleration sensor may be provided in the vehicle body frame 10A or each of the crawler traveling devices 30AR, 30AL, 70AR, and 70AL. With such a configuration, the travel state of the traveling vehicle 1A can be detected with higher accuracy.

Further, various sensors may be provided and the number of sensors is not limited. For example, the angle sensors S1A to S4A each serving as a swing sensor detecting the swing state in the vertical direction of each of the crawler traveling devices 30AR, 30AL, 70AR, and 70AL with respect to the vehicle body frame 10A may be a configuration including S1A and S3A or a configuration including S2A and S4A. Additionally, various sensors may be provided. With such a configuration, the travel state of the traveling vehicle 1A can be checked with higher accuracy.

Further, the arrangement of various sensors is not particularly limited. For example, it is desirable to fix the angle sensors S1A to S4A to the vehicle body frame 10A. With such a configuration, a wire harness connected to the angle sensors S1A to S4A is not influenced by the rotation of the rotation arms 51A and 91A or the swing of the swing arms 54A and 94A. Accordingly, a disconnection of a wire can be prevented and a wire harness is easily wired. Desirably, the inclination sensor S7A is disposed at the center of the traveling vehicle 1A in the width direction. More desirably, the inclination sensor is provided at the center of the traveling vehicle 1A in the longitudinal direction or the front and rear portions of the traveling vehicle 1A. That is, the inclination sensor S7A is desirably provided at the center of the traveling vehicle 1A in the longitudinal direction or is desirably provided to correspond to each of the front suspension device 50A and the rear suspension device 90A. In the case where the inclination sensor S7A is provided at the center of the traveling vehicle 1A in the longitudinal direction, the inclination angle of the traveling vehicle 1A with respect to a horizontal plane (the traveling posture of the traveling vehicle 1A) can be effectively detected by one inclination sensor S7A. Further, when the inclination sensor S7A is provided to correspond to each of the front suspension device 50A and the rear suspension device 90A, the inclination angle of the traveling vehicle 1A with respect to a horizontal plane (the traveling posture of the traveling vehicle 1A) can be detected with higher accuracy.

Further, a warning device which is controlled by the controller CA on the basis of the detection values of various sensors may be provided. For example, a warning device which is controlled on the basis of the detection value of the inclination sensor S7A may be provided. With such a configuration, it is possible to warn a slope which suddenly appears when the occupant drives a vehicle and thus to prevent a situation in which a sideslip and an overturn easily occur. Accordingly, safety is further improved. Additionally, the warning device is not particularly limited and may be used to warn the occupant. For example, the warning device may warn the occupant by a sound or light. Further, a warning sound generating device or a lamp flashing device may be used. Further, the warning device may be an emergency stop device which stops the front and rear crawler traveling devices 30A and 70A.

Further, the travel control of the traveling vehicle 1A using the controller CA is not limited to the above-described control configuration. For example, an ON/OFF control may be provided which drives the motors 52A and 92A serving as the rotation devices on the basis of the roll angle as the inclination in the horizontal direction of the traveling vehicle 1A detected by the inclination sensor S7A or the swing displacements of the crawler traveling devices 30AR, 30AL, 70AR, and 70AL detected by the angle sensors S1A to S4A. That is, an ON/OFF control may be provided which drives the motors 52A and 92A in response to the travel state.

With such a control configuration, for example, the vehicle travels while the driving of the motors 52A and 92A is stopped when an unevenness portion or a slope of a travel road is smaller than a predetermined value and the vehicle travels while the motors 52A and 92A are driven when the unevenness portion or the slope is larger than the predetermined value. Since the driving time of the motors 52A and 92A in the travel state is reduced, the traveling vehicle 1A can travel with high energy efficiency. Additionally, the ON/OFF control for the driving of the motors 52A and 92A is not limited to the control using the controller CA and may be performed in response to the operation of the occupant.

Additionally, the front suspension device 50A is not limited to the above-described configuration, but may include the rotation arm 51A which extends in the horizontal direction and is supported by the vehicle body frame 10A to be rotatable at the center of the rotation arm in the horizontal direction, the right swing arm 54AR which is supported by the vehicle body frame 10A to be rotatable in the vertical direction about the horizontal direction serving as an axis and of which the end is connected to the right front crawler traveling device 30AR, the left swing arm 54AL which is supported by the vehicle body frame 10A to be swingable in the vertical direction about the horizontal direction serving as an axis and of which the end is connected to the left front crawler traveling device 30AL, the right connection arm 53AR of which one end is connected to the right end of the rotation arm 51A and the other end is connected to the right swing arm 54AR, and the left connection arm 53AL of which one end is connected to the left end of the rotation arm 51A and the other end is connected to the left swing arm 54AL.

For example, the second arm 61A of the swing arm 54A of the front suspension device 50A extends downward from the support portion 59A, but may extend upward. With such a configuration, the second arm 61A does not protrude toward the downside of the vehicle body frame 10A. Accordingly, it is possible to prevent the second arm 61A from contacting an obstacle in the travel state. Further, since it is possible to lower the gravity center by reducing the vehicle height of the traveling vehicle 1A, the traveling performance is improved. Additionally, when the gravity center needs to be lowered, it is desirable that a heavy battery or fuel tank be located at the lower portion of the vehicle body frame 10A. Additionally, the above-described effect is obtained even in the rear suspension device 90A similarly to the front suspension device 50A.

Here, the cushion mechanism is not limited to the damper configured as a cylinder or the like. Any structure capable of reducing an impact may be employed. For example, a structure obtained by a combination of a spring and a cylinder may be employed.

Further, the front and rear suspension devices 50A and 90A may not include the motors 52A and 92A serving as the rotation devices. In the case of such a configuration, when the occupant inclines the vehicle body frame 10A to any one of the right and left sides, the front and rear crawler traveling devices 30A and 70A can be swung in the vertical direction. For example, when the occupant moves the body weight rightward so that the vehicle body frame 10A is inclined rightward, the right front and rear crawler traveling devices 30AR and 70AR swing upward and the left front and rear crawler traveling devices 30AL and 70AL swing downward.

Thus, when the vehicle travels on a slope, the traveling vehicle 1A is inclined toward a crest side of the slope so that the vehicle body frame 10A becomes substantially horizontal. Accordingly, a crest side portion of a ground contact portion of the front crawler traveling device 30A and a crest side portion of a ground contact portion of the rear crawler traveling device 70A can be bitten into the slope while being used as an edge. Then, since the sideslip of the front and rear crawler traveling devices 30A and 70A hardly occurs on a slope, the traveling performance or the riding comfort when the vehicle travels on the slope is satisfactory.

Here, in the case of such a configuration, the occupant normally moves a body weight in the horizontal direction to take a balance of the vehicle body frame 10A in the horizontal direction in a travel state. Thus, when the operability for the continued traveling operation for a long period of time is taken into consideration, a configuration including the motors 52A and 92A serving as the rotation devices is desirable. Accordingly, the occupant can drive the vehicle more comfortably for a long period of time.

Further, the traveling vehicle 1A according to the embodiment is not limited to a configuration in which four front, rear, right, and left crawler traveling devices 30AR, 30AL, 70AR, and 70AL are used in the travel state. At least a pair of right and left traveling devices may be used. For example, here, although not illustrated in the drawings, a traveling vehicle may be used in which only one of the rear crawler traveling devices 70AR and 70AL of the traveling vehicle 1A is provided. In the traveling vehicle, one rear crawler traveling device 70A is disposed at the center of the rear portion of the vehicle body frame 10A in the horizontal direction of the traveling vehicle 1A, and the vehicle travels by three crawler traveling devices. The suspension device of the rear crawler traveling device 70A of the traveling vehicle is not particularly limited. However, it is desirable that the rear crawler traveling device be suspended on the vehicle body frame 10A by the suspension device to be largely swingable in the vertical direction. For example, the rear crawler traveling device 70A may be suspended by a pulling arm of which one end is connected to the vehicle body frame 10A to be rotatable about the horizontal direction serving as an axis and the other end is connected to the rear crawler traveling device 70A. With such a configuration, the vehicle can stably travel on a slope or an irregular ground even in the case of three traveling devices. Further, the number of components can be decreased and thus the productivity and the maintenance workability are improved.

Figure 17:
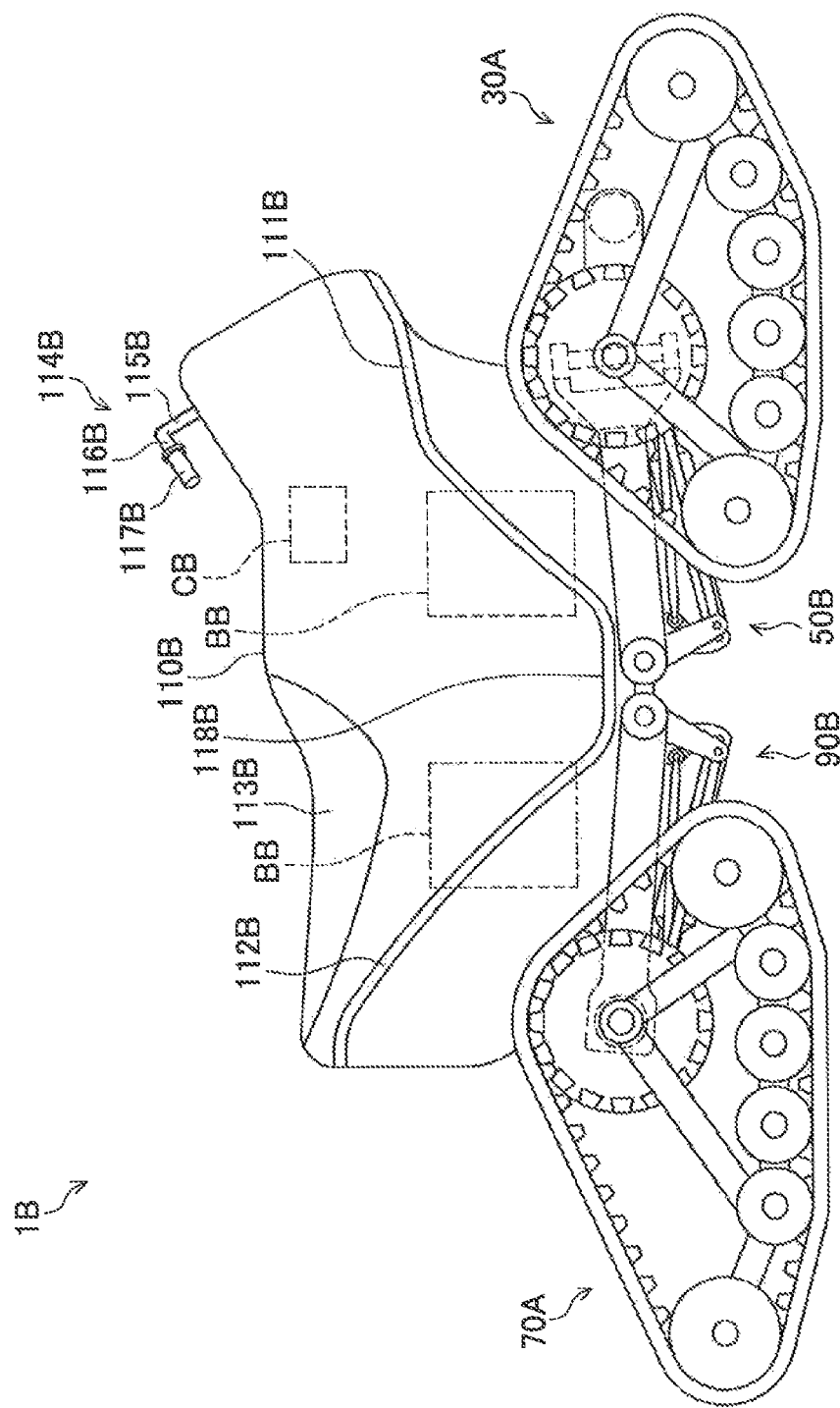
FIG. 17 is a right side view illustrating an example of a traveling vehicle according to another embodiment.
Figure 18:
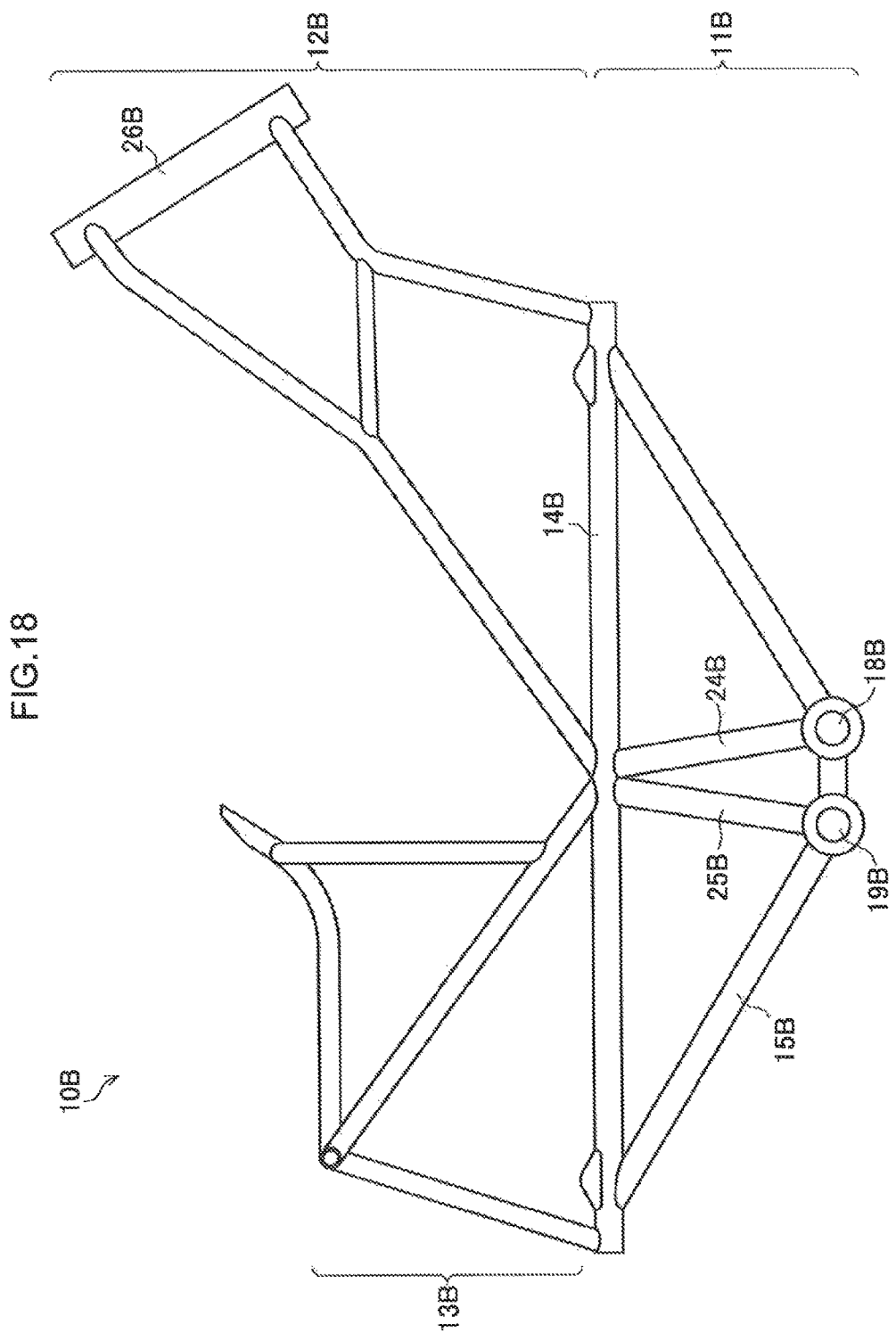
FIG. 18 is a right side view illustrating a vehicle body frame of the traveling vehicle of FIG. 17.
Figure 19:
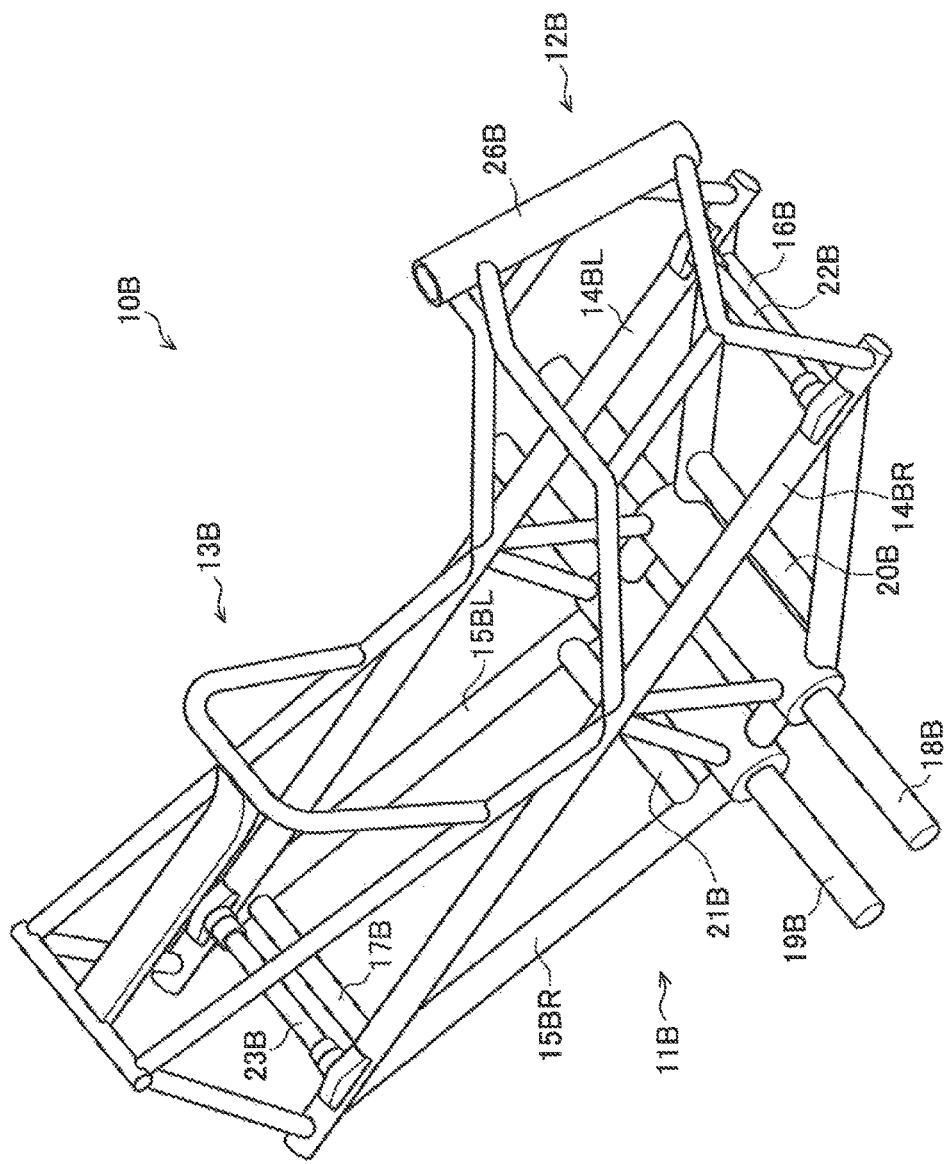
FIG. 19 is a perspective view illustrating the vehicle body frame of FIG. 18.

Further, the traveling vehicle according to the embodiment may be a traveling vehicle 1B illustrated in FIGS. 17 to 19. FIG. 17 is a right side view illustrating an example of the traveling vehicle 1B according to another embodiment, FIG. 18 is a right side view illustrating a vehicle body frame 10B of the traveling vehicle 1B of FIG. 17, and FIG. 19 is a perspective view illustrating the vehicle body frame 10B of FIG. 18 when viewed from the forward-diagonally upside. Additionally, the traveling vehicle 1B according to another embodiment is different from the traveling vehicle 1A in that the vehicle body frame 10A, the front and rear suspension devices 50A and 90A, and the like are different. Then, the same component as that of the traveling vehicle 1A will be indicated by the same reference sign and a description thereof will be appropriately omitted.

As illustrated in FIGS. 17 to 19, the traveling vehicle 1B includes the vehicle body frame 10B, the front crawler traveling devices 30A which serve as a pair of right and left traveling devices provided at a front portion of the vehicle body frame, a front suspension device 50B which suspends the pair of right and left front crawler traveling devices 30A on the vehicle body frame 10B, the rear crawler traveling devices 70A which serve as a pair of right and left traveling devices provided at a rear portion of the vehicle body frame, and the rear suspension device 90B which suspends the pair of right and left rear crawler traveling devices 70A on the vehicle body frame 10B. Further, the traveling vehicle 1B also includes a battery BB which stores electricity, a controller CB which includes a calculation unit and a storage unit and controls devices inside the vehicle body frame 10B.

Further, the traveling vehicle 1B includes a main body cover 110B which includes front fenders 111B, rear fenders 112B, and the like, a driver seat 113B, a handle 114B which includes a steering shaft 115B, a handle bar 116B, an accelerator grip 117B, and the like, a handle sensor (not illustrated), an accelerator grip sensor (not illustrated), right and left step floors 118B, and the like. The battery BB, the controller CB, the main body cover 110B, the front fenders 111B, the rear fenders 112B, the driver seat 113B, the handle 114B, the steering shaft 115B, the handle bar 116B, the accelerator grip 117B, the handle sensor, the accelerator grip sensor, and the right and left step floors 118B correspond to the battery BA, the controller CA, the main body cover 110A, the front fenders 111A, the rear fenders 112A, the driver seat 113A, the handle 114A, the steering shaft 115A, the handle bar 116A, the accelerator grip 117A, the handle sensor, the accelerator grip sensor, and the right and left step floors 118A of the traveling vehicle 1A. Then, a description of these configurations will be omitted.

Next, the vehicle body frame 10B will be described. Additionally, since the vehicle body frame 10B has a horizontal symmetrical shape, a right component will be appropriately indicated by a reference sign R and a left component will be appropriately indicated by a reference sign L if necessary. Additionally, the vehicle body frame 10B is different from the vehicle body frame 10A of the traveling vehicle 1A in that the front and rear suspension devices 50A and 90A are attached in a different manner.

As illustrated in FIGS. 18 and 19, the vehicle body frame 10B is obtained by connecting a plurality of steel members through welding or the like. The steel member is a cylindrical pipe or a plate-shaped plate. The vehicle body frame 10B includes a base frame portion 11B which extends in the longitudinal direction and has a bottom portion formed in a ship bottom shape, a front frame portion 12B which extends upward from a front portion of the base frame portion 11B, a rear frame portion 13B which extends upward from a rear portion of the base frame portion 11B, and the like.

The base frame portion 11B constitutes a main part of the vehicle body frame 10B and is used to attach the front suspension device 50B, the rear suspension device 90B, and the like to be described later. The base frame portion 11B includes a pair of right and left main frames 14B (14BR, 14BL) which extends in the longitudinal direction, a pair of right and left lower frames 15B (15BR, 15BL), a plurality of reinforcement frames 16B, 17B, 24B, and 25B, and the like.

The front ends of the right and left main frames 14BR and 14BL are connected to each other by the reinforcement frame 16B extending in the horizontal direction. Further, the rear ends of the right and left main frames 14BR and 14BL are connected to each other by the reinforcement frame 17B extending in the horizontal direction.

The right and left lower frames 15BR and 15BL are respectively located below the right and left main frames 14BR and 14BL and are provided to extend in the longitudinal direction in substantially parallel to the right and left main frames 14BR and 14BL. Both ends of the right and left lower frames 15BR and 15BL are respectively inclined upward to be connected to the right and left main frames 14BR and 14BL.

Two rotation shafts 18B and 19B extending in the horizontal direction are disposed between the center portions of the right and left lower frames 15BR and 15BL. The rotation shafts 18B and 19B are separated from each other in the longitudinal direction by a predetermined gap to be parallel to each other and both ends thereof protrude toward the outside of the lower frames 15BR and 15BL. Then, the rotation shafts 18B and 19B are used to connect the front suspension device 50B and the rear suspension device 90B to be described later to the vehicle body frame 10B.

Further, the rotation shafts 18B and 19B between the right and left lower frames 15BR and 15BL are formed to have diameters larger than that of, for example, the main frame 14B or the lower frame 15B. Thus, the rotation shafts 18B and 19B improves the rigidity of the vehicle body frame 10B by rigidly connecting the right and left lower frames 15BR and 15BL.

Rocker shafts 20B and 21B extending in the horizontal direction to be parallel to the rotation shafts 18B and 19B are provided at the front side of the rotation shaft 18B and the rear side of the rotation shaft 19B. Both ends of the rocker shafts 20B and 21B are respectively fixed to the right and left lower frames 15BR and 15BL. Then, the rocker shafts 20B and 21B are used to rotatably support rocker arms 212B and 232B to be described later.

A support shaft 22B which extends in the horizontal direction to be parallel to the rotation shafts 18B and 19B is provided at a position corresponding to the front ends of the right and left main frames 14BR and 14BL and the vicinity of the connection portions of the front ends of the right and left lower frames 15BR and 15BL. Both ends of the support shaft 22B are respectively fixed to the right and left main frames 14BR and 14BL. Meanwhile, a support shaft 23 which extends in the horizontal direction to be parallel to the rotation shafts 18B and 19B is provided at a position corresponding to the rear ends of the right and left main frames 14BR and 14BL and the vicinity of the connection portions of the rear ends of the right and left lower frames 15BR and 15BL. Both ends of the support shaft 23B are respectively fixed to the right and left main frames 14BR and 14BL. Then, the support shafts 22B and 23B are used to rotatably support motor casings 200B and 220B serving as swing support portions to be described later.

Two reinforcement frames 24B and 25B are respectively provided between the right main frame 14BR and the right lower frame 15BR and between the left main frame 14BL and the left lower frame 15BL. More specifically, the reinforcement frame 24B extends upward and backward from the vicinity of the connection portion between the rotation shaft 18B and the lower frame 15B to be connected to the substantial center of the main frame 14B in the longitudinal direction. The reinforcement frame 25B extends upward and forward from the vicinity of the connection portion between the rotation shaft 19B and the lower frame 15B to be connected to the substantial center of the main frame 14B in the longitudinal direction. Then, the strength in the vicinity of the arrangement positions of the rotation shafts 18B and 19B is improved by the reinforcement frames 24B and 25B.

Additionally, the base frame portion 11B has a longitudinally symmetrical shape. Then, two rotation shafts 18B and 19B, two rocker shafts 20B and 21B, and two support shafts 22B and 23B are respectively disposed at the longitudinally symmetrical positions. Further, the base frame portion 11B is provided with a truss structure formed by the main frame 14B, the lower frame 15B, and the reinforcement frames 24B and 25B in the side view. Thus, the base frame portion 11B has a high strength since the vicinity of the rotation shafts 18B and 19B is effectively reinforced and strength is equalized.

The front frame portion 12B is formed by a plurality of cylindrical steel members and has a substantially rectangular shape inclined so that a front portion is high and a rear portion is low in the side view. The front frame portion 12B is used to rotatably support the handle 114B (not illustrated). Ahead pipe 26B is provided at an upper portion of the front frame portion 12B. The head pipe 26B is a cylindrical pipe having an opening formed at both ends thereof and is disposed so that a front portion is low and a rear portion is high. Additionally, the head pipe 26B is located at the center of the vehicle body frame 10B in the horizontal direction. Then, the steering shaft 115B is inserted into the head pipe 26B from above so that the handle 114B is supported to be rotatable. Further, the front frame portion 12B accommodates various devices such as the battery BB (not illustrated).

The rear frame portion 13B is formed by a plurality of cylindrical steel members and has a substantially cuboid shape. The driver seat 113B (not illustrated) is attached to an upper portion of the rear frame portion 13B. Further, various devices such as the battery BB (not illustrated) are accommodated inside the rear frame portion 13B.

Additionally, the vehicle body frame 10B is not limited to the above-described configuration. The vehicle body frame 10B may be used to attach the front suspension device 50B and the rear suspension device 90B and has a sufficient rigidity for the traveling vehicle. For example, the vehicle body frame 10B may be formed by a hollow square column member or a steel member having an L-shaped or H-shaped cross-section instead of the cylindrical pipe. Further, a configuration may be employed in which the plate-shaped member is stretched across the frame in order to improve the strength or to place various devices.

Figure 20:
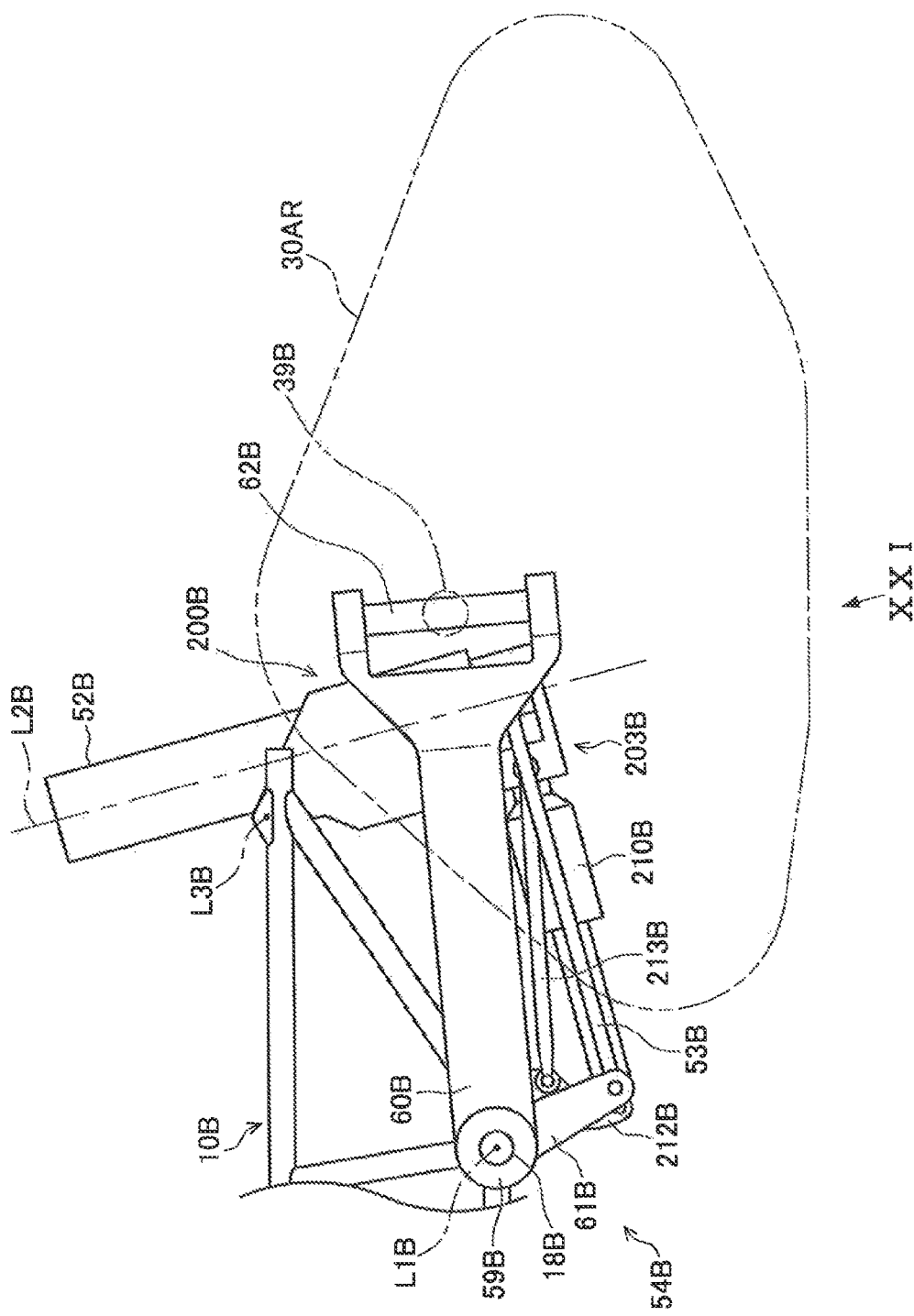
FIG. 20 is a right side view illustrating a front suspension device.
Figure 21:
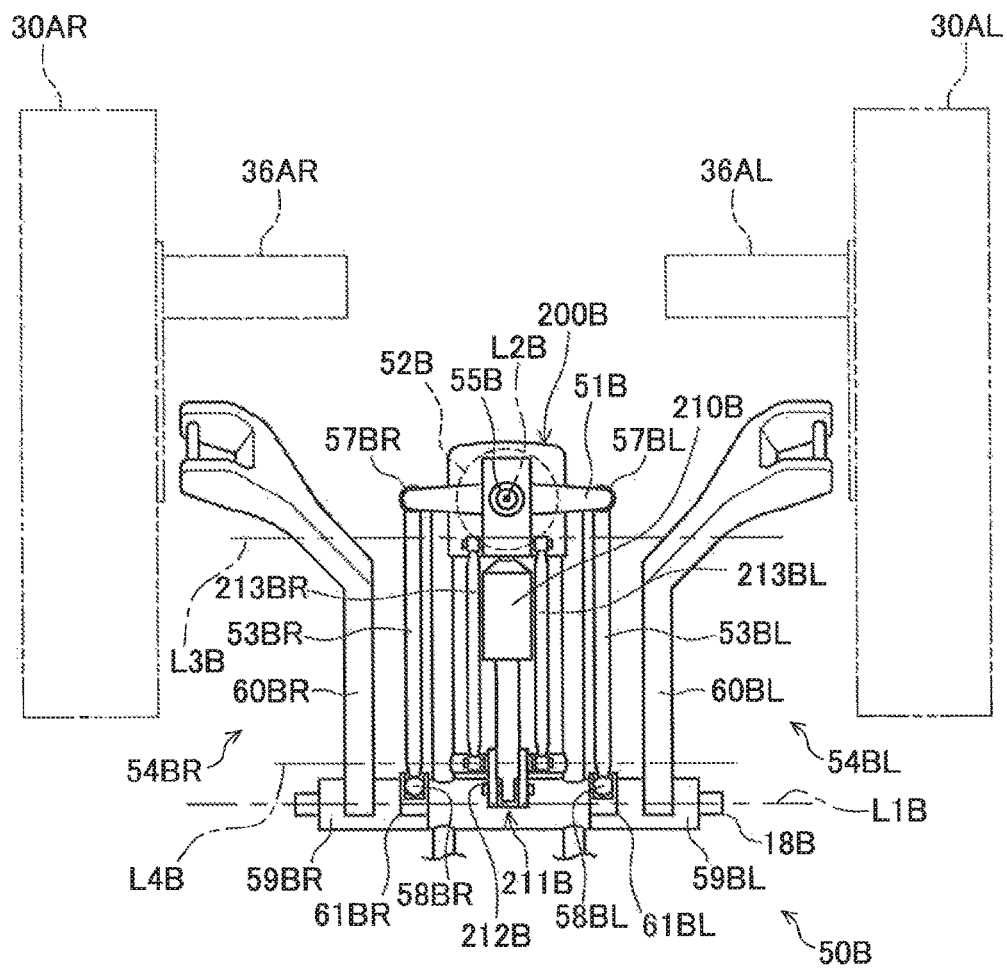
FIG. 21 is a view in a direction XXI of FIG. 20.
Figure 22:
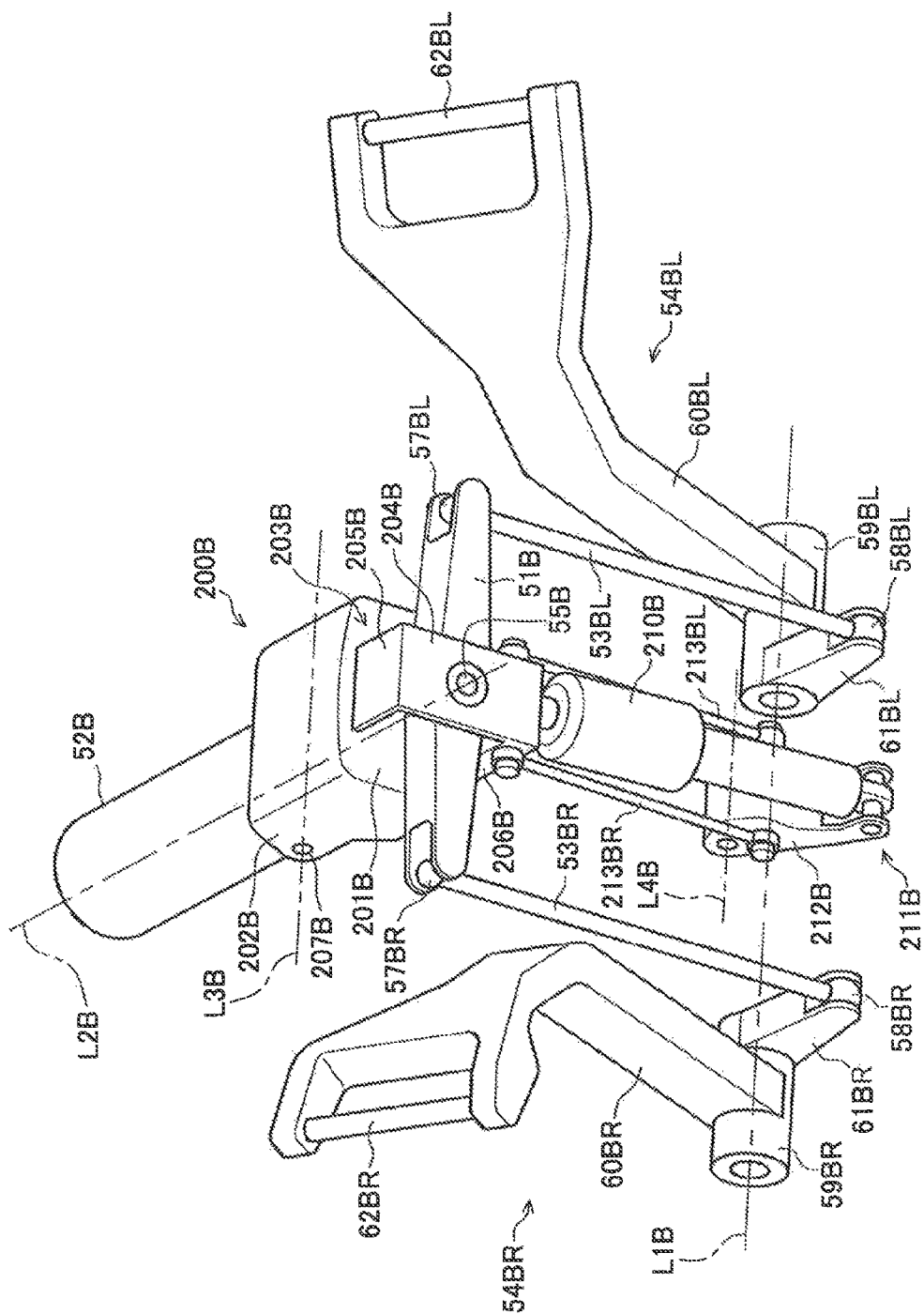
FIG. 22 is a perspective view illustrating the front suspension device.

Next, the front suspension device 50B will be described. Additionally, since the front suspension device 50B has a horizontal symmetrical shape, a right component will be appropriately indicated by a reference sign R and a left component will be appropriately indicated by a reference sign L if necessary. FIG. 20 is a right side view illustrating the front suspension device 50B. FIG. 21 is a view in a direction XXI of FIG. 20. FIG. 22 is a perspective view illustrating the front suspension device 50B when viewed from the forward-diagonally downside.

As illustrated in FIGS. 20 to 22, the front suspension device 50B includes a rotation arm 51B, a motor 52B which serves as a rotation device rotating the rotation arm 51B, a motor casing 200B which serves as a swing support portion, a pair of right and left connection arms 53B (53BR, 53BL), a pair of right and left swing arms 54B (54BR, 54BL), a damper 210B which serves as a cushion mechanism, and the like. Additionally, a description of the vehicle body frame 10B is omitted in FIG. 22. Further, in FIGS. 20 to 22, a line L1B is a line passing through the center of the rotation shaft 18B, a line L2B is a line passing through the rotation center of the rotation arm 51B, a line L3B is a line passing through the center of the support shaft 22B, and a line L4B is a line passing through the center of the rocker shaft 20B. Here, the rotation arm 51B, the motor 52B, the pair of right and left connection arms 53B, and the pair of right and left swing arms 54B correspond to the rotation arm 51A, the motor 52A, the pair of right and left connection arms 53A, and the pair of right and left swing arms 54A of the front suspension device 50A of the traveling vehicle 1A. Accordingly, a description of the same configuration will be appropriately omitted.

The motor casing 200B is a casing having a substantially bottomed square cylindrical shape and includes a substantially square bottom wall 201B and four side walls 202B. The lower face of the bottom wall 201B is provided with a bracket 203B which has a U-shape in the side view. The bracket 203B includes a bottom wall 204B and front and rear side walls 205B and 206B and the upper ends of the front and rear side walls 205B and 206B are fixed to the bottom wall 201B.

The motor 52B is inserted into the motor casing 200B from above while a drive shaft (not illustrated) is directed downward and is fixed to the bottom wall 201B of the motor casing 200B. The right and left side walls 202B of the motor casing 200B are formed so that a through-hole 207B is formed at the rear side of the upper portions to penetrate the upper portions in the horizontal direction. The support shaft 22B of the vehicle body frame 10B is inserted through the through-hole 207B. Thus, the motor casing 200B is supported by the vehicle body frame 10B to be swingable in the vertical direction about the horizontal direction serving as an axis (the line L3B). Additionally, the motor casing 200B is disposed so that the upper portion is inclined backward.

The rotation arm 51B is a square column member extending in the horizontal direction and includes a rotation shaft 55B disposed at the center in the horizontal direction. The rotation arm 51B is located between the bottom wall 201B of the motor casing 200B and the bottom wall 204B of the bracket 203B and is supported by the bottom wall 204B of the bracket 203B to be rotatable about the rotation shaft 55B serving as an axis. That is, the rotation arm 51B is supported by the motor casing 200B to be rotatable about the substantially vertical direction serving as an axis (the line L2B). Additionally, the rotation shaft 55B is perpendicular to the bottom wall 201B of the motor casing 200B and the rotation shaft 55B is inclined in the longitudinal direction.

Further, the bottom wall 201B of the motor casing 200B includes a through-hole (not illustrated) and the drive shaft of the motor 52B is connected to the rotation shaft 55B of the rotation arm 51B through a speed changing device (not illustrated) including gears and the like. Then, the motor 52B is able to swing the rotation arm 51B about the rotation shaft 55B serving as an axis.

Here, the motor casing 200B serving as a swing support portion is not limited to the above-described configuration. The motor casing 200B may be supported by the vehicle body frame 10B to be swingable in the vertical direction about the horizontal direction serving as an axis. For example, a bottomed cylindrical casing may be also used. Further, the motor casing 200B and the bracket 203B may be integrated with each other.

Further, the rotation arm 51B is not limited to the above-described configuration. The rotation arm 51B may extend in the horizontal direction and may be supported by the motor casing 200B serving as the swing support portion to be rotatable at the center of the rotation in the horizontal direction. For example, a columnar member extending in the horizontal direction may be also used.

Further, the connection between the rotation arm 51B and the drive shaft of the motor 52B is not particularly limited, but the rotation shaft 55B and the drive shaft of the motor 52B may be directly connected to each other.

Here, the motor 52B is an electric motor which is driven by the electric power of the battery BB and is controlled by the controller CB. Additionally, a device that rotates the rotation arm 51B may be configured to rotate the rotation arm 51B by a predetermined angle in a predetermined rotation direction and is not limited to the electric motor. For example, similarly to the motor 52A of the traveling vehicle 1A, the motor 52B may be a hydraulic motor driven by a fluid pressure.

The connection arm 53B (53BR, 53BL) is a columnar member. One end of the right connection arm 53BR is connected to the right end of the rotation arm 51B through a ball joint 57BR serving as a universal joint. The other end of the right connection arm 53BR is connected to the right swing arm 54BR through a ball joint 58BR serving as a universal joint.

Similarly to the right connection arm 53BR, one end of the left connection arm 53BL is connected to the left end of the rotation arm 51B through a ball joint 57BL serving as a universal joint. Further, the other end of the left connection arm 53BL is connected to the left swing arm 54BL through a ball joint 58BL serving as a universal joint. That is, the connection arm 53B is formed such that one end thereof is connected to the rotation arm 51B through the ball joint 57B and the other end thereof is connected to the swing arm 54B through the ball joint 58B.

Here, the connection arm 53B is not limited to the above-described configuration. The connection arm 53B may be formed such that one end thereof is connected to the rotation arm 51B and the other end thereof is connected to the swing arm 54B. For example, a connection using a cross type universal joint instead of the ball joint as a universal joint may be performed.

The swing arm 54B (54BR, 54BL) includes a support portion 59B, a first arm 60B, a second arm 61B, and the like. Here, the swing arm 54B has the same configuration as that of the swing arm 54A of the traveling vehicle 1A. The swing arm 54B is formed in a substantial L-shape in the side view such that the first arm 60B and the second arm 61B extend from the support portion 59B. The support portion 59B has a cylindrical shape extending in the horizontal direction and is supported by the rotation shaft 18B of the vehicle body frame 10B to be rotatable. The first arm 60B is a bar-shaped member that extends forward from the outer periphery of the support portion 59B and a rotation shaft 62B is fixed to the end thereof. Then, similarly to the connection between the front crawler traveling device 30A and the front suspension device 50A of the traveling vehicle 1A, the front crawler traveling device 30A is connected to the end of the first arm 60B through the bracket 40A to be rotatable in the horizontal direction about the vertical direction serving as an axis (the rotation shaft 62B) (see FIG. 5). The second arm 61B is a bar-shaped member that extends downward from the outer periphery of the support portion 59B and the end thereof is connected to one end of the connection arm 53B through the ball joint 58B serving as a universal joint.

Then, the swing arm 54B is supported by the vehicle body frame 10B through the support portion 59B to be swingable in the vertical direction about the horizontal direction serving as an axis (the line L1B). Further, the swing arm 54B is connected to the front crawler traveling device 30A through the first arm 60B. In addition, the swing arm 54B is connected to one end of the connection arm 53B through the second arm 61B.

The damper 210B is a telescopic bar-shaped cushion mechanism including a cylinder and the like and is disposed to extend in the longitudinal direction at the center of the vehicle body frame 10B in the horizontal direction. One end of the damper 210B is connected to a rear wall 206B of the bracket 203B to be rotatable about the horizontal direction serving as an axis. The other end of the damper 210B is connected to the rocker arm 212B of a link mechanism 211B. Then, the damper 210B is formed such that one end thereof is connected to the motor casing 200B serving as a swing support portion and the other end thereof is connected to the vehicle body frame 10B through the link mechanism 211B.

Here, the link mechanism 211B includes the rocker arm 212B and a pair of right and left pulling rods 213B (213BR, 213BL). The upper end of the rocker arm 212B is supported by the vehicle body frame 10B to be rotatable about the rocker shaft 20B serving as an axis (the line L4B). The other end of the damper 210B is connected to the lower end of the rocker arm 212B to be rotatable about the horizontal direction serving as an axis.

The pair of right and left pulling rods 213B (213BR, 213BL) is disposed at both right and left sides of the rocker arm 212B to be bilaterally symmetrical to each other. One end of the pulling rod 213B is connected between the upper and lower ends of the rocker arm 212B to be rotatable about the horizontal direction serving as an axis. The other end of the pulling rod 213B is connected to the rear wall 206B of the bracket 203B to be rotatable about the horizontal direction serving as an axis. Here, the rotation axis of the pulling rod 213B at the rear wall 206B is the same as the rotation axis of the damper 210B at the rear wall 206B. That is, the damper 210B and the pulling rod 213B are coaxially connected to the rear wall 206B. Then, the damper 210B which is disposed as described above can reduce an impact between the vehicle body frame 10B and the right and left front crawler traveling devices 30AR and 30AL, but a detailed description thereof will be made below.

Figure 23:
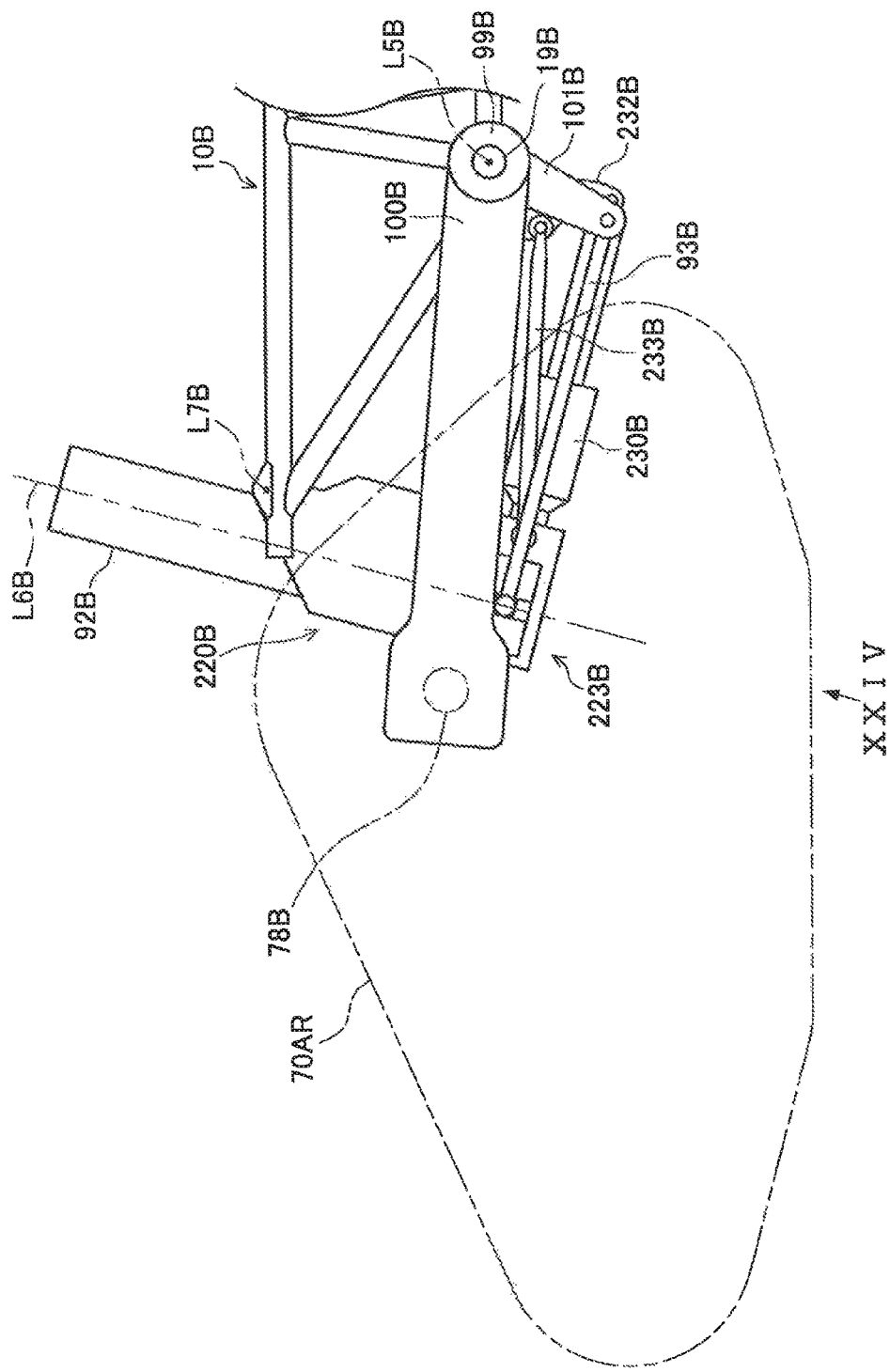
FIG. 23 is a right side view illustrating a rear suspension device.
Figure 24:
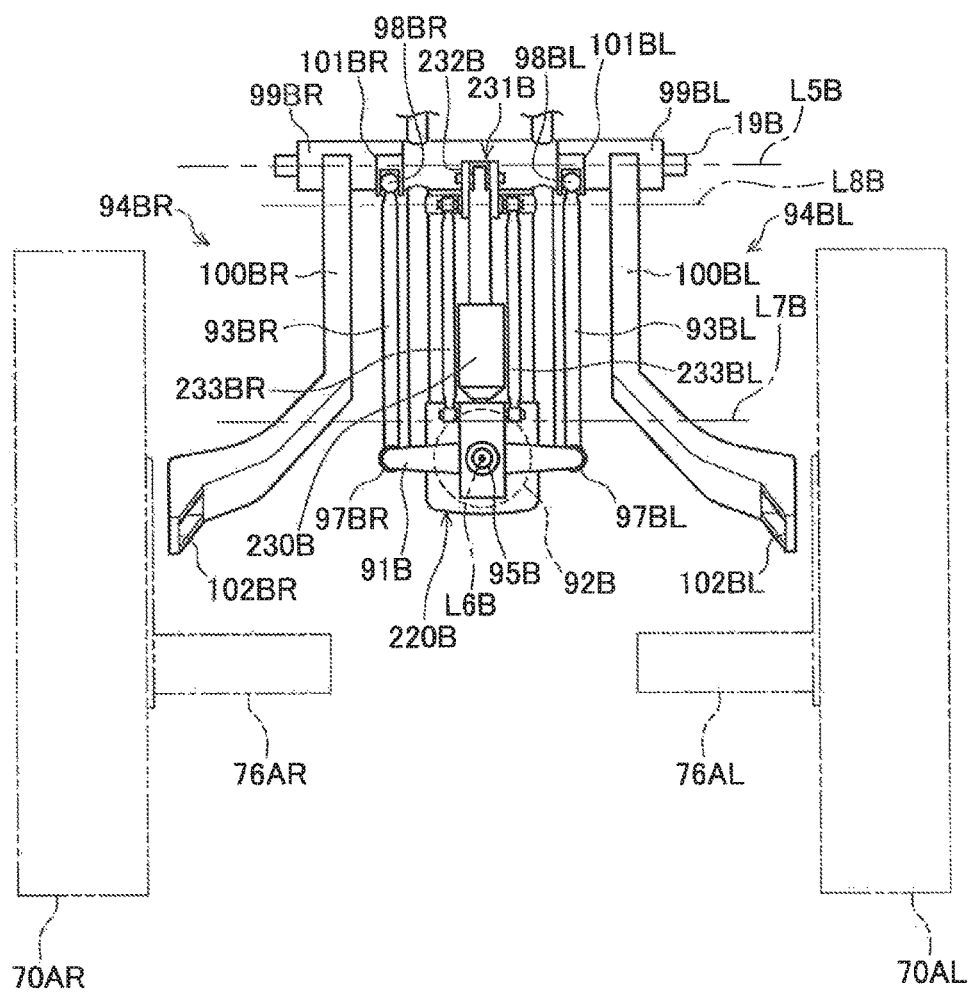
FIG. 24 is a view in a direction XXIV of FIG. 23.

Next, the rear suspension device 90B will be described. Additionally, since the rear suspension device 90B has a horizontal symmetrical shape, a right component will be appropriately indicated by a reference sign R and a left component will be appropriately indicated by a reference sign L if necessary. FIG. 23 is a right side view illustrating the rear suspension device 90B. FIG. 24 is a view in a direction XXIV of FIG. 23.

As illustrated in FIGS. 23 and 24, the rear suspension device 90B includes a rotation arm 91B, a motor 92B which serves as a rotation device rotating the rotation arm 91B, a motor casing 220B which serves as a swing support portion, a pair of right and left connection arms 93B (93BR, 93BL), a pair of right and left swing arms 94B (94BR, 94BL), a damper 230B which serves as a cushion mechanism, and the like. Additionally, in FIGS. 23 and 24, a line L5B is a line passing through the center of the rotation shaft 19B, a line L6B is a line passing through the rotation center of the rotation arm 91B, a line L7B is a line passing through the center of the support shaft 23B, and a line L8B is a line passing through the center of the rocker shaft 21B.

Here, the rear suspension device 90B is longitudinally symmetrical to the front suspension device 50B with respect to the line L1B except for the shape of the swing arm 94B. The connection between the swing arm 94B and the rear crawler traveling device 70A is different from the connection between the front crawler traveling device 30A and the swing arm 54B of the front suspension device 50B and a connection without the bracket 40A is performed. That is, only an end of a first arm 100B of the swing arm 94B has a different shape. Accordingly, a description of the same configuration as that of the front suspension device 50B will be appropriately omitted.

The motor casing 220B is supported by the vehicle body frame 10B to be swingable in the vertical direction about the support shaft 23B serving as an axis. The motor 92B is fixed to the motor casing 220B. The rotation arm 91B is supported by a bracket 223B of the motor casing 220B to be rotatable about the rotation shaft 95B serving as an axis. Additionally, the rotation shaft 95B is inclined in the longitudinal direction.

A drive shaft (not illustrated) of the motor 92B is connected to the rotation shaft 95B of the rotation arm 91B through a speed changing device (not illustrated) including gears and the like. Then, the motor 92B is able to rotate the rotation arm 91B about the rotation shaft 95B serving as an axis.

One end of the connection arm 93B is connected to the rotation arm 91B through a ball joint 97B. The other end of the connection arm 93B is connected to the swing arm 94B through a ball joint 98B. Additionally, the swing arm 94B has the same configuration as that of the swing arm 94A of the traveling vehicle 1A. The swing arm 94B is formed in a substantial L-shape in the side view such that the first arm 100B and the second arm 101B extend from the support portion 99B. The support portion 99B has a cylindrical shape extending in the horizontal direction and is supported by the rotation shaft 19B of the vehicle body frame 10B to be rotatable. The first arm 100B is a bar-shaped member that extends backward from the outer periphery of the support portion 99B and a flange portion 102B having a flat face formed in the vertical direction is provided at the end thereof. Then, similarly to the connection between the rear crawler traveling device 70A and the rear suspension device 90A of the traveling vehicle 1A, the motor 76A of the rear crawler traveling device 70A is fixed to a face of the flange portion 102B on the inside of the vehicle (see FIG. 8). Thus, the rear crawler traveling device 70A is connected to the end of the first arm 100B. The second arm 101B is a bar-shaped member that extends downward from the outer periphery of the support portion 99B and the end thereof is connected to one end of the connection arm 93B through the ball joint 98B serving as a universal joint.

Then, the swing arm 94B is supported by the vehicle body frame 10B through the support portion 99B to be swingable in the vertical direction about the horizontal direction serving as an axis. Further, the swing arm 94B is connected to the rear crawler traveling device 70A through the first arm 100B. In addition, the swing arm 94B is connected to one end of the connection arm 93B by the second arm 101B.

The rear suspension device 90B includes the damper 230B which reduces an impact between the vehicle body frame 10B and the right and left rear crawler traveling devices 70AR and 70AL and a link mechanism 231B. The link mechanism 231B includes a rocker arm 232B and a pair of right and left pulling rods 233B (233BR, 233BL). One end of the damper 230B is connected to the bracket 223B to be rotatable about the horizontal direction serving as an axis. The other end of the damper 230B is connected to the rocker arm 232B. The upper end of the rocker arm 232B is supported by the rocker shaft 21B of the vehicle body frame 10B to be rotatable. The other end of the damper 230B is connected to the lower end of the rocker arm 232B to be rotatable about the horizontal direction serving as an axis. One end of the pulling rod 233B is connected between the upper and lower ends of the rocker arm 232B to be rotatable about the horizontal direction serving as an axis. The other end of the pulling rod 233B is connected to the bracket 223B to be rotatable about the horizontal direction serving as an axis. Here, the damper 230B and the pulling rod 233B are coaxially connected to the bracket 223B.

Figure 25:
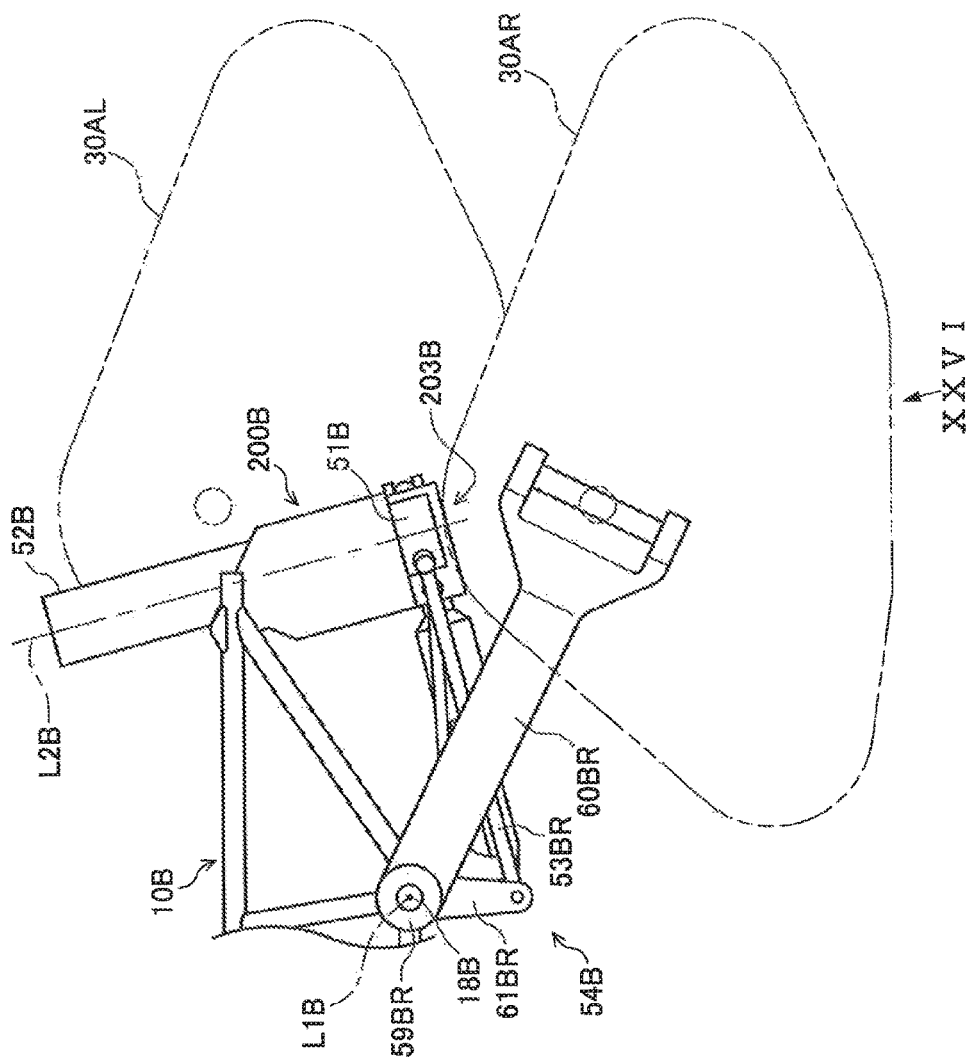
FIG. 25 is a right side view illustrating an operation state of the front suspension device.
Figure 26:
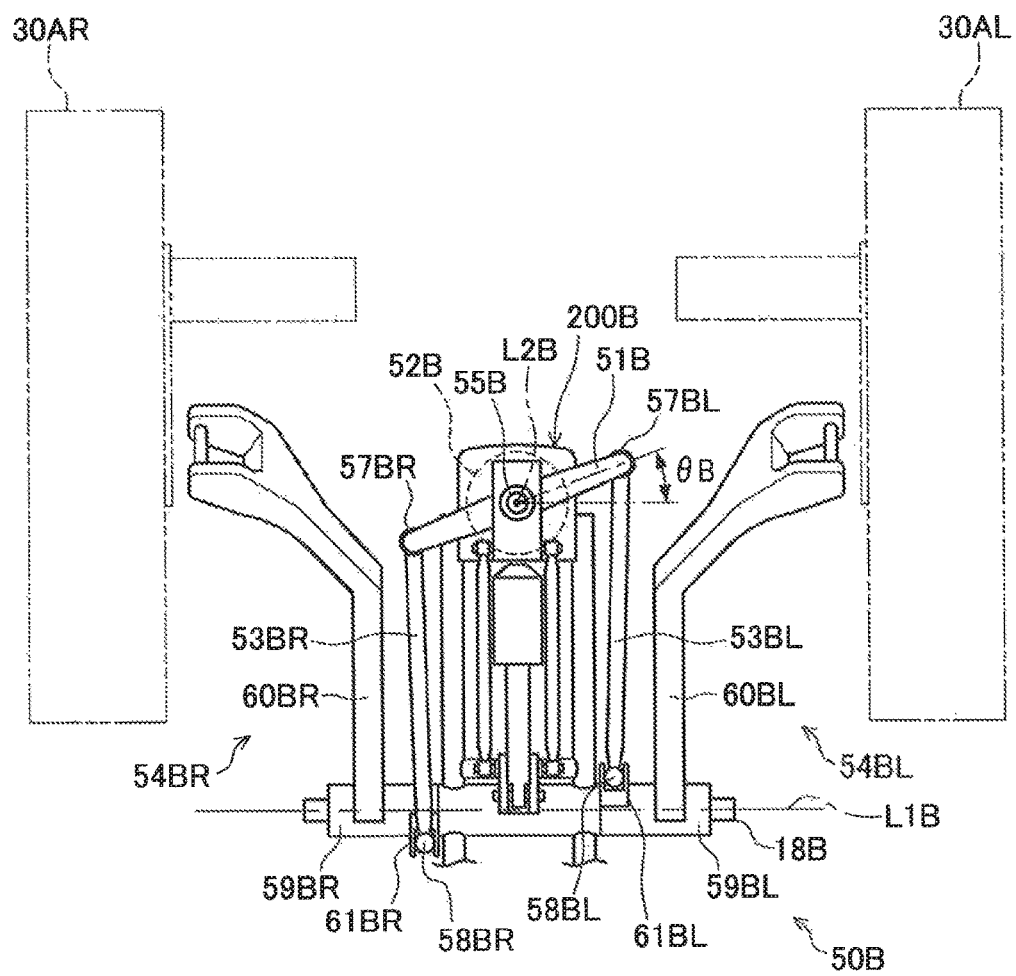
FIG. 26 is a view in a direction XXVI of FIG. 25.

Next, the operations of the front suspension device 50B and the rear suspension device 90B will be described. Additionally, since the front suspension device 50B and the rear suspension device 90B have a longitudinally symmetrical shape except for the connection structure to the crawler traveling devices 30A and 70A, the front suspension device 50B will be representatively described and a description of the rear suspension device 90B will be omitted. FIG. 25 is a right side view illustrating an operation state of the front suspension device 50B. FIG. 26 is a view in a direction XXVI of FIG. 25. Additionally, FIG. 25 is a view illustrating a state where the right front crawler traveling device 30AR swings downward and the left front crawler traveling device 30AL swings upward and a description of the left connection arm 53BL and the left swing arm 54BL of the front suspension device 50B will be omitted.

The front suspension device 50B is able to swing the suspended right and left front crawler traveling devices 30AR and 30AL in the opposite directions in the vertical direction. In the state of FIG. 21, when the rotation arm 51B is rotated in the counter-clockwise direction (leftward) by the motor 52B, the right front crawler traveling device 30AR is swung downward about the rotation shaft 18B serving as an axis and the left front crawler traveling device 30AL is swung upward about the rotation shaft 18B serving as an axis as illustrated in FIGS. 25 and 26.

More specifically, as illustrated in FIG. 26, when the rotation arm 51B is rotated in the counter-clockwise direction (leftward) by an angle θB through the motor 52B, the right connection arm 53BR is moved backward. When the right connection arm 53BR is moved backward, a second arm 61BR of the right swing arm 54BR is rotated backward (in FIG. 25, in the clockwise direction) about the rotation shaft 18B serving as an axis. The right second arm 61BR integrally rotates with the right first arm 60BR along with the right support portion 59BR. For this reason, when the right second arm 61BR is rotated backward, the right first arm 60Br is rotated downward (in FIG. 25, in the clockwise direction) about the rotation shaft 18B serving as an axis and the right front crawler traveling device 30AR is swung downward.

Meanwhile, when the rotation arm 51B is rotated in the counter-clockwise direction (leftward) by an angle θB through the motor 52B, the left connection arm 53BL is moved forward. When the left connection arm 53BL moves forward, a second arm 61BL of the left swing arm 54BL is rotated forward (in FIG. 25, in the counter-clockwise direction) about the rotation shaft 18B serving as an axis. When the left second arm 61BL rotates forward, a left first arm 60BL is rotated upward (in FIG. 25, in the counter-clockwise direction) about the rotation shaft 18B serving as an axis and the left front crawler traveling device 30AL is swung upward. Additionally, when the rotation arm 51B is rotated in the clockwise direction (rightward) by the motor 52B, the front suspension device 50B performs an operation opposite to the above-described operation and thus a description thereof will be omitted.

Thus, the suspended right and left front crawler traveling devices 30AR and 30AL are swung in the opposite directions in the vertical direction in an interlocking manner by the front suspension device 50B. This is because the right and left front crawler traveling devices 30AR and 30AL are connected to each other through the rotation arm 51B supported by the motor casing 200B serving as the swing support portion to be rotatable at the center of the rotation arm in the horizontal direction.

Here, the front crawler traveling device 30A swings in the vertical direction without the movement in the horizontal direction and the rotation about the longitudinal direction serving as an axis. Then, the ground contact portion of the front crawler traveling device 30A is kept in parallel to the vehicle body frame 10B at all times and slides in the vertical direction with respect to the vehicle body frame 10B. Thus, the right and left front crawler traveling devices 30AR and 30AL are able to promptly follow an inclination of a slope or a change in an unevenness portion of an irregular ground in the vertical direction. Accordingly, the traveling performance, the operability, or the riding comfort becomes satisfactory.

Further, since the right and left front crawler traveling devices 30AR and 30AL are swung in the vertical direction by the motor 52B, the occupant does not need to perform an operation in accordance with the movement of a body weight or the like. Thus, since the occupant can easily swing the right and left front crawler traveling devices 30AR and 30AL in the vertical direction, a burden on a driving operation of the occupant is reduced and the driving operation can be comfortably and continuously performed for a long period of time.

Further, the front suspension device 50B is configured to integrally suspend the right and left front crawler traveling devices 30AR and 30AL on the vehicle body frame 10B. Since this configuration is simpler than the configuration in which the crawler traveling devices are independently suspended and the number of components is decreased, the productivity or the maintenance workability becomes satisfactory.

Further, even when the right and left front crawler traveling devices 30AR and 30AL are swung in the vertical direction to follow an inclination of a slope when the vehicle travels on the slope, the ground contact portion of the front crawler traveling device 30A is kept in parallel to the vehicle body frame 10B at all times. Thus, a crest side portion of the ground contact portion of the front crawler traveling device 30A can be bitten into the slope while being used as an edge. For example, when the vehicle travels on a slope in which the right side of the traveling vehicle 1B is high and the left side thereof is low, a right portion of the ground contact portion of the front crawler traveling device 30A can be bitten into the slope while being used as an edge. Thus, the front crawler traveling device 30A cannot easily slip laterally on the slope and thus the traveling performance or the riding comfort when the vehicle travels on the slope becomes satisfactory.

Here, as illustrated in FIG. 20, the connection arm 53B and the second arm 61B are connected to each other at a substantially right angle in the side view. Thus, a force generated by the rotation of the rotation arm 51B can be effectively transmitted from the connection arm 53B as a force of swinging the swing arm 54B in the vertical direction (a rotation about the rotation shaft 18B serving as an axis) and thus the heavy front crawler traveling device 30A can be easily swung in the vertical direction. Then, the motor 52B can be decreased in size.

Further, a distance (the length of the first arm 60B) from the rotation center of the support portion 59B (the line L1B passing through the center of the rotation shaft 18B) to the connection portion between the first arm 60B and the front crawler traveling device 30A is longer than a distance (the length of the second arm 61B) from the rotation center of the support portion 59B (the line L1B passing through the center of the rotation shaft 18B) to the connection portion between the second arm 61B and the connection arm 53B. Thus, even when the movement amount of the connection arm 53B in the longitudinal direction, that is, the rotation amount of the rotation arm 51B is small, the rotation amount of the swing arm 54B about the rotation shaft 18B serving as an axis can be increased. That is, the front crawler traveling device 30A can be largely swung by the small rotation of the rotation arm 51B and thus the front suspension device 50B can be decreased in size.

Further, the rotation shaft 18B is located at the substantial center of the vehicle body frame 10B in the longitudinal direction and the connection arm 53B and the swing arm 54B are disposed to extend forward from the rotation shaft 18B. That is, the front suspension device 50B is bent at the connection portion between the connection arm 53B and the swing arm 54B (the end of the second arm 61B) and the connection arm 53B and the swing arm 54B are disposed side by side in the top view. Thus, since the length of the front suspension device 50B in the longitudinal direction can be shortened so that the entire length of the traveling vehicle 1B can be shortened, the traveling performance is improved.

Further, the rotation shaft 18B is located at the substantial center of the vehicle body frame 10B in the longitudinal direction. That is, the support portion 59B is supported by the substantial center of the vehicle body frame 10B in the longitudinal direction to be rotatable and the swing arm 54B is disposed to extend forward from the substantial center of the vehicle body frame 10B in the longitudinal direction. Thus, since the front suspension device 50B (the swing arm 54B) does not largely protrude toward the front side of the traveling vehicle 1B and the entire length of the traveling vehicle 1B can be shortened, the traveling performance is improved.

Further, the swing arm 54B of the front suspension device 50B and the swing arm 94B of the rear suspension device 90B are adjacent to the substantial center of the vehicle body frame 10B in the longitudinal direction and are supported to be rotatable. Then, a force applied from the front suspension device 50B and the rear suspension device 90B to the vehicle body frame 10B easily concentrates on the vicinity of the center. Here, the base frame portion 11B provided with the rotation shafts 18B and 19B has a longitudinally symmetrical shape and a truss structure is formed by the reinforcement frames 24B and 25B connected to the vicinity of the rotation shafts 18B and 19B. That is, the base frame portion 11B has a high strength since a position easily collecting a force is effectively reinforced and strength is equalized. Thus, the vehicle body frame 10B has a sufficient strength and can suppress an increase in weight.

Further, the rotation shaft 18B is located at the lower portion of the substantial center of the vehicle body frame 10B in the longitudinal direction and the second arm 61B is provided to vertically extend downward from the support portion 59B. Further, the rotation arm 51B, the connection arm 53B, the damper 210B, and the link mechanism 211B are located below the vehicle body frame 10B. That is, main components of the front suspension device 50B are located below the vehicle body frame 10B. Additionally, the swing arm 54B is located at the lateral side of the vehicle body frame 10B. Thus, the front suspension device 50B does not occupy the inside of the vehicle body frame 10B, the inner space of the vehicle body frame 10B can be efficiently used, and the entire length of the traveling vehicle 1B can be shortened. Then, for example, a battery and the like can be disposed inside the vehicle body frame 10B.

Here, the swing of the front crawler traveling device 30A in the vertical direction, that is, the rotation of the motor 52B may be performed in response to the operation of the occupant. However, there are many cases in which the occupant cannot easily operate the right and left front crawler traveling devices 30A to swing so that the traveling devices follow a slope or an unevenness portion of an irregular ground. Thus, it is desirable to control the motor 52B serving as a rotation device by various sensors and the controller CB similarly to the traveling vehicle 1A. Additionally, as a configuration in which the motor 52B is operated in response to the operation of the occupant, the same configuration as the operation configuration of the motor 52A of the traveling vehicle 1A can be used and thus a description thereof will be omitted.

Figure 27:
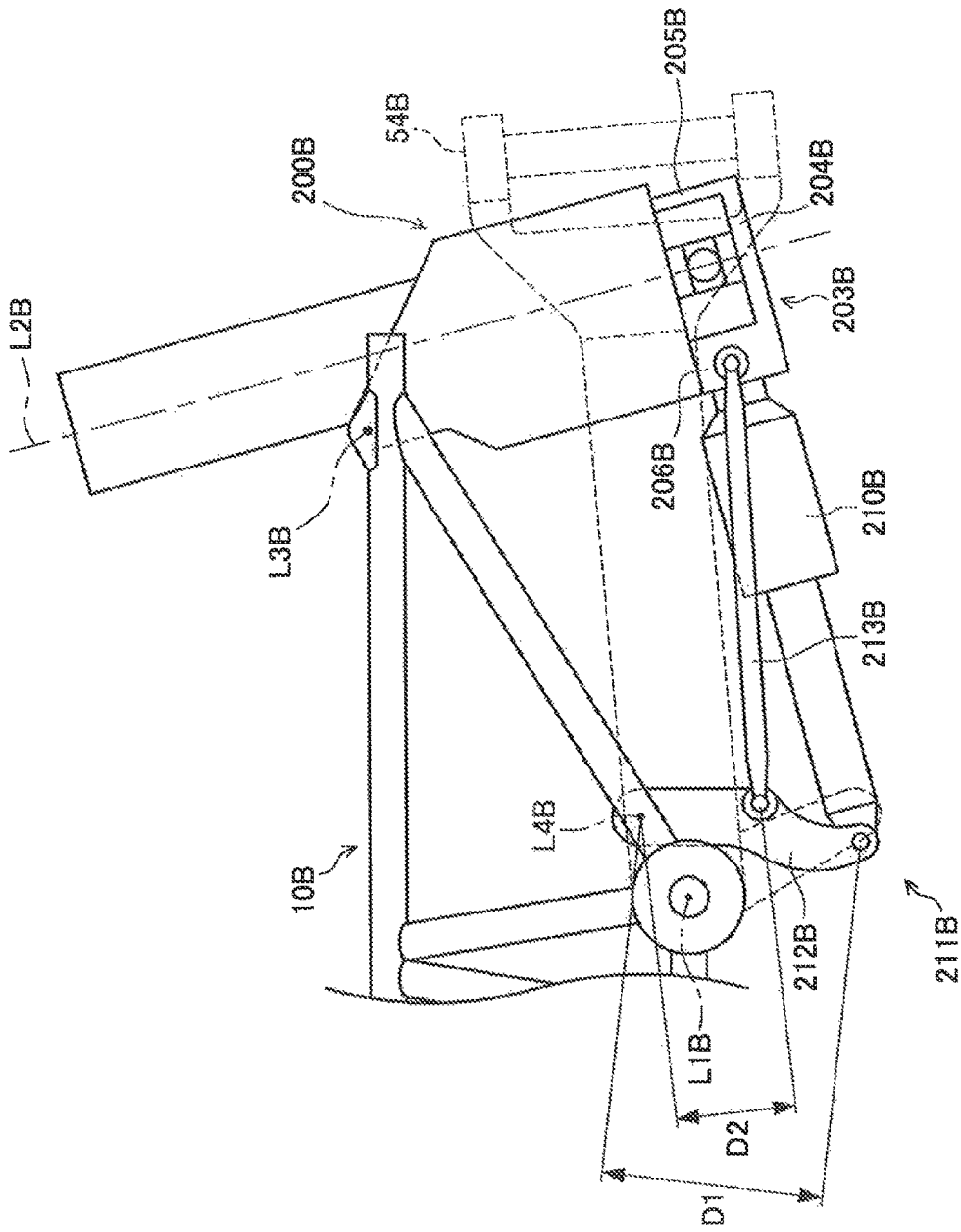
FIG. 27 is a right side view illustrating an operation state of a cushion mechanism.
Figure 28:
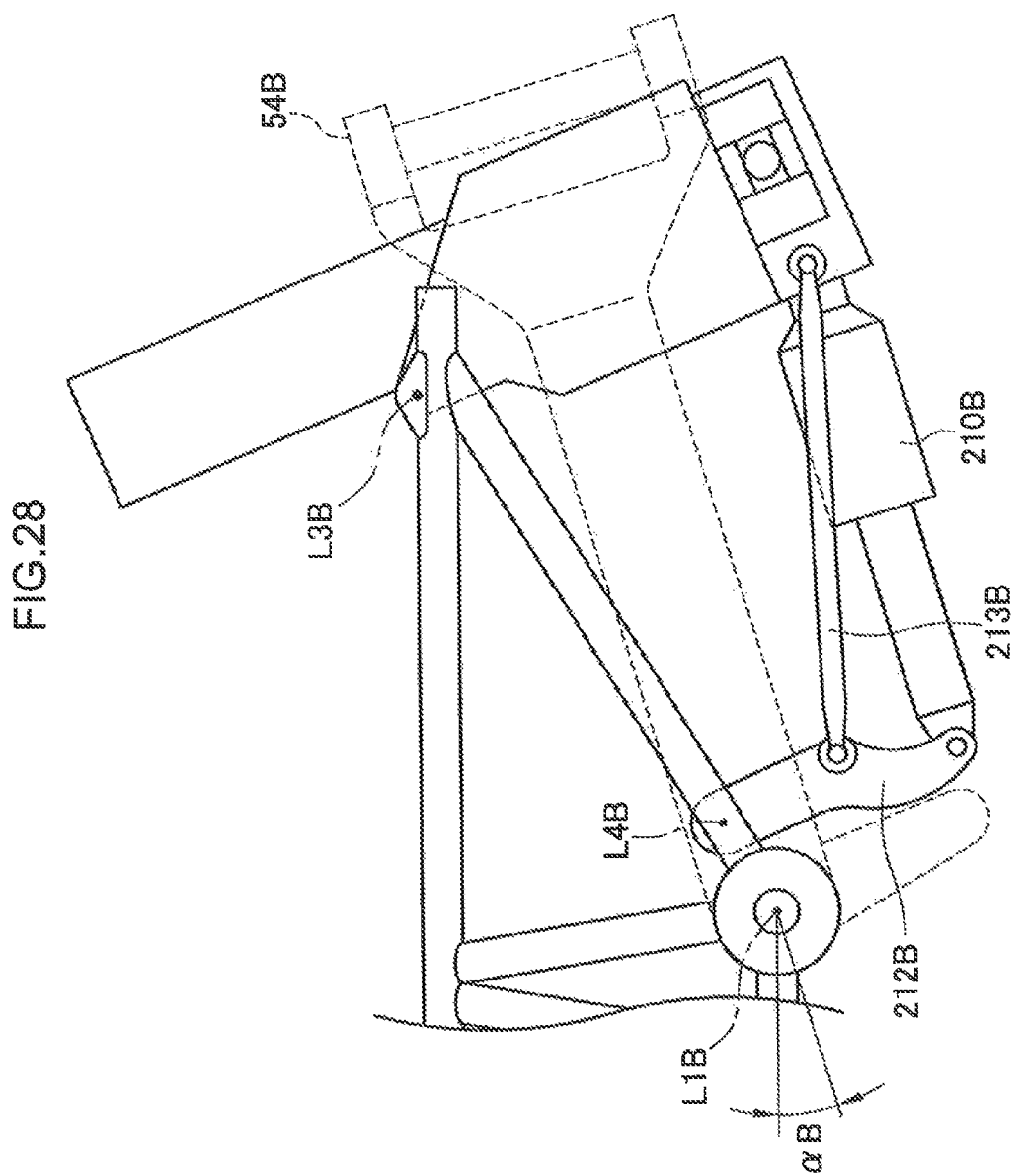
FIG. 28 is a right side view illustrating the operation state of the cushion mechanism.
Figure 29:
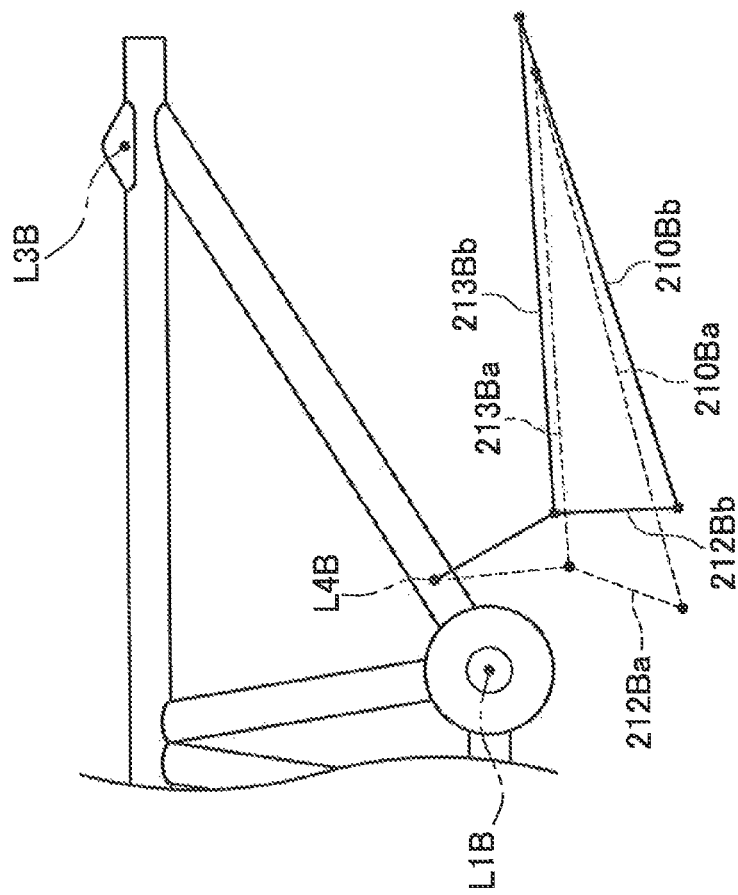
FIG. 29 is a schematic diagram illustrating the operation state of the cushion mechanism.

Next, the operations of the dampers 210B and 230B serving as the cushion mechanisms will be described. Additionally, since the damper 210B of the front suspension device 50B and the damper 230B of the rear suspension device 90B are longitudinally symmetrical to each other, the damper 210B of the front suspension device 50B will be representatively described below and a description of the damper 230B of the rear suspension device 90B will be omitted. FIGS. 27 to 29 are right side views illustrating an operation state of the damper 210B and only main parts are described. Additionally, FIG. 27 illustrates a state where the traveling vehicle 1B travels on a flat ground. FIG. 28 illustrates a state where the front crawler traveling device 30A climbs over a convex portion of a ground. Here, the front crawler traveling device 30A swings upward and the swing arm 54B swings upward. FIG. 29 schematically illustrates the damper 210B and the like before and after the swing of the front crawler traveling device 30A. Here, a non-swing state is indicated by a dashed line, a swing state is indicated by a solid line, a non-swing member is indicated by the reference sign a, and a swing member is indicated by the reference sign b.

As described above, one end of the damper 210B is connected to the motor casing 200B serving as the swing support portion and the other end thereof is connected to the vehicle body frame 10B through the link mechanism 211B. Then, the damper 210B can reduce an impact between the vehicle body frame 10B and the right and left front crawler traveling devices 30AR and 30AL.

For example, an upward and backward impact load generated by a convex portion of a ground is applied to the front crawler traveling device 30A when the vehicle travels forward. At this time, in the state of FIG. 27, the right and left front crawler traveling devices 30AR and 30AL are swung upward about the rotation shaft 18B serving as an axis (the line L1B) due to the impact load. Then, the right and left swing arms 54B swing upward as illustrated in FIG. 28 in accordance with the swing of the right and left front crawler traveling devices 30AR and 30AL. Additionally, in FIG. 28, the right and left swing arms 54B rotate in the counter-clockwise direction by an angle αB about the rotation shaft 18B serving as an axis (the line L1B).

When the right and left swing arms 54B swing upward, the right and left connection arms 53B (not illustrated) are moved forward. When the right and left connection arm 53B move forward, the rotation arm 51B is pressed forward while not rotating about the rotation shaft 55B serving as an axis (the line L2B). Since the rotation arm 51B is pressed forward, the motor casing 200B supporting the rotation arm 51B swings forward and upward about the support shaft 22B serving as an axis (the line L3B). Then, the damper 210B connected to the motor casing 200B is pulled forward.

Here, the other end of the damper 210B is connected to the link mechanism 211B. Since the right and left pulling rods 213B of the link mechanism 211B are formed such that one ends thereof are connected to the motor casing 200B, the right and left pulling rods move forward when the motor casing 200B swings upward. Since the right and left pulling rods 213B move forward, the rocker arm 212B is swung forward and upward about the rocker shaft 20B serving as an axis (the line L4B). Then, the damper 210B connected to the end of the rocker arm 212B is pressed forward. Thus, the damper 210B takes a posture in which the front end (the connection portion to the motor casing 200B) is pulled forward and the rear end (the connection portion to the rocker arm 212B) is pressed forward.

Additionally, the right and left pulling rods 213B which apply a force to the rear end of the damper 210B are formed such that one end is connected to the motor casing 200B which is coaxial to the front end of the damper 210B and the other end is connected between the upper and lower ends of the rocker arm 212B. That is, a distance D1 from the rotation center of the rocker arm (the line L4B passing through the center of the rocker shaft 20B) to the connection portion between the rocker arm 212B and the damper 210B is longer than a distance D2 from the rotation center of the rocker arm (the line L4B passing through the center of the rocker shaft 20) to the connection portion between the rocker arm 212B and the right and left pulling rods 213B. Further, one end of each of the right and left pulling rods 213B and the damper 210B is coaxially connected to the motor casing 200B. Thus, the damper 210B is shortened when the right and left front crawler traveling devices 30AR and 30AL are swung upward. Then, since the damper 210B reduces a force acting in the shortening direction, an impact generated when the right and left front crawler traveling devices 30AR and 30AL are swung upward is reduced.

Thus, an impact generated among the vehicle body frame 10B and the right and left front crawler traveling devices 30AR and 30AL can be reduced by the damper 210B. Then, since the right and left front crawler traveling devices 30AR and 30AL stably contact a ground, the traveling performance or the riding comfort is improved. Further, since the damper 210B is a simple structure configured as a telescopic bar-shaped member, the number of components is decreased and the productivity or maintenance workability is satisfactory.

Further, the link mechanism 211B is used to shorten the damper 210B when the right and left front crawler traveling devices 30AR and 30AL are swung upward and the motor casing 200B swings upward and forward. Thus, the damper 210B serving as the cushion mechanism may effectively reduce an impact while being shortened. That is, the damper 210B may be configured to reduce an impact in one direction. Since the configuration is simple, the productivity or maintenance workability is satisfactory.

Additionally, the damper 210B serving as the cushion mechanism is not limited to the above-described configuration. If an impact can be reduced, for example, a combination of a spring and a cylinder may be used.

Further, the link mechanism 211B is not limited to the above-described configuration. The link mechanism may be used to shorten the damper 210B when the right and left front crawler traveling devices 30AR and 30AL are swung upward and the motor casing 200B swings upward and forward. For example, the rotation shaft of the pulling rod 213B may be different from the rotation shaft of the damper 210B in the motor casing 200B. Further, a configuration using one pulling rod 213B may be used.

Further, the arrangement of the damper 210B is not limited to the above-described configuration. For example, the damper 210B may be disposed to be connected to the vehicle body frame 10B and the motor casing 200B serving as the swing support portion. For example, although not illustrated in the drawings, one end of the damper 210B may be connected to the vehicle body frame 10B without using the link mechanism 211B. In the above-described configuration, the rear end of the damper 210B may be connected to the rocker shaft 20B. Additionally, in the case of such a configuration, the damper 210B needs to be configured to reduce an impact generated when the damper is lengthened and thus the configuration of the damper 210B becomes complicated. Further, the damper 210B may be disposed at the front side of the motor casing 200B. For example, one end of the damper 210B may be connected to a front wall 205B of the bracket 203B of the motor casing 200B and the other end of the damper 210B may be connected to the vehicle body frame 10B at the front and upper sides of the connection portion of the bracket 203B of one end. In the case of such a configuration, the damper 210B can reduce an impact while being shortened. However, since the damper 210B is disposed to extend forward from the motor casing 200B, the entire length of the vehicle body frame 10B increases and thus the traveling performance is degraded. Thus, it is desirable to connect the damper 210B to the vehicle body frame 10B through the link mechanism 211B from the viewpoint of the productivity, the maintenance workability, and the traveling performance.

Here, since the traveling operation and the steering operation of the traveling vehicle 1B are similar to those of the traveling vehicle 1A, a description thereof will be omitted.

Additionally, the front suspension device 50B is not limited to the above-described configuration. The front suspension device may include the motor casing 200B which serves as the swing support portion supported by the vehicle body frame 10B to be swingable in the vertical direction about the horizontal direction serving as an axis, the rotation arm 51B which extends in the horizontal direction and is supported by the motor casing 200B to be rotatable at the center of the rotation arm in the horizontal direction, the swing arm 54BR which is supported by the vehicle body frame 10B to be swingable in the vertical direction about the horizontal direction serving as an axis and of which the end is connected to the right front crawler traveling device 30AR, the swing arm 54BL which is supported by the vehicle body frame 10B to be swingable in the vertical direction about the horizontal direction serving as an axis and of which the end is connected to the left front crawler traveling device 30AL, the right connection arm 53BR of which one end is connected to the right end of the rotation arm 51B and the other end is connected to the right swing arm 54BR, and the left connection arm 53BL of which one end is connected to the left end of the rotation arm 51B and the other end is connected to the left swing arm 54BL. Here, the damper 210B serving as the cushion mechanism may be provided between the vehicle body frame 10B and the motor casing 200B.

For example, the second arm 61B of the swing arm 54B of the front suspension device 50B extends downward from the support portion 59B, but may extend upward. With such a configuration, the second arm 61B does not protrude toward the downside of the vehicle body frame 10B. Accordingly, it is possible to prevent the second arm 61B from contacting an obstacle when the vehicle travels. Further, since it is possible to lower the gravity center by reducing the vehicle height of the traveling vehicle 1B, the traveling performance is improved. Additionally, when the gravity center needs to be lowered, it is desirable that a heavy battery or fuel tank be located at the lower portion of the vehicle body frame 10B. Additionally, the above-described effect is obtained even in the rear suspension device 90B similarly to the front suspension device 50B.

Further, the front and rear suspension devices 50B and 90B may not include the motors 52B and 92B serving as the rotation devices similarly to the front and rear suspension devices 50A and 90A of the traveling vehicle 1A. Since such a configuration is similar to that of the traveling vehicle 1A, a description thereof will be omitted. Further, the traveling vehicle 1B may travel by at least the pair of right and left traveling devices similarly to the traveling vehicle 1A and the configurations other than the front and rear suspension devices 50B and 90B may be set as in the example of the traveling vehicle 1A.

For example, similarly to the traveling vehicle 1A, the traveling vehicle 1B may be a traveling vehicle in which only one of the rear crawler traveling devices 70AR and 70AL of the traveling vehicle 1B is provided.

Further, the steering operations of the traveling vehicles 1A and 1B are performed by a so-called known steering mechanism in which the right and left front crawler traveling devices 70AR and 70AL serving as the traveling devices are rotated in an interlocking manner in the horizontal direction by the steering device, but the invention is not limited to this configuration. For example, the vehicle may be steered by a difference in driving speed between the traveling devices.

Figure 30:
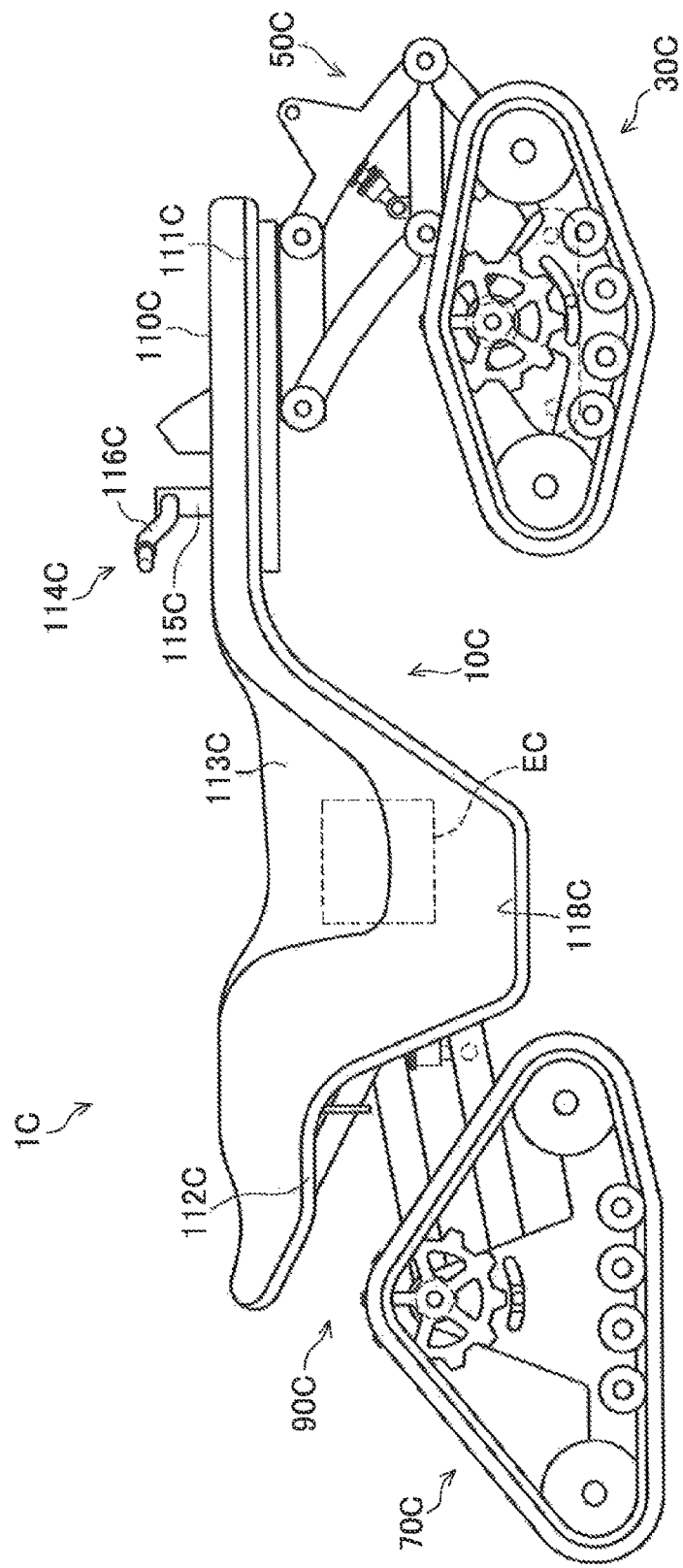
FIG. 30 is a right side view illustrating an example of a traveling vehicle according to another embodiment.
Figure 31:
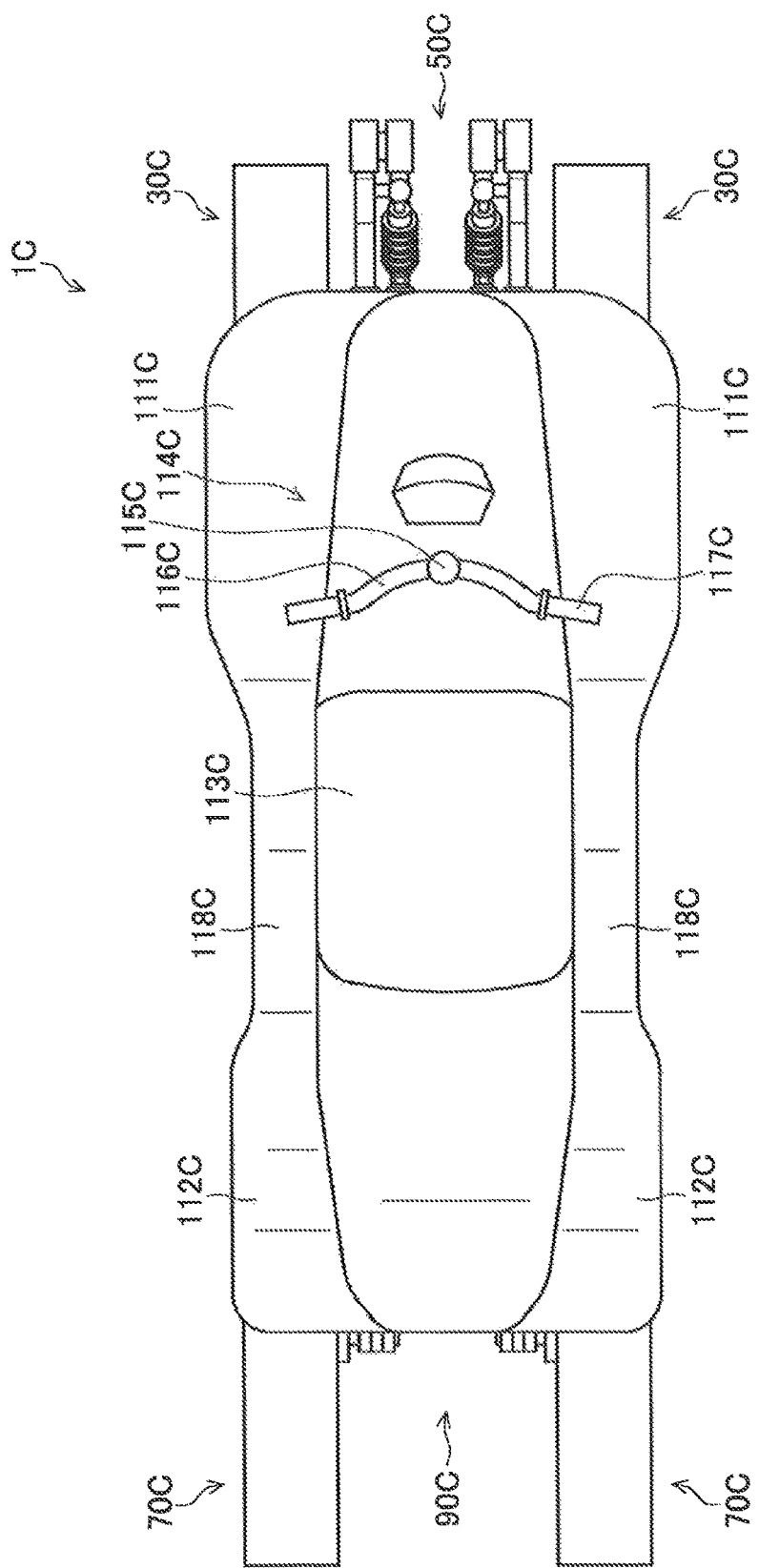
FIG. 31 is a top view of FIG. 30.
Figure 32:
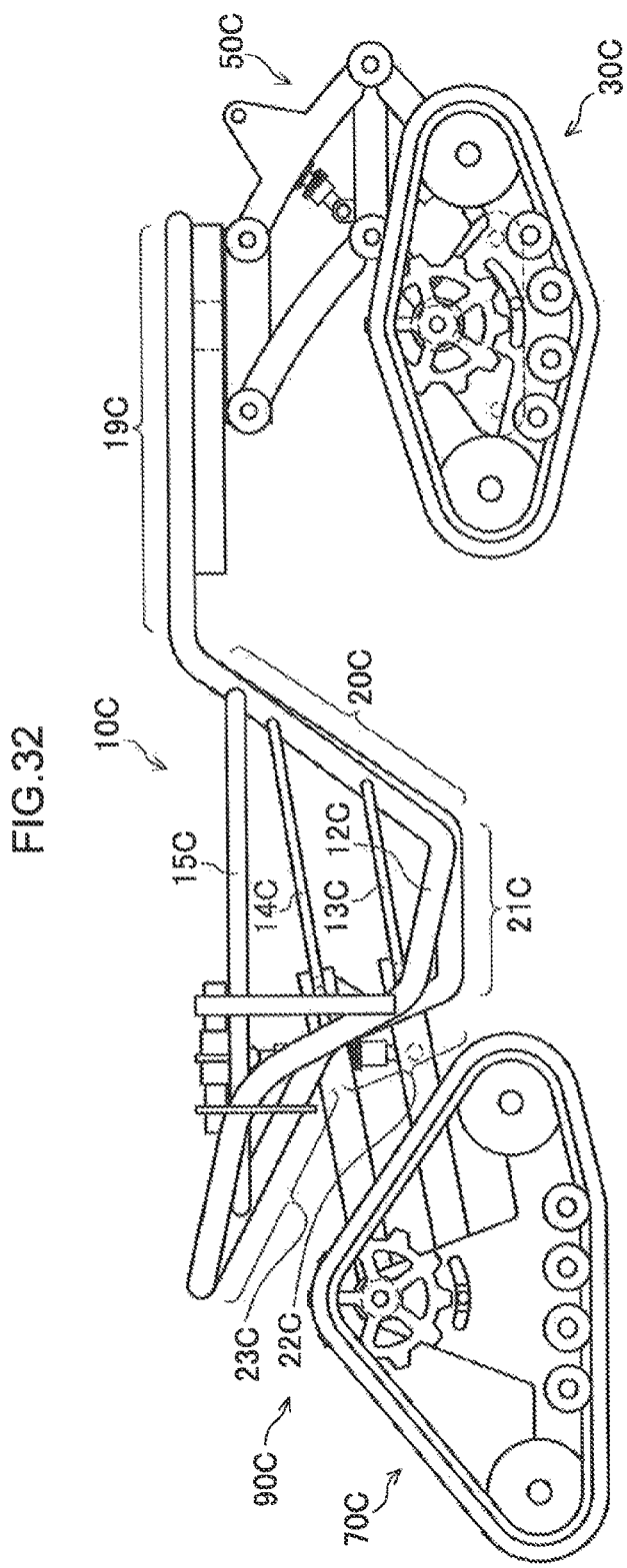
FIG. 32 is a right side view mainly illustrating a configuration of a vehicle body frame and a suspension device.
Figure 33:
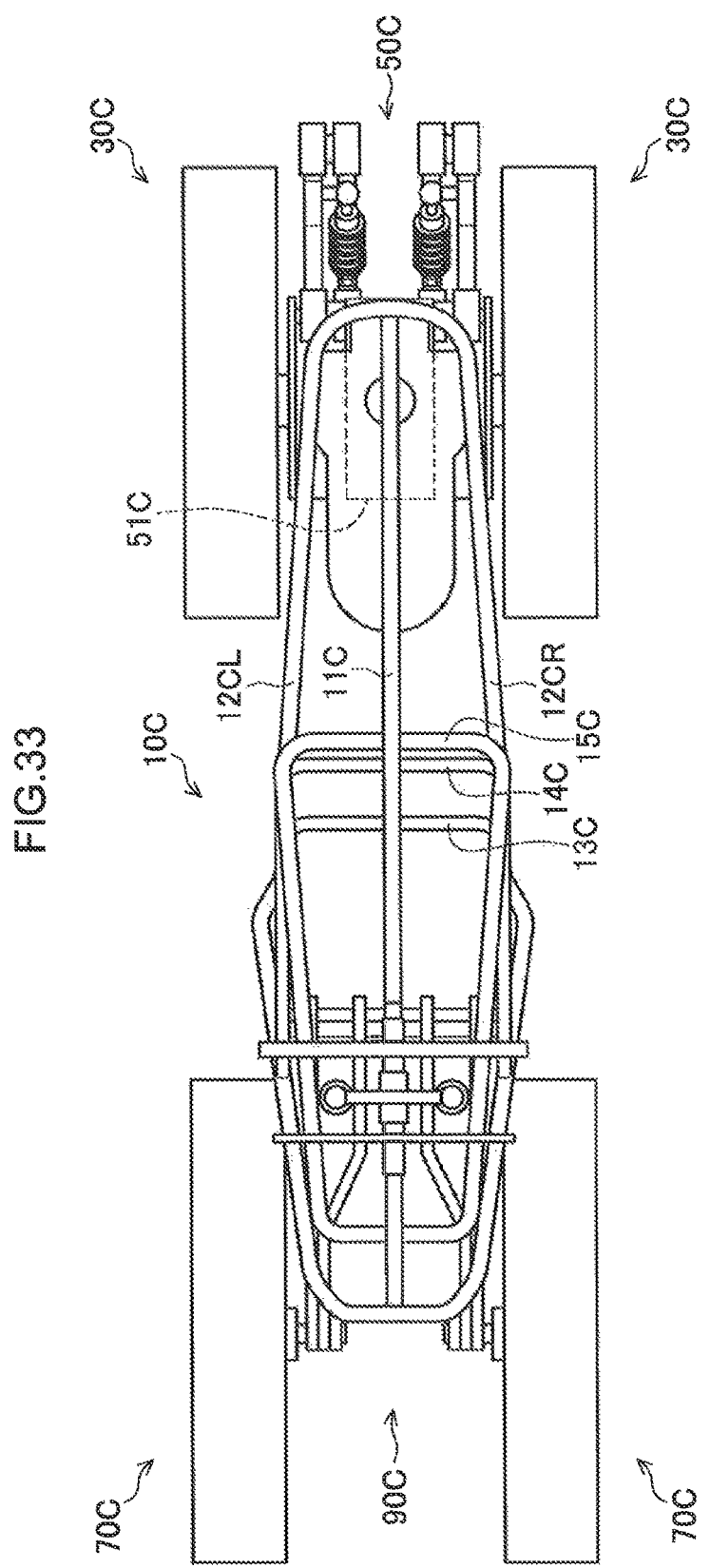
FIG. 33 is a top view of FIG. 32.
Figure 34:
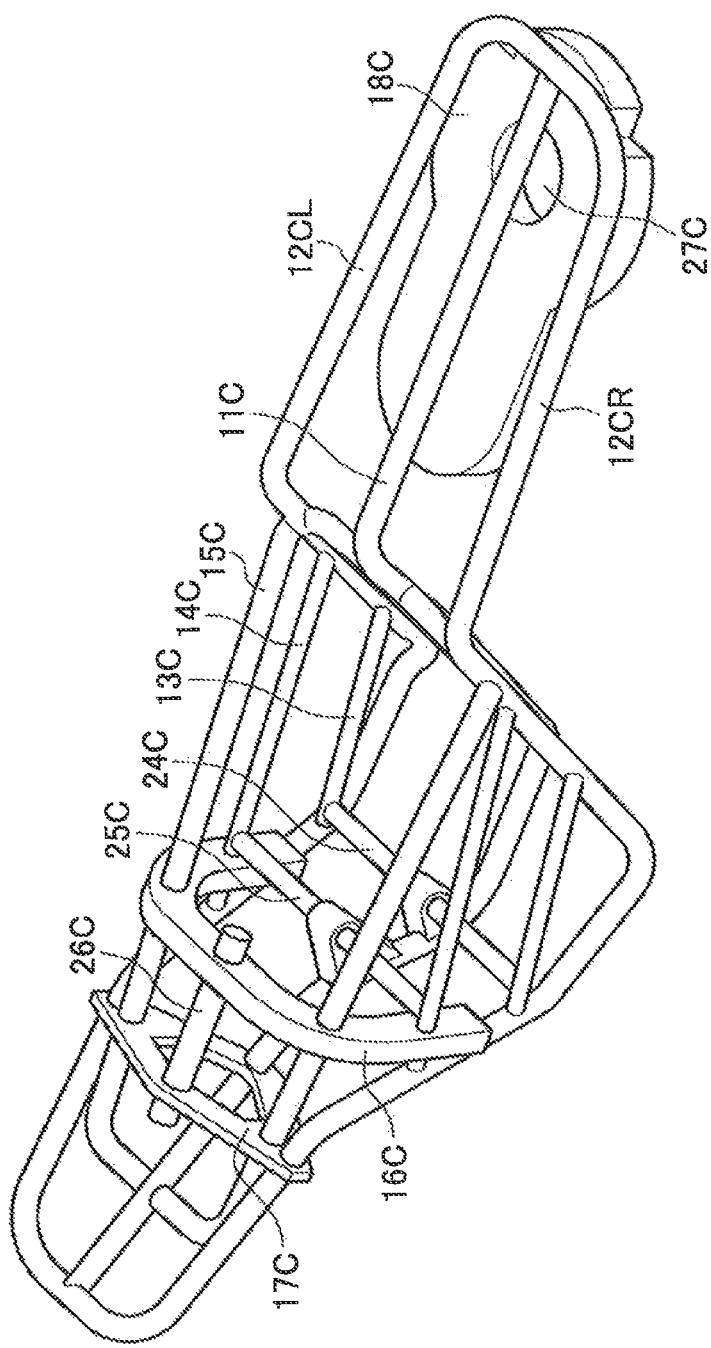
FIG. 34 is a perspective view illustrating the vehicle body frame.

Further, the traveling vehicle according to the embodiment may be a traveling vehicle 1C illustrated in FIGS. 30 to 33. FIG. 30 is a right side view illustrating an example of the traveling vehicle 1C according to another embodiment. FIG. 31 is a top view of FIG. 30, FIG. 32 is a right side view mainly illustrating the configurations of a vehicle body frame 10C and suspension devices 50C and 90C, FIG. 33 is a top view of FIG. 32, and FIG. 34 is a perspective view illustrating the vehicle body frame 10C when viewed from the forward-diagonally upside.

As illustrated in FIGS. 30 to 34, the traveling vehicle 1C includes front crawler traveling devices 30C which serve as a pair of right and left traveling devices provided at a front portion of the vehicle body frame 10C, the front suspension device 50C which suspends the pair of right and left front crawler traveling devices 30C on the vehicle body frame 10C, rear crawler traveling devices 70C which serve as a pair of right and left traveling devices provided at a rear portion of the vehicle body frame, and the rear suspension device 90C which suspends the pair of right and left rear crawler traveling devices 70C on the vehicle body frame 10C. Further, the traveling vehicle 1C includes an engine EC which serves as a prime mover, a pump (not illustrated) which is driven by the engine EC, a controller (not illustrated) which includes a calculation unit and a storage unit and controls various devices.

The vehicle body frame 10C is covered by a main body cover 110C. The main body cover 110C is used to cover the vehicle body frame 10C. The main body cover 110C includes front fenders 111C which are provided above the front crawler traveling devices 30C and rear fenders 112C which are provided above the rear crawler traveling devices 70C.

A driver seat 113C is provided on the main body cover 110 between the front crawler traveling device 30C and the rear crawler traveling device 70C.

A handle 114C which operates the traveling operation of the traveling vehicle 1C is provided at the front side of the driver seat 113C. The handle 114C includes a steering shaft 115C, a handle bar 116C which is provided at the upper end of the steering shaft 115C to protrude outward in the horizontal direction, an accelerator grip 117C which serves as an accelerator provided at one end of the handle bar 116C, and the like.

The steering shaft 115C is supported by the vehicle body frame 10C to be rotatable. The lower end of the steering shaft 115C is provided with a handle sensor (not illustrated) detecting a rotation angle of the steering shaft 115C.

The accelerator grip 117C is supported by the handle bar 116C to be rotatable. The accelerator grip 117C includes an accelerator grip sensor (not illustrated) detecting a rotation angle of the accelerator grip 117C.

Right and left step floors 118C are provided below the driver seat 113C. The traveling vehicle 1C is a saddle type traveling vehicle. The occupant sits on the driver seat 113C while feet are placed on the right and left step floors 118C.

Next, the vehicle body frame 10C will be described. Additionally, since the vehicle body frame 10C has a horizontal symmetrical shape, a right component will be appropriately indicated by a reference sign R and a left component will be appropriately indicated by a reference sign L if necessary.

As illustrated in FIGS. 32 to 34, the vehicle body frame 10C is obtained by connecting a plurality of steel members through welding or the like. The steel member is a cylindrical or square cylindrical pipe. The vehicle body frame 10C includes a main frame 11C which extends in the longitudinal direction, a pair of right and left side frames 12C (12CR, 12CL) which is provided at both right and left sides of the main frame 11C in parallel thereto and extends in the longitudinal direction, a plurality of reinforcement frames 13C, 14C, 15C, 16C, and 17C which are stretched across the main frame 11C or the right and left side frames 12CR and 12CL, a plate-shaped front support plate 18C which is used to attach the front suspension device 50C, and the like.

As illustrated in FIG. 32, the main frame 11C and the side frame 12C include a front portion 19C which extends horizontally in the longitudinal direction, a front slope portion 20C which is inclined from the front portion 19C so that a front portion is high and a rear portion is low, a center portion 21C which extends horizontally in the longitudinal direction from the front slope portion 20C, a rear slope portion 22C which is inclined from the center portion 21C so that a front portion is low and a rear portion is high, and a rear portion 23C which is inclined from the rear slope portion 22C so that a front portion is low and a rear portion is high. These members are formed by bending the main frame 11C and the side frames 12C.

The right and left side frames 12CR and 12CL are formed so that the front ends are connected to each other and the rear ends are connected to each other and the connection portions are formed in a U-shape in the top view. The front and rear ends of the main frame 11C are respectively connected to the front and rear connection portions.

The reinforcement frame 13C has a substantial U-shape in the top view and is disposed substantially horizontally. Here, one end is connected to the right side frame 12CR at the rear slope portion 22C and the other end is connected to the left side frame 12CL at the rear slope portion 22C. Further, the reinforcement frame 13C is also connected to the right and left side frames 12CR and 12CL and the main frame 11C at the front slope portion 20C.

The reinforcement frame 14C has a substantial U-shape in the top view and is disposed substantially horizontally above the reinforcement frame 13C. Here, one end is connected to the right side frame 12CR at the rear slope portion 22C and the other end is connected to the left side frame 12CL at the rear slope portion 22C. Further, the reinforcement frame 14C is also connected to the right and left side frames 12CR and 12CL and the main frame 11C at the front slope portion 20C.

The reinforcement frame 15C has an annular shape extending in the longitudinal direction in the top view and is disposed substantially horizontally above the reinforcement frame 14C to be connected to the right and left side frames 12CR and 12CL and the center frame 11C at the front slope portion 20C and to be connected to the right and left side frames 12CR and 12CL and the center frame 11C at the rear portion 23C.

The reinforcement frame 16C is formed in a reverse U-shape in the rear view and is disposed substantially perpendicularly. Here, one end is connected to the right side frame 12CR at the rear slope portion 22C and the other end is connected to the left side frame 12CL at the rear slope portion 22C. Further, the reinforcement frame 16C is also connected to the reinforcement frames 14C and 15C.

The reinforcement frame 17C is a plate-shaped member, has an annular shape extending in the horizontal direction in the rearview, and is disposed substantially perpendicularly at the rear side of the reinforcement frame 16C. Here, the right and left ends of the reinforcement frame are respectively connected to the right and left side frames 12CR and 12CL and the center lower portion is connected to the center frame 11C. Further, the reinforcement frame 17C is also connected to the reinforcement frame 15C.

A rotation shaft 24C extending in the horizontal direction is attached to the center frame 11C at the rear slope portion 22C and both ends of the rotation shaft 24C are connected to the reinforcement frame 13C.

A rotation shaft 25C which extends in the horizontal direction and is parallel to the rotation shaft 24C is attached to the center frame 11C at the rear slope portion 22C above the rotation shaft 24C and both ends of the rotation shaft 25C are connected to the reinforcement frame 14C.

Further, the center of the vehicle body frame 10C in the horizontal direction is provided with a rotation shaft 26C which extends in the longitudinal direction and is connected to the upper portions of the reinforcement frame 16C and the reinforcement frame 17C. Then, the rotation shafts 24C, 25C, and 26C are used to connect the rear suspension device 90C to be described later.

The front support plate 18C has a substantially rectangular shape extending in the longitudinal direction in the top view and the upper face thereof is fixed to the side frame 12C and the center frame 11C at the front portion 19C. The front support plate 18C includes a through-hole 27C formed in the vertical direction. Then, the through-hole 27C is used to connect the front suspension device 50C to be described later.

Additionally, the vehicle body frame 10C is not limited to the above-described configuration. The vehicle body frame 10C may be used to attach the front suspension device 50C and the rear suspension device 90C thereto and have a sufficient rigidity for the traveling vehicle. For example, the vehicle body frame 10C may be formed by a hollow square column member or a steel member having an L-shaped or H-shaped cross-section instead of the cylindrical pipe.

Figure 35:
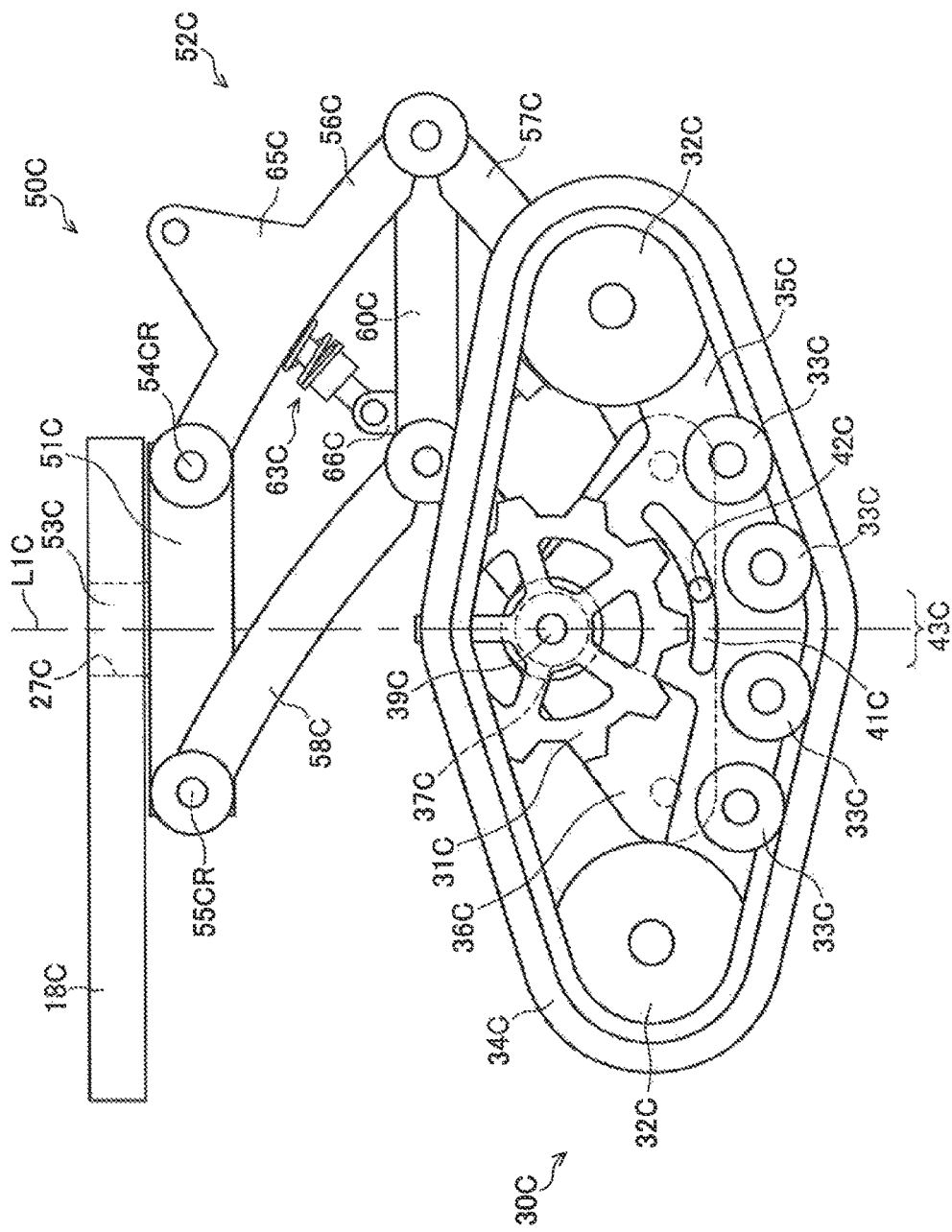
FIG. 35 is a right side view illustrating a front crawler traveling device.
Figure 36:
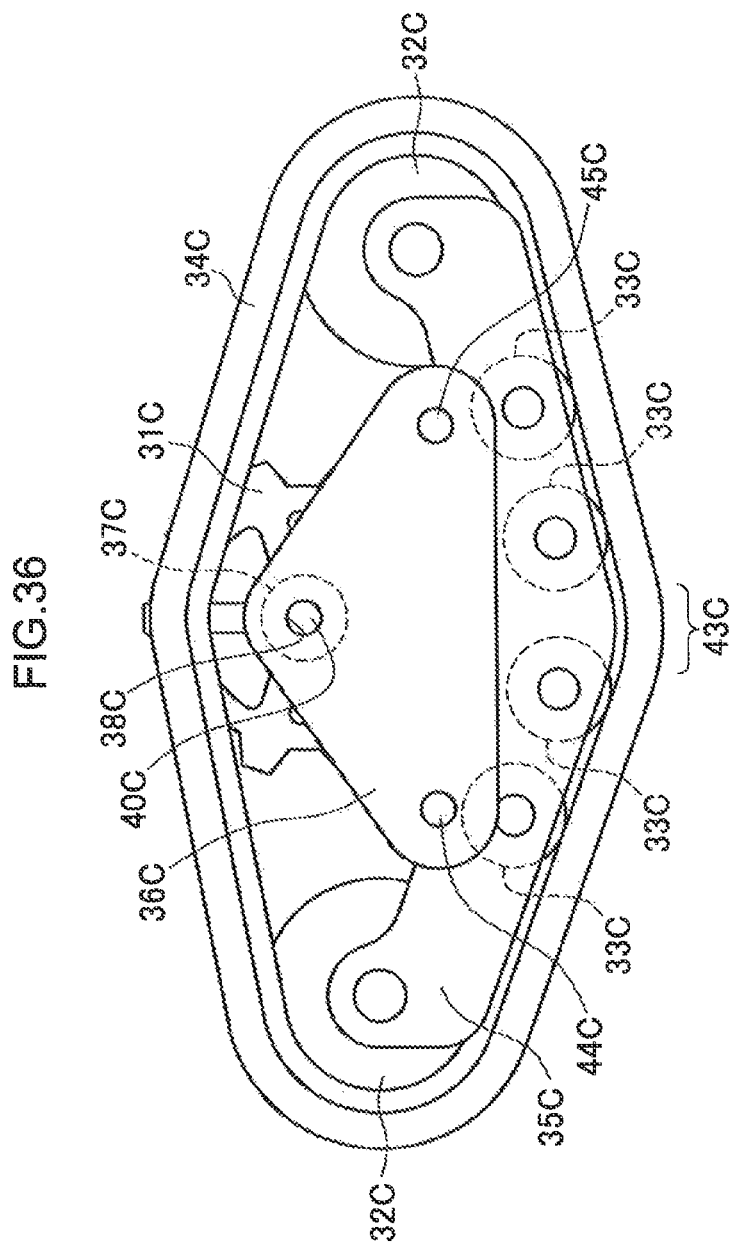
FIG. 36 is a side view illustrating the front crawler traveling device when viewed from the inside of the vehicle.
Figure 37:
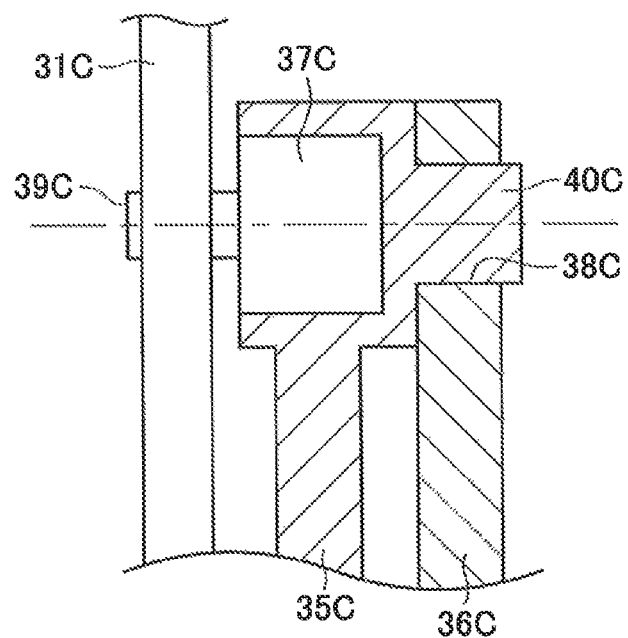
FIG. 37 is a partially enlarged cross-sectional view illustrating the front crawler traveling device.

Next, the front crawler traveling device 30C serving as the pair of right and left traveling devices will be described. Additionally, since the right and left front crawler traveling devices 30C have a horizontal symmetrical shape, the right front crawler traveling device 30C will be representatively described below. A description of the configuration of the left front crawler traveling device 30C will be omitted. Further, a reference sign R will be appropriately added to the right front crawler traveling device 30C and a reference sign L will be appropriately added to the left front crawler traveling device 30C if necessary. FIG. 35 is a right side view illustrating the front crawler traveling device 30C and FIG. 36 is a side view (a left side view) illustrating the front crawler traveling device 30C when viewed from the inside of the vehicle. Further, FIG. 37 is a partially enlarged cross-sectional view illustrating the front crawler traveling device 30C and used to describe the attachment configuration of a drive wheel 31C. Here, the right side indicates the inside of the vehicle and the left side indicated the outside of the vehicle.

As illustrated in FIGS. 35 and 36, the front crawler traveling device 30C includes the drive wheel 31C which is provided at an upper portion, driven wheels 32C which are provided at front and rear portions, four auxiliary rollers 33C which are provided between two driven wheels 32C, a crawler belt 34C, an attachment frame 35C, a connection frame 36C, a hydraulic motor 37C, and the like.

The crawler belt 34C is wound around the drive wheel 31C, two driven wheels 32C, and four auxiliary rollers 33C so as to contact the outer peripheries thereof.

The driven wheel 32C and the auxiliary roller 33C are rotatably supported by the attachment frame 35C and the hydraulic motor 37C is attached thereto.

The connection frame 36C has an upward triangular shape and is located on the inside of the vehicle than the attachment frame 35C. Then, a through-hole 38C is provided in the vicinity of the upper apex of the triangular shape.

As illustrated in FIG. 37, the hydraulic motor 37C serving as the driving device of the front crawler traveling device 30C is located on the inside of the vehicle than the drive wheel 31C and is attached to the attachment frame 35C. The drive wheel 31C is fixed to a front end of a drive shaft 39C of the hydraulic motor 37C. The drive wheel 31C is rotated by the hydraulic motor 37C.

The attachment frame 35C includes a rotation shaft 40C which is coaxial to the drive shaft 39C of the hydraulic motor 37C. The rotation shaft 40C is inserted through the through-hole 38C of the connection frame 36C. The attachment frame 35C is supported by the connection frame 36C to be rotatable about the rotation shaft 40C serving as an axis. Thus, the front crawler traveling device 30C is supported by the connection frame 36C to be swingable in the longitudinal direction about the rotation shaft 40C serving as an axis.

Here, the attachment frame 35C includes a circular-arc notch 41C formed about the rotation shaft 40C and a pin 42C which is installed vertically to the connection frame 36C is inserted into the notch 41C. When the attachment frame 35C rotates with respect to the connection frame 36C, the pin 42C slides inside the notch 41C. For this reason, the rotatable range of the attachment frame 35C about the rotation shaft 40C serving as an axis is regulated by the pin 42C and the notch 41C. That is, the swingable range of the front crawler traveling device 30C in the longitudinal direction about the rotation shaft 40C serving as an axis is regulated.

The front crawler traveling device 30C has a substantially diamond shape in which an apex is located at the front, rear, upper, and lower positions and which extends in the longitudinal direction. Then, the crawler belt 34C near the lower apex is used as a ground contact portion 43C contacting a ground. Additionally, the diamond shape is formed such that the front apex is biased upward in relation to the rear apex.

Further, rotation shafts 44C and 45C which vertically extend toward the inside of the vehicle are provided in the vicinity of two lower apexes of the triangular shape of the connection frame 36C. Two rotation shafts 44C and 45C are used to connect the front suspension device 50C to be described later.

Since the front crawler traveling device 30C has the above-described configuration, the crawler belt 34C is easily caught by a convex portion protruding upward from a ground when the traveling device climbs over the convex portion and thus the traveling operation is stabilized. Further, when the ground contact portion 43C is formed in a small size, a friction resistance with respect to a ground during the turning traveling operation is reduced and thus the turning traveling operation is improved.

Further, since the front crawler traveling device 30C is supported to be swingable in the longitudinal direction, the ground contact performance is improved and a cushion effect generated by the swing of the front crawler traveling device 30C is obtained. Thus, the vehicle can travel stably and the riding comfort is improved.

Further, the drive wheel 31C is located at the upper portion of the front crawler traveling device 30C, the drive wheel 31C is attached to the front end of the drive shaft 39C of the hydraulic motor 37C rotating the drive wheel 31C, and the protruding amount of the hydraulic motor 37C toward the inside of the vehicle is reduced. That is, the hydraulic motor 37C is disposed in an in-wheel shape. Thus, a large space can be formed below the vehicle body frame 10 between right and left front crawler traveling devices 30CR and 30CL. Then, the connection mechanism of the front suspension device 50C to be described later can be disposed in the space. Since the space is effectively used, the vehicle width does not increase.

Further, since the swingable range of the front crawler traveling device 30C in the longitudinal direction about the rotation shaft 40C serving as an axis is regulated, an excessive swing can be prevented and the failures of the front crawler traveling device 30C and the front suspension device 50C can be prevented.

Additionally, the front crawler traveling device 30C also includes a tension adjustment device (not illustrated) which adjusts a tension of the crawler belt 34C by moving a position of the driven wheel 32C with respect to the attachment frame 35C, a brake device (not illustrated) which stops a rotation of the drive wheel 31C, a damper which serves as a cushion mechanism suppressing a swing of the front crawler traveling device 30C in the longitudinal direction with respect to the connection frame 36C, and the like. The damper is provided between the attachment frame 35C and the connection frame 36C and the front crawler traveling device 30C stably contacts a ground. Accordingly, the traveling performance or the riding comfort is improved. Further, since the damper can reduce a load such as an impact or torsion of a connection portion to the front suspension device 50C when the front crawler traveling device 30C contacts an unevenness portion of an irregular ground, the durability is improved.

Figure 38:
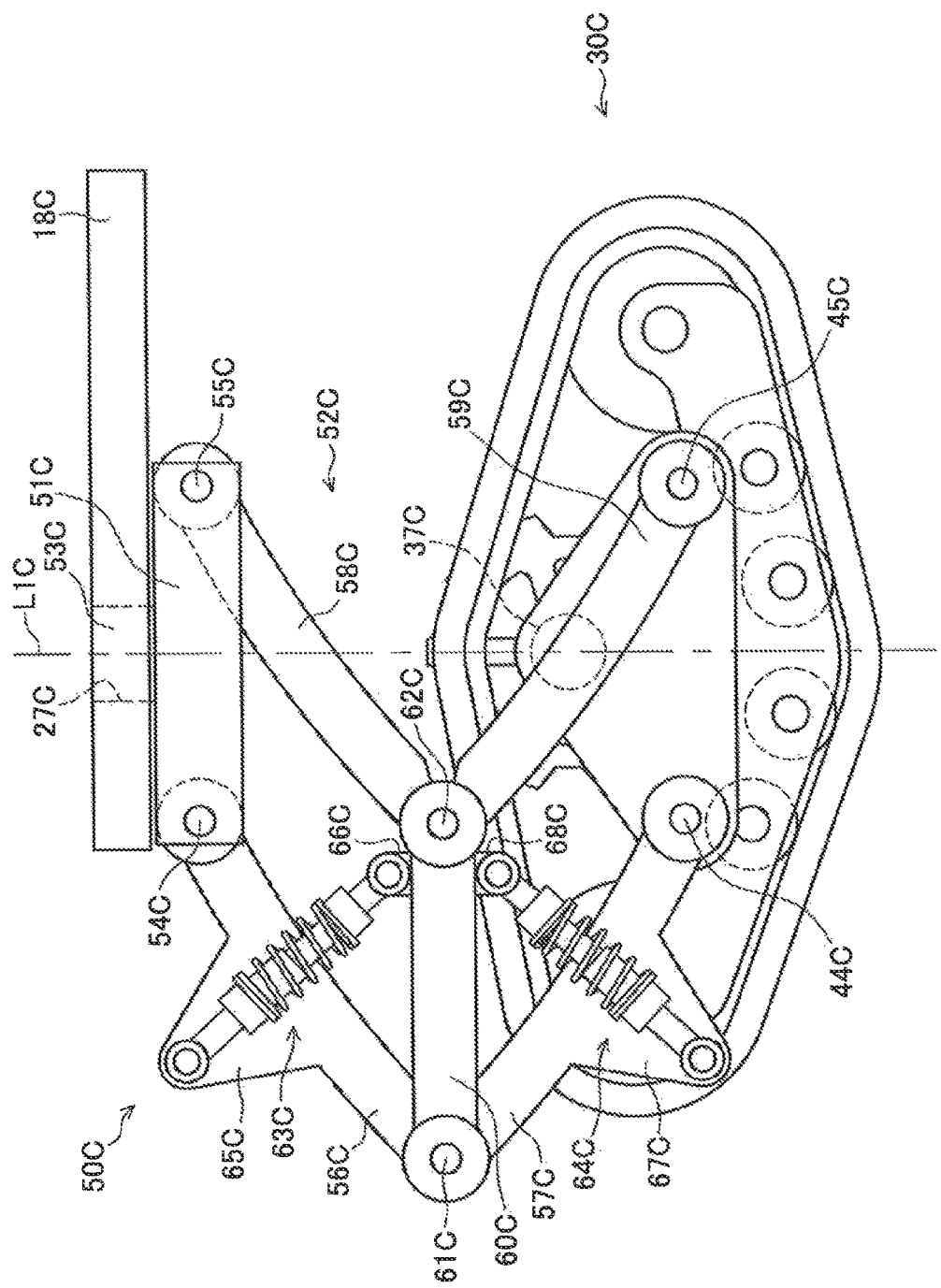
FIG. 38 is a side view illustrating a front suspension device when viewed from the inside of the vehicle.
Figure 39A:
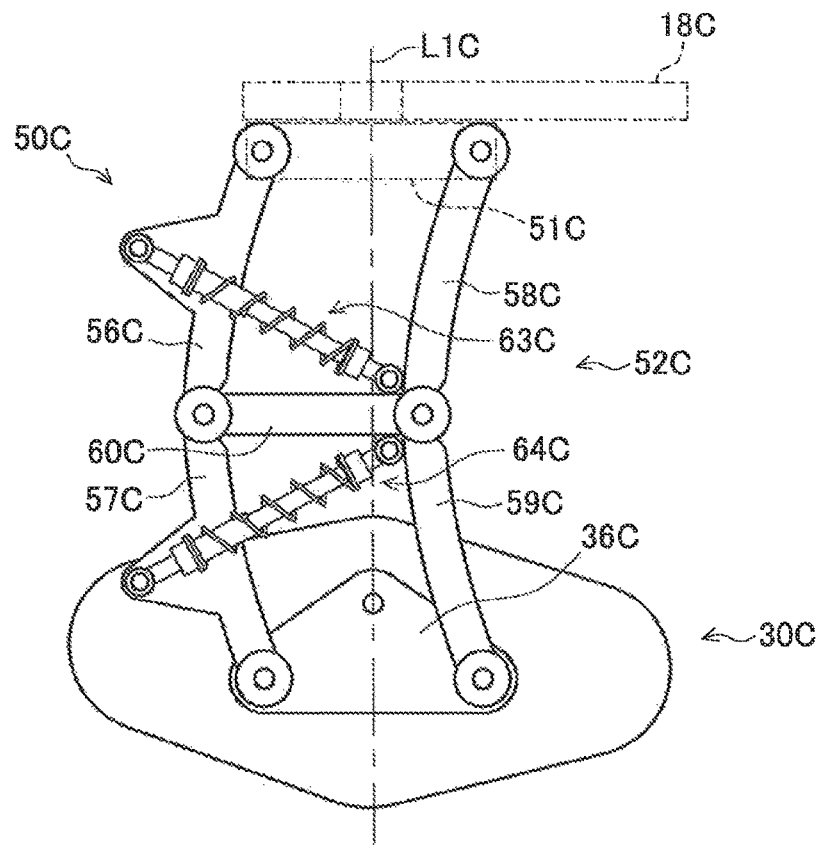
FIGS. 39A and 39B are diagrams illustrating an operation of the front suspension device of FIG. 38, where
Figure 39B:
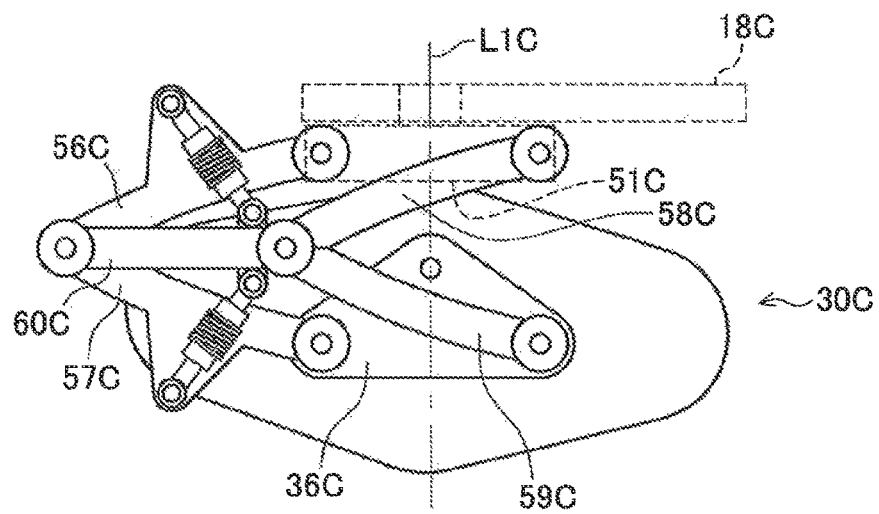

Next, the front suspension device 50C will be described. Additionally, since the front suspension device 50C has a horizontal symmetrical shape, a right component will be appropriately indicated by a reference sign R and a left component will be appropriately indicated by a reference sign L if necessary. FIG. 38 is a side view (a left side view) illustrating the front crawler traveling device 30C and the front suspension device 50C when viewed from the inside of the vehicle. FIGS. 39A and 39B are diagrams illustrating an operation of the front suspension device 50C of FIG. 38, FIG. 39A illustrates a state where the link mechanism of FIG. 38 is lengthened, and FIG. 39B illustrates a state where the link mechanism of FIG. 38 is shortened.

As illustrated in FIGS. 33, 35, and 38, the front suspension device 50C includes a bogie frame 51C, link mechanisms 52C which serve as a pair of right and left connection mechanisms respectively connecting the right and left front crawler traveling devices 30CR and 30CL to the right and left sides of the bogie frame 51C, and the like. Additionally, in FIG. 38, a description of the left link mechanism 52CL and the left front crawler traveling device 30CL will be omitted.

The bogie frame 51C has a substantially rectangular cuboid shape extending in the longitudinal direction in the top view and a rotation shaft 53C used as a steering shaft is installed vertically to the center of the upper face in the horizontal direction. The rotation shaft 53C is inserted through the through-hole 27C of the front support plate 18C. Then, the bogie frame 51C is connected to the front support plate 18C to be rotatable about the rotation shaft 53C serving as an axis. That is, the bogie frame 51C is supported by the vehicle body frame 10C to be rotatable about the vertical direction serving as an axis. Additionally, a line L1C in FIGS. 35, 38, and 39 indicates the center of the rotation shaft 53C (the rotation center of the bogie frame 51C), corresponds to the axial direction of the steering shaft, and is provided in the vertical direction.

Further, a rotation shaft 54C (54CR, 54CL) and a rotation shaft 55C (55CR, 55CL) are provided at the right and left side faces of the bogie frame 51C to extend vertically. The rotation shaft 54C and the rotation shaft 55C are provided at line symmetrical positions with respect to the line L1C.

Additionally, the bogie frame 51C is not limited to the above-described configuration and may be supported by the vehicle body frame 10C to be rotatable about the steering shaft serving as an axis in the vertical direction. Further, the direction of the rotation shaft 53C serving as the steering shaft of the bogie frame 51C is not limited to the vertical direction. The rotation shaft 53C may have a caster angle in which a front portion is low and a rear portion is high. In this way, when the rotation shaft 53C has the caster angle, the traveling performance and the durability are improved. Additionally, when the rotation shaft 53C is disposed in the vertical direction, the configuration of the front suspension device 50C is simple and the productivity is high.

The link mechanism 52C includes a first link member 56C, a second link member 57C, a third link member 58C, a fourth link member 59C, and a fifth link member 60C. The first link member 56C, the second link member 57C, the third link member 58C, and the fourth link member 59C have the same shape and are formed as a bar-shaped member curved in a substantially circular-arc shape. The fifth link member 60C is a straight bar-shaped member which is not curved. When the ends of five link members 56C, 57C, 58C, 59C, and 60C are connected, the link mechanism 52C is obtained.

One end of the first link member 56C is connected to the rotation shaft 54C of the bogie frame 51C. One end of the second link member 57C is connected to the other end of the first link member 56C and the other end thereof is connected to the rotation shaft 44C of the connection frame 36C of the front crawler traveling device 30C. One end of the third link member 58C is connected to the rotation shaft 55C of the bogie frame 51C. One end of the fourth link member 59C is connected to the other end of the third link member 58C and the other end thereof is connected to the rotation shaft 45C of the connection frame 36C of the front crawler traveling device 30C. One end of the fifth link member 60C is connected to a connection portion 61C between the first link member 56C and the second link member 57C and the other end thereof is connected to a connection portion 62C between the third link member 58C and the fourth link member 59C. Additionally, the fifth link member 60C is disposed on the inside of the vehicle than the first link member 56C, the second link member 57C, the third link member 58C, and the fourth link member 59C.

Here, the link mechanism 52C has a vertically symmetrical structure with respect to the fifth link member 60C. Then, a distance between the rotation shaft 54C and the connection portion 61C, a distance between the connection portion 61C and the rotation shaft 44C, a distance between the rotation shaft 55C and the connection portion 62C, and a distance between the connection portion 62C and the rotation shaft 45C are equal to one another. Further, a distance between the rotation shaft 44C connected to the second link member 57C and the rotation shaft 45C connected to the fourth link member 59C is equal to a distance between the rotation shaft 55C and the rotation shaft 54C of the bogie frame 51C. Further, the first link member 56C, the second link member 57C, the third link member 58C, and the fourth link member 59C are connected to one another so that a curved shape protrudes forward.

Dampers 63C and 64C are respectively provided between the first link member 56C and the fifth link member 60C and between the second link member 57C and the fifth link member 60C. Each of the dampers 63C and 64C is a telescopic bar-shaped cushion mechanism including a spring, a cylinder, and the like. One end of the damper 63C is attached to a bracket 65C of the first link member 56C to be rotatable and the other end thereof is attached to a bracket 66C of the fifth link member 60C to be rotatable. One end of the damper 64C is attached to a bracket 67C of the second link member 57C to be rotatable and the other end thereof is attached to a bracket 68C of the fifth link member 60C to be rotatable.

Two dampers 63C and 64C are disposed at vertically symmetrical positions and two dampers 63C and 64C generate the same cushion force while being lengthened and shortened. Additionally, the rotation shaft 40C of the front crawler traveling device 30C is located on the line L1C and the center of the ground contact portion 43C of the front crawler traveling device 30C is also located thereon.

Here, as illustrated in FIGS. 39A and 39B, the link mechanism 52C moves in a telescopic manner in the vertical direction while being bent forward and deformed so that the front crawler traveling device 30C is elevatable in the vertical direction. Here, the link mechanism 52C allows the front crawler traveling device 30C to be elevatable in the vertical direction along the line L1C (the steering shaft).

This is because an upper link mechanism including the first link member 56C, the third link member 58C, the fifth link member 60C, and the damper 63C and a lower link mechanism including the second link member 57C, the fourth link member 59C, the fifth link member 60C, and the damper 64C are vertically symmetrical to each other and the damper 63C and the damper 64C generate the same cushion force.

Thus, the front crawler traveling device 30C is elevatable with respect to a change in an unevenness portion of an irregular ground and the traveling performance for an irregular ground with an unevenness portion is satisfactory. Further, since the link mechanism 52C serving as the connection mechanism includes the dampers 63C and 64C serving as the cushion mechanisms, an impact between the vehicle body frame 10C and the front crawler traveling device 30C is reduced. Accordingly, the front crawler traveling device 30C stably contacts a ground and the traveling performance or the riding comfort is improved.

Further, the front suspension device 50C is used to elevate the front crawler traveling device 30C in the vertical direction and does not include a forward or backward extension member differently from the rear suspension device 90C allowing the vertical swing to be described later. Thus, since the entire length of the traveling vehicle 1C can be shortened, the turning traveling operation can be easily performed and the traveling performance is improved.

Figure 40:
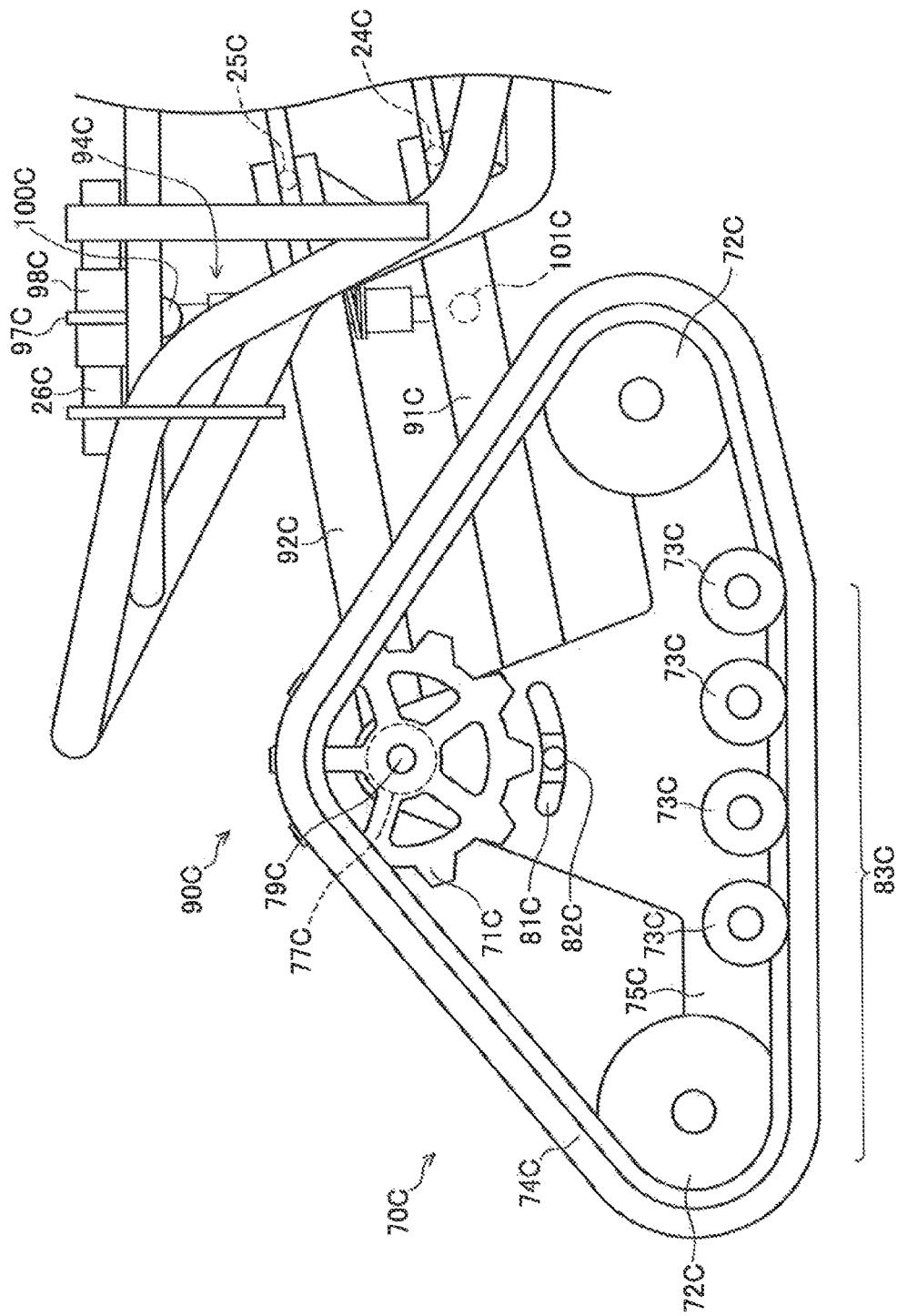
FIG. 40 is a right side view illustrating a rear crawler traveling device.
Figure 41:
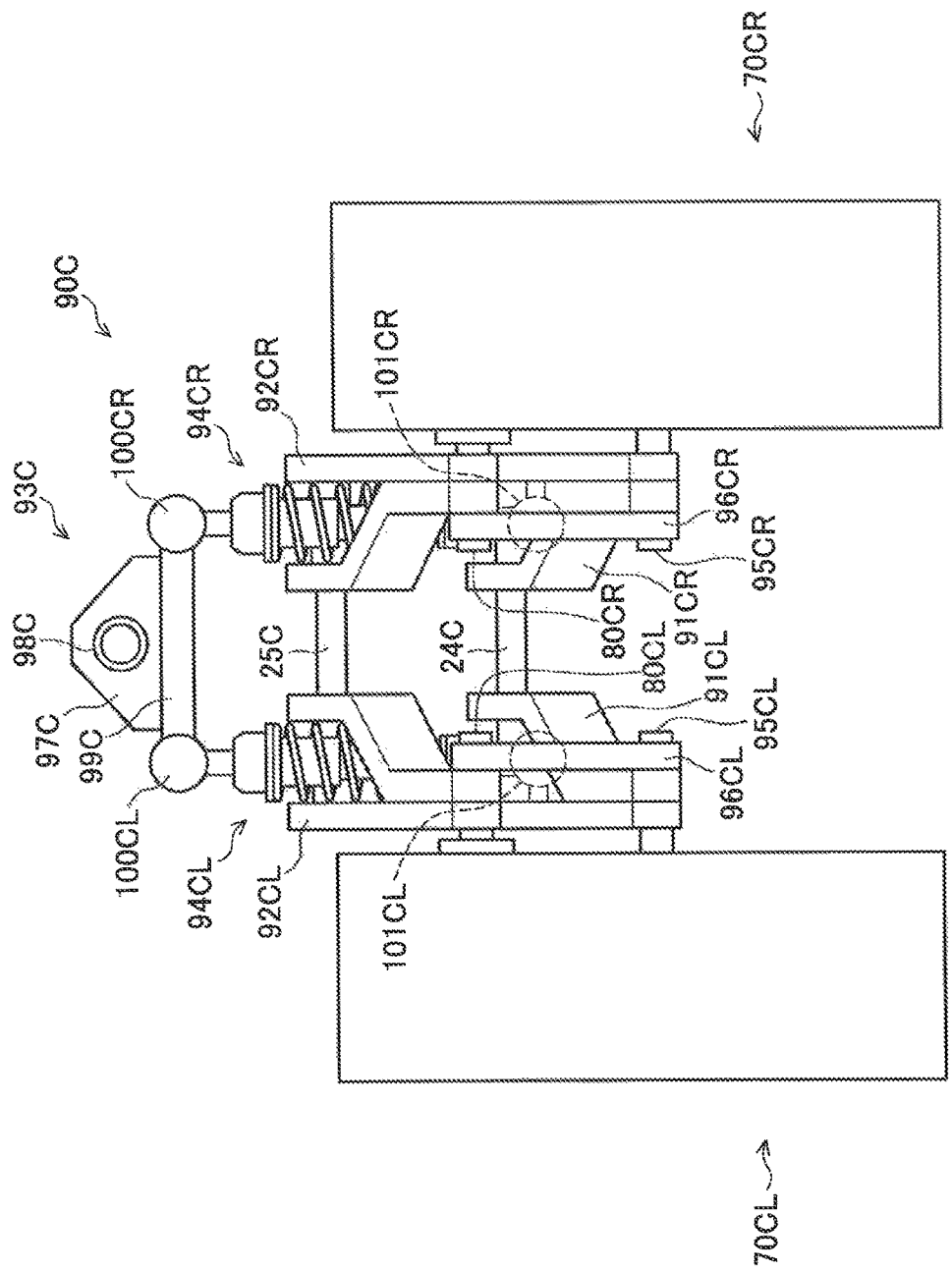
FIG. 41 is a rear view illustrating the rear crawler traveling device and a rear suspension device.

Next, the pair of right and left rear crawler traveling devices 70C serving as the traveling devices will be described. Additionally, since the right and left rear crawler traveling devices 70C have a horizontal symmetrical shape, the right rear crawler traveling device 70C will be representatively described below. A description of the configuration of the left rear crawler traveling device 70C will be omitted. Further, a reference sign R will be appropriately added to the right rear crawler traveling device 70C and a reference sign L will be appropriately added to the left rear crawler traveling device 70C if necessary. FIG. 40 is a right side view illustrating the rear crawler traveling device 70C and FIG. 41 is a rear view illustrating the rear crawler traveling device 70C and the rear suspension device 90C.

As illustrated in FIG. 40, the rear crawler traveling device 70C includes a drive wheel 71C which is provided at an upper portion, a driven wheel 72C which is provided below the drive wheel 71C to be located at front and rear portions, four auxiliary rollers 73C which are provided between two driven wheels 72C, a crawler belt 74C, an attachment frame 75C, a hydraulic motor 77C, and the like.

Here, the rear crawler traveling device 70C has a shape different from that of the front crawler traveling device 30C in the side view. The connection between the rear crawler traveling device 70C and the rear suspension device 90C is performed without the connection frame 36C. Then, a description of the same configuration as that of the front crawler traveling device 30C will be appropriately omitted.

Similarly to the hydraulic motor 37C of the front crawler traveling device 30C, the hydraulic motor 77C serving as the driving device of the rear crawler traveling device 70C is located at the drive wheel 71C on the inside of the vehicle and is attached to the attachment frame 75C. The drive wheel 71C is fixed to the front end of the drive shaft 79C of the hydraulic motor 77C. The drive wheel 71C is rotated by the hydraulic motor 77C.

Further, similarly to the attachment frame 35C of the front crawler traveling device 30C, the attachment frame 75C includes a rotation shaft 80C which is coaxial to the drive shaft 79C of the hydraulic motor 77C. Here, the rotation shaft 80C is used to connect the rear suspension device 90C to be described later and the rear crawler traveling device 70C is connected to the rear suspension device 90C to be swingable in the longitudinal direction about the rotation shaft 80C serving as an axis.

Further, the attachment frame 75C includes a circular-arc notch 81C formed about the rotation shaft 80C and a pin 82C provided in the rear suspension device 90C to be described later is inserted into the notch 81C. When the attachment frame 75C rotates with respect to the rear suspension device 90C, the pin 82C slides inside the notch 81C. For this reason, the rotatable range of the attachment frame 75C about the rotation shaft 80C serving as an axis is regulated by the pin 82C and the notch 81C. That is, similarly to the front crawler traveling device 30C, the swingable range of the rear crawler traveling device 70C in the longitudinal direction about the rotation shaft 80C serving as an axis is regulated.

Further, the rear crawler traveling device 70C is disposed so that the front driven wheel 72C is located at the upside in relation to the rear driven wheel 72C. Then, the crawler belt 74C on which the rear driven wheel 72C and four auxiliary rollers 73C are located becomes aground contact portion 83C contacting a ground. That is, the rear crawler traveling device 70C is formed such that the ground contact portion 83C is wider than the front crawler traveling device 30C.

Since the rear crawler traveling device 70C has the above-described configuration, the crawler belt 74C is easily caught by a convex portion protruding upward from a ground when the traveling device climbs over the convex portion and thus the traveling operation is stabilized. Further, since the ground contact portion 83C of the crawler belt 74C is formed widely, the vehicle can travel stably.

Further, since the rear crawler traveling device 70C is connected to the rear suspension device 90C to be swingable in the longitudinal direction, the ground contact performance is improved and a cushion effect is obtained by the swing of the rear crawler traveling device 70C. Thus, the vehicle can travel stably and the riding comfort is improved. Further, since a load such as an impact or torsion of a connection portion to the rear suspension device 90C can be reduced by the cushion effect, the durability is improved.

Further, the drive wheel 71C is located at the upper portion of the rear crawler traveling device 70C, the drive wheel 71C is attached to the front end of the drive shaft 79C of the hydraulic motor 77C rotating the drive wheel 71C, and the protruding amount of the hydraulic motor 77C toward the inside of the vehicle is reduced. That is, the hydraulic motor 77C is disposed in an in-wheel shape. Thus, a large space can be formed below the vehicle body frame 10C between right and left rear crawler traveling devices 70CR and 70LC. Then, the connection mechanism of the rear suspension device 90C to be described later can be disposed in the space. Since the space is effectively used, the vehicle width does not increase.

Further, since the swingable range of the rear crawler traveling device 70C in the longitudinal direction about the rotation shaft 80C serving as an axis is regulated, an excessive swing can be prevented and thus the failures of the rear crawler traveling device 70C and the rear suspension device 90C can be prevented.

Additionally, similarly to the front crawler traveling device 30C, the rear crawler traveling device 70C also includes a tension adjustment device (not illustrated) which adjusts a tension of the crawler belt 74C by moving a position of the driven wheel 72C with respect to the attachment frame 75C, a brake device (not illustrated) which stops a rotation of the drive wheel 71C, a damper which serves as a cushion mechanism suppressing a swing of the rear crawler traveling device 70C in the longitudinal direction with respect to the rear suspension device 90C, and the like. The damper is provided between the attachment frame 75C and the rear suspension device 90C and the rear crawler traveling device 70C stably contacts a ground. Accordingly, the traveling performance or the riding comfort is improved. Further, since the damper can reduce a load such as an impact or torsion of a connection portion to the rear suspension device 90C when the rear crawler traveling device 70C contacts an unevenness portion of an irregular ground, the durability is improved.

Here, the front and rear crawler traveling devices 30C and 70C are driven by the driving power of the engine EC. The driving power of the engine EC is transmitted to a pump (not illustrated) provided in the vehicle body frame 10C and is further transmitted to the hydraulic motors 37C and 77C through a proportional electromagnetic valve (not illustrated). Then, when the hydraulic motors 37C and 77C are driven, the front and rear crawler traveling devices 30C and 70C are driven so that the traveling vehicle 1C can travel. Additionally, it is desirable to transmit the driving power to the front and rear crawler traveling devices 30C and 70C through a flexible member, for example, a flexible hose. The front and rear crawler traveling devices 30C and 70C can be largely elevated or swung in the vertical direction by the front and rear suspension devices 50C and 90C. Thus, it is desirable to transmit the driving power between the vehicle body frame 10C and the front and rear crawler traveling devices 30C and 70C without disturbing the elevation or the swing in the vertical direction. When a flexible member is used to transmit the driving power, the driving power can be transmitted to the front and rear crawler traveling devices 30C and 70C without disturbing the elevation or the swing in the vertical direction.

Additionally, the transmission of the driving power to the front and rear crawler traveling devices 30C and 70C is not limited to the above-described configuration. For example, four proportional electromagnetic valves respectively corresponding to the crawler traveling devices 30CR, 30CL, 70CR, and 70CL may be provided and four proportional electromagnetic valves may be respectively controlled.

Further, the front and rear crawler traveling devices 30C and 70C are not limited to the above-described configuration. For example, a crawler traveling device having a square or trapezoid shape in the side view may be used. Further, the front crawler traveling device 30C and the rear crawler traveling device 70C may have the same shape. With such a configuration, the number of components is decreased and thus the productivity is improved.

Further, a configuration may be employed in which a speed changing device is provided between the drive wheels 31C and 71C and the hydraulic motors 37C and 77C and the driving power of the hydraulic motors 37C and 77C is transmitted to the drive wheels 31C and 71C through the speed changing device. With such a configuration, the front and rear crawler traveling devices 30C and 70C can be further easily driven by a desired output.

Further, the connection between the hydraulic motors 37C and 77C and the drive wheels 31C and 71C of the front and rear crawler traveling devices 30C and 70C is not limited to the above-described configuration. For example, the hydraulic motors 37C and 77C may be disposed at the drive wheels 31C and 71C on the outside of the vehicle and may be connected to each other through gears. With such a configuration, the degree of freedom in the arrangement of the hydraulic motors 37C and 77C is improved.

Further, the driving devices of the front and rear crawler traveling devices 30C and 70C are not limited to the hydraulic motors 37C and 77C. For example, the drive wheels 31C and 71C may be rotated by an electric motor instead of the hydraulic motor. In the case of using the electric motor, the driving power is transmitted from the engine EC to the crawler traveling device by the electricity (the electric power) and thus a flexible member, for example, a flexible wire harness is used. With such a configuration, similarly to the hydraulic motors 37C and 77C, the elevation and the swing of the front and rear crawler traveling devices 30C and 70C in the vertical direction are not disturbed.

Additionally, when the hydraulic motor is used in the driving devices of the front and rear crawler traveling devices 30C and 70C, the front and rear crawler traveling devices can be easily driven by a high output. Further, when the electric motor is used in the driving devices of the front and rear crawler traveling devices 30C and 70C, the control is easy and the responsiveness becomes satisfactory.

Next, the rear suspension device 90C will be described. Additionally, since the rear suspension device 90C has a horizontal symmetrical shape, a right component will be appropriately indicated by a reference sign R and a left component will be appropriately indicated by a reference sign L if necessary.

As illustrated in FIGS. 40 and 41, the rear suspension device 90C includes four pulling arms 91C and 92C (91CR, 91CL, 92CR, 92CL) which are provided so that two pulling arms are disposed at each of the right and left sides of the rear suspension device, a swing arm 93C, right and left dampers 94C (94CR, 94CL), and the like.

The pulling arm 91C includes two square cylindrical pipes (hereinafter, referred to as square pipes) extending in the longitudinal direction. One square pipe of the pulling arm 91C is bent twice in the opposite directions at the substantial center in the longitudinal direction and is offset toward the inside of the vehicle from the bent portion to the front end. The other square pipe of the pulling arm 91C extends straightly without any bent mark and is disposed at the square cylindrical pipe with a bent mark on the outside of the vehicle. Then, two square pipes of the pulling arm 91C are formed such that a portion from the rear end to the bent mark of one square pipe is joined. Both front and rear ends of the pulling arm 91C are provided with a through-hole formed in the horizontal direction. Additionally, since the pulling arm 92C has the same shape, a description thereof will be omitted.

The rotation shaft 24C of the vehicle body frame 10C is inserted through the through-hole of the front end of the pulling arm 91C. Then, the front end of the pulling arm 91C is supported by the vehicle body frame 10C to be rotatable about the rotation shaft 24C serving as an axis. Further, the rotation shaft 25C is inserted through the through-hole of the front end of the pulling arm 92C. Then, the front end of the pulling arm 92C is supported by the vehicle body frame 10C to be rotatable about the rotation shaft 25C serving as an axis.

A connection pin 95C is inserted through the through-hole of the rear end of the pulling arm 91C. Then, one end of a connection member 96C of the square cylindrical pipe having a through-hole formed at both ends thereof is connected to the rear end of the pulling arm 91C through the connection pin 95C.

The rotation shaft 80C provided at the attachment frame 75C of the rear crawler traveling device 70C is inserted through the through-hole of the rear end of the pulling arm 92C and the through-hole of the other end of the connection member 96C. Then, the rear crawler traveling device 70C is connected to the rear end of the pulling arm 92C to be rotatable about the rotation shaft 80C serving as an axis.

Additionally, the end of the connection pin 95C on the outside of the vehicle is provided with the pin 82C of the rear crawler traveling device 70C in the perpendicular direction. Then, as described above, the swingable range of the rear crawler traveling device 70C in the longitudinal direction about the rotation shaft 80C serving as an axis with respect to the rear suspension device 90C is regulated by the pin 82C and the notch 81C.

Here, the pulling arms 91C and 92C are not limited to the above-described configuration. Here, one end may be supported by the vehicle body frame 10C to be rotatable about the horizontal direction serving as an axis and the rear crawler traveling device 70C may be connected to the other end to be rotatable about the horizontal direction serving as an axis.

For example, each of the pulling arms 91C and 92C may be formed as a single square pipe. Further, the vehicle body frame 10C and the rear crawler traveling device 70C may be connected to each other only by the pulling arm 92C. With such a configuration, the number of components can be decreased and thus the productivity is improved. However, since the strength is reduced in the case of such a configuration, it is desirable that a mechanism connecting the rear crawler traveling device 70C to the vehicle body frame 10C have a necessary strength.

The swing arm 93C includes a plate-shaped plate 97C which has an upward triangular shape in the rear view, a cylindrical pipe 98C which extends in the longitudinal direction from the center of the plate-shaped plate 97C in the horizontal direction, a columnar shaft 99C which is fixed to the lower end of the plate 97C and extends in the horizontal direction, and the like. The rotation shaft 26C of the vehicle body frame 10C is inserted through the cylindrical pipe 98C. Then, the swing arm 93C is supported by the vehicle body frame 10C to be rotatable about the rotation shaft 26C serving as an axis.

Here, the swing arm 93C is not limited to the above-described configuration. The swing arm 93C is provided to extend in the horizontal direction and is supported by the vehicle body frame 10C at the center in the horizontal direction to be rotatable about the longitudinal direction serving as an axis.

The damper 94C is a telescopic bar-shaped cushion mechanism including a spring, a cylinder, and the like. One end of the left damper 94CL is connected to the left end of the shaft 99C of the swing arm 93C through a ball joint 100CL serving as a universal joint. The other end of the left damper 94CL is connected to the left pulling arm 91CL through a ball joint 101CL serving as a universal joint.

One end of the right damper 94CR is connected to the right end of the shaft 99C of the swing arm 93C through a ball joint 100CR serving as a universal joint. The other end of the right damper 94CR is connected to the right pulling arm 91CL through a ball joint 101CR serving as a universal joint.

Here, the damper 94C is not limited to the above-described configuration. One end of the damper 94C may be connected to the swing arm 93C through a universal joint and the other end thereof may be connected to the rear crawler traveling device 70C through a universal joint. Additionally, the above-described configuration is a configuration in which one end of the damper 94C is connected to the rear crawler traveling device 70C through the pulling arm 91C.

For example, a connection using a cross type universal joint instead of the ball joint as a universal joint may be performed. Further, an arm formed by a steel member may be used instead of the damper 94C serving as the telescopic cushion mechanism. However, it is desirable to use the damper 94C serving as the telescopic cushion mechanism in order to realize the stable traveling operation and to improve the riding comfort. With such a configuration, since there is no need to provide a separate cushion mechanism between the vehicle body frame 10C and the rear crawler traveling device 70C, the number of components is decreased and the productivity is improved.

Then, the suspended right and left rear crawler traveling devices 70CR and 70CL are swung in an interlocking manner in the opposite directions in the vertical direction by the rear suspension device 90C. This is because the right and left rear crawler traveling devices 70CR and 70CL are connected to each other through the swing arm 93C supported by the vehicle body frame 10C to be rotatable about the rotation shaft 26C serving as an axis and extending in the longitudinal direction.

Further, the rear crawler traveling device 70C swings in the vertical direction without the movement in the horizontal direction and the rotation about the longitudinal direction serving as an axis. Then, the ground contact portion 83C of the rear crawler traveling device 70C is kept in parallel to the vehicle body frame 10C at all times. That is, the rear crawler traveling device 70C slides in the vertical direction with respect to the vehicle body frame 10C in the rear view. This is because the right and left rear crawler traveling devices 70CR and 70LC are connected by the pulling arms 91CR, 92CR, 91CL, and 92CL of which one ends are supported by the vehicle body frame 10C to be rotatable about the rotation shaft 24C or the rotation shaft 25C extending in the horizontal direction serving as an axis and of which the other ends are respectively supported by the rear crawler traveling device 70C to be rotatable about the rotation shaft 80C extending in the horizontal direction serving as an axis.

Thus, the rear crawler traveling device 70C can promptly follow a change in an unevenness portion of an irregular ground in the vertical direction and the traveling performance or the riding comfort is satisfactory. Further, the rear suspension device 90C is configured to integrally suspend the right and left rear crawler traveling devices 70CR and 70CL on the vehicle body frame 10C. Since this configuration is simpler than the configuration in which the crawler traveling devices are independently suspended. The number of components is decreased, the productivity or the maintenance workability becomes satisfactory.

Additionally, the rear suspension device 90C is not limited to the above-described configuration. The rear crawler traveling device 70C may be configured to be suspended on the vehicle body frame 10C. More desirably, the rear crawler traveling device 70C may be configured to be swingable in the vertical direction. For example, the rear suspension device 90C may not include the pulling arm 91C, the swing arm 93C, the damper 94C, and the connection member 96C. That is, a configuration may be employed in which the right and left rear crawler traveling devices 70CR and 70CL are suspended on the vehicle body frame 10C by the pulling arms 92CR and 92CL serving as the connection members and a damper which is similar to the damper 94C is connected between the vehicle body frame 10C and the pulling arm 92C. Thus, the right and left rear crawler traveling devices 70CR and 70CL are independently suspended on the vehicle body frame 10C. With such a configuration, the rear suspension device 90C has a simple configuration and thus the productivity and the maintenance workability are improved.

Further, one end of the pulling arm 92C of the rear suspension device 90C is supported by the vehicle body frame 10C and the other end thereof is supported by the rear crawler traveling device 70C. However, the rear suspension device 90C may have a configuration in which a pair of upper and lower arms (an upper arm and a lower arm) used in a known double wishbone type suspension is provided between the vehicle body frame 10C and the rear crawler traveling device 70C instead of the pulling arm 92C. With such a configuration, the connection strength between the vehicle body frame 10C and the rear crawler traveling device 70C is improved. However, since the swingable amount of the rear crawler traveling device 70C in the vertical direction (the movement amount in the vertical direction) is reduced with such a configuration, a configuration using the pulling arm 92C is desirable.

Next, the traveling operation and the steering operation of the traveling vehicle 1C will be described. As described above, drive wheels 31CR, 31CL, 71CR, and 71CL are driven to rotate by hydraulic motors 37CR, 37CL, 77CR, and 77CL of the crawler traveling devices 30CR, 30CL, 70CR, and 70CL.

The hydraulic motors 37CR, 37CL, 77CR, and 77CL are driven by pumps (not illustrated) driven by the driving power of the engine EC. Further, when proportional electromagnetic valves (not illustrated) provided between the hydraulic motors 37CR, 37CL, 77CR, and 77CL and the pumps are controlled by a controller (not illustrated), the hydraulic motors 37CR, 37CL, 77CR, and 77CL are independently controlled. That is, the driving power of the engine EC is independently transmitted from the pumps to the hydraulic motors 37CR, 37CL, 77CR, and 77CL through the proportional electromagnetic valves.

With such a configuration, the crawler traveling devices 30CR, 30CL, 70CR, and 70CL can be independently driven so that the traveling vehicle 1C can move forward or backward and turn.

When the vehicle moves forward or backward, the front, rear, right, and left crawler traveling devices 30CR, 30CL, 70CR, and 70CL are driven at the same speed in the same direction.

During the turning operation, the right front crawler traveling device 30CR and the left front crawler traveling device 30CL are driven at a different speed. Due to a difference in speed between the right and left front crawler traveling devices 30CR and 30CL, the front crawler traveling device 30C and the front suspension device 50C rotate together with respect to the vehicle body frame 10C about the rotation shaft 53C of the front suspension device 50C serving as an axis. That is, the front crawler traveling device 30C and the front suspension device 50C rotate about the rotation shaft 53C. Thus, the direction of the front crawler traveling device 30C with respect to the vehicle body frame 10C is changed so that the traveling direction of the traveling vehicle 1C can be changed.

Then, since the direction of the front crawler traveling device 30C with respect to the vehicle body frame 10C is changed so that the traveling direction of the traveling vehicle 1C is changed, the traveling direction of the traveling vehicle 1C can be reliably changed.

Additionally, the right and left rear crawler traveling devices 70CR and 70CL may be also driven at a different speed when the right and left front crawler traveling devices 30CR and 30CL are driven at a different speed. With such a configuration, the traveling vehicle 1C can turn at a small radius and thus the turning operation can be promptly performed. Further, the traveling vehicle 1C can make a zero turn and thus the traveling performance is improved.

Here, the front crawler traveling device 30C is suspended on the vehicle body frame 10C by the front suspension device 50C to be largely elevatable in the vertical direction. Further, the rear crawler traveling device 70C is suspended on the vehicle body frame 10C by the rear suspension device 90C to be largely swingable in the vertical direction. Thus, the front crawler traveling device 30C and the rear crawler traveling device 70C can move or swing in the vertical direction to follow a slope or an unevenness portion of an irregular ground. Accordingly, the traveling performance for the irregular ground is improved.

Further, when the traveling vehicle 1C travels on an irregular ground, the crawler traveling devices 30CR, 30CL, 70CR, and 70CL are located at different positions in the vertical direction. However, even in such a state, the turning operation can be easily performed. Then, the turning operation of the traveling vehicle 1C will be described.

Figure 42:
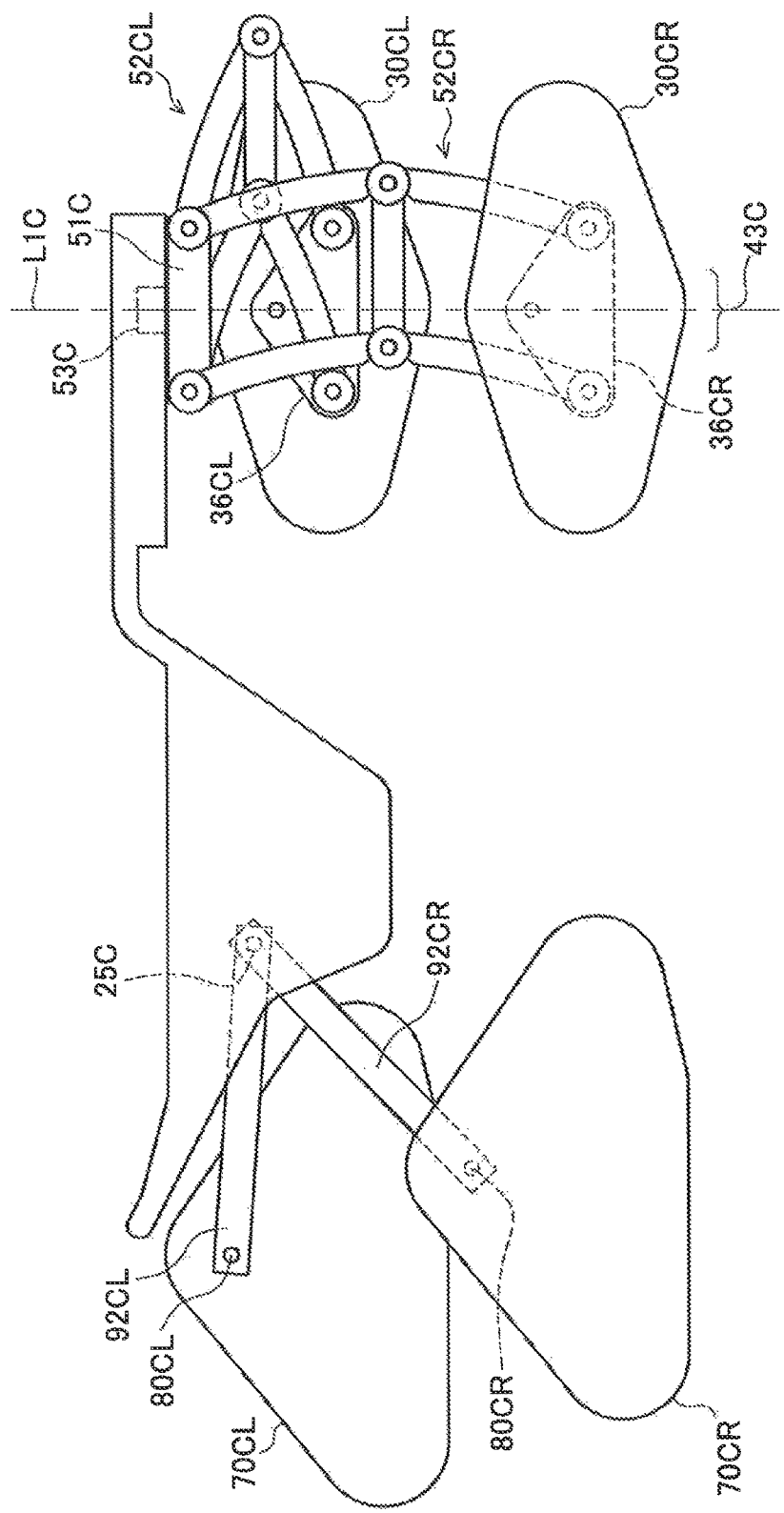
FIG. 42 is a schematic right side view illustrating a turning operation of a traveling vehicle.
Figure 43:
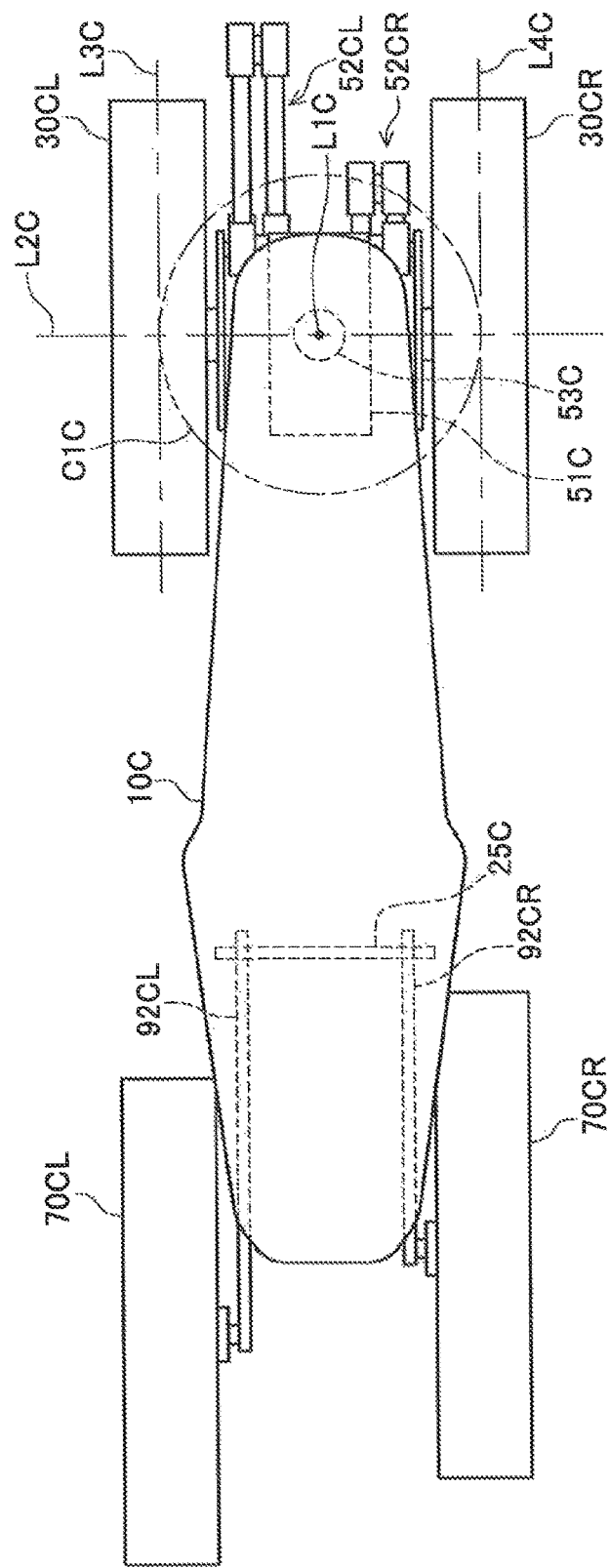
FIG. 43 is a schematic top view of FIG. 42.

FIG. 42 is a schematic right side view illustrating a state where the left front and rear crawler traveling devices 30CL and 70CL are located at the upside with respect to the right front and rear crawler traveling devices 30CR and 70CR. In FIG. 42, a description of the dampers 63C and 64C of the front suspension device 50C and a description of the pulling arm 91C, the swing arm 93C, the damper 94C, and the like of the rear suspension device 90C is omitted. FIG. 43 is a schematic top view of FIG. 42. In FIG. 43, a circle C1C is a circle about the rotation shaft 53C, a line L2C indicates the center of the ground contact portion 43C of the front crawler traveling device 30C in the longitudinal direction, a line L3C indicates the center of the left front crawler traveling device 30CL in the width direction, and a line L4C indicates the center of the right front crawler traveling device 30CR in the width direction.

As illustrated in FIGS. 42 and 43, since the right and left rear crawler traveling devices 70CR and 70CL are located at different positions in the vertical direction, the left rear crawler traveling device 70CL is disposed at the rear side of the right rear crawler traveling device 70CR.

Additionally, even when the right and left front crawler traveling devices 30CR and 30CL are disposed at different positions in the vertical direction, a displacement in the longitudinal direction does not occur. That is, the right and left front crawler traveling devices 30CR and 30CL are axially symmetrical to each other with respect to the rotation shaft 53C at all times in the top view. This depends on the link mechanism 52C of the front suspension device 50C.

Here, there is a case in which the turning operation is not easily performed when the right and left crawler traveling device are displaced from each other in the longitudinal direction in the configuration in which the right and left crawler traveling devices are driven at a different speed to turn. For example, when a right turning operation is performed while the left rear crawler traveling device 70CL is located at the rear side in relation to the right rear crawler traveling device 70CR, the turning operation is not smoothly performed due to the interruption of the right rear crawler traveling device 70CR. On the contrary, there is a case in which a turning operation is easily performed compared to the normal state (a case where the right and left rear crawler traveling devices 70CR and 70CL are located at the same position in the vertical direction) when a left turning operation is performed in such a state. Thus, a desired turning operation cannot be performed and thus a control becomes complicated.

However, the right and left front crawler traveling devices 30CR and 30CL are axially symmetrical to each other with respect to the rotation shaft 53C at all times in the top view without a difference in the longitudinal direction even at different positions in the vertical direction. Thus, when the right and left front crawler traveling devices 30CR and 30CL are driven at a different speed so that the front crawler traveling device 30C and the front suspension device 50C are rotated with respect to the rotation shaft 53C, a desired rotation can be performed without any influence of the positions of the right and left front crawler traveling devices 30CR and 30CL in the vertical direction.

This is because a force transmitted from the right and left front crawler traveling devices 30CR and 30CL to a ground is efficiently used for the rotation. The force transmission directions of the left front crawler traveling device 30CL and the right front crawler traveling device 30CR with respect to a ground correspond to the directions of the line L3C and the line L4C. The line L3C and the line L4C contact the circle C1C about the rotation shaft 53C at the intersection point with the line L2C. Thus, a force transmitted to a ground in the directions of the line L3C and the line L4C can be used for the rotation about the rotation shaft 53C without any waste and thus a desired rotation can be easily performed. Additionally, this is because the elevation direction of the front crawler traveling device 30C is regulated in the direction of the line L1C corresponding to the direction of the steering shaft by the link mechanism 52C of the front suspension device 50C. Accordingly, the ground contact portion 43C of the front crawler traveling device 30C moves along the line L1C in the vertical direction. Then, the line L2C normally passes through the center (the line L1C) of the rotation shaft 53C.

Figure 44:
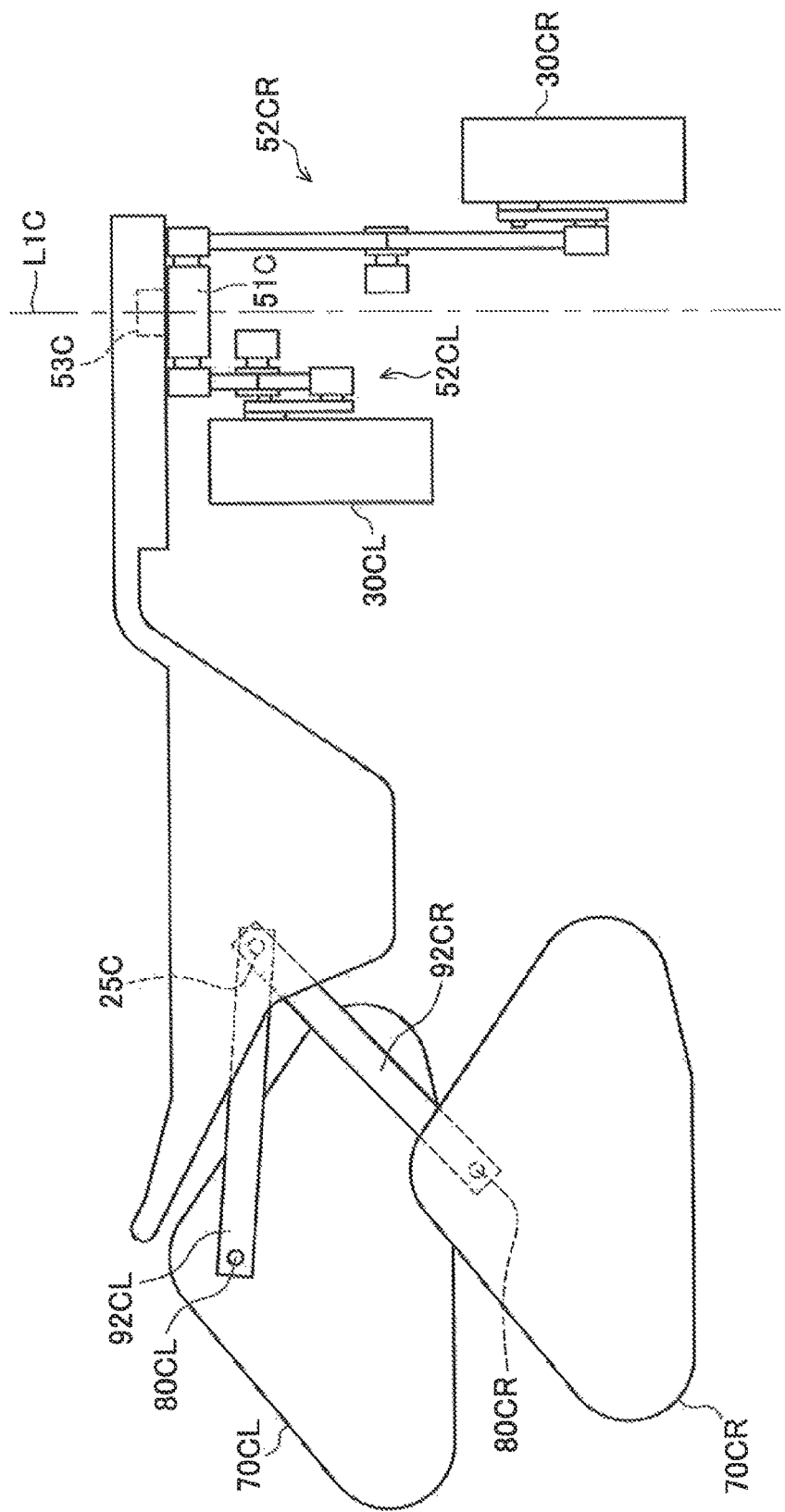
FIG. 44 is a schematic right side view illustrating the turning operation of the traveling vehicle.
Figure 45:
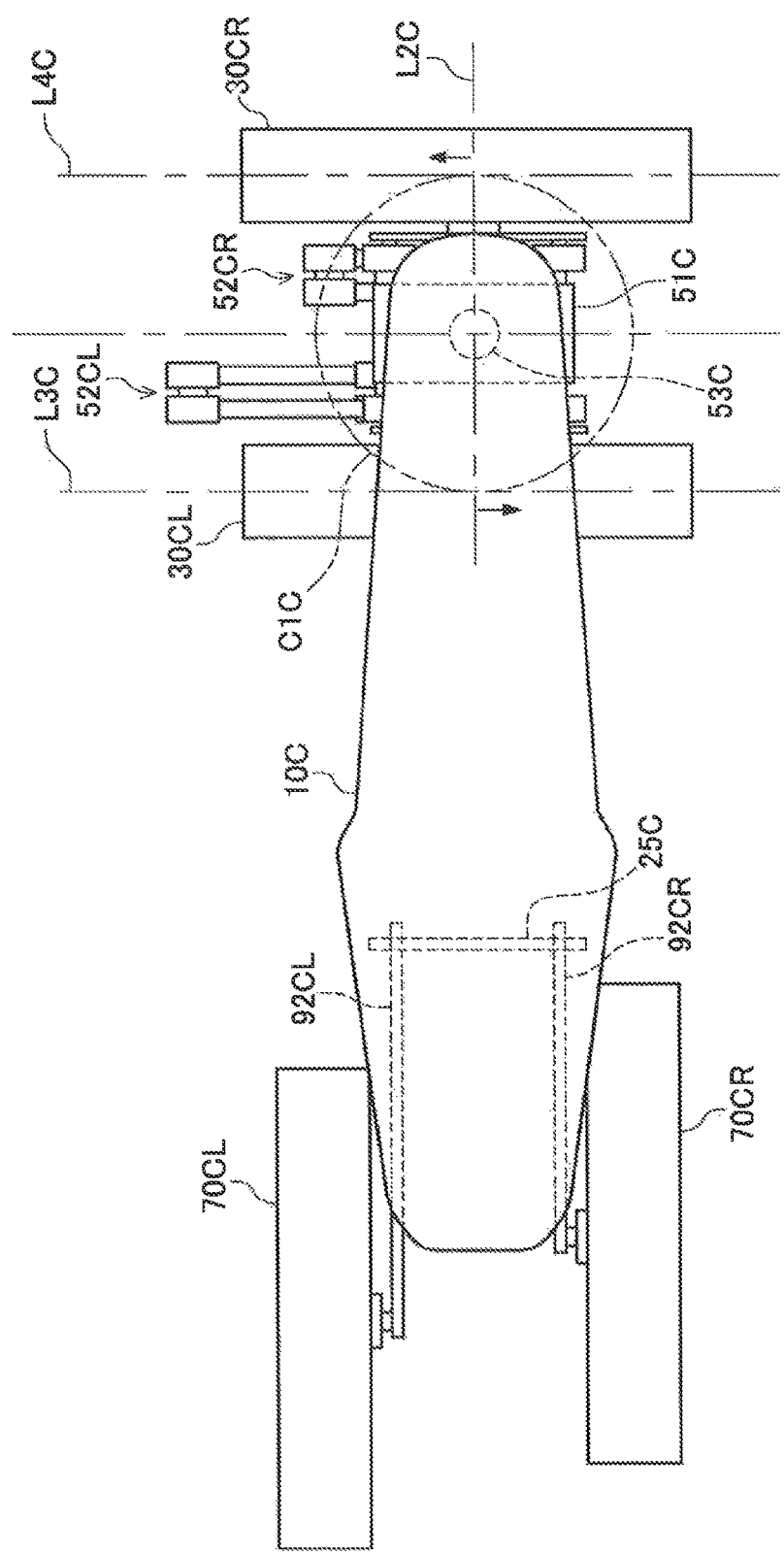
FIG. 45 is a schematic top view of FIG. 44.

Here, FIG. 44 is a schematic right side view illustrating a state where the front crawler traveling device 30C and the front suspension device 50C are rotated about the rotation shaft 53C by 90° in the left direction (the counter-clockwise direction) from the state of FIG. 42. FIG. 45 is a schematic top view of FIG. 44. Additionally, an arrow of FIG. 45 indicates a direction of a force transmitted from the front crawler traveling device 30C to a ground in the rotation state.

The right front crawler traveling device 30CR rotates the crawler belt 34CR in the forward movement direction when the vehicle rotates in the left direction. Since a force transmitted from the right front crawler traveling device 30CR to a ground is exerted in a direction contacting the circle C1C about the rotation shaft 53C, most of the force can be used for the rotation in the left direction (the counter-clockwise direction). On the contrary, the left front crawler traveling device 30CL rotates the crawler belt 34CL in the backward movement direction when the vehicle rotates in the left direction. Since a force transmitted from the left front crawler traveling device 30CL to a ground is exerted in a direction contacting the circle C1C about the rotation shaft 53C, most of the force can be used for the rotation in the left direction (the counter-clockwise direction).

Thus, the traveling direction of the traveling vehicle 1C can be changed while the right and left front crawler traveling devices 30CR and 30CL are easily rotated even when the right and left front crawler traveling devices 30CR and 30CL are disposed at different positions in the vertical direction. That is, the direction of the front crawler traveling device 30C with respect to the vehicle body frame 10C is easily changed to a desired direction in an irregular ground with an unevenness portion or a slope and thus the traveling performance is improved.

Further, the link mechanism 52C of the front suspension device 50C is bent toward the front side of the vehicle body frame 10C at the outside of the bogie frame 51C. That is, the link mechanism 52C is bent outward from the traveling vehicle 1C. Thus, there is no need to ensure a space for bending the link mechanism 52C at the inside of the vehicle and thus the entire length of the traveling vehicle 1C can be shortened.

Further, since it is possible to reduce a sideslip of the front and rear crawler traveling devices 30C and 70C when the traveling vehicle 1C travels across a slope, the traveling performance when the vehicle travels across the slope is satisfactory. The front suspension device 50C is elevatable in the vertical direction without moving the front crawler traveling device 30C in the horizontal direction and rotating the front crawler traveling device about the longitudinal direction serving as an axis. Then, the ground contact portion 43C of the front crawler traveling device 30C is kept in parallel to the vehicle body frame 10C at all times. That is, the front crawler traveling device 30C slides in the vertical direction with respect to the vehicle body frame 10C. Further, the rear suspension device 90C is swingable in the vertical direction without moving the rear crawler traveling device 70C in the horizontal direction and rotating the rear crawler traveling device about the longitudinal direction serving as an axis. Then, the ground contact portion 83C of the rear crawler traveling device 70C is kept in parallel to the vehicle body frame 10C at all times. That is, the rear crawler traveling device 70C slides in the vertical direction with respect to the vehicle body frame 10C.

Thus, the ground contact portion 43C of the front crawler traveling device 30C is kept in parallel to the vehicle body frame 10C at all times even when the front crawler traveling device 30C is elevated in the vertical direction to follow an inclination of a slope when the vehicle travels across the slope. Further, the ground contact portion 83C of the rear crawler traveling device 70C is kept in parallel to the vehicle body frame 10C at all times similarly to the front crawler traveling device 30C. Thus, when the traveling vehicle 1C is inclined toward a crest side of a slope so that the vehicle body frame 10C becomes substantially horizontal, a crest side portion of the ground contact portion 43C of the front crawler traveling device 30C and a crest side portion of the ground contact portion 83C of the rear crawler traveling device 70C can be bitten into the slope while being used as edges. Then, since the sideslip of the front and rear crawler traveling devices 30C and 70C hardly occurs on a slope, the traveling performance or the riding comfort when the vehicle travels on the slope is satisfactory.

Next, the traveling operation of the traveling vehicle 1C will be described. As described above, the traveling vehicle 1C can move forward or backward and turn by the independent control of the crawler traveling devices 30CR, 30CL, 70CR, and 70CL using the controller.

More specifically, the proportional electromagnetic valves are controlled on the basis of the detection value of the handle sensor detecting the rotation angle of the steering shaft 115C and the detection value of the accelerator grip sensor detecting the rotation angle of the accelerator grip 117C so that the driving directions and the speeds of the crawler traveling devices 30CR, 30CL, 70CR, and 70CL are changed. Thus, since the traveling operation of the traveling vehicle 1C can be performed by the control of the proportional electromagnetic valve, the productivity or the maintenance workability is satisfactory.

Figure 46:
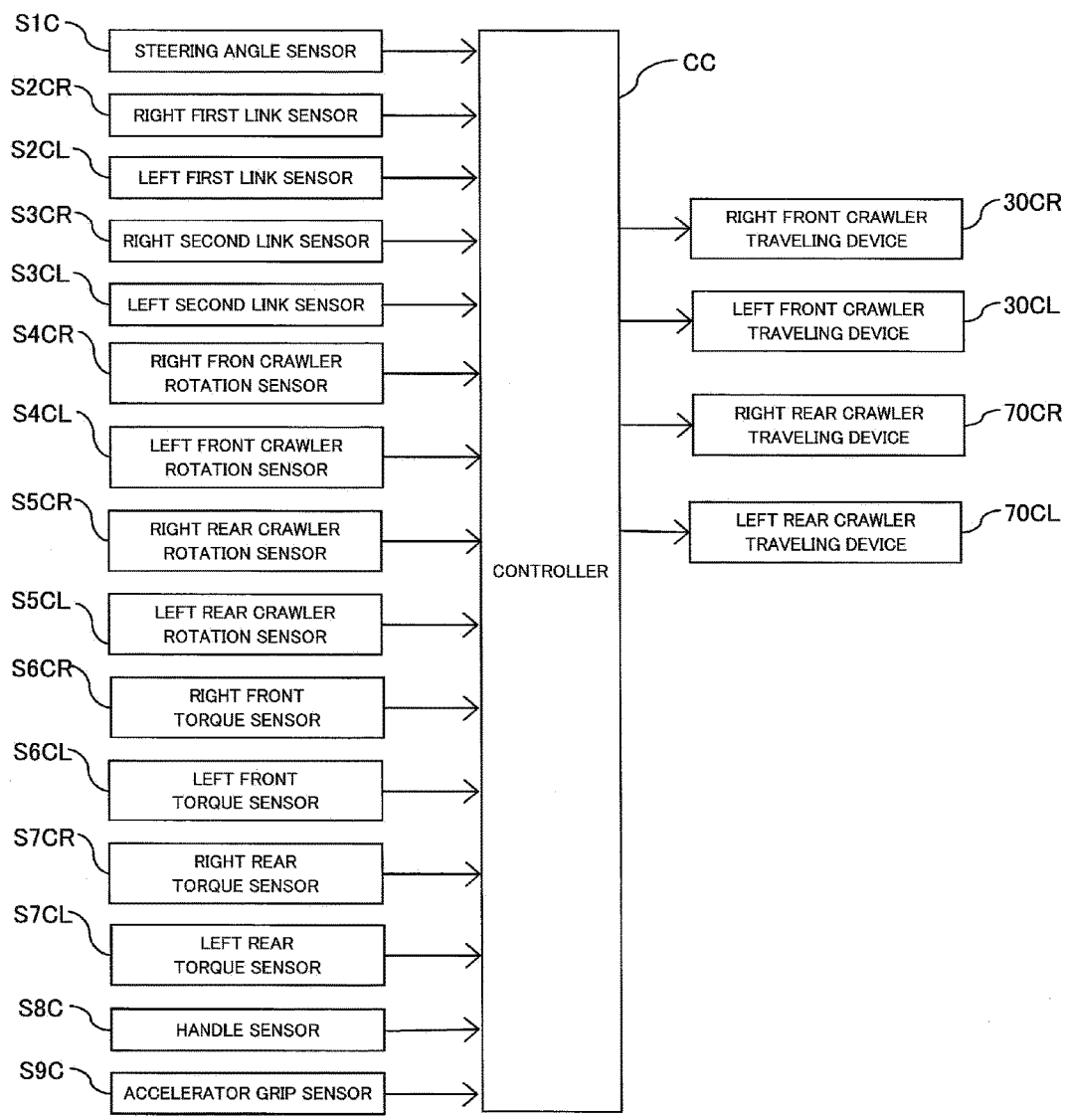
FIG. 46 is a configuration block diagram illustrating an example of a configuration of a controller.

Additionally, in the above-described configuration, the crawler traveling devices 30CR, 30CL, 70CR, and 70CL are controlled on the basis of the detection values obtained from the handle sensor and the accelerator grip sensor and corresponding to the operation amounts of the handle 114C and the accelerator grip 117C of the occupant, but the invention is not limited to this configuration. The crawler traveling devices 30CR, 30CL, 70CR, and 70CL may be controlled on the basis of at least the detection values obtained from the handle sensor and the accelerator grip sensor and corresponding to the operation amount of the occupant. For example, as illustrated in FIG. 46, various sensors detecting the travel state of the traveling vehicle 1C may be provided and a control may be performed on the basis of the detection values of various sensors.

A sensor detecting the travel state of the traveling vehicle 1C includes a steering angle sensor S1C which detects a rotation angle of the front suspension device 50C with respect to the vehicle body frame 10C, two first link sensors S2CR and S2CL which respectively detect a rotation angle of the second link member 57C with respect to the first link member 56C in the connection portion 61C of the right and left link mechanisms 52C, two second link sensors S3CR and S3CL which respectively detect a rotation angle of the fourth link member 59C with respect to the third link member 58C in the connection portion 62C of the right and left link mechanisms 52C, four crawler rotation sensors S4CR, S4CL, S5CR, and S5CL which respectively detect the number of rotations of the drive shafts 39CR, 39CL, 79CR, and 79CL of the crawler traveling devices 30CR, 30CL, 70CR, and 70CL, four torque sensors S6CR, S6CL, S7CR, and S7CL which respectively detect output torques of the hydraulic motors 37CR, 37CL, 77CR, and 77CL of the crawler traveling devices 30CR, 30CL, 70CR, and 70CL. Then, a controller CC controls the crawler traveling devices 30CR, 30CL, 70CR, and 70CL on the basis of the detection values of various sensors along with a handle sensor S8C and an accelerator grip sensor S9C.

Here, the traveling direction of the traveling vehicle 1C can be detected by the steering angle sensor S1C. Further, the elevation states of the crawler traveling devices 30CR, 30CL, 70CR, and 70CL in the vertical direction can be detected by the first link sensors S2CR and S2CL and the second link sensors S3CR and S3CL. On the basis of the detection values (the rotation angles) of the first link sensors S2CR and S2CL and the second link sensors S3CR and S3CL, the controller CC calculates the elevation displacements of the crawler traveling devices 30CR, 30CL, 70CR, and 70CL. That is, the first link sensors S2CR and S2CL and the second link sensors S3CR and S3CL are elevation sensors which can detect the telescopic movement state of the link mechanism 52C in the vertical direction and detect the elevation states of the crawler traveling devices 30CR, 30CL, 70CR, and 70CL on the basis of the state of the link mechanism 52C. Further, the ground contact states (the road conditions) of the crawler traveling devices 30CR, 30CL, 70CR, and 70CL can be detected by the crawler rotation sensors S4CR, S4CL, S5CR, and S5CL and the torque sensors S6CR, S6CL, S7CR, and S7CL. Further, the traveling operation of the occupant can be detected by the handle sensor S8C and the accelerator grip sensor S9C.

Thus, the travel state of the traveling vehicle 1C can be checked in detail by various sensors. Then, since the controller CC can control the crawler traveling devices 30CR, 30CL, 70CR, and 70CL in response to the travel state of the traveling vehicle 1C for the operations of the handle and the accelerator from the occupant, the traveling performance of the traveling vehicle 1C is improved.

Additionally, the type of various sensors is not particularly limited. For example, a potentiometer or an encoder is used to detect a rotation angle.

Further, the controller CC may intermittently store the detection values of various sensors and may control the devices on the basis of the detection values of various sensors and the change amounts thereof. For example, the controller CC may be configured to calculate the elevation displacements of the crawler traveling devices 30CR, 30CL, 70CR, and 70CL on the basis of the detection values of the first link sensors S2CR and S2CL and the second link sensors S3CR and S3CL and to calculate the elevation speeds of the crawler traveling devices 30CR, 30CL, 70CR, and 70CL on the basis of an intermittent change in elevation displacement. With such a configuration, the elevation states of the crawler traveling devices 30CR, 30CL, 70CR, and 70CL can be checked by the elevation displacement and the elevation speed. Thus, since the detailed travel state of the traveling vehicle 1C can be checked, the traveling performance of the traveling vehicle 1C is improved.

Further, the configurations of various sensors for checking the travel state are not particularly limited. For example, an elevation sensor that detects the elevation states of the crawler traveling devices 30CR, 30CL, 70CR, and 70CL in the vertical direction may be a sensor that detects a distance between the vehicle body frame 10C and a ground. As such a distance detecting sensor, an ultrasonic distance sensor or an infrared distance sensor can be used. Additionally, the elevation sensor may be desirably the first link sensors S2CR and S2CL and the second link sensors S3CR and S3CL. Here, the elevation states of the crawler traveling devices 30CR, 30CL, 70CR, and 70CL in the vertical direction can be detected more accurately compared to the distance sensor.

Further, an acceleration sensor may be provided in the vehicle body frame 10C, the bogie frame 51C, or the crawler traveling devices 30CR, 30CL, 70CR, and 70CL. With such a configuration, the more detailed travel state of the traveling vehicle 1C can be checked.

Further, an inclination sensor may be further provided to detect an inclination angle of the traveling vehicle 1C with respect to a horizontal plane. As such an inclination sensor, a gyro sensor or the like can be used. Additionally, the inclination sensor may be used to detect at least a roll angle as an inclination in the horizontal direction. Further, a pitch angle as an inclination in the longitudinal direction may be detected. With such a configuration, since an inclination angle of the traveling vehicle 1C with respect to a horizontal plane can be detected in more detail, the traveling performance and the stability of the traveling vehicle 1C can be improved.

Further, various sensors may be provided and the number of sensors is not limited. For example, only one of the first link sensors S2CR and S2CL and the second link sensors S3CR and S3CL serving as the elevation sensors may be provided. Further, a sensor that detects a rotation angle of the first link member 56C or the third link member 58C with respect to the bogie frame 51C or a sensor that detects a rotation angle of the second link member 57C or the fourth link member 59C with respect to the connection frame 36C of the front crawler traveling device 30C may be provided. Additionally, a plurality of various sensors may be desirably provided. With such a configuration, the travel state of the traveling vehicle 1C can be checked with higher accuracy. Further, the rear crawler traveling device 70C or the rear suspension device 90C may include the above-described sensor.

Further, a warning device which is controlled by the controller CC on the basis of the detection values of various sensors may be provided. For example, a warning device which is controlled on the basis of the detection value of the inclination sensor may be provided. With such a configuration, it is possible to warn a slope which suddenly appears when the occupant drives a vehicle and thus to prevent a situation in which a sideslip and an overturn easily occur. Accordingly, safety is further improved. Additionally, the warning device is not particularly limited and may be used to warn the occupant. For example, the warning device may warn the occupant by a sound or light. Further, a warning sound generating device or a lamp flashing device may be used. Further, the warning device may be an emergency stop device which stops the front and rear crawler traveling devices 30 and 70.

Additionally, the front suspension device 50C is not limited to the above-described configuration and may be configured to elevate the front crawler traveling device 30C along the rotation shaft 53C (the line L1C) serving as the steering shaft in the vertical direction. Here, the elevation direction of the front crawler traveling device 30C is determined by the configuration of the link mechanism 52C serving as the connection mechanism.

For example, the connection mechanism may not include the fifth link member 60C in the link mechanism 52C. At this time, a damper which extends in the vertical direction while one end is rotatably connected to the bogie frame 51C and the other end is rotatably connected to the third link member 58C and a damper which extends in the vertical direction while one end is rotatably connected to the connection frame 36C and the other end is rotatably connected to the fourth link member 59C may be provided instead of the dampers 63C and 64C. With such a configuration, since the number of components can be decreased, the productivity is improved. Additionally, since the strength of the connection mechanism is reduced in the case of such a configuration, it is desirable to include the fifth link member 60C.

Further, the connection mechanism may be provided such that the link mechanism 52C includes a damper which extends in the vertical direction while one end is rotatably connected to the first link member 56C and the other end is rotatably connected to the second link member 57C instead of the dampers 63C and 64C. With such a configuration, since the number of components can be decreased, the productivity is improved.

Further, the connection mechanism may have a configuration in which the connection portion 62 between the third link member 58C and the fourth link member 59C in the link mechanism 52C is bent backward. That is, the connection mechanism may be a so-called pantograph mechanism corresponding to a link mechanism having a substantial diamond shape in the side view. With such a configuration, since the connection mechanism becomes simple, the productivity or the maintenance workability is improved. Further, the stability in the telescopic movement of the link mechanism is improved.

Further, the connection mechanism may have a configuration in which the first link member 56C and the second link member 57C of the link mechanism 52C are respectively connected to the fifth link member 60C and the third link member 58C and the fourth link member 59C thereof are respectively connected to the fifth link member 60C. That is, the first link member 56C, the second link member 57C, the third link member 58C, and the fourth link member 59C may be connected to one another through the fifth link member 60C. With such a configuration, since the configuration of the connection portion becomes simple, the productivity or the maintenance workability is improved.

Further, the connection mechanism is a telescopic cylinder including a piston rod which includes a piston head and a bottomed cylinder liner into which the piston head is insertable. Here, one end of the cylinder may be fixed to the bogie frame 51C and the other end thereof may be attached to the connection frame 36C of the front crawler traveling device 30C to be rotatable about the horizontal direction serving as an axis. Additionally, the cylinder may include a spring similarly to the dampers 63C and 64C. With such a configuration, since the connection mechanism becomes simple, the productivity or the maintenance workability is improved.

Further, the dampers 63C and 64C serving as cushion mechanisms are not limited to the above-described configuration. Any structure capable of reducing an impact between the vehicle body frame 10C and the front crawler traveling device 30C may be provided and a structure only including a spring or a cylinder may be used.

Here, the front suspension device 50C may include an elevation device that elevates the right and left front crawler traveling devices 30R and 30L. For example, a front suspension device 50D illustrated in FIGS. 47, 48, and 49 may be also used. Here, FIG. 47 is a right side view illustrating an example of the front suspension device 50D according to another embodiment, FIG. 48 is a side view illustrating the front suspension device 50D of FIG. 47 when viewed from the inside of the vehicle, FIGS. 49A and 49B are diagrams illustrating an operation of the front suspension device 50D of FIG. 48, FIG. 49A illustrates a state where the link mechanism of FIG. 48 is lengthened, and FIG. 49B illustrates a state where the link mechanism of FIG. 48 is shortened.

Figure 47:
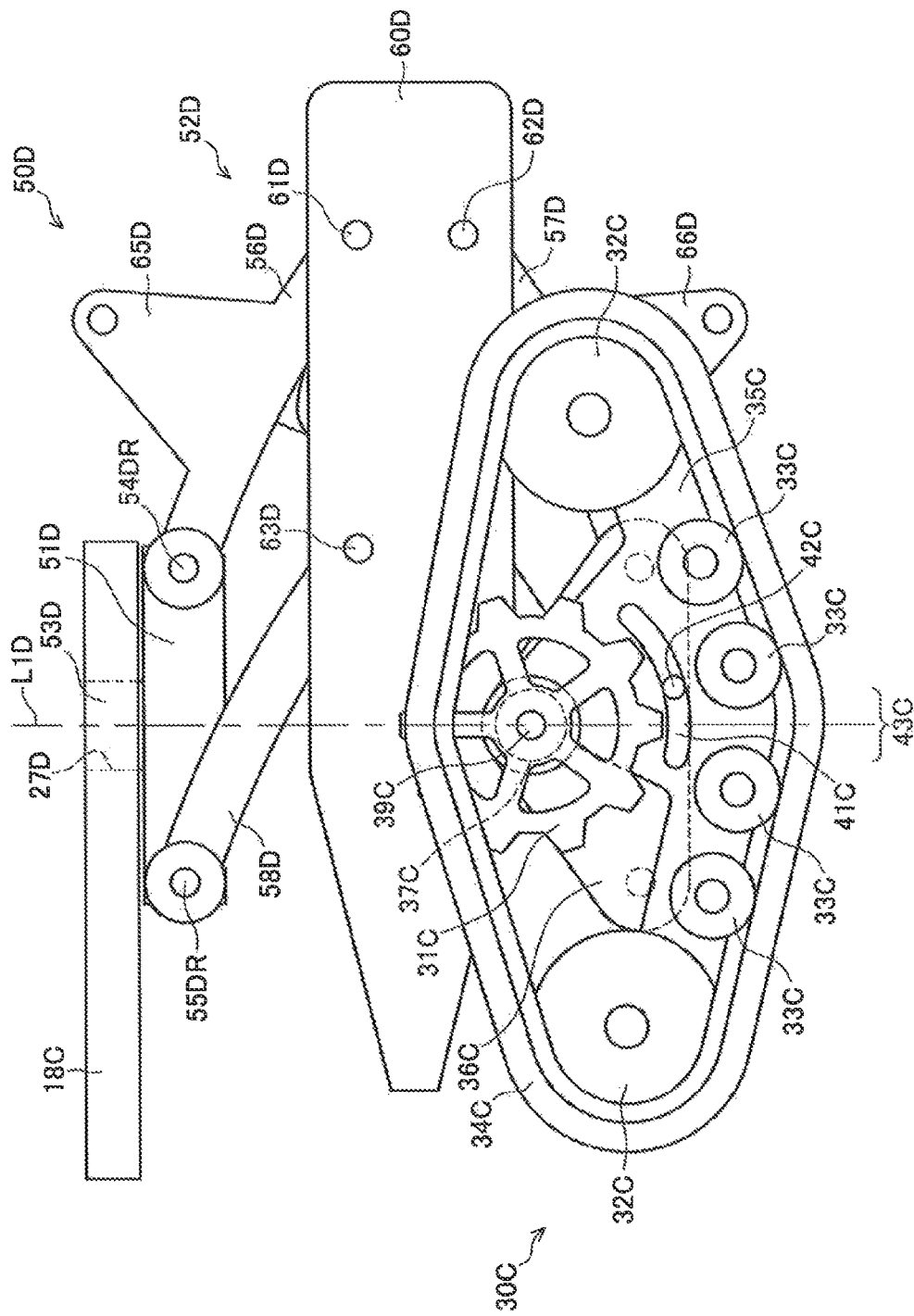
FIG. 47 is a right side view illustrating an example of a front suspension device according to another embodiment.
Figure 48:
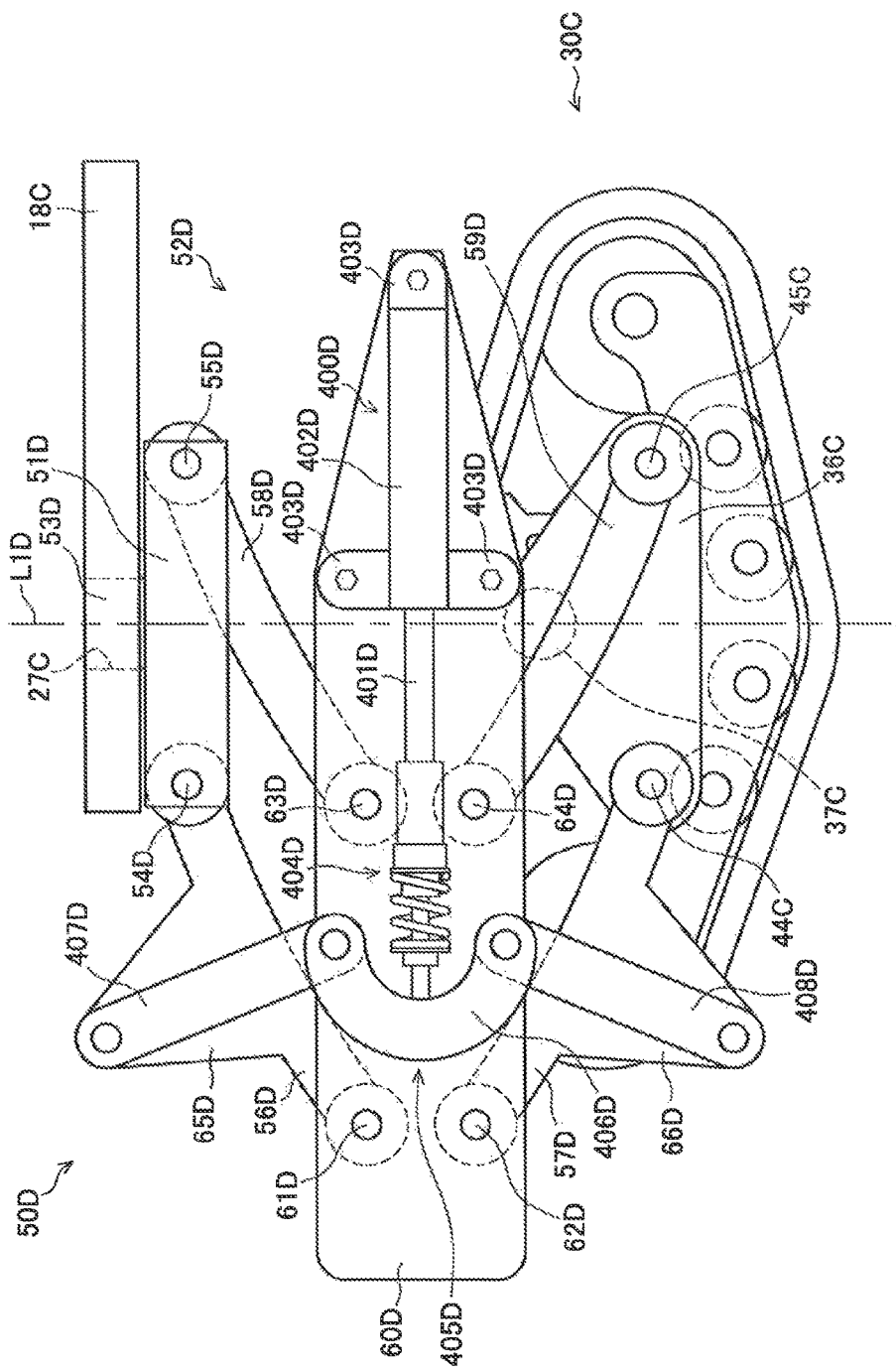
FIG. 48 is a side view illustrating the front suspension device of FIG. 47 when viewed from the inside of the vehicle.
Figure 49A:
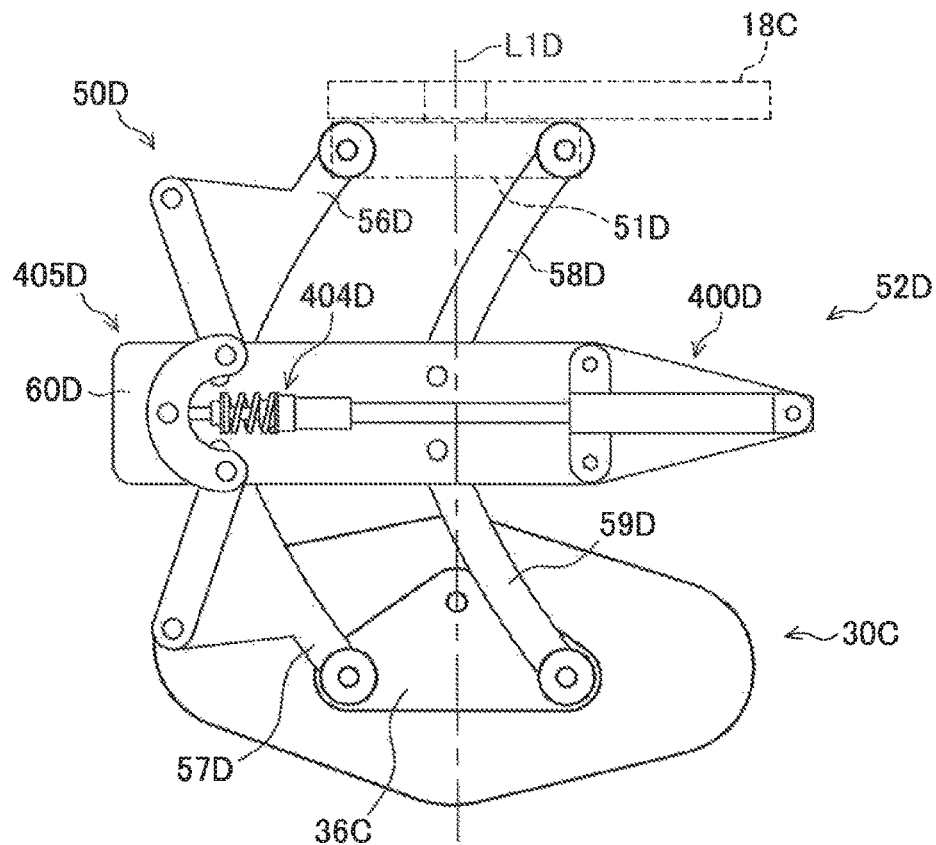
FIGS. 49A and 49B are diagrams illustrating an operation of the front suspension device of FIG. 48, where
Figure 49B:
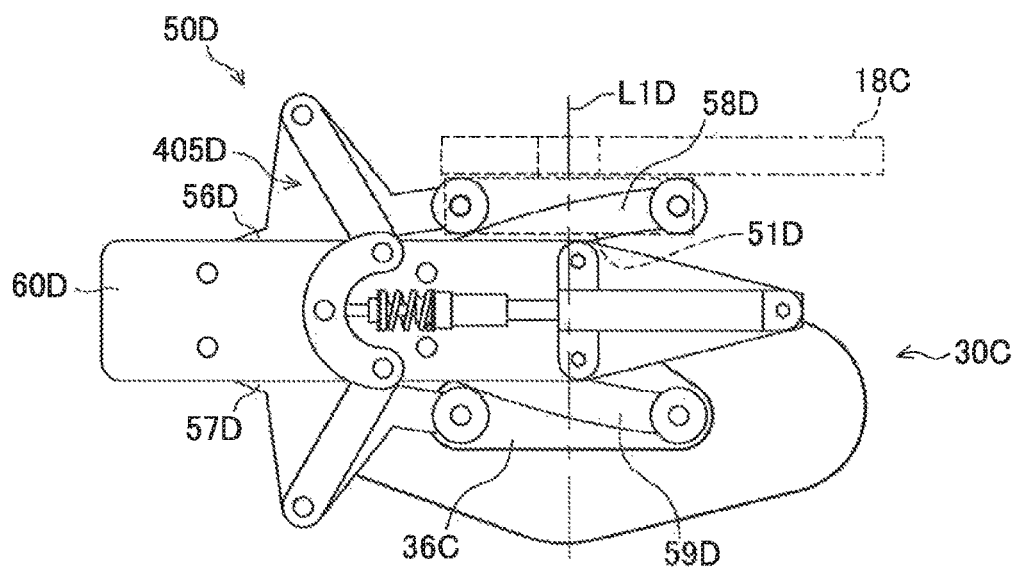

As illustrated in FIGS. 47 and 48, the front suspension device 50D includes a bogie frame 51D, link mechanisms 52D which serve as a pair of right and left connection mechanisms respectively connecting the right and left front crawler traveling devices 30CR and 30CL to the right and left sides of the bogie frame 51D, cylinders 400DR and 400DL which serve as an elevation device elevating the right and left front crawler traveling devices 30CR and 30CL, and the like. Additionally, in FIGS. 47 and 48, a description of the left link mechanism 52DL, the left front crawler traveling device 30CL, and the left cylinder 400DL is omitted.

The bogie frame 51D is similar to the bogie frame 51C of the front suspension device 50C. The bogie frame 51D has a substantially rectangular cuboid shape extending in the longitudinal direction in the top view and a rotation shaft 53D used as a steering shaft vertically extends from the center of the upper face in the horizontal direction. The rotation shaft 53D is inserted through the through-hole 27C of the front support plate 18C. Then, the bogie frame 51D is connected to the front support plate 18C to be rotatable about the rotation shaft 53D serving as an axis. That is, the bogie frame 51 is supported by the vehicle body frame 10C to be rotatable about the vertical direction serving as an axis. Additionally, a line L1D in FIGS. 47, 48, and 49 indicates the center of the rotation shaft 53D (the rotation center of the bogie frame 51D) corresponds to the axial direction of the steering shaft, and is provided in the vertical direction.

Further, the rotation shaft 54D (54DR, 54DL) and the rotation shaft 55D (55DR, 55DL) are vertically provided at the right and left side faces of the bogie frame 51D. The rotation shaft 54D and the rotation shaft 55D are provided at the line symmetrical positions with respect to the line L1D.

Additionally, the bogie frame 51D is not limited to the above-described configuration and may be supported by the vehicle body frame 10C to be rotatable about the steering shaft disposed in the vertical direction and serving as an axis. Further, the direction of the rotation shaft 53D serving as the steering shaft of the bogie frame 51D is not limited to the vertical direction and the rotation shaft 53D may have a caster angle in which a front portion is low and a rear portion is high. In this way, when the rotation shaft 53D has a caster angle, the traveling performance and the durability are improved. Additionally, when the rotation shaft 53D is disposed in the vertical direction, the configuration of the front suspension device 50D becomes simple and the productivity is high.

The link mechanism 52D includes a first link member 56D, a second link member 57D, a third link member 58D, a fourth link member 59D, and a fifth link member 60D. The first link member 56D, the second link member 57D, the third link member 58D, and the fourth link member 59D have the same shape and are formed as a bar-shaped member curved in a substantially circular-arc shape. The fifth link member 60D includes two plate-shaped members extending in the longitudinal direction and having a substantially rectangular shape in the side view. When the five link members 56D, 57D, 58D, 59D, and 60D are connected, the link mechanism 52D is obtained.

One end of the first link member 56D is connected to the rotation shaft 54D of the bogie frame 51D and the other end thereof is connected to a connection portion 61D in the vicinity of the front end of the fifth link member 60D. One end of the second link member 57D is connected to a connection portion 62D in the vicinity of the front end of the fifth link member 60D and the other end thereof is connected to the rotation shaft 44C of the connection frame 36C of the front crawler traveling device 30C. One end of the third link member 58D is connected to a rotation shaft 55D of the bogie frame 51D and the other end thereof is connected to a connection portion 63D at the substantial center of the fifth link member 60D in the longitudinal direction. One end of the fourth link member 59D is connected to a connection portion 64D at the substantial center of the fifth link member 60D in the longitudinal direction and the other end thereof is connected to the rotation shaft 45C of the connection frame 36C of the front crawler traveling device 30C.

Here, the fifth link member 60D includes a plate-shaped member disposed on the inside of the vehicle and a plate-shaped member disposed on the outside of the vehicle. Then, two plate-shaped members of the fifth link member 60D sandwich the ends of the other link members 56D, 57D, 58D, and 59D and the fifth link member 60D is connected to the other link members 56D, 57D, 58D, and 59D. The link members 56D, 57D, 58D, and 59D are respectively rotatable about the connection portions 61D, 62D, 63D, and 64D serving as axes. Further, two plate-shaped members of the fifth link member 60D are connected to each other by welding a connection member (not illustrated) in the front end, the rear end, and between the connection portion 61D and the connection portion 63D.

Here, the link mechanism 52D has a vertically symmetrical structure with respect to the fifth link member 60D.

Then, a distance between the rotation shaft 54D and the connection portion 61D, a distance between the connection portion 62D and the rotation shaft 44C, a distance between the rotation shaft 55D and the connection portion 63D, and a distance between the connection portion 64D and the rotation shaft 45C are equal to one another. Further, a distance between the rotation shaft 44C and the rotation shaft 45C, a distance between the rotation shaft 54D and the rotation shaft 55D, a distance between the connection portion 61D and the connection portion 63D, and a distance between the connection portion 62D and the connection portion 64D are equal to one another. Further, the first link member 56D, the second link member 57D, the third link member 58D, and the fourth link member 59D are connected to one another so that a curved shape protrudes forward.

The cylinder 400D serving as the elevation device includes a piston rod 401D which has a piston head (not illustrated), a bottomed cylinder liner 402D into which the piston head is insertable, and the like. The cylinder 400D is attached to the center in the vertical direction of the plate-shaped member of the fifth link member 60D which is disposed on the inside of the vehicle. And the cylinder 400D extend in the longitudinal direction.

More specifically, the cylinder liner 402D includes brackets 403D provided in the vicinity of an opening and the bottom, the brackets 403D are fixed by the use of a bolt to the plate-shaped member of the fifth link member 60D which is disposed on the inside of the vehicle. The bottom portion of the cylinder liner 402D is located in the vicinity of the rear portion of the fifth link member 60D and the cylinder 400D is movable in a telescopic manner in the longitudinal direction along the fifth link member 60D. Additionally, the cylinder 400D is attached to the fifth link member 60D through a rubber sheet (not illustrated).

The end of the piston rod 401D opposite to the piston head is connected to the first link member 56D and the second link member 57D through a damper 404D and a link mechanism 405D serving as a connection member. The damper 404D is a telescopic bar-shaped cushion mechanism including a spring, a cylinder, and the like and one end thereof is fixed to the end of the piston rod 401D. The link mechanism 405D has a vertically symmetrical structure and includes a circular-arc support member 406D which is curved forward, two link bars 407D and 408D which are connected to the support member 406D, and the like. The support member 406D is fixed to the damper 404D. One end of the link bar 407D is connected to the upper end of the support member 406D and the other end thereof is connected to a bracket 65D of the first link member 56D. One end of the link bar 408D is connected to the lower end of the support member 406D and the other end thereof is connected to a bracket 66D of the second link member 57D. Two link bars 407D and 408D are disposed at vertically symmetrical positions and the link mechanism 405D has a vertically symmetrical shape with respect to the fifth link member 60D.

Thus, the link mechanism 405D is configured to equally transmit a force generated by the telescopic movement of the cylinder 400D to the first link member 56D and the second link member 57D in the vertically symmetrical direction. Additionally, the rotation shaft 40C of the front crawler traveling device 30C is located on the line L1D and the center of the ground contact portion 43C of the front crawler traveling device 30C is also located thereon.

As illustrated in FIGS. 49A and 49B, when the cylinder 400D moves in a telescopic manner in the longitudinal direction, the link mechanism 405D moves in a telescopic manner in the vertical direction and the link mechanism 52D bent forward is deformed in the longitudinal direction to move in a telescopic manner in the vertical direction. Then, the front crawler traveling device 30C is elevated in the vertical direction in response to the telescopic movement of the cylinder 400D. Here, the link mechanism 52D is configured to elevate the front crawler traveling device 30C in the vertical direction along the line L1D (the steering shaft).

This is because an upper link mechanism including the first link member 56D, the third link member 58D, and the fifth link member 60D and a lower link mechanism including the second link member 57D, the fourth link member 59D, and the fifth link member 60D are vertically symmetrical to each other and a force generated by the telescopic movement of the cylinder 400D is equally exerted on the upper and lower link mechanisms in the vertically symmetrical direction.

Further, the front suspension device 50D is used to elevate the front crawler traveling device 30C in the vertical direction and does not include a forward or backward extension member differently from the rear suspension device 90C allowing crawler traveling device to swing in the vertical direction. Thus, since the entire length of the traveling vehicle 1C can be shortened, the turning traveling operation can be easily performed and the traveling performance is improved.

Here, the cylinder 400D serving as an elevation device elevating the front crawler traveling device 30C is driven by the driving power of the engine EC. The driving power of the engine EC is transmitted to a pump (not illustrated) provided in the vehicle body frame 10C and is further transmitted to the cylinder 400D through a proportional electromagnetic valve (not illustrated). Then, when the proportional electromagnetic valve is controlled so that the cylinder 400D moves in a telescopic manner, the front crawler traveling device 30C can be elevated.

Thus, since the front crawler traveling device 30C can be elevated to follow a slope or an unevenness portion of an irregular ground and the same effect as that of the front suspension device 50C can be obtained, the vehicle can stably travel on the irregular ground. Additionally, the same effect as that of the front suspension device 50C will be omitted. Accordingly, it is possible to obtain an effect in which the direction of the front crawler traveling device 30C with respect to the vehicle body frame 10C is easily changed to a desired direction in an irregular ground with an unevenness portion or a slope or the traveling performance or the riding comfort when the vehicle travels across a slope is satisfactory.

Additionally, since the elevation device elevating the front crawler traveling device 30C is simply configured as one cylinder 400D, the productivity and the maintenance workability are satisfactory. Further, the elevation device is the cylinder 400D and the heavy front crawler traveling device 30C can be also easily elevated. Further, since the cylinder 400D is connected to the link mechanism 52D through the damper 404D serving as the cushion mechanism, an impact between the vehicle body frame 10C and the front crawler traveling device 30C is reduced. Accordingly, the front crawler traveling device 30C stably contacts a ground and the traveling performance or the riding comfort is improved. Further, the cylinder 400D is attached to the link mechanism 52D through a rubber sheet serving as an elastic body and the rubber sheet reduces an impact between the vehicle body frame 10C and the front crawler traveling device 30C similarly to the damper 404D.

Figure 50:
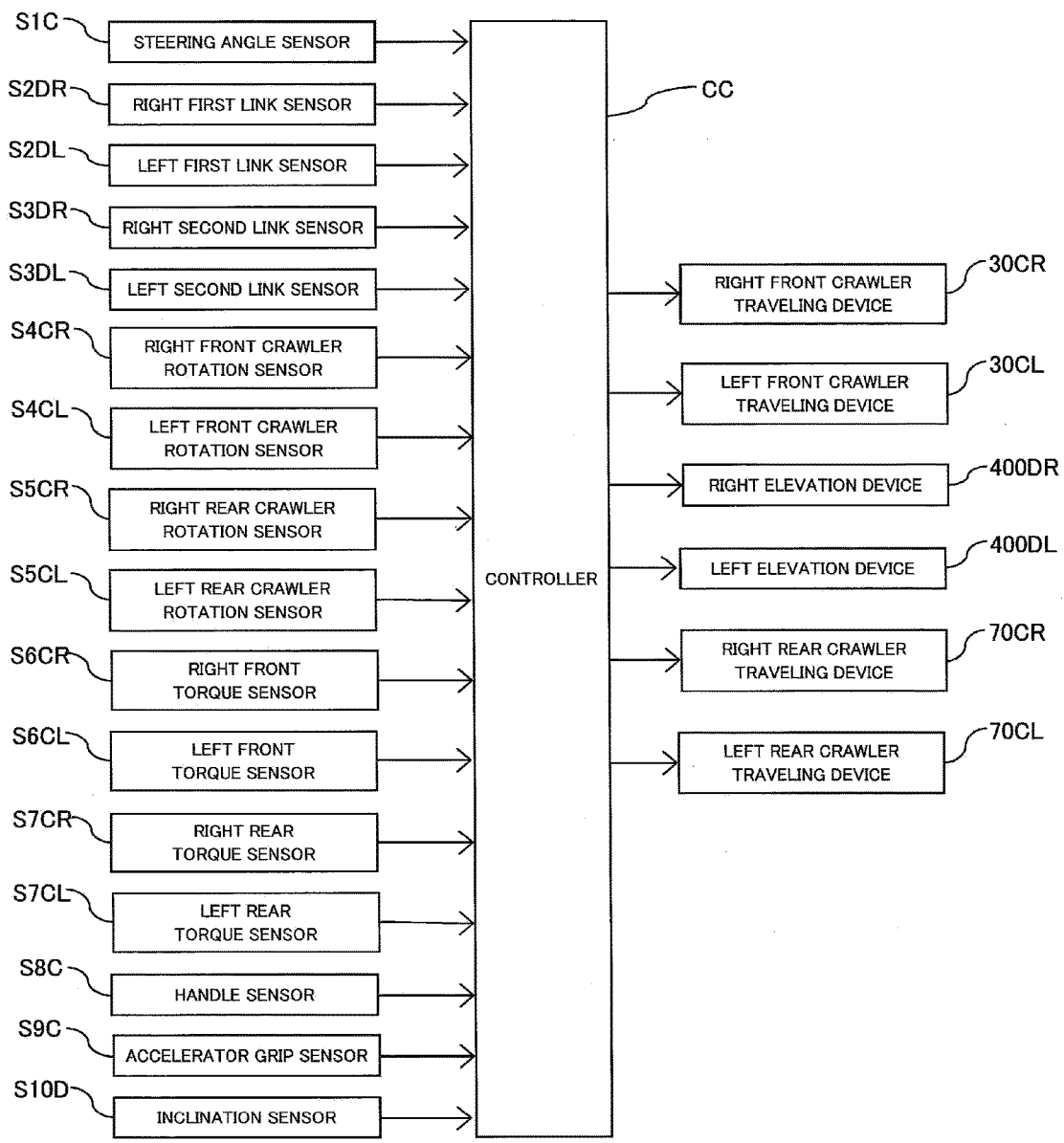
FIG. 50 is a configuration block diagram illustrating an example of a configuration of a controller according to another embodiment.

Here, the cylinder 400D may be operated in response to the operation of the occupant. For example, a configuration may be employed in which a pedal is provided at each of the right and left step floors 118C and the cylinder 400D is operated in response to the stepping amounts of the right and left pedal by the occupant. However, there are many cases in which the occupant cannot easily operate the right and left front crawler traveling devices 30C to elevate so that the right and left front crawler traveling devices follow a slope or an unevenness portion of an irregular ground. Thus, it is desirable to control the cylinder 400D serving as the elevation device by various sensors and the controller. With such a configuration, for example, as illustrated in FIG. 50, various sensors for detecting the travel state of the traveling vehicle 1C may be provided and a control may be performed on the basis of the detection values of various sensors.

A sensor detecting the travel state of the traveling vehicle 1C includes a steering angle sensor S1D which detects a rotation angle of the front suspension device 50D with respect to the vehicle body frame 10C, two right and left first link sensors S2DR and S2DL which detect a rotation angle of the second link member 57D with respect to the first link member 56D in the right and left link mechanism 52D, two right and left second link sensors S3DR and S3DL which detect a rotation angle of the fourth link member 59D with respect to the third link member 58D in the right and left link mechanism 52D, four crawler rotation sensors S4CR, S4CL, S5CR, and S5CL which detect the number of rotations of the drive shafts 39CR, 39CL, 79CR, and 79CL of the crawler traveling devices 30CR, 30CL, 70CR, and 70CL, four torque sensors S6CR, S6CL, S7CR, and S7CL which detect output torques of the hydraulic motors 37CR, 37CL, 77CR, and 77CL of the crawler traveling devices 30CR, 30CL, 70CR, and 70CL, an inclination sensor S10D which detects an inclination angle of the vehicle body frame 10C with respect to a horizontal plane, and the like.

Additionally, two right and left first link sensors S2DR and S2DL and two right and left second link sensors S3DR and S3DL correspond to two right and left first link sensors S2SR and S2SL and two right and left second link sensors S3SR and S3SL illustrated in FIG. 46. Then, a configuration illustrated in FIG. 50 is obtained by further providing the inclination sensor S10D and the cylinders 400D serving as the elevation device in the configuration illustrated in FIG. 46. Then, the controller CC controls the crawler traveling devices 30CR, 30CL, 70CR, and 70CL and the cylinders 400D serving as the elevation device on the basis of the detection values of various sensors along with a handle sensor S8 and an accelerator grip sensor S9.

With such a configuration, the travel state of the traveling vehicle 1C can be checked in detail by various sensors. Then, since the controller CC can control the crawler traveling devices 30CR, 30CL, 70CR, and 70CL in response to the travel state of the traveling vehicle 1C by the operations of the handle and the accelerator from the occupant, the traveling performance of the traveling vehicle 1C is improved. Further, since the cylinders 400D serving as the elevation device are controlled on the basis of the detection value of the inclination sensor S10D, the vehicle body frame 10C can be kept horizontally and thus the traveling performance or the riding comfort for an irregular ground is improved.

Further, the travel control of the traveling vehicle 1C by the controller CC is not limited to the above-described control configuration. For example, an ON/OFF control may be provided which drives the cylinders 400D serving as the elevation device on the basis of the roll angle as an inclination in the horizontal direction of the traveling vehicle 1C detected by the inclination sensor S10D or the elevation displacements of the crawler traveling devices 30CR, 30CL, 70CR, and 70CL detected by the first link sensors S2DR and S2DL and the second link sensors SDR and S3DL. That is, an ON/OFF control may be provided which drives the cylinders 400D in response to the travel state.

With such a control configuration, for example, the vehicle travels while the driving of the cylinders 400D are stopped when an unevenness portion or a slope of a travel road is smaller than a predetermined value and the vehicle travels while the cylinders 400D are driven only when the unevenness portion or the slope is larger than the predetermined value. Since the driving time of the cylinders 400D in the travel state is reduced, the traveling vehicle 1C can travel with high energy efficiency. Additionally, the ON/OFF control for the driving of the cylinders 400D is not limited to the control using the controller CC and may be performed in response to the operation of the occupant.

Additionally, the front suspension device 50D including the elevation device for elevating the right and left front crawler traveling devices 30CR and 30CL is not limited to the above-described configuration and the front crawler traveling device 30C may be elevated in the vertical direction along the rotation shaft 53D (the line L1D) serving as the steering shaft. Here, the elevation direction of the front crawler traveling device 30C is determined by the configuration of the link mechanism 52D serving as the connection mechanism and the configuration of the cylinder 400D serving as the elevation device.

For example, in the link mechanism 52D, the first link member 56D is connected to the second link member 57D through the fifth link member 60D and the third link member 58D is connected to the fourth link member 59D through the fifth link member 60D. However, a connection without using the fifth link member 60D may be performed similarly to the link mechanism 52C of the front suspension device 50C.

Further, the connection mechanism may have a configuration in which the third link member 58D and the fourth link member 59D in the link mechanism 52D are bent backward. That is, the connection mechanism may be a so-called pantograph mechanism corresponding to a link mechanism having a substantial diamond shape in the side view. With such a configuration, since the connection mechanism becomes simple, the productivity or the maintenance workability is improved. Further, the stability of the telescopic movement of the link mechanism is improved.

Further, the front suspension device 50D may have a configuration in which a damper serving as a cushion mechanism is provided in the link mechanism 405D instead of the link bars 407D and 408D. That is, a damper may be provided between the support member 406D and the bracket 65D and between the support member 406D and the bracket 66D. With such a configuration, since an impact between the vehicle body frame 10C and the front crawler traveling device 30C can be more effectively reduced, the vehicle travels stably and the riding comfort is improved.

Figure 51:
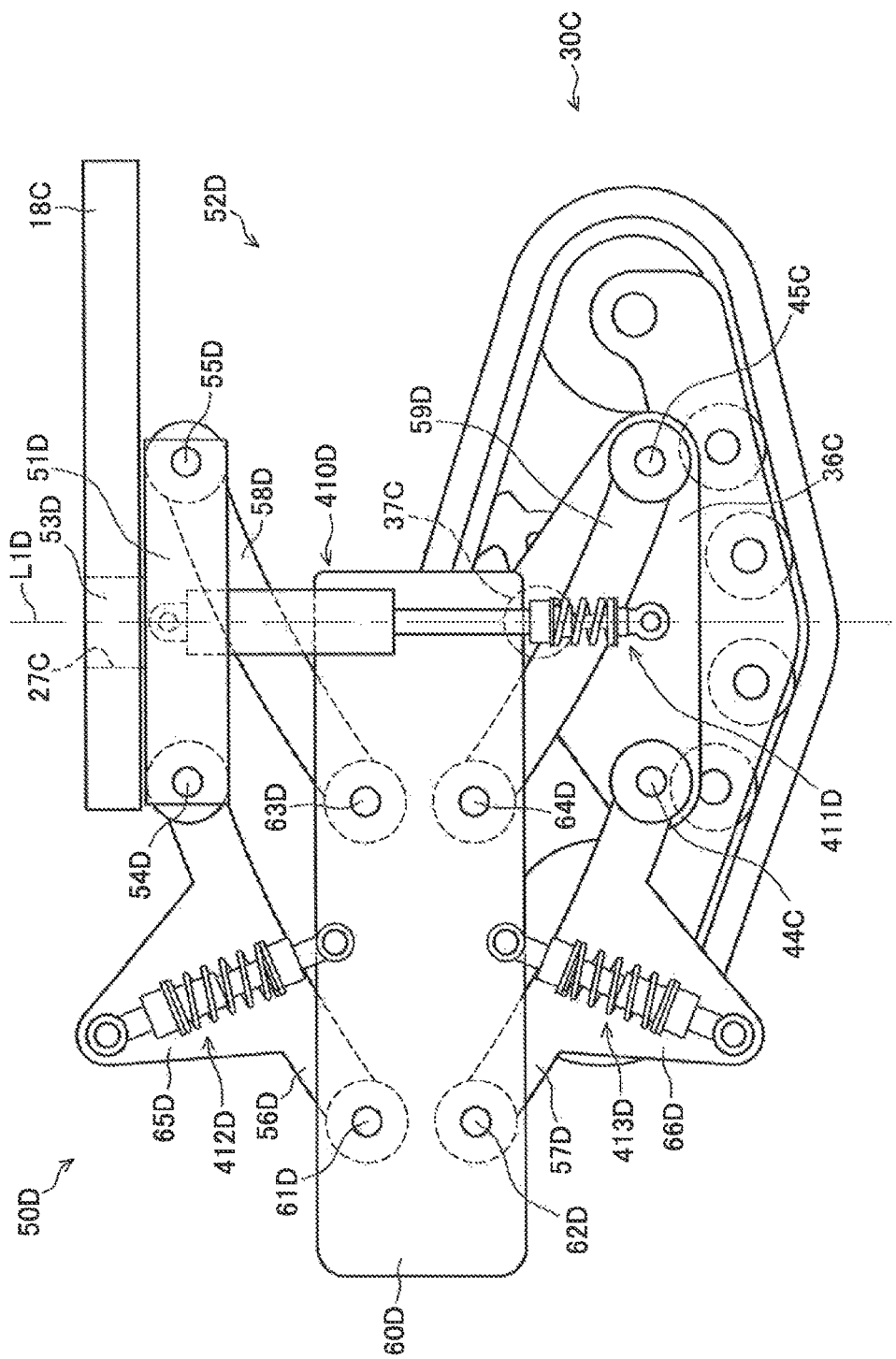
FIG. 51 is a side view illustrating an example of a front suspension device according to another embodiment when viewed from the inside of the vehicle.

Further, the elevation device is not limited to the cylinder 400D. For example, as illustrated in FIG. 51, the elevation device may include a cylinder 410D which is provided between the bogie frame 51D and the front crawler traveling device 30C. One end of the cylinder 410D is attached to the bogie frame 51D to be rotatable about the horizontal direction serving as an axis. The other end of the cylinder 410D is attached to the connection frame 36C of the front crawler traveling device 30C through a damper 411D serving as a cushion mechanism to be rotatable about the horizontal direction serving as an axis.

Further, in the configuration illustrated in FIG. 51, dampers 412D and 413D serving as cushion mechanisms are provided. One end of the damper 412D is rotatably attached to the bracket 65D of the first link member 56D and the other end thereof is rotatably attached to the fifth link member 60D. One end of the damper 413D is rotatably attached to the bracket 66D of the second link member 57D and the other end thereof is rotatably attached to the fifth link member 60D. Two dampers 412D and 413D are disposed at vertically symmetrical positions with respect to the fifth link member 60D. And two dampers 412D and 413D generate the same cushion force while moving in a telescopic manner.

Thus, when the cylinder 410D is moved in a telescopic manner, the front crawler traveling device 30C can be elevated in the vertical direction along the rotation shaft 53D (the line L1D) serving as the steering shaft. With such a configuration, a force generated by the telescopic movement of the cylinder 410D serving as the elevation device is exerted in the vertical direction and thus the front crawler traveling device 30C can be elevated more effectively. Thus, since the configuration of the cylinder 410D can be decreased in size, the productivity is improved. Further, an impact between the vehicle body frame 10C and the front crawler traveling device 30C is reduced by the dampers 411D, 412D, and 413D serving as the cushion mechanisms. Thus, the front crawler traveling device 30C stably contacts a ground and the traveling performance or the riding comfort is improved. Additionally, the fifth link member 60D of this example is shortened such that the rear portion equipped with the cylinder liner 402D is partially removed.

Figure 52:
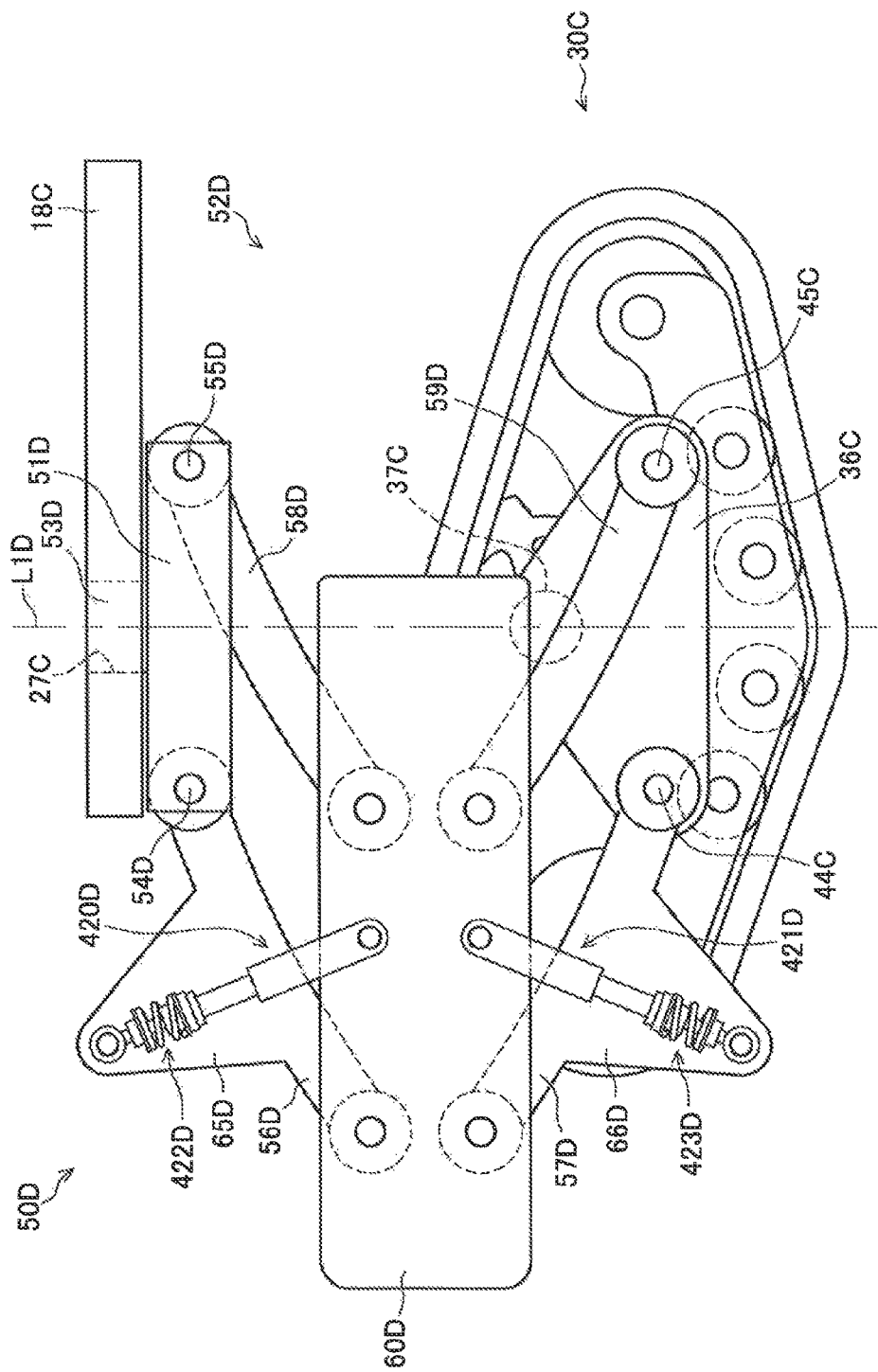
FIG. 52 is a side view illustrating an example of a front suspension device according to another embodiment when viewed from the inside of the vehicle.

Further, the elevation device may include two cylinders 420D and 421D as illustrated in FIG. 52. One end of the cylinder 420D is rotatably attached to the bracket 65D of the first link member 56D through a damper 422D serving as a cushion mechanism and the other end thereof is rotatably attached to the fifth link member 60D. One end of the cylinder 421D is rotatably attached to the bracket 66D of the second link member 57D through a damper 423D serving as a cushion mechanism and the other end thereof is rotatably attached to the fifth link member 60D. Two cylinders 420D and 421D are disposed at vertically symmetrical positions with respect to the fifth link member 60D. Further, two cylinders 420D and 421D are connected side by side within a hydraulic circuit and two cylinders 420D and 421D perform the same telescopic operation at all times.

Thus, when the cylinders 420D and 421D are moved in a telescopic manner, the front crawler traveling device 30C is elevated in the vertical direction along the rotation shaft 53D (the line L1D) serving as the steering shaft. With such a configuration, the cylinders 420D and 421D can be decreased in size and the productivity is improved. Additionally, since the cylinders 420D and 421D are connected side by side within a hydraulic circuit, there is no need to separately control the cylinders and the control configuration is simple. Further, an impact between the vehicle body frame 10C and the front crawler traveling device 30C is reduced by the dampers 422D and 423D serving as the cushion mechanisms. Accordingly, the front crawler traveling device 30C stably contacts a ground and the traveling performance or the riding comfort is improved.

Figure 53:
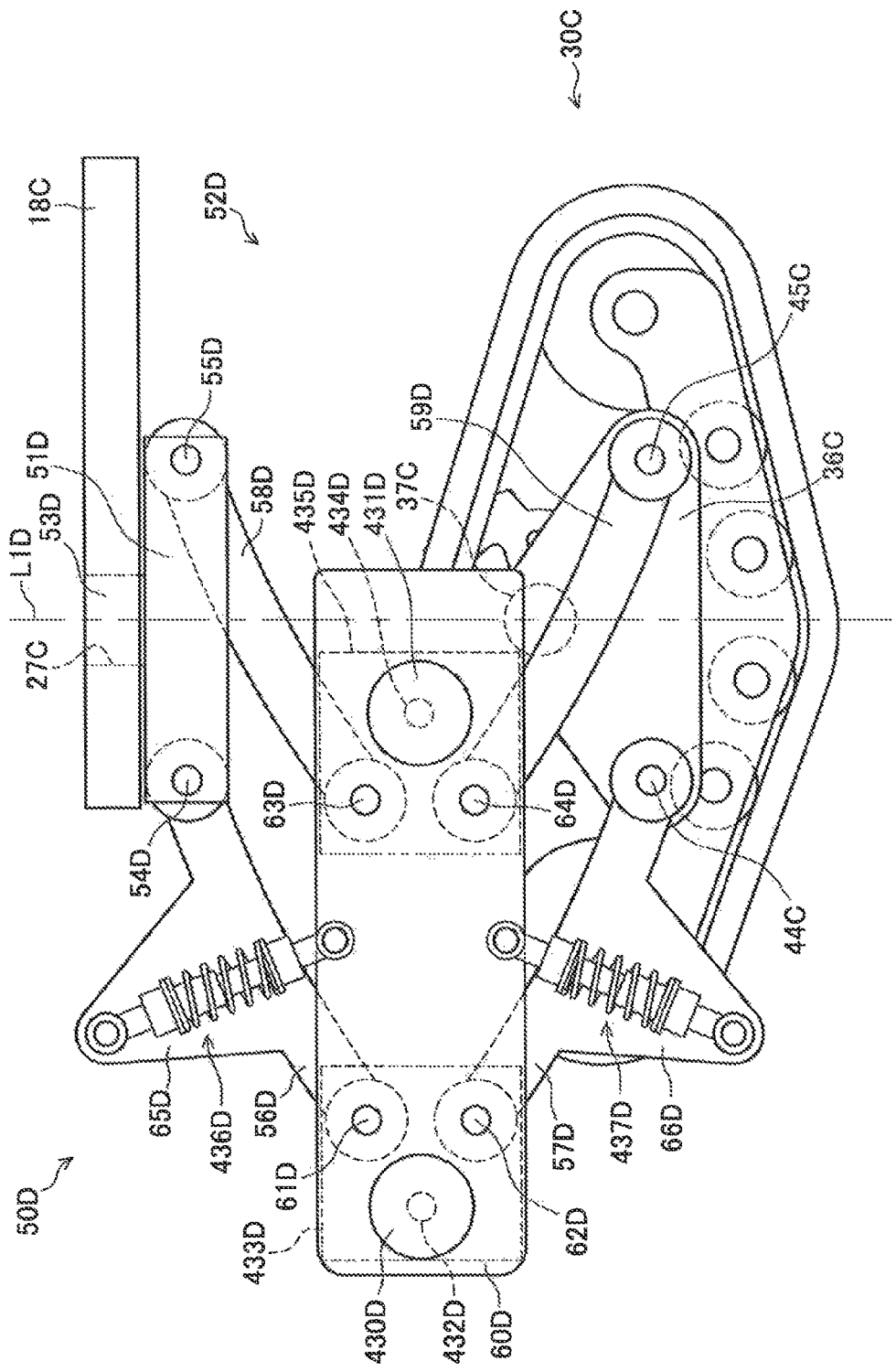
FIG. 53 is a side view illustrating an example of a front suspension device according to another embodiment when viewed from the inside of the vehicle.

Further, the elevation device may include a first motor 430D and a second motor 431D serving as electric motors as illustrated in FIG. 53. The first motor 430D and the second motor 431D are connected to the battery and the controller CC (not illustrated). The first motor 430D and the second motor 431D are driven by the electric power of the battery and are controlled by the controller CC.

The first motor 430D is attached to the plate-shaped member disposed at the inside of the vehicle of the fifth link member 60D in the vicinity of the connection portion 61D and the connection portion 62D. A drive shaft 432D of the first motor 430D protrudes into a gear box 433D provided between two plate-shaped members of the fifth link member 60D. Then, the drive shaft 432D of the first motor 430D is connected in an interlocking manner to the connection portion 61D of the first link member 56D and the connection portion 62D of the second link member 57D through a plurality of gears (not illustrated) inside the gear box 433D.

Then, when the drive shaft 432D of the first motor 430D rotates, the first link member 56D rotates about the connection portion 61D with respect to the fifth link member 60D and the second link member 57D rotates about the connection portion 62D with respect to the fifth link member 60D. Here, the rotation directions of the first link member 56D and the second link member 57D in response to the rotation of the drive shaft 432D of the first motor 430D are opposite to each other and the rotation amounts (the rotation angles) thereof are equal to each other. That is, in FIG. 53, for example, when the first link member 56D rotates about the connection portion 61D in the counter-clockwise direction by an angle θD, the second link member 57D rotates about the connection portion 62D in the clockwise direction by an angle θD.

Similarly to the first motor 430D, the second motor 431D is attached to the plate-shaped member disposed at the inside of the vehicle of the fifth link member 60D in the vicinity of the connection portion 63D and the connection portion 64D. A drive shaft 434D of the second motor 431D protrudes into a gear box 435D provided between two plate-shaped members of the fifth link member 60D. Then, the drive shaft 434D of the second motor 431D is connected in an interlocking manner to the connection portion 63D of the third link member 58D and the connection portion 64D of the fourth link member 59D through a plurality of gears (not illustrated) inside the gear box 435D.

Then, when the drive shaft 434D of the second motor 431D rotates, the third link member 58D rotates about the connection portion 63D with respect to the fifth link member 60D and the fourth link member 59D rotates about the connection portion 64D with respect to the fifth link member 60D. Here, the rotation directions of the third link member 58D and the fourth link member 59D in response to the rotation of the drive shaft 434D of the second motor 431D are opposite to each other and the rotation amounts (the rotation angles) are equal to each other. That is, in FIG. 53, for example, when the third link member 58D rotates about the connection portion 63D in the counter-clockwise direction by an angle θD, the fourth link member 59D rotates about the connection portion 64D in the clockwise direction by an angle θD. Additionally, dampers 436D and 437D which are similar to the dampers 412D and 413D illustrated in FIG. 51 are provided between each of the first link member 56D and the second link member 57D and the fifth link member 60D.

Thus, the link mechanism 52D moves in a telescopic manner in the vertical direction by the control of the rotation directions and the rotation amounts of the first motor 430D and the second motor 431D. And the front crawler traveling device 30C is elevated in the vertical direction along the rotation shaft 53D (the line L1D) serving as the steering shaft. With such a configuration, the elevation device is easily controlled, the responsiveness of the elevation device is fast, and a desired elevation operation can be performed. Further, an impact between the vehicle body frame 10C and the front crawler traveling device 30C is reduced by the dampers 436D and 437D serving as the cushion mechanisms. Accordingly, the front crawler traveling device 30C stably contacts a ground and the traveling performance or the riding comfort is improved.

Additionally, the elevation direction of the front crawler traveling device 30C is determined by the lengths or the arrangement of the link members 56D, 57D, 58D, 59D, and 60D and the configuration of the first motor 430D and the second motor 431D serving as the elevation device. Each configuration is appropriately designed so that the front crawler traveling device 30C is elevatable in the vertical direction along the rotation shaft 53D (the line L1D) serving as the steering shaft.

Additionally, the arrangement of the first motor 430D and the second motor 431D is not limited to the above-described configuration. For example, the first and second motors may be disposed between the plate-shaped member of the fifth link member 60D disposed on the inside of the vehicle and the plate-shaped member of the fifth link member 60D disposed on the outside of the vehicle. With such a configuration, the first motor 430D and the second motor 431D do not protrude, a space can be effectively used, and the vehicle does not increase in size. Further, the first motor 430D and the second motor 431D can be protected by the fifth link member 60D.

Further, the motor serving as the elevation device may include the first motor 430D or the second motor 431D. Here, the first motor 430D can rotate the first link member 56D and the second link member 57D in the opposite directions with respect to the fifth link member 60D so that the rotation amounts (the rotation angles) are equal to each other. Thus, the front crawler traveling device 30C can be elevated in the vertical direction along the rotation shaft 53D (the line L1D) serving as the steering shaft only by the first motor 430D. Further, the second motor 431D can rotate the third link member 58D and the fourth link member 59D in the opposite directions with respect to the fifth link member 60D so that the rotation amounts (the rotation angles) are equal to each other. Thus, the front crawler traveling device 30C can be elevated in the vertical direction along the rotation shaft 53D (the line L1D) serving as the steering shaft only by the second motor 431D. Thus, the front crawler traveling device 30C can be elevated by the first motor 430D or the second motor 431D. With such a configuration, since the front crawler traveling device 30C can be elevated by the control of one motor, a control is simple.

Further, the first motor 430D or the second motor 431D serving as the elevation device may be operated as a generator so that electric power is stored in a battery. With such a configuration, the elevation energy of the front crawler traveling device 30C can be regenerated as electric energy and thus the traveling vehicle 1C can perform energy-efficient traveling.

Further, as an example of such a configuration, the first motor 430D is operated as a generator so that electric power is stored in a battery and the second motor 431D is operated as an electric motor. When the front crawler traveling device 30C is moved downward, that is, the link mechanism 52D is lengthened in the vertical direction, the first motor 430D is stopped and the second motor 431D is operated as the electric motor. Accordingly, the link mechanism 52D is lengthened by the driving power of the second motor 431D. When the front crawler traveling device 30C is moved upward, that is, the link mechanism 52D is shortened in the vertical direction, the first motor 430D is operated as the generator and the second motor 431D is stopped to be a passive state (a torque free state) so that the link mechanism 52D is shortened. Here, when the second motor 431D is stopped, a force of supporting the link mechanism 52D by the second motor 431D disappears so that the link mechanism 52D is shortened by the weight of the vehicle body frame 10C or the occupant. When the link mechanism 52D is shortened by the weight of the vehicle body frame 10C or the occupant, the first motor 430D is operated as the generator so that energy is regenerated.

Additionally, the first motor 430D and the second motor 431D may be selectively operated as the electric motor or the generator. With such a configuration, the front crawler traveling device 30C can be moved downward and the energy can be regenerated by two motors. Accordingly, the front crawler traveling device 30C can be promptly moved downward and the energy regeneration efficiency is improved. Further, since two motors can be selectively operated as the electric motor and the generator in response to the travel state, the traveling vehicle 1C can perform more energy-efficient traveling.

Additionally, the driving of the first motor 430D and the second motor 431D and the selection of the electric motor and the generator is not particularly limited. Here, a control may be performed in response to the travel state. For example, similarly to the control of the cylinder 400D, the ON/OFF control of driving the first motor 430D and the second motor 431D as the electric motor or the control of selecting the electric motor and the generator may be performed in response to the travel state.

Here, since there is a need to continuously driving the first motor 430D and the second motor 431D as the electric motors in order to keep the front crawler traveling device 30C at a predetermined elevation position, the electric power consumption amount increases. Here, for example, only when the front crawler traveling device 30C is largely elevated, the first motor 430D and the second motor 431D are driven as the electric motors. In the other case, the driving is stopped to become a passive state (a torque free state). With such a control configuration, since the driving time of the first motor 430D and the second motor 431D serving as the electric motors is reduced, the traveling vehicle 1C can perform energy-efficient traveling. Additionally, the link mechanism 52D is supported by the dampers 436D and 437D serving as the cushion mechanisms in a state where the first motor 430D and the second motor 431D are stopped.

Further, when the driving of the first motor 430D and the second motor 431D serving as the electric motors is stopped, the first motor 430D and the second motor 431D may be operated as the generators. When the vehicle travels on a travel road having a small difference in height of an unevenness portion, an impact caused by the unevenness portion is reduced by the dampers 436D and 437D, but the link mechanism 52D moves in a telescopic manner in response to the unevenness portion. Thus, the first motor 430D and the second motor 431D can be operated as the generators so that energy is regenerated. Additionally, the invention is not limited to the control of the first motor 430D and the second motor 431D by the controller CC. For example, the ON/OFF control for the driving or the selection control for the electric motor or the generator may be performed in response to the operation of the occupant.

Further, the elevation device may be a combination of the above-described elevation device. For example, a combination of the cylinder 400D illustrated in FIG. 48 and the first motor 430D and the second motor 431D illustrated in FIG. 53 may be used. With such a configuration, the front crawler traveling device 30C can be elevated by the cylinder 400D, the first motor 430D, or the second motor 431D and the energy can be regenerated by the first motor 430D or the second motor 431D. Thus, since the operation of the cylinder 400D and the operations of the first motor 430D and the second motor 431D serving as the electric motors or the generators can be used in combination in response to the elevation of the front crawler traveling device 30C, energy regeneration efficiency is improved.

Further, the first motor 430D and the second motor 431D are not limited to the electric motors, but may be hydraulic motors. In the case of such a configuration, for example, one motor is configured as a hydraulic motor serving as an elevation device elevating the front crawler traveling device 30C and the other motor is configured as an electric motor serving as a generator. Accordingly, energy can be regenerated.

Further, the cushion mechanism is not limited to the damper including the spring, the cylinder, and the like. Any structure capable of reducing an impact between the vehicle body frame 10C and the front crawler traveling device 30C may be provided. And a structure only including a spring or a cylinder may be used.

Further, the link mechanism may include a neutral position keeping mechanism that applies a force to the front crawler traveling device 30C in a direction opposite to the elevation direction. For example, a link mechanism 152D illustrated in FIG. 54 includes three springs 500D, 501D, and 502D serving as elastic members in the link mechanism 52D of FIG. 48.

A front portion of the fifth link member 60D is provided with a bracket 503D which extends upward and a bracket 504D which extends downward. The spring 500D is provided instead of the cylinder 400D and is disposed such that one end is attached to the fifth link member 60D and the other end is attached to the support member 407D. Then, the spring 500D is disposed at the center of the fifth link member 60D in the vertical direction, that is, the center of the link mechanism 152D in the vertical direction. One end of the spring 501D is attached to the bracket 503D and the other end thereof is attached to the connection portion between the link bar 407D and the bracket 65D. One end of the spring 502D is attached to the bracket 504D and the other end thereof is attached to the connection portion between the link bar 408D and the bracket 66D. Then, two springs 501D and 502D are disposed at vertically symmetrical positions with respect to the fifth link member 60D.

Three springs 500D, 501D, and 502D are all movable in a telescopic manner in the longitudinal direction and telescopic bar-shaped members 505D, 506D, and 507D are respectively inserted through the springs 500D, 501D, and 502D. The bar-shaped members 505D, 506D, and 507D are used as guides when the springs 500D, 501D, and 502D move in a telescopic manner and are used to prevent the bending of the springs 500D, 501D, and 502D in a shortened state. Additionally, three springs 500D, 501D, and 502D are all attached in a shortened state to cause a lengthening force (an elastic force). Additionally, the elevation device includes the first motor 430D and the second motor 431D disposed between the plate-shaped member of the fifth link member 60D disposed on the inside of the vehicle and the plate-shaped member of the fifth link member 60D disposed on the outside of the vehicle.

Figure 54:
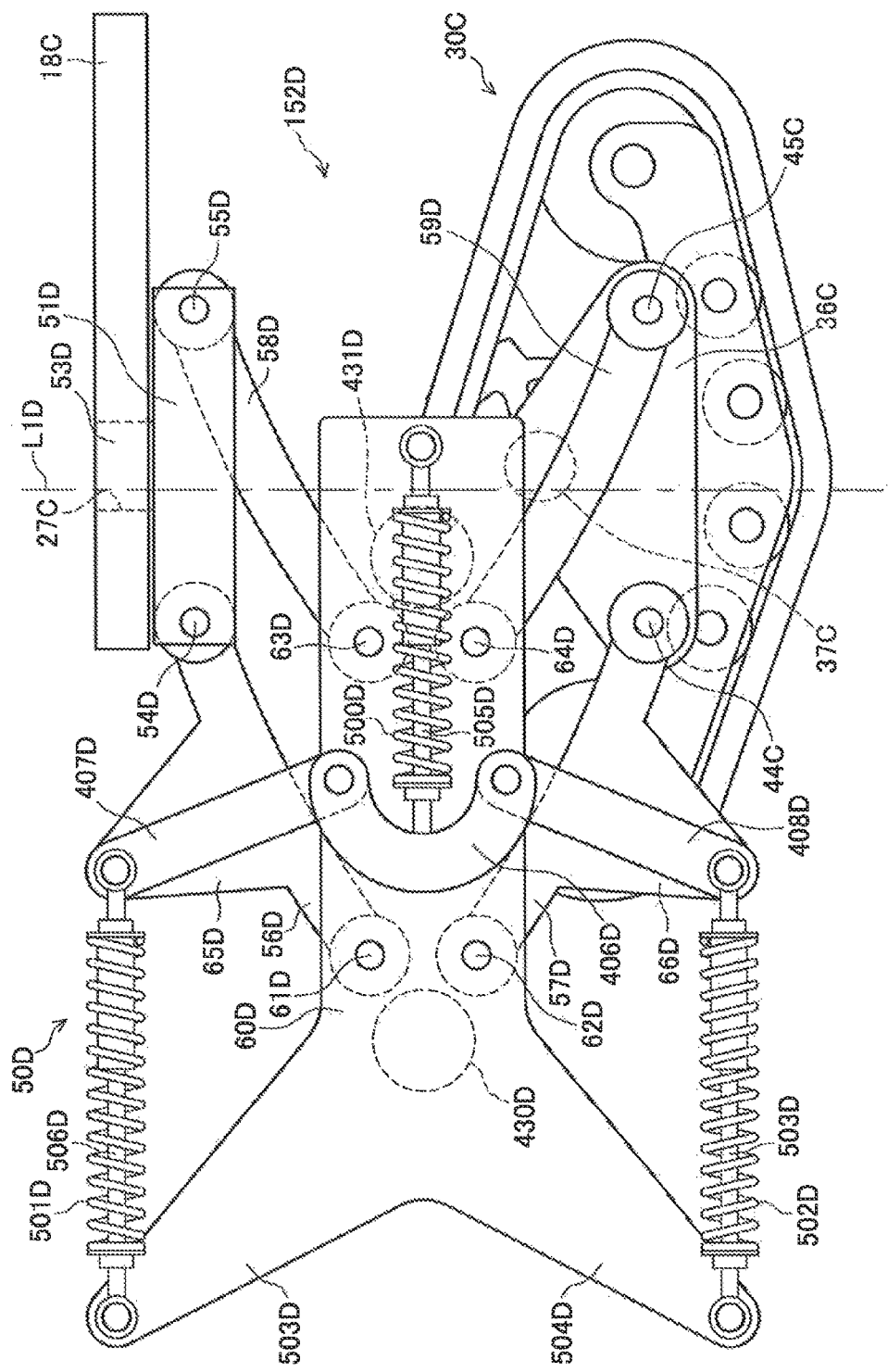
FIG. 54 is a side view illustrating an example of a front suspension device according to another embodiment when viewed from the inside of the vehicle.

Here, FIG. 54 illustrates a state where the traveling vehicle 1C is stopped on a flat ground and the front crawler traveling device 30C is located at a neutral position in the vertical direction. Then, the link mechanism 152D is supported while keeping a balance among the elastic force of the spring 500D, the load of the traveling vehicle 1C applied to the link mechanism 152D, and the elastic forces of two springs 501D and 502D. Additionally, the neutral position indicates the center of the elevatable range of the front crawler traveling device 30C in the vertical direction.

When the link mechanism 152D with such a configuration is lengthened in the vertical direction from the state of FIG. 54 and the front crawler traveling device 30C moves downward, the spring 500D is lengthened so that the elastic force decreases and two springs 501D and 502D are shortened so that the elastic forces increase. Thus, the balance of the forces of the springs 500D, 501D, and 502D applied to the link mechanism 152D is not kept. Accordingly, a force of shortening the link mechanism 152D in the vertical direction, that is, a force of moving the front crawler traveling device 30C upward acts on the link mechanism 152D.

Further, when the link mechanism 152D is shortened in the vertical direction from the state of FIG. 54 so that the front crawler traveling device 30C moves upward, the spring 500D is shortened so that the elastic force increases and two springs 501D and 502D are lengthened so that the elastic forces decrease. Thus, the balance of the forces of the springs 500D, 501D, and 502D applied to the link mechanism 152D is not kept. Accordingly, a force of lengthening the link mechanism 152D in the vertical direction, that is, a force of moving the front crawler traveling device 30C downward acts on the link mechanism 152D.

Thus, the above-described mechanism including the springs 500D, 501D, and 502D is used to apply a force to the front crawler traveling device 30C in a direction opposite to the elevation direction and this force is used to return the front crawler traveling device 30C to a neutral position. That is, the above-described mechanism is a neutral position keeping mechanism that keeps the front crawler traveling device 30C at a neutral position in the vertical direction. Then, since such a neutral position keeping mechanism is provided, it is possible to prevent a problem in which the front crawler traveling device 30C excessively follows an unevenness portion of an irregular ground when the vehicle travels on the irregular ground with the unevenness portion and to improve the traveling performance. Further, when the first motor 430D and the second motor 431D are operated as the generators in response to the elevation of the front crawler traveling device 30C, that is, the telescopic movement of the link mechanism 152D, energy can be regenerated effectively.

Additionally, the neutral position keeping mechanism is not limited to the above-described configuration and may be a mechanism that applies a force in a direction opposite to the elevation direction in response to the elevation of the front crawler traveling device 30C. For example, a combination of the damper serving as the cushion mechanism may be used.

Further, two springs 501D and 502D may be formed as one new spring. In this way, two springs may be obtained. Here, the new spring is arrange coaxially with the spring 500d and longitudinally symmetrical to the spring 500D with respect to the support member 406D. Here, one end is attached to the support member 406D and the other end is attached to the fifth link member 60D. With such a configuration, since the neutral position keeping mechanism becomes simple, the productivity or the maintenance workability is improved. Additionally, in the case of the configuration including three springs 500D, 501D, and 502D, a force of the spring 501D exerted on the first link member 56D and a force of the spring 502D exerted on the second link member 57D can be separately adjusted. And the Setting for the telescopic operation of the link mechanism 152D in the vertical direction can be easily adjusted.

Further, the connection mechanism may include a telescopic cylinder instead of the link mechanism 52D illustrated in FIG. 48. The cylinder is disposed along the line L1D in the side view. Here, one end is fixed to the bogie frame 51D and the other end is attached to the connection frame 36C of the front crawler traveling device 30C to be rotatable about the horizontal direction serving as an axis. With such a configuration, since the connection between the front crawler traveling device 30C and the bogie frame 51D and the elevation of the front crawler traveling device 30C can be performed by one cylinder mechanism, the productivity or the maintenance workability is improved. Additionally, one end of the cylinder may be provided with a damper serving as a cushion mechanism and the cylinder may be attached to the front crawler traveling device 30C through the damper.

Further, the rear crawler traveling device 70C may also include a swing device that allows a swing in the vertical direction similarly to the elevation device of the front crawler traveling device 30C. For example, as the swing device, a cylinder is provided to forcedly rotate the swing arm 93C of the rear suspension device 90C illustrated in FIGS. 40 and 41 with respect to the vehicle body frame 10C. Here, since the right and left rear crawler traveling devices 70CR and 70CL are connected to each other through the swing arm 93C, the right and left rear crawler traveling devices 70CR and 70CL can be swung in the vertical direction by the rotation of the swing arm 93C.

The cylinder serving as the swing device is disposed to extend in the substantially vertical direction so that one end is attached to the swing arm 93C to be rotatable about the longitudinal direction serving as an axis. Further, the other end of the cylinder is attached to the vehicle body frame 10C to be rotatable about the longitudinal direction serving as an axis. Then, when the cylinder is moved in a telescopic manner, the swing arm 93C is rotated with respect to the vehicle body frame 10C.

In this way, since the swing device that swings the rear crawler traveling device 70C in the vertical direction is provided, the right and left rear crawler traveling devices 70CR and 70CL can be swung in the vertical direction to follow an unevenness portion of a ground or an inclination of a slope. And the traveling performance for the irregular ground is further improved.

Figure 55:
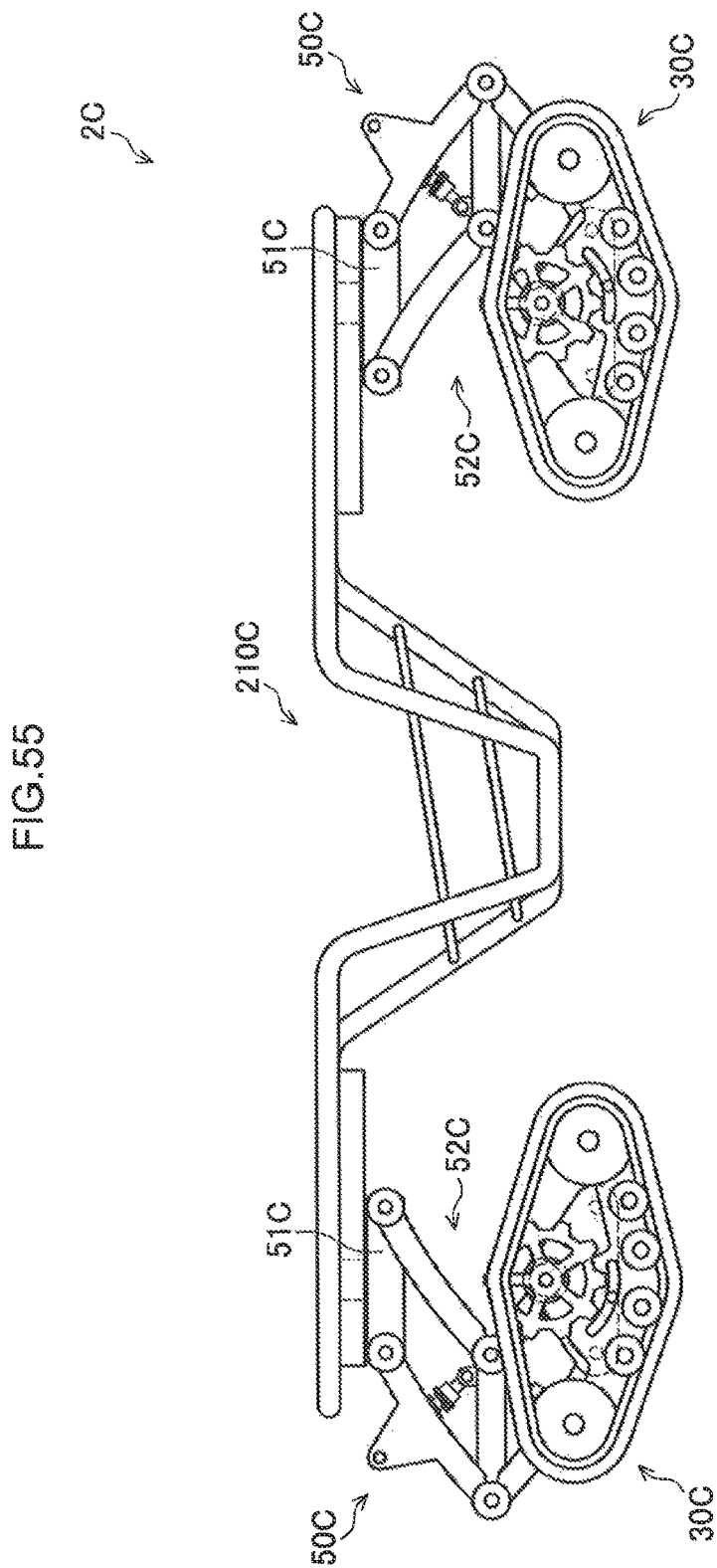
FIG. 55 is a right side view mainly illustrating a configuration of a vehicle body frame and a suspension device of an example of a traveling vehicle according to another embodiment.

Further, as illustrated in FIG. 55, the traveling vehicle according to the embodiment may be a traveling vehicle 2C in which the rear crawler traveling device 70C and the rear suspension device 90C of the traveling vehicle 1C have the same configurations as those of the front crawler traveling device 30C and the front suspension device 50C. With such a configuration, the number of components is decreased and thus the productivity is improved. Further, the traveling vehicle 2C can perform various traveling operations. For example, the vehicle can perform a turning operation at the smaller radius or a traveling operation in the lateral direction without changing the direction of the vehicle body frame 210C.

Here, the rear suspension device of the traveling vehicle 2C is disposed so that the link mechanism 52C is bent in a direction opposite to the front suspension device 50C. That is, the link mechanism 52C is bent toward the rear side of the vehicle body frame 210C at the outside of the bogie frame 51C. Thus, the link mechanisms 52C and 52C of the front and rear suspension devices are all bent outward from the traveling vehicle 2C. Here, since there is no need to ensure a space for bending the link mechanisms 52C and 52C at the inside of the vehicle, the entire length of the traveling vehicle 2C can be shortened. Additionally, the front and rear suspension devices of the traveling vehicle 2C may be the front suspension device 50D with the elevation device.

Figure 56:
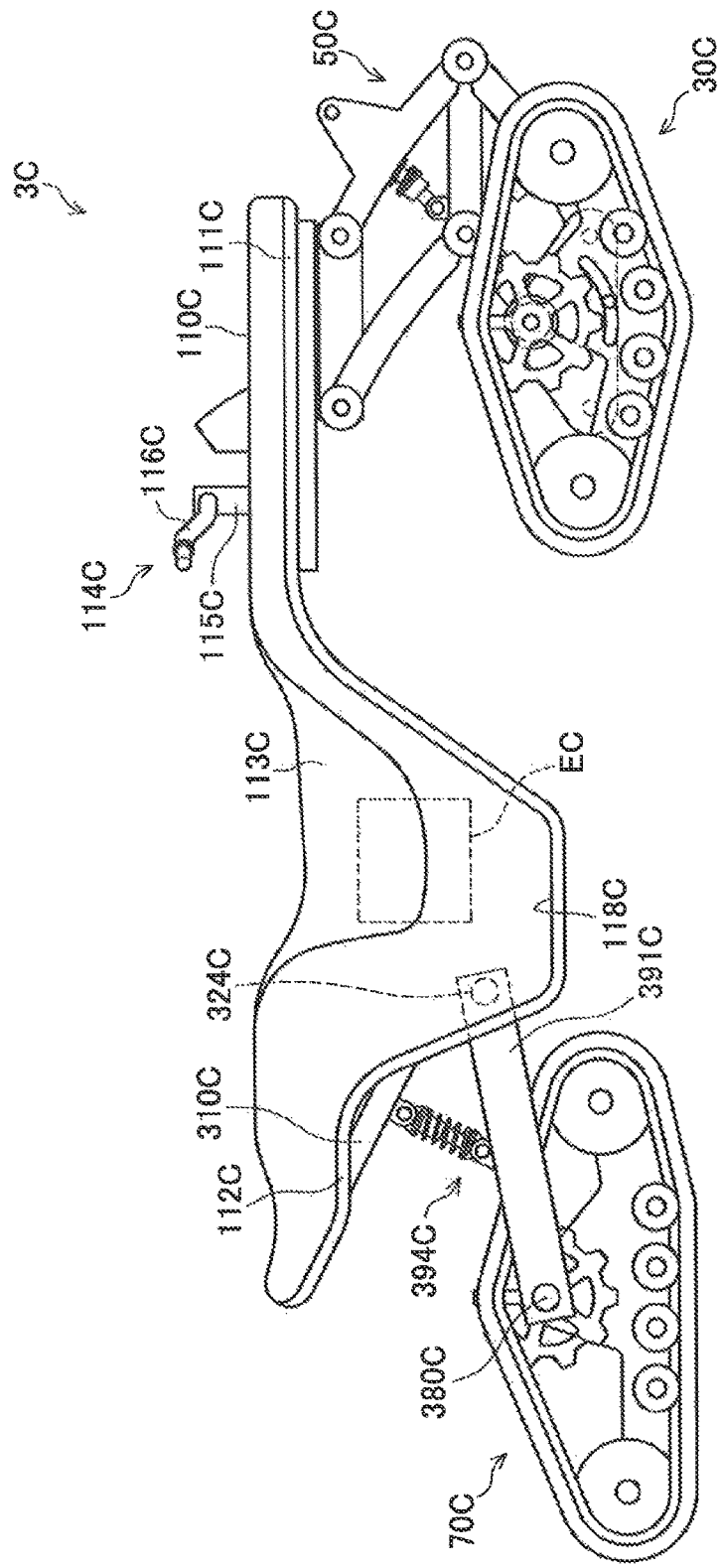
FIG. 56 is a right side view illustrating an example of a traveling vehicle according to another embodiment.

Further, the traveling vehicle according to the embodiment is not limited to a configuration including four front, rear, right, and left crawler traveling devices 30CR, 30CL, 70CR, and 70CL similarly to the traveling vehicles 1C and 2C. The vehicle may travel by using at least a pair of right and left traveling devices. For example, as illustrated in FIG. 56, a traveling vehicle 3C may be used in which only one of the rear crawler traveling devices 70CR and 70CL of the traveling vehicle 1C is provided. The traveling vehicle 3C has a configuration in which one rear crawler traveling device 70C is disposed at the center of the vehicle body frame 10C in the horizontal direction of the traveling vehicle 1C. The rear crawler traveling device 70C of the traveling vehicle 3C is located between a pair of right and left pulling arms 391C and 391C extending in the longitudinal direction and is suspended on the vehicle body frame 310C by the pulling arms 391C and 391C. The right and left pulling arms 391C and 391C are disposed such that one ends are connected to the vehicle body frame 310C to be rotatable about the horizontal direction serving as an axis (a rotation shaft 324C) and the other ends are connected to the rear crawler traveling device 70C to be rotatable about the horizontal direction serving as an axis (a rotation shaft 380C). Thus, the right and left pulling arms 391C and 391C suspend the rear crawler traveling device 70C on the vehicle body frame 310C to be swingable in the vertical direction.

Additionally, dampers 394C and 394C which are similar to the damper 94C are connected between the right and left pulling arms 391C and 391C and the vehicle body frame 310C. That is, the traveling vehicle 3C is configured to travel by three crawler traveling devices formed such that the front portions are provided with the pair of right and left front crawler traveling devices 30C and the rear portions are provided with one rear crawler traveling device 70C.

With such a configuration, the vehicle can stably travel on a slope or an irregular ground even in three traveling devices. Further, since the number of components can be decreased, the productivity and the maintenance workability are improved.

Further, the traveling devices of the traveling vehicles 1A, 1B, 1C, 2C, and 3C according to the embodiment are not limited to the crawler type traveling device, but may be a wheel type traveling device. With such a configuration, since the traveling device has a simple configuration, the number of components can be decreased and the productivity and the maintenance workability are improved. Additionally, when the vehicle travels on a soft ground or the like, a crawler type traveling device having a high gripping performance for the ground is desirable.

Further, the traveling vehicles 1A, 1B, 1C, 2C, and 3C according to the embodiment are not limited the saddle type traveling vehicle, but may be a traveling vehicle which has a cabin so that the occupant sits on a seat therein. A handle having a circular handle bar at an upper end of a steering shaft is provided at the front side of the seat. An accelerator pedal operated by a foot is provided below the handle. With such a configuration, the safety of the occupant is ensured by the cabin.

Instead of the steering and the accelerator pedal, a pair of right and left operation levers of which one ends are rotatably supported by the vehicle body frame to be inclined in the longitudinal direction may be provided. The operation lever is disposed at each of the right and left sides of the occupant sitting on the vehicle. The occupant operates the right operation lever by a right hand and operates the left operation lever by a left hand.

For example, in the traveling vehicle 1A, the driving of the right front and rear crawler traveling devices 30AR and 70AR is controlled on the basis of the inclination (the rotation angle) of the right operation lever in the longitudinal direction and the driving of the left front and rear crawler traveling devices 30AL and 70AL is controlled on the basis of the inclination (the rotation angle) of the left operation lever in the longitudinal direction. With such a configuration, since the occupant can perform the traveling operation of the working vehicle only by the inclination operations of the right and left operation lever, the traveling operation can be easily performed.

Additionally, when the traveling operation is performed by the right and left operation levers, the occupant cannot easily keep a posture by gripping the operation lever. Thus, it is desirable to use the traveling vehicle in which the occupant sits on a seat.

Further, the traveling vehicles 1A, 1B, 1C, 2C, and 3C according to the embodiment are not limited to the traveling vehicle on which the occupant sits as described above. That is, an unmanned traveling vehicle which can be operated from a remote place may be used. For example, a configuration may be employed in which a communication device connected to the controller CA of the traveling vehicle 1A is provided and the traveling vehicle 1A is operated by an external operation device from a remote place. Here, the communication device is used to wirelessly transmit and receive information. Accordingly, the traveling vehicle can transmit and receive information to and from the external operation device. With such a configuration, since a worker can operate the traveling vehicle 1A from a remote place, the working efficiency is improved and the safety of the worker can be ensured.

Additionally, in case of such a remote operation, the traveling vehicle 1A may further include an image capturing device capable of capturing at least an image in the traveling direction so that the captured image can be checked by the external operation device. With such a configuration, the worker can operate the traveling vehicle 1A from a remote place by checking the travel state of the traveling vehicle 1A even in a place where the traveling vehicle cannot be viewed.

Further, the invention is not limited to the above-described examples and may include all modifications within the scope of the invention.

INDUSTRIAL APPLICABILITY

The traveling vehicle of the invention is not particularly limited. The invention can be applied to all traveling vehicles, for example, a working vehicle such as a tractor, a combine, a transplanter, a construction machine, and a forestry machine used on an irregular ground, a transportation vehicle such as a forklift, and an automobile.

REFERENCE SIGNS LIST 1A, 1B, 1C, 2C, 3C Traveling vehicle
10A, 10B, 10C, 210C, 310C Vehicle body frame
30A, 30C Front crawler traveling device (traveling device)
50A, 50B, 50C, 50D Front suspension device
51A, 51B Rotation arm
51C, 51D Bogie frame
52C, 52D Link mechanism (connection mechanism)
53A, 53B Connection arm
54A, 54B Swing arm
70A, 70C Rear crawler traveling device (traveling device)
90A, 90B, 90C Rear suspension device
91A, 91B Rotation arm
93A, 93B Connection arm
94A, 94B Swing arm
200B, 220B Motor casing (swing support portion)
210B, 230B Damper (cushion mechanism)
400D, 410D, 420D, 421D Cylinder (elevation device)
430D First motor (elevation device)
431D Second motor (elevation device)

The invention claimed is:
1. A traveling vehicle comprising:
a vehicle body frame;
a pair of front crawler traveling devices;
a pair of rear crawler traveling devices;
a front suspension device that suspends the pair of front crawler traveling devices on the vehicle body frame; and
a rear suspension device that suspends the pair of rear crawler traveling devices on the vehicle body frame,
wherein the front suspension device integrally suspends the pair of front crawler traveling devices on the vehicle body frame and allows the pair of front crawler traveling devices to be swingable or elevatable in a vertical direction with respect to the vehicle body frame, and
wherein the front suspension device includes:
a rotation arm that extends in a horizontal direction and is supported by a swing support portion to be rotatable at a center of the rotation arm in the horizontal direction,
a right swing arm that is supported by the vehicle body frame to be swingable in the vertical direction about the horizontal direction serving as an axis and has an end connected to the right front crawler traveling device,
a left swing arm that is supported by the vehicle body frame to be swingable in the vertical direction about the horizontal direction serving as an axis and has an end connected to the left front crawler traveling device,
a right connection arm that has a first end connected to a right end of the rotation arm and a second end connected to the right swing arm, and
a left connection arm that has a first end connected to a left end of the rotation arm and a second end connected to the left swing arm.
2. The traveling vehicle according to claim 1,
wherein the swing support portion is supported by the vehicle body frame to be swingable in the vertical direction about the horizontal direction serving as an axis, and
wherein the traveling vehicle further comprises a cushion mechanism that is provided between the vehicle body frame and the swing support portion.
3. A traveling vehicle, comprising:
a vehicle body frame;
a pair of front crawler traveling devices;
a pair of rear crawler traveling devices;
a front suspension device that suspends the pair of front crawler traveling devices on the vehicle body frame; and a rear suspension device that suspends the pair of rear crawler traveling devices on the vehicle body frame, wherein the front suspension device integrally suspends the pair of front crawler traveling devices on the vehicle body frame and allows the pair of front crawler traveling devices to be swingable or elevatable in the vertical direction with respect to the vehicle body frame, wherein the front suspension device includes:
- a bogie frame that is supported by the vehicle body frame to be rotatable about a steering shaft serving as an axis and provided in the vertical direction, and
- a pair of connection mechanisms that respectively connects the pair of front crawler traveling devices to right and left sides of the bogie frame, and
- wherein the pair of connection mechanisms allows the pair of front crawler traveling devices to be elevatable in the direction of the steering shaft.

4. The traveling vehicle according to claim 3, wherein the front suspension device further includes:
- an elevation device that elevates the front crawler traveling device.

5. A traveling vehicle, comprising:
a vehicle body frame having a longitudinal axis;
a pair of crawler traveling devices;
a suspension device, the suspension device comprising:
- a rotation arm pivotable mounted on an axis extending in a direction of the longitudinal axis of the vehicle body frame;
- a connection aim extending downwardly and rearwardly from each end of the rotation arm;
- a first arm extending rearwardly from each connection arm; and
- a swing arm extending upwardly and forwardly from each first arm,
- wherein one of the crawler traveling devices of the pair of crawler traveling devices is connected to each swing arm.

6. The traveling vehicle of claim 5, further comprising a motor connected to a center of the rotation arm.

7. The traveling vehicle of claim 6, further comprising a damper connected to the motor, the damper being below the motor.

8. The traveling vehicle of claim 5, wherein the connection arms each have a variable length.

9. The traveling vehicle of claim 5, wherein each swing arm has a forked end.

10. The traveling vehicle of claim 9, wherein a rotation shaft extends across the forked end of each swing arm, the rotation shaft connected to one of the crawler traveling devices.

\* \* \* \* \*